(12) United States Patent
Garrett

(10) Patent No.: US 6,926,241 B2
(45) Date of Patent: Aug. 9, 2005

(54) ROOFMATES™ ROOFING ACCESSORIES

(75) Inventor: Robert Garrett, Severn, MD (US)

(73) Assignee: Roofmates, Inc., Severn, MD (US)

( * ) Notice: Subject to any disclaimer, the term of this patent is extended or adjusted under 35 U.S.C. 154(b) by 124 days.

(21) Appl. No.: 10/388,642

(22) Filed: Mar. 17, 2003

(65) Prior Publication Data

US 2003/0230451 A1 Dec. 18, 2003

Related U.S. Application Data

(63) Continuation-in-part of application No. 10/050,964, filed on Jan. 22, 2002, now Pat. No. 6,745,869.
(60) Provisional application No. 60/365,538, filed on Mar. 20, 2002, provisional application No. 60/262,650, filed on Jan. 22, 2001, provisional application No. 60/286,527, filed on Apr. 27, 2001, provisional application No. 60/297,530, filed on Jun. 13, 2001, provisional application No. 60/304,098, filed on Jul. 11, 2001, and provisional application No. 60/426,808, filed on Nov. 18, 2002.

(51) Int. Cl.$^7$ .............................. A47B 96/06; E04G 3/00; E04G 5/02
(52) U.S. Cl. ............................. 248/229.1; 248/229.14; 182/107; 182/121
(58) Field of Search ..................... 182/45, 129, 107, 182/206, 214, 121, 127; 52/749.12; 248/210, 211, 238, 237, 229.1, 229.14, 229.24, 229.25, 228.5, 228.6, 230.5, 230.6, 231.61, 231.71

(56) References Cited

U.S. PATENT DOCUMENTS

| | | | |
|---|---|---|---|
| 3,603,431 A | * | 9/1971 | Nameche et al. ........... 182/206 |
| 4,074,792 A | | 2/1978 | Zaugg et al. ................ 182/150 |
| 4,398,620 A | | 8/1983 | Townsend .................... 182/45 |
| 4,412,599 A | | 11/1983 | McCrudden et al. ........ 182/201 |
| 4,450,935 A | | 5/1984 | Gustavus ..................... 182/45 |
| 4,957,185 A | | 9/1990 | Courchesne et al. ........ 182/150 |
| 5,249,397 A | | 10/1993 | Monaco ....................... 52/126.1 |
| 5,320,194 A | | 6/1994 | Bredijk ......................... 182/45 |
| 5,379,859 A | | 1/1995 | Pigman ........................ 182/45 |
| 5,601,154 A | | 2/1997 | Eisenmenger ................ 182/45 |
| 5,624,006 A | | 4/1997 | Richardson, Jr. ............ 182/45 |
| 5,664,391 A | | 9/1997 | Bartholomew ............... 57/714 |
| 5,664,643 A | * | 9/1997 | Taylor, Jr. .................... 182/214 |
| 5,862,880 A | | 1/1999 | Nelson et al. ................ 182/45 |
| 5,890,560 A | * | 4/1999 | Sloop .......................... 182/107 |
| 5,899,296 A | * | 5/1999 | Lantz .......................... 182/214 |
| 5,979,600 A | | 11/1999 | Bitner ......................... 182/45 |
| 6,167,987 B1 | | 1/2001 | Jensen ......................... 182/45 |
| 6,170,222 B1 | | 1/2001 | Miller ....................... 57/749.12 |
| 6,286,797 B1 | * | 9/2001 | Thaxton ................ 248/229.14 |

OTHER PUBLICATIONS

Roofmates™ brochure (undated) Circa 2001.
ABC Supply Co. Inc. Summary 2002 Catalog, p. 53, Aug. 1, 2002.
ABC Supply Co. Inc. Spring 2002 Catalog (copy provided in Parent).
ABC Supply Co. Inc. Spring 2001 Catalog.

* cited by examiner

Primary Examiner—Hugh B. Thompson, II
(74) Attorney, Agent, or Firm—Robert Platt Bell

(57) ABSTRACT

A number of roofing accessories, including a lightweight adjustable ladder and scaffold support are disclosed. The scaffold support includes a pair of rails at the standard spacing of most roof joists. Rods, connected to the rails, support an adjustable platform. An apparatus is also provided for supporting loads of materials or supplies on an inclined roof, using components and parts in common with the scaffold support, or components and parts similar thereto. A tool tray is provided which may be backed with a layer of foam to prevent the tray from slipping off the roof, while allowing the tray to be freely moved along and up and down the roof, as work progresses. In another embodiment of the present invention, a cooling system is provided to spray water on the face and neck area of an individual.

5 Claims, 170 Drawing Sheets

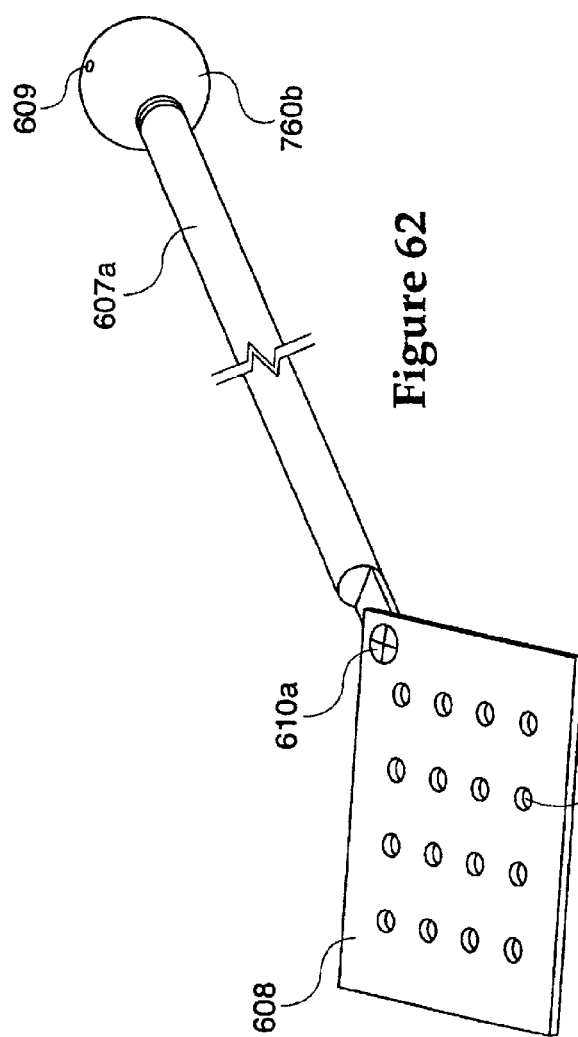
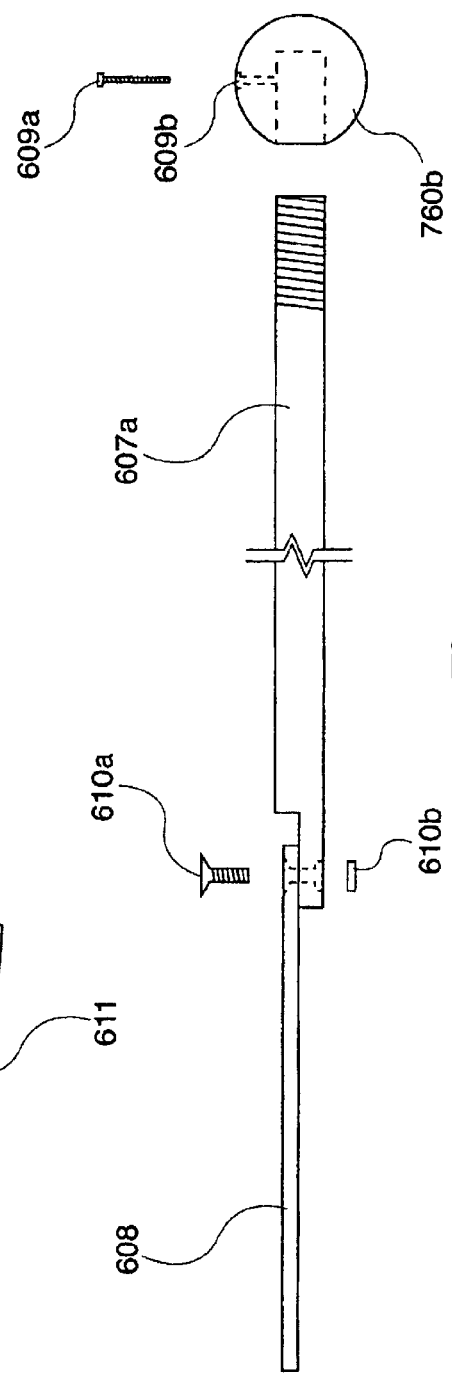
Figure 62
Figure 63

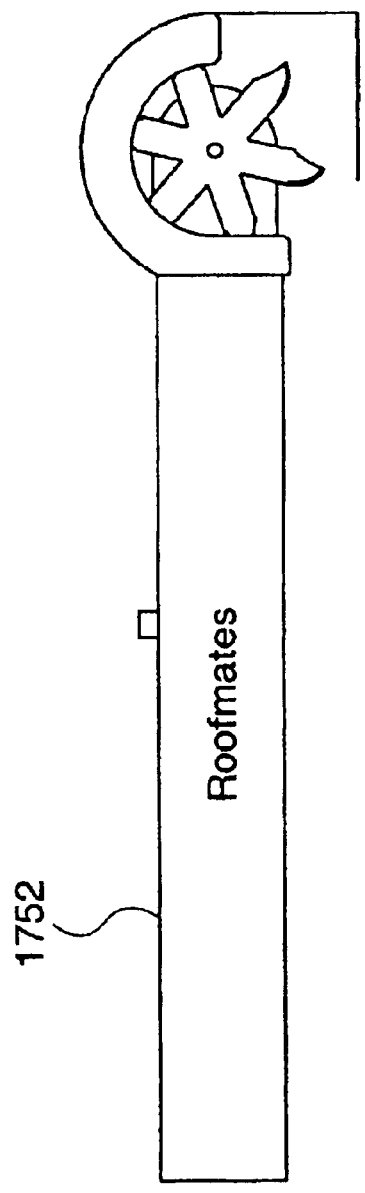
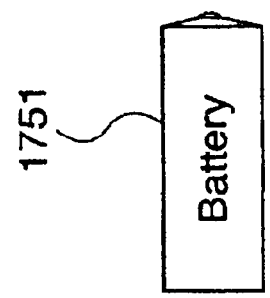
Figure 175

ROOFMATES™ ROOFING ACCESSORIES

CROSS-REFERENCE TO RELATED APPLICATIONS

The present application claims priority from Provisional U.S. Patent Application No. 60/365,538, filed on Mar. 20, 2002, and incorporated herein by reference.

The present application also claims priority from Provisional U.S. Patent Application No. 60/426,808, filed on Nov. 18, 2002, and incorporated herein by reference.

The present application is also a Continuation-In-Part of U.S. patent Application Ser. No. 10/050,964, filed on Jan. 22, 2002, now U.S. Pat. No. 6,745,869 and incorporated herein by reference; that application claims priority from the following Provisional Patent Applications, all of which are incorporated herein by reference: Provisional U.S. Patent Application No. 60/262,650, filed on Jan. 22, 2001; Provisional U.S. Patent Application No. 60/286,527, filed on Apr. 27, 2001; Provisional U.S. Patent Application No. 60/297,530 filed Jun. 13, 2001; and Provisional U.S. Patent Application No. 60/304,098, filed on Jul. 11, 2001.

FIELD OF THE INVENTION

The present invention relates to the field of residential and commercial roofing. In particular, the present invention relates to a number of scaffolds, platforms, tools, and accessories for use in pitched roof construction as well as an apparatus for securing ladders and other devices to a ladder rack, luggage rack, or other type of vehicle accessory rack. The present application also is directed toward a user wearable cooling device for spraying water onto a user. The present application is also directed toward an integrated sunglasses and headgear, and various roofing scaffolding supports and other roofing accessories. The present application is also directed toward an air-powered saw for use in cutting shingles for ridgelines and the like. The present application is also directed toward a number of accessories and tools for use by a roofer or other construction worker.

BACKGROUND OF THE INVENTION

Safety in pitched roof construction has been an ever increasing concern. An alarming number of construction site accidents are due to falls from pitched roofs by workmen, or injuries sustained by workmen when roofing materials (shingles, felt, nails, flashing, compounds, sealants, and the like) or tools (hammer, nail guns, water jugs, and the like) fall from a roof onto workers or passersby below.

One of the basic difficulties in roof work is transporting the materials up to the roof and storing them there until needed. Typically, roofers will load most, if not all, of the roofing materials onto the roof surface before beginning work. In the past, this may have been accomplished by the use of ladder elevators (e.g., laddervator). However, in new home and large scale construction, a crane or large forklift may be used to transfer entire pallets of roofing material to the roof level upon delivery. Thus, large quantities of shingles, tiles, slates, or the like, may need to be stored on the roof prior to installation.

In some recorded instances, entire pallets or "squares" of roofing materials (e.g., shingles) have fallen off pitched roofs onto the ground below. If a fellow workman or passerby is below when such a large amount of material falls, serious injury or even death can occur. In addition, although probably less hazardous, workers and passersby below are also in danger of serious injury from falling tools, hammers, and smaller amounts of roofing materials and the like. As a result of such accidents, residential as well as commercial roofers are finding increased scrutiny from insurance companies and government agencies (e.g., OSHA).

In addition to such obvious safety concerns, government agencies and insurance companies are seeing more claims of injuries due to repetitive stress disorders (e.g., carpal tunnel syndrome). In the roofing industry, such stresses can occur as a roofer may be forced to reach in one extreme direction (e.g., downward to a scaffold walkboard) to retrieve shingles, tools, or nails, and then reach in another extreme direction (e.g. upward) to secure the shingle to the roof.

In addition to causing stress on the body, such a work environment is inefficient, as such long reaches increase the time needed to install shingles and more readily fatigue the roofer. Moreover, extended reaches may put the roofer at increase risk of falling due to loss of balance and the like. Roofing materials and tools may be more likely to fall off a roof if a roofer has to stretch to reach them.

In the Prior Art, primitive techniques have been used in an attempt to secure materials and persons on a roof. For example, a short length of 2" by 4" wood may be nailed to a roof to provide temporary support for a ladder, materials, or a roofer. Such a primitive technique, commonly used, provides very little purchase for the roofer or materials to rest upon. In addition, it may take time at the jobsite for the roofer to secure such scrap lumber, cut it to size, measure for nail spacing, and install.

A number of Patents have been issued which describe various apparatus in the Prior Art for correcting the deficiencies noted above. However, most, if not all, of these attempts have failed in one or more ways, and none of these patented invention appear to have been commercially successful or readily available in the marketplace. Most of these schemes utilize unnecessarily complicated apparatus, which is too costly for the average roofer to afford, to heavy to lift to the jobsite, and to cumbersome to work with.

For example, Eisenmenger, U.S. Pat. No. 5,601,154, issued Feb. 11, 1997, discloses a portable suspended roof scaffold system. Eisenmenger uses a specialized apparatus (See FIGS. 1, 3, and 4) to secure a ladder to a roof. Once the ladder is secured, an adjustable platform (See FIG. 7) may be secured to the ladder to support a walkboard or the like. The problem with the Eisenmenger system is that it requires that a ladder with specialized fittings first be hauled up to the roof and secured before the platform can be installed.

Moreover, the ladder, once secured, covers a substantial portion of the roof being worked on. Since shingles are generally installed in horizontal rows, the ladder of Eisenmenger necessarily covers a portion of each row at all times (See, FIG. 20). The roofer must either move the entire apparatus or try to install shingles underneath the ladder. In addition, the apparatus, by requiring the use of a ladder, ties up one of the roofer's ladders at the jobsite. As a result, the roofer must purchase a separate ladder for such a purpose, or do without a ladder at another location on the site.

Bitner, U.S. Pat. No. 5,979,600, issued Nov. 9, 1999, discloses a leveling roof platform support. The Bitner device is an improvement over using a nailed-in 2" by 4" and much less complex than the Eisenmenger device. However, it appears that Bitner is limited to a device for supporting a walk-board or plank, and does not explicitly provide support for ladders, tools, supplies, or roofing materials. In addition, the Bitner device utilizes a fairly complex and expensive screw-jack leveling system to provide infinite adjustment of angle. While the screw-jack system may provide more levels of adjustment, it does so at the expense of added cost and complexity. Moreover, the screw-jack of Bitner does not appear to be sufficient to support large loads (e.g., square of shingles). No method of locking the screw jack into place appears to be present.

Thus, it remains a requirement in the art to provide a simple, flexible, lightweight, safe, and inexpensive system for supporting persons, ladders, roofing supplies, shingles, tools, and accessories on an inclined roof without covering up large portions of the roof with such a device.

Miller, U.S. Pat. No. 6,170,222, issued Jan. 9, 2001, discloses a foam rubber wedge pad for placing shingles on a roof. As the pad is made entirely of foam rubber, it may be difficult to grip (no handles). Moreover, the foam pad does not provide storage for small items such as nails or tools.

In addition to the above problems in the Prior Art, injuries have occurred when ladders and scaffolding set up for roof and other work are not properly secured and as a result, fall down. OSHA requires that ladders be "tied-off" prior to work commencing. However, oftentimes a convenient and easy way to tie off a ladder (e.g., to a gutter) is not present, particularly with regard to roofing work.

Thus, it remains a further requirement in the art to provide a safe, easy, convenient, and inexpensive way to allow ladders and scaffolds to be readily attached to a housing or other structure prior to work commencing.

In addition, safety in transporting roofing and construction ladders, as well as other items is also important. An aluminum ladder flying off a construction truck can cause great bodily injury or even death on a crowded superhighway. Such dangers pose huge liabilities for construction companies which may be ultimately responsible for the actions of their employees.

Moreover, securing any load to a vehicle present safety problems. Most commercial over-the road truckers have rather elaborate straps and chains to secure loads. However contractors and homeowners have relied upon straps, ropes and even strings, to secure loads to their vehicles, with limited success and sometimes disastrous results.

Many contractors will leave ladders entirely unsecured on ladder racks, or use only a token string or rope to secure them. In addition to being unsafe, ropes and strings are difficult to tie and untie. Straps (since or ratchet) are one solution, however, they are generally provided with large rubber hooks which may slip on a ladder or luggage rack or may be difficult to secure.

Homeowners may attempt to use luggage racks supplied with their vehicles, or commercially available racks, such as the THULE® or YAKIMA® racks to secure objects to their vehicles. However, the YAKIMA® and THULE® racks may be highly specialized in their purposes and thus require an enormous amount of accessories in order to secure various items. Moreover, accessories for one rack (e.g., YAKIMA®, which uses round tubing) may not fit another rack (e.g., THULE®, which uses square tubing). Luggage racks supplied with cars generally are of little use and provide few or no places for tie-downs or the like.

When installing roofing materials, it is often necessary to cut shingles either before installation, or in situ. For example, when building a roof "Valley", shingles may be installed over the valley, and then later cut to the valley "V" shape. Traditionally, a knife has been used for such cuts. However, there is little precision in depth of cut with a knife, and in addition, such a cut can be laborious and difficult. Too deep a cut may create roof leaks.

Power tools are generally not well suited to cutting shingles. Most are heavy and require electrical power. In addition, large power tools present a hazard to workers below if they fall off the roof. What is needed is a small powered tool which can cut shingles accurately and cleanly.

Stein, U.S. Pat. No. 5,715,533, issued Feb. 10, 1998, and incorporated herein by reference, discloses a hat with a coolant supply. Coolant may be fed through the hat to wet the hat, which, through the process of evaporation, supposedly cools the head of the wearer. While the Stein hat may provide some cooling, particularly in dry climates, in many more humid climates, it may provide little more than a wet hat. Also note the limited size of the fluid reservoir in the Stein hat.

McPherson, U.S. Pat. No. 5,197,292, issued Mar. 30, 1993 and incorporated herein by reference, discloses a cooling cap for athletes. In McPherson, a chamber is provided to retain a fluid (e.g., icewater) which is allowed to transmit to the head of the wearer. The McPherson system allows liquid to pass to the head of the wearer and also allows ice water to be used, which can provide additional cooling over that of Stein. However, the McPherson design still passes water through the hat, which may result it little more than a wet hat, and little cooling.

In both the Stein and McPherson Patents, the reservoir size for water or icewater is limited in size. Thus, even if these devices provide any substantial cooling to the wearer, they need to be replenished on a regular basis. What is needed in the art is a system which can provide extended cooling capabilities for a user and additional cooling capacity beyond the limited capabilities of McPherson and Stein.

In the roofing, siding, and construction arts, pump jacks are known in the art. A pair of pump jack poles may be placed on the ground and fixed to a structure. A scaffold-type walk board is attached to pump jacks, one at each pole, and the scaffold board assembly may be moved up and down the pump jack poles by means of pumping with the foot, for example. Such pump jack systems are well known in the art.

However, there are safety concerns with such systems. In particular, if the pump jack poles are not securely fastened to the ground or building, the entire assembly can tip over, causing injury or death to workers on the scaffold board or working below. In the Prior Art, workers merely place the pump jack poles on the ground without securing the poles in any way. Loose or compactable soil may allow the pump jack poles to sink or shift. Uneven or sloped terrain may cause the pump jack poles to move laterally. A means of securing pump jack poles remains a requirement in the art.

Roofing tools are always at a risk of falling off a roof, especially an inclined roof. In addition to the inconvenience of having to retrieve such tools and possible damage to a tool from such a fall, there is the hazard that such tools present to workers below. Nailguns and the like present an additional hazard in that they may go off when they hit the ground and further injure other workers or passersby. A means for preventing tools from falling off roofs is still a requirement in the art.

Mounting a ladder to an inclined roofing surface can be dangerous. If the ladder is not securely fastened to the roof, it may slide off, taking the user with it. Devices are known for holding a ladder on an inclined roof. For example, the so-called "J-hook" may be attached to a ladder and hooked over the peak of a roof to prevent the ladder from sliding off the roof. However, such a technique requires that the ladder be put onto the roof surface first, and slid all the way to the top. The roofer must either try to push the ladder up from the bottom, or climb to the peak using other means and then pull the ladder up.

For large roofs, or roofs with compound or unusual peak configurations, the J-hook may not be suitable for use. In addition, such ladders may need to be frequently moved or adjusted to allow work to progress, as they may get in the way of the work area. Thus, a need in the art exists for a ladder system for use on inclined roofs which does not require that the roofer first ascend the roof. In addition, a need exists in the art for a ladder system which may be flexible so as to allow a roofer to work on the roof surface without frequently relocating the ladder.

When installing roofing materials, it is often necessary to cut shingles either before installation, or in situ. For example, when building a roof "Valley", shingles may be installed over the valley, and then later cut to the valley "V" shape. In addition, when finishing a roof, it is often necessary to cut the shingles along the edge of the roof to provide a uniform appearing edge. These shingles may be 3 or more layers thick in some places, dulling traditional knives and saws quickly.

Traditionally, a knife has been used for such cuts. However, there is little precision in depth of cut with a knife, and in addition, such a cut can be laborious and difficult. Too deep a cut may create roof leaks. Power saws and the like are difficult to use as the saw may require an extension cord on the roof and also the blade may not be well suited for cutting shingles (i.e., it will "load up" with tar and other materials and cease to cut well). In addition, large power tools present a hazard to workers below if they fall off the roof. What is needed is a small powered tool which can cut shingles accurately and cleanly.

Roofing tools are always at a risk of falling off a roof, especially an inclined roof. In addition to the inconvenience of having to retrieve such tools and possible damage to a tool from such a fall, there is the hazard that such tools present to workers below. Nailguns and the like present an additional hazard in that they may go off when they hit the ground and further injure other workers or passersby. A means for preventing tools from falling off roofs is still a requirement in the art.

Mounting a ladder to an inclined roofing surface can be dangerous. If the ladder is not securely fastened to the roof, it may slide off, taking the user with it. Devices are known for holding a ladder on an inclined roof. For example, the so-called "J-hook" may be attached to a ladder and hooked over the peak of a roof to prevent the ladder from sliding off the roof. However, such a technique requires that the ladder be put onto the roof surface first, and slid all the way to the top. The roofer must either try to push the ladder up from the bottom, or climb to the peak using other means and then pull the ladder up.

For large roofs, or roofs with compound or unusual peak configurations, the J-hook may not be suitable for use. In addition, such ladders may need to be frequently moved or adjusted to allow work to progress, as they may get in the way of the work area. Thus, a need in the art exists for a ladder system for use on inclined roofs which does not require that the roofer first ascend the roof. In addition, a need exists in the art for a ladder system which may be flexible so as to allow a roofer to work on the roof surface without frequently relocating the ladder.

Properly installed flashing is necessary for almost all roofing jobs. Flashing that is poorly installed, bent, wrinkled, or the like, can cause leaks and detract from the appearance of a finished roof. Flashing is typically sold in copper or aluminum rolls of material. A roofer may have a roll of such material in the back of his truck. Unfortunately, the material may roll around in the truck, and moreover, workers may drop tools on it and the like. As a result, a roofer may be forced to throw away many half-used rolls of flashing material, as the material may be damaged by such rough handling. In addition, measuring and cutting such material may be awkward and difficult when handling an open roll of flashing or the like. A need exists in the art for a means of handling, storing, measuring and cutting such rolls of flashing.

Laying a ladder on a roof can be problematic as well. One problem with roofing jobs in general is that when roofers step on a completed roof surface, lay tools upon it, or drag materials, ladders, scaffolding, or the like, the roof surface may be marred, particularly in warm weather when the asphalt in the asphalt shingles may be soft. Such marring may disappear after a few days, weeks, or months, or may be permanent. In any event, it presents a problem in that homeowners may perceive such marring as roofing damage and complain to the roofer, causing much difficulty, as such marring may be impossible to repair other than to re-roof the entire house.

Ladders laid against surfaces can slide and fall, causing injury. When using a pump jack and scaffold, a worker may be tempted to climb up and down from the scaffold using a ladder laid against the pump jack pole, rather than using the pump jack to raise and lower the entire scaffold. A ladder laid against a narrow object such as a pump jack pole may tend to wobble and tip, which can cause the ladder (and worker) to fall.

Moving materials up and down a roof surface is difficult, particularly with heavy materials such as roofing tile. Laddervaters are known to get materials up to a roof surface, but laddervaters cannot be used to move materials around the roof surface itself. When removing tiles from a roof, for example, it can be cumbersome and dangerous to walk across the roof surface carrying such tiles. A means for moving such materials up and down a roof surface is required.

Placing a ladder on uneven ground will inevitably result in the ladder being unstable or tipping over. Using blocks of wood or the like to level a ladder is dangerous, awkward, and cumbersome. A means for automatically levelling a ladder is required in the art to provide a stable base for ladder support.

SUMMARY OF THE INVENTION

The present invention comprises a number of embodiments of apparatus for use in working on an inclined roofing surface, for supporting persons, ladders, scaffolding, tools, roofing materials, shingles, supplies, and accessories. All of the embodiments of the present invention may be marketed under the umbrella name of ROOFMATES™, a trademark of the inventor.

In one embodiment, a lightweight adjustable ladder and scaffold support is provided which may be marketed under the .name GABLEMASTER™, a trademark of the inventor. A pair of rails are provided, spaced approximately 24 inches apart, the standard spacing of most roof joists. Connected to the rails through suitable holes and slots, are rods supporting an adjustable platform. One of the rods may be placed through a corresponding slot to achieve a suitable angle of adjustment corresponding to roof incline.

The platform may be provided with a number of aluminum beams drilled with suitable holes, spaced apart and shaped so as to accept the leg of a standard extension ladder or siding jack. Bolts or pins may be passed through the holes to secure the ladder or jack to the platform. In addition, the platform may support a walking board, scaffold, or the like.

In another embodiment of the present invention, an apparatus is provided for supporting loads of materials or supplies on an inclined roof. The apparatus of this embodiment of the present invention may use components and parts in common with other embodiments of the present invention, or components and parts similar thereto.

In this embodiment, a lightweight adjustable material and supply support is provided which may be marketed under the name ROOFSTOCKER™, a trademark of the inventor. A pair (or more) rails are provided, adjustably spaced to fit the standard spacing of most roof joists. Connected to the rails through suitable holes and slots, are rods supporting an adjustable platform. One of the rods may be placed through a corresponding slot to achieve a suitable angle of adjustment corresponding to roof incline.

The platform may be provided as a planar table, with one or more edge rails to prevent materials from falling off the platform. The platform may be sized to accommodate a standard package size of shingles or a shingle "square". Roofing materials stored on a roof may be stored on the platform in a level manner and thus reduce the likelihood that such materials will fall off. Smaller versions of the platform may be provided for holding tools and the like, and specialized version may be provided for specific applications such as holding a 5-gallon IGLOO™ water cooler.

In such a specialized version, the apparatus may be mounted to a plate which is backed with a one-inch layer of foam. The foam may grip the uneven roof surface sufficiently that no nailing, or only a safety nail is required, allowing the unit to be moved freely along the roof.

In another embodiment of ROOFSTOCKER™, two channels having U-shaped cross-sections may be provided, each with an adjustable support pole. Connected to the support poles though a pivot joint is an adjustable platform which has its other end hinged to the channels. The support or poles may be adjusted to achieve a suitable angle of adjustment corresponding to roof incline.

In another embodiment of ROOFSTOCKER™, a U-shaped backing plate is provided with a one or more adjustable support poles. Connected to the support pole though a pivot joint is an adjustable platform which has its other end hinged to the backing plate. The support pole (or poles) may be adjusted to achieve a suitable angle of adjustment corresponding to roof incline.

In another embodiment of the present invention, which may be marketed under the name ROOFER'S TOOLBOX™, a trademark of the inventor, a tool tray is provided which may be backed with a layer of foam to prevent the tray from slipping off the roof, while allowing the tray to be freely moved along and up and down the roof, as work progresses.

The tool tray may comprise a flat lower portion backed with a layer of medium density expanded polyurethane foam, the type commonly sold for upholstery in upholstery and fabric shops. A number of compartments may be provided in the tray for holding nails, shingles, tubes of roofing compound, tools, and the like. A specialized version may be provided for slate work and marketed under the name SLATEMATES™, a trademark of the present inventor.

In yet another embodiment of the present invention, an apparatus is provided to allow ladders and scaffolds to be readily attached to a structure or the like. A clamp is provided which may be bolted to a ladder leg or the like. A rotatable arm is provided attached to the clamp at one end and having a nailing plate attached at the other. In use, the device may be clamped to the ladder leg without any need for drilling or otherwise altering the ladder structure. The other end may be nailed or screw-gunned into a joist, truss, beam, or other structural surface to secure the ladder. The apparatus may have particular use when ladders are used on roofs and uneven or inclined surfaces are present.

In addition, the present invention provides a number of different embodiments of tools, accessories, tie-offs, and braces for use in roofing. In another embodiment, a tie-off called SURETETHER™ is provided to allow roofers to secure safety harnesses and ropes.

In another embodiment of the present invention, called SUREFOOTS™, an apparatus is provided to allow ladders and scaffolds to be readily attached to a structure or the like. A clamp is provided which may be bolted to a ladder leg or the like. A rotatable arm is provided attached to the clamp at one end and having a nailing plate attached at the other. In use, the device may be clamped to the ladder leg without any need for drilling or otherwise altering the ladder structure. The other end may be nailed or screw-gunned into a joist, truss, beam, or other structural surface to secure the ladder. The apparatus may have particular use when ladders are used on roofs and uneven or inclined surfaces are present.

In another embodiment of the present invention, a lightweight adjustable ladder and scaffold support is provided which may be marketed under the name GABLEMASTER™, a trademark of the inventor. A pair of rails are provided, spaced approximately 24 inches apart (or adjustably spaced) to fit the standard spacing of most roof joists. Connected to the rails through suitable holes and slots, are rods supporting an adjustable platform. One of the rods may be placed through a corresponding slot to achieve a suitable angle of adjustment corresponding to roof incline.

The platform may be provided with a number of aluminum beams drilled with suitable holes, spaced apart and shaped so as to accept the leg of a standard extension ladder or siding jack. Bolts or pins may be passed through the holes to secure the ladder or jack to the platform. In addition, the platform may support a walking board, scaffold, or the like.

In another embodiment of the present invention, a bracket for holding a ladder on a sloped roof is provided. Ladder legs may be locked into the bracket using pins, bolts, or the like, such that the ladder will not fall off the sloped roof. This invention has particular application when a roofer needs to climb an existing roof to the peak when no safety rope, guide wire, scaffolding, or ladder is in place. The bracket may be nailed to the roof, a ladder slid up the roof and the bottom of the ladder secured to the ladder bracket.

In another embodiment of the present invention, a jack post roof rack holder is provided as a variation on one invention set forth in related Provisional U.S. Patent Application No. 60/297,530 filed on Jun. 13, 2001. In this embodiment of the present invention, a clamp is provided which may be mounted to a truck ladder rack, car luggage rack, or the like. The clamp may be lined with compressible foam rubber so as to securely grip various rack channel cross-sections without slipping. The use of the foam rubber allows the apparatus to be made for a number of different rack styles.

In another embodiment of this invention, a clamp is provided which may be mounted to a truck ladder rack, car luggage rack, or the like. The clamp may be lined with compressible foam rubber so as to securely grip various rack channel cross-sections without slipping. The use of the foam rubber allows the apparatus to be made for a number of different rack styles.

A draw-tight or ratchet strap may be mounted to the clamp to secure a ladder or other object to the roof rack. Hooks for the strap may thus not be required. In addition, the strap may be locked to prevent loosening of the strap or petty theft or borrowing of the objects secured to the strap.

In an alternative embodiment of the ladder brace set forth in Provisional U.S. Patent Application No. 60/262,650 filed on Jan. 22, 2001, and Provisional U.S. Patent Application No. 60/286,527 filed on Apr. 27, 2001, a version of the SUREFOOT™ invention is provided with a threaded leg portion.

In an alternative embodiment of one invention set forth in related Provisional U.S. Patent Application No. 60/286,527 filed on Apr. 27, 2001, a tie-off called Sure-Tether is provided to allow roofers to secure safety harnesses and ropes.

In an alternative embodiment of one invention set forth in related Provisional U.S. Patent Application No. 60/297,530 filed on Jun. 13, 2001, the ladder rack apparatus is adapted for use in securing ladders to houses and the like.

In yet another alternative embodiment of one invention set forth in repled Provisional U.S. Patent Application No. 60/297,530 filed on Jun. 13, 2001, a lightweight adjustable scaffold board support is provided. In this variation, a single channel having U-shaped cross-section may be provided, each with an adjustable support pole. Connected to the support pole though a pivot joint is an adjustable support channel which has its other end hinged to single channel. The support pole may be adjusted to achieve a suitable angle of adjustment corresponding to roof incline. A number of these devices may be used to support a scaffold board on a roof by means of a scaffold securing clip.

Another embodiment of the present invention, SHINGLESAW™, comprises a pneumatically powered miniaturized reciprocating or circular saw designed especially for roofing applications. In an alternative embodiment, SHINGLESAW™ may be powered by rechargeable battery packs or the like. SHINGLESAW™ is the size and shape of a Prior Art razor knife, but is powered and provided with a depth gauge to prevent cutting through roofing underlayment or the like.

In another embodiment known as SHINGLESTOCKER™, a small, lightweight movable wedge is provided with a foam backing. When wedged under a shingle or nailed to a roof, the SHINGLESTOCKER™ can be used to prevent bundles of shingles from falling off roofs.

In another embodiment of the SURETETHER™ an adjustable strap is provided which may be used to tie-off safety harnesses used by roofers. The straps are lightweight and inexpensive to use.

In another embodiment of the present invention, a cooling system is provided to spray water on the face and neck area of an individual. A large liquid reservoir, which may be molded to the shape of the back, is provided with a pressure pump. The reservoir may be pressurized to force liquid through a flexible tube. Spray or misting nozzles may be provided to spray the user's head and neck area to provide cooling. A valve may be provided to allow the user to control the flow rate and/or turn the apparatus on or off.

In another embodiment of the present invention, a single channel having U-shaped cross-section may be provided, each with an adjustable support pole. Connected to the support pole though a pivot joint is an adjustable support channel which has its other end hinged to single channel. The support pole may be adjusted to achieve a suitable angle of adjustment corresponding to roof incline. A number of these devices may be used to support scaffold brackets on inclined roof surfaces.

In another embodiment of the present invention, another "soft" version of the SUREFOOT™ invention of applicant, a strap may be secured around an object, such as a tree or utility pole or the like.

In another embodiment of the present invention, a device may be attached to a ladder leg and placed or nailed to a roof, wall or other surface (either at the top or bottom of the ladder). In addition, the device may be used by attaching to the bottom of a ladder to steady the ladder as an extra leg, or to act as a ladder stabilizer. In addition, the device may be used to hold a ladder away from a wall to prevent gutters form being crushed.

In another embodiment, a SUREFOOT™ apparatus is provided which may be attached to the foot of a ladder. In use, the apparatus is attached to the pivoting foot of an aluminum ladder or the like. The apparatus rests between the ladder and the floor, preventing the ladder from marring the floor surface and distributing the weight of the ladder and user over a broader area. In addition, the foam acts as a non-slip anti-skid device, to prevent the ladder from moving or slipping. When used on a stairway or against a wall, a bent lip portion may rest against the stair riser or wall baseboard to prevent marring of these surfaces.

In another embodiment, a roof ladder is provided. The roof ladder may be provided in one or more sections and may be supported from the bottom of the roof by a roof ladder bracket. As shingling progresses, for example, the roof ladder bracket may be installed at the bottom. Additional, lightweight sections may then be added as the shingling progresses up the roof. A scaffold board or the like may be attached to the roof ladder using brackets and the like as is known in the art. Individual sections of roof ladder may be attached to one another like sections of railroad track, using suitable fasteners.

In another embodiment, a means is provided to prevent roofing tools from sliding off a roof. A piece of resilient foam may be attached to a tool surface using Velcro™ fasteners. The resilient foam prevents the tool from sliding, and the use of Velcro™ allows the foam to be renewed.

In another embodiment, a pump jack mounting device is provided to secure a pump jack pole to the ground. A cup-like sleeve is provided with a hole the bottom for receiving a ground spike. A portion of the sleeve may be removed to facilitate driving the ground spike into the ground. Once secured to the ground, the removable portion of the sleeve is reinserted and a pump jack pole inserted into the sleeve. In an alternative version of this ninth embodiment, an adjustable angle plate is provided for securing the sleeve to the ground on sloped or uneven terrains.

In another embodiment of the present invention, a ROOFER'S SAWHORSE™ is provided to allow a roofer or other construction worker to support materials on a uneven surface such as a roof.

In another embodiment of the present invention, an improved SUREFOOT ladder attachment device is disclosed.

In another embodiment of the present invention, a sweatproof sunglasses/eyeglasses device is provided.

In another embodiment of the present invention, a water cooler with an adjustable base for use on a roof or other slanted surface is provided.

In another embodiment, known as ROOFMISTER™, a water tank and pump may be provided on the ground, fed to one or more misting nozzles mounted on a rooftop.

In another embodiment, a battery or solar powered cooling fan and mister is provided with a built-in water tank and roof mount.

In another embodiment, a radial fan powered by 110 Volts or the like, may be used in an adjustable platform, provided with a mist spray fed by a ground mounted tank.

In another embodiment, a ROOFWINCH™ is provided to allow a roofer or other worker to lift materials and pump jack poles up to a roof.

In another embodiment, the FLASHING MASTER™ is provided to allow for clean, accurate cutting of flashing and other types of sheet metal for roofing or other applications.

In another embodiment of the present invention, a variation on applicant's ROOFLADDER™ is provided. In this invention, a ladder may be provided with a foam backing and/or nailing blocks to allow the ladder to be nailed to roof trusses. A ladder mounted platform with an adjustable angle plate may be provided to support materials, persons, or scaffold boards. A safety cable may be provided to secure persons or materials.

In another embodiment, a LADDER BRACE™ is provided to brace a ladder against a pump jack pole.

In another embodiment, a ROOF HOIST™ is provided to haul materials up and down a roof surface.

In another embodiment, a GROUND JACK™ is provided to support a ladder on a uneven surface.

BRIEF DESCRIPTION OF THE DRAWINGS

FIG. 56 is a perspective view of one version of the SUREFOOT™ embodiment of the present invention shown attached to a ladder, secured to a nailing plate via a bungee chord, cable, or the like.

FIG. 57 is a perspective view of one version of the SUREFOOT™ embodiment of the present invention shown attached to a ladder, secured to a beam using a pressure clamp and a bungee chord, cable or the like.

FIG. 58 is a perspective view of another version of the SUREFOOT™ embodiment of the present invention illustrating the swivel clip for use with a bungee, cable, or the like.

FIG. 62 is a perspective view of another version of the SUREFOOT™ embodiment of the present invention, illustrating the pivot shaft and nailing plate.

FIG. 63 is a side view of another version of the SUREFOOT™ embodiment of the present invention, illustrating the pivot shaft and nailing plate.

FIG. 90 is a perspective view of the SURETETHER™ embodiment of the present invention for walls and the like.

FIG. 92 is a top plan view of the SURETETHER™ embodiment of the present invention for use on walls and the like.

FIG. 101 is a perspective view of another the "soft" version of the SURETETHER™ of FIG. 100 illustrating how safety straps may be clipped on.

FIG. 121 is a perspective and exploded view of a tool anti-slip apparatus known as GUNPAD™

FIG. 122 is a diagram illustrating a pump jack post anchor.

FIG. 123 is a diagram illustrating another version of the pump jack anchor with adjustable pivot base.

FIG. 124 is a diagram illustrating another embodiment of a pump jack post anchor.

FIG. 125 is a perspective view of the ROOFER'S SAWHORSE™.

FIG. 126 is an enlarged perspective view of a first foot design option of the apparatus of FIG. 125.

FIG. 127 is an enlarged perspective view of a second foot design option of the apparatus FIG. 125.

FIG. 128 is a perspective view of an improved embodiment of the SURE FOOT™ of the present invention.

FIG. 129 is a perspective view of a first embodiment of the SWEATRAYS™ of the present invention.

FIG. 130 is a perspective exploded view of a second embodiment of the SWEATRAYS™ of the present invention.

FIG. 131 is a perspective assembled view of the second embodiment of the SWEATRAYS™ of the present invention.

FIG. 132 is a side exploded view of the second embodiment of the SWEATRAYS™ of the present invention.

Figure 133:
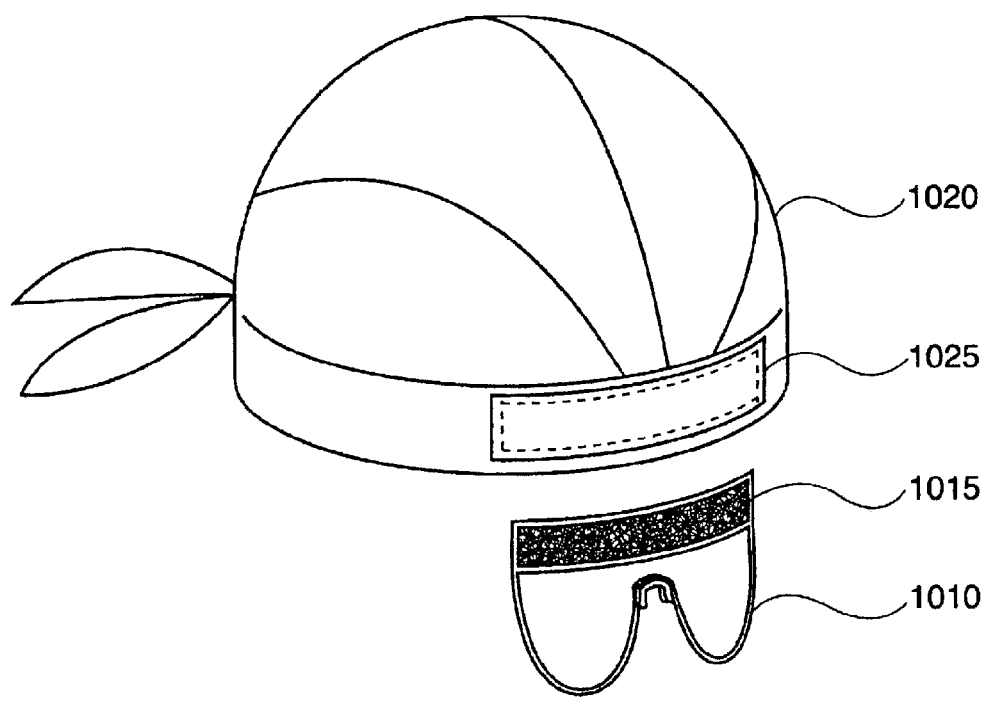

FIG. 133 is a perspective view of a third embodiment of the SWEATRAYS™ of the present invention.

Figure 134:
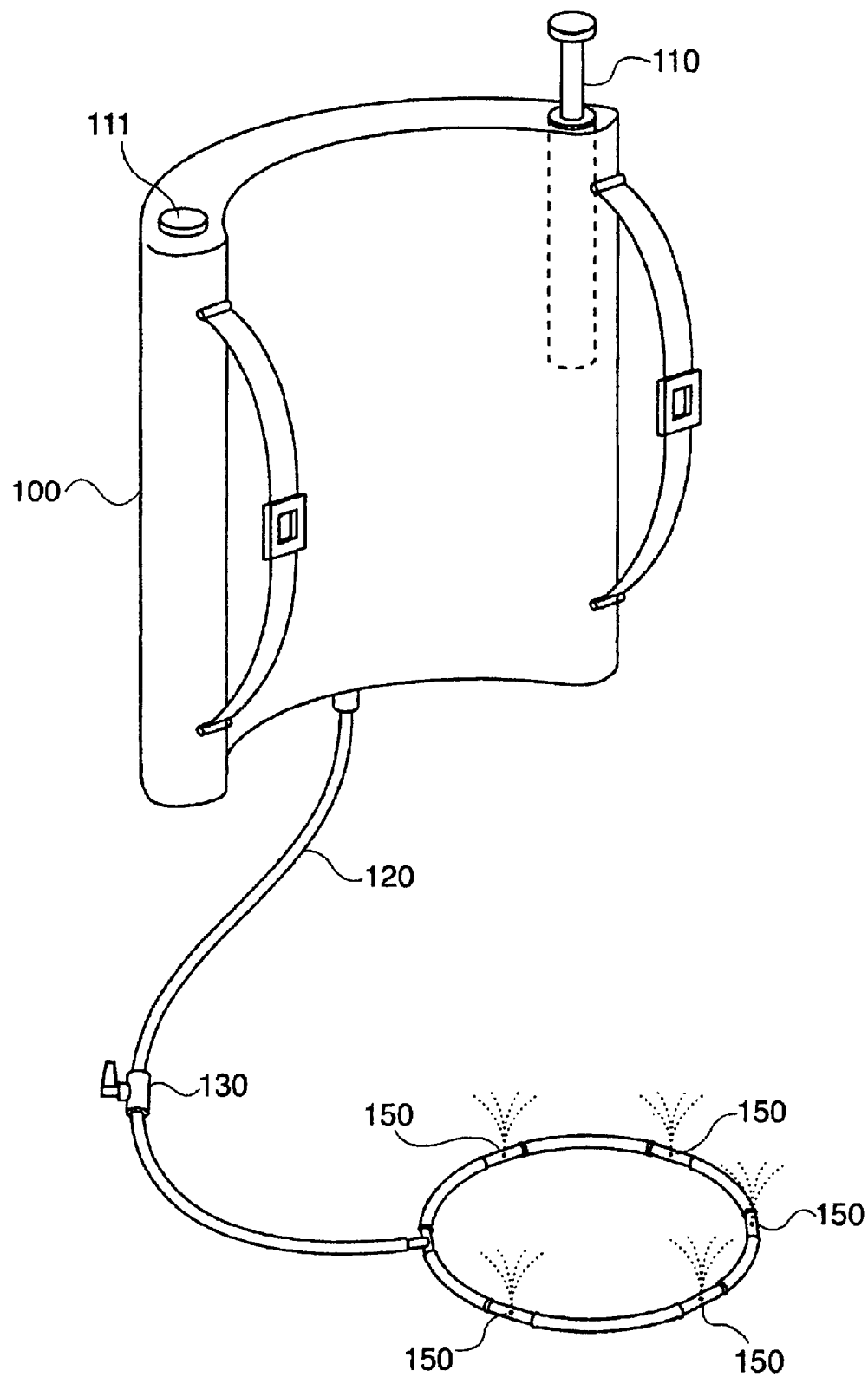

FIG. 134 is a perspective view of another cooling apparatus of the present invention.

Figure 135:
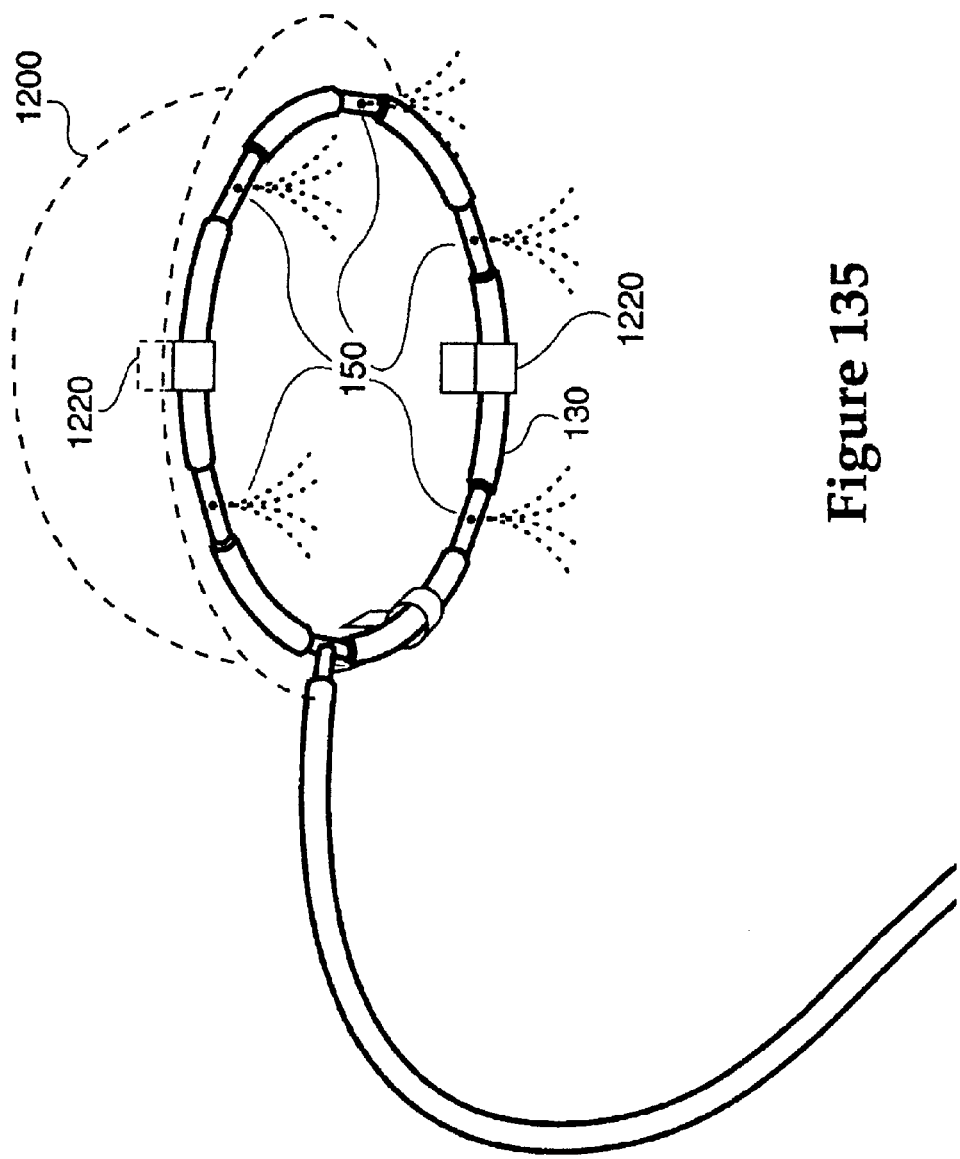

FIG. 135 is an enlarged perspective view of the embodiment of FIG. 134, illustrating the spray ring as attached to a hard hat.

Figure 136:
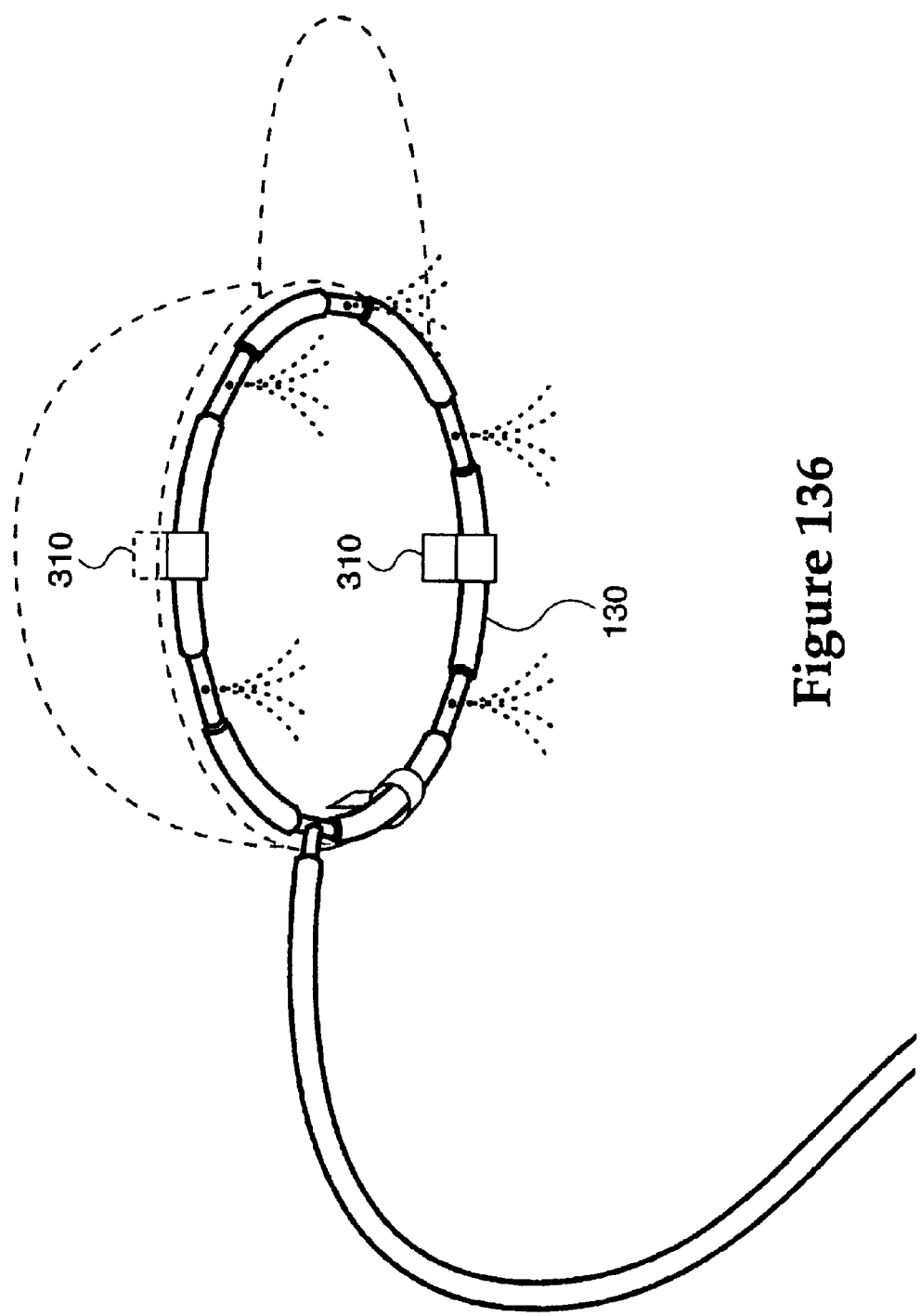

FIG. 136 is an enlarged perspective view of the embodiment of FIG. 134, illustrating the spray ring as mounted to a baseball hat.

Figure 137:
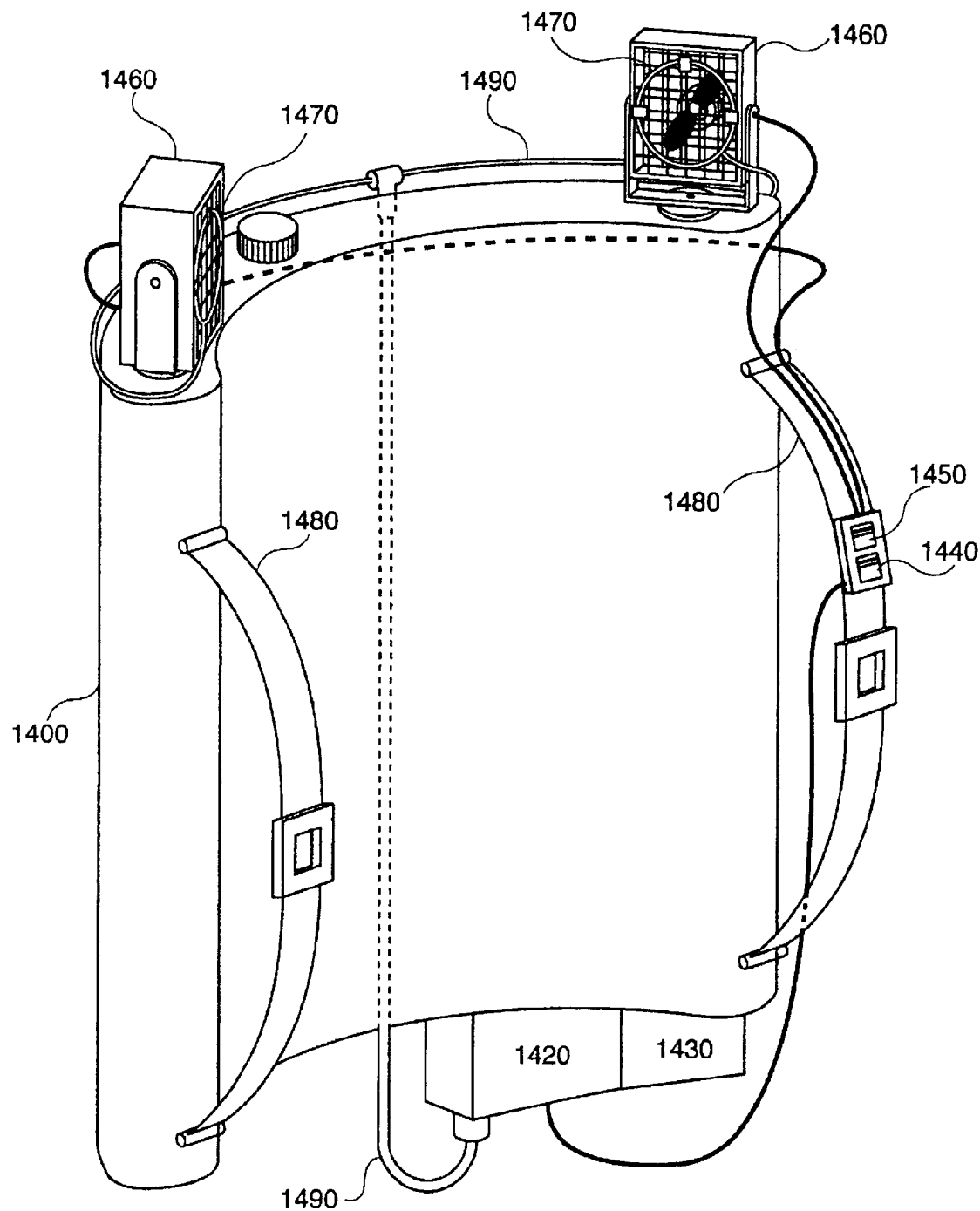

FIG. 137 is an enlarged perspective view of an alternative embodiment of FIG. 134, illustrating the use of electric fans to spray and cool the user.

Figure 138:
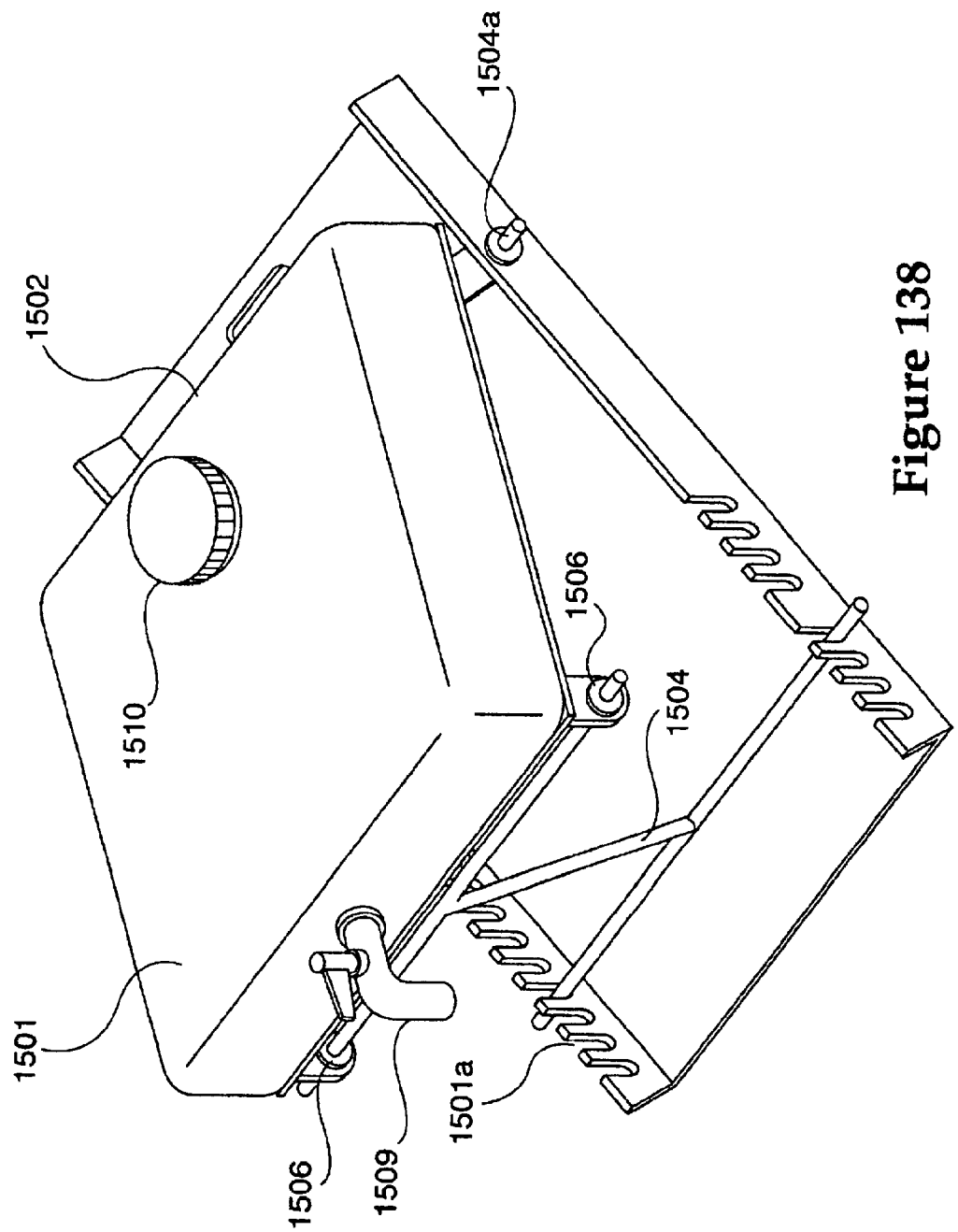

FIG. 138 is a perspective view of another water cooler of the present invention.

Figure 139:
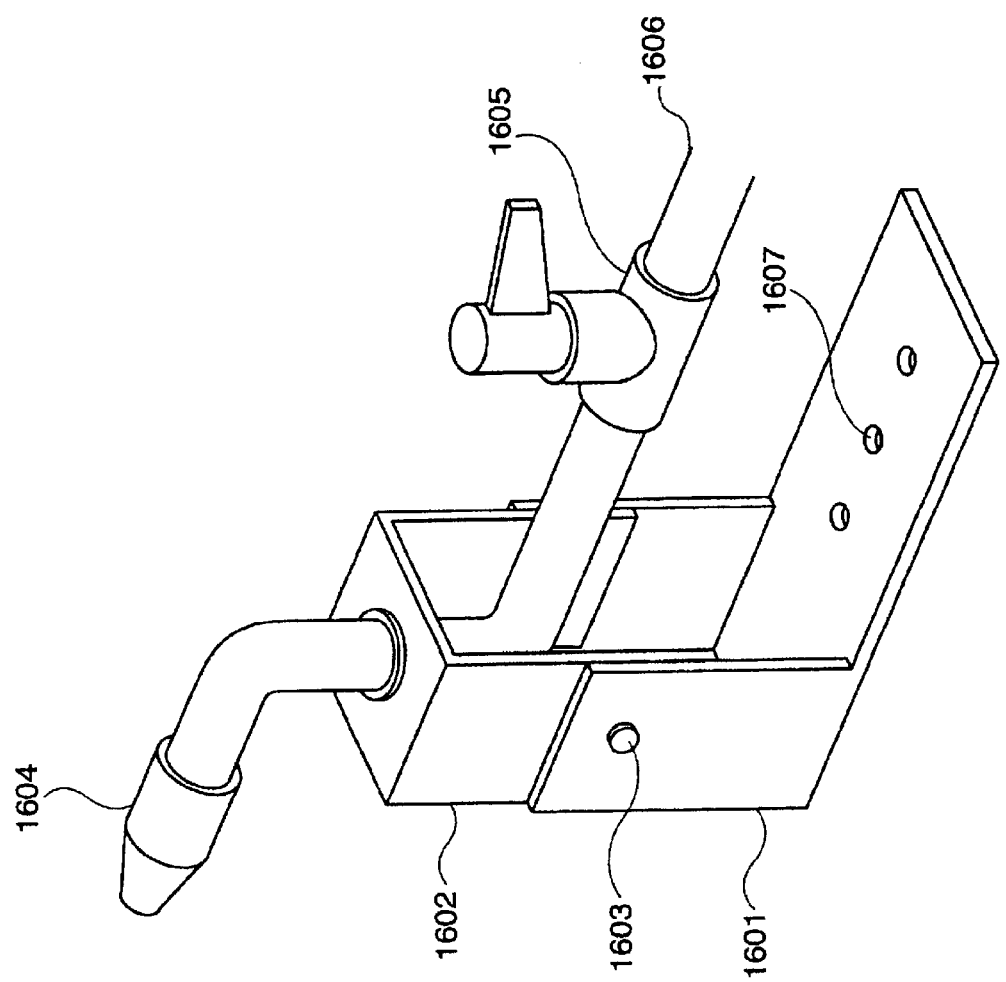

FIG. 139 is a perspective view of the misting nozzle portion of the water cooler of the present invention.

Figure 140:
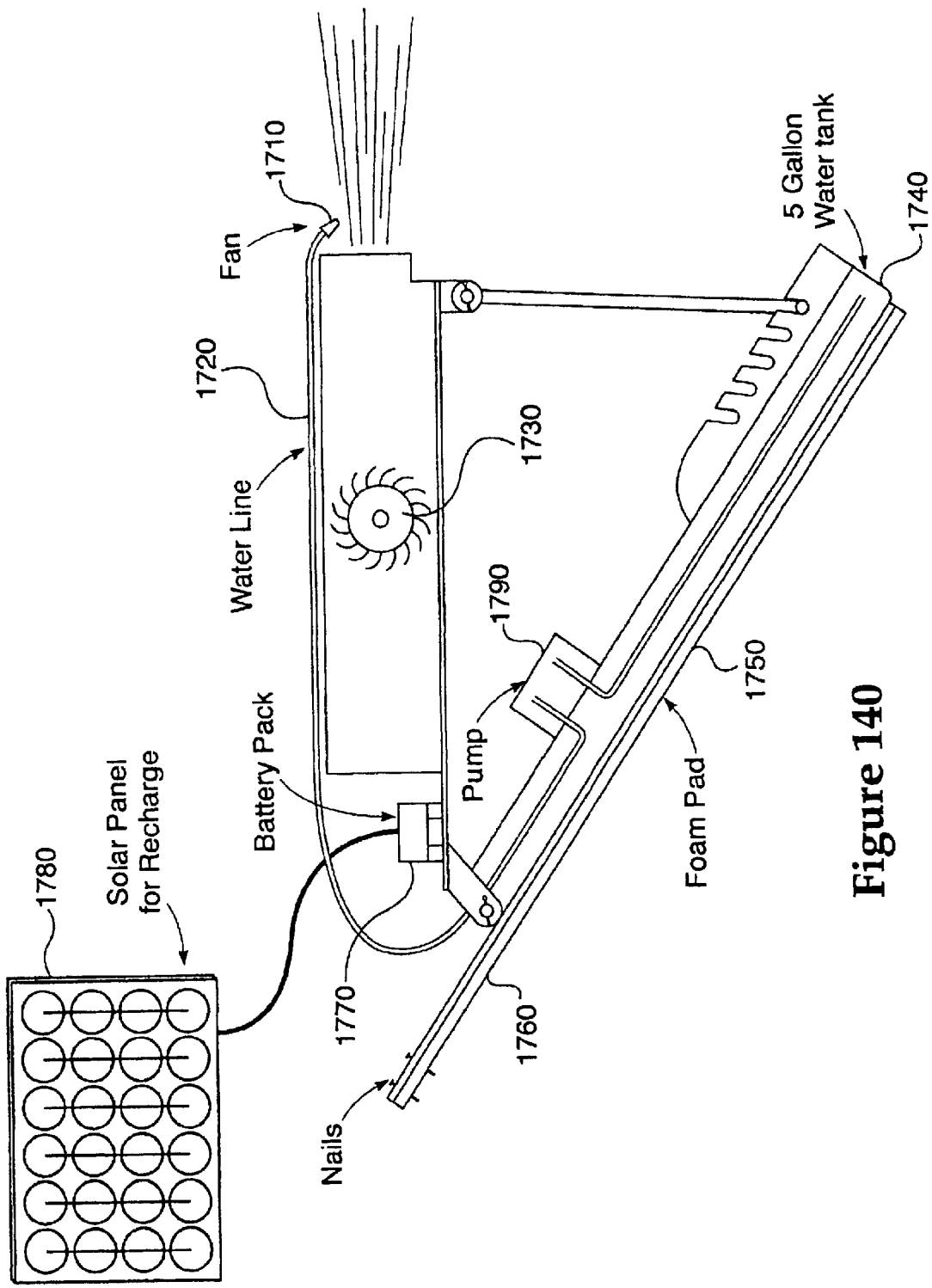

FIG. 140 is a side view of another water cooler embodiment of the present invention illustrating a battery or solar powered cooling fan and mister provided with a built-in water tank and roof mount.

Figure 141:
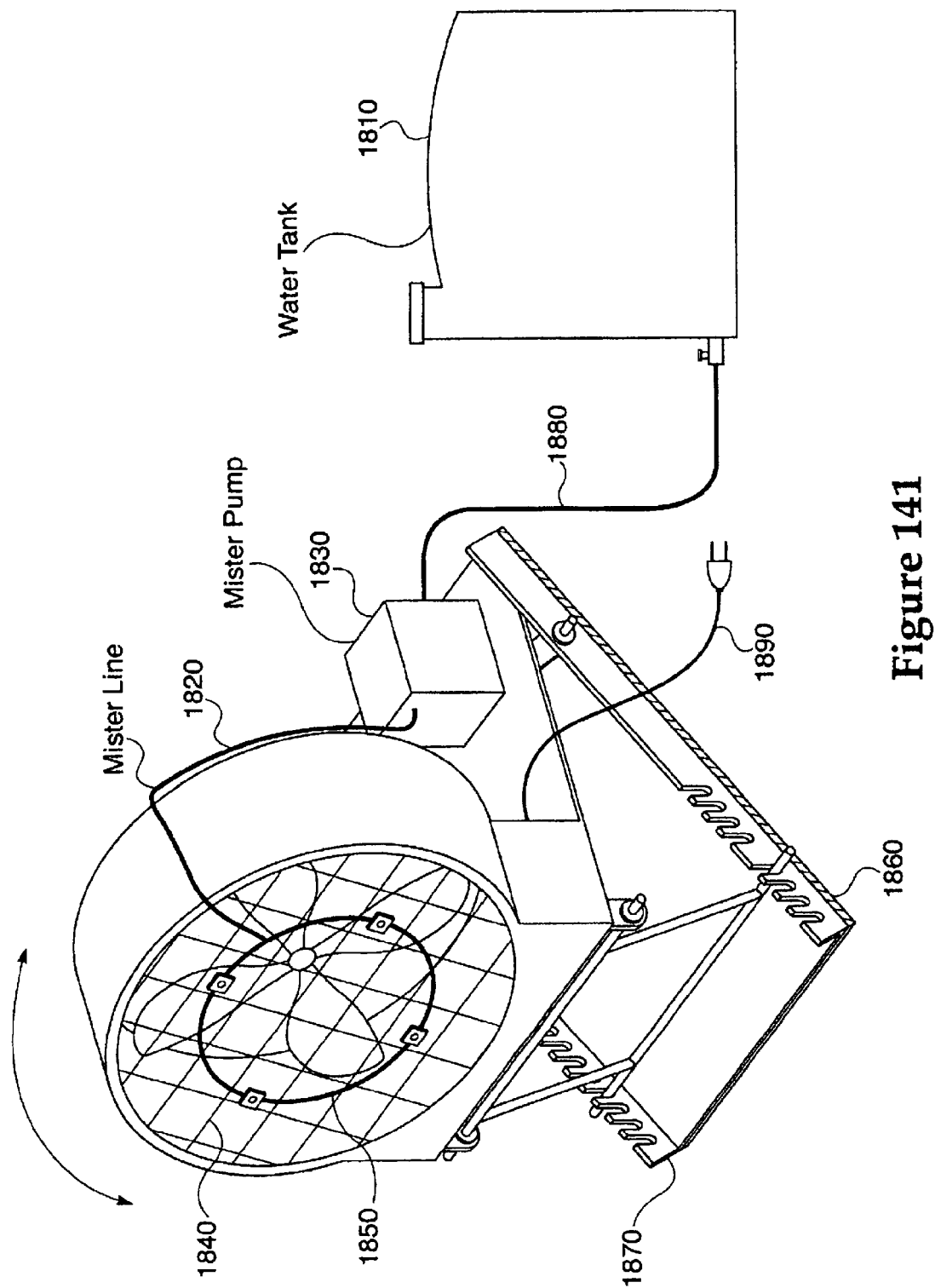

FIG. 141 is a perspective view of another embodiment of the present invention in which a radial fan powered by 110 Volts or the like, may be used in an adjustable platform, provided with a mist spray fed by a ground mounted tank.

Figure 142:
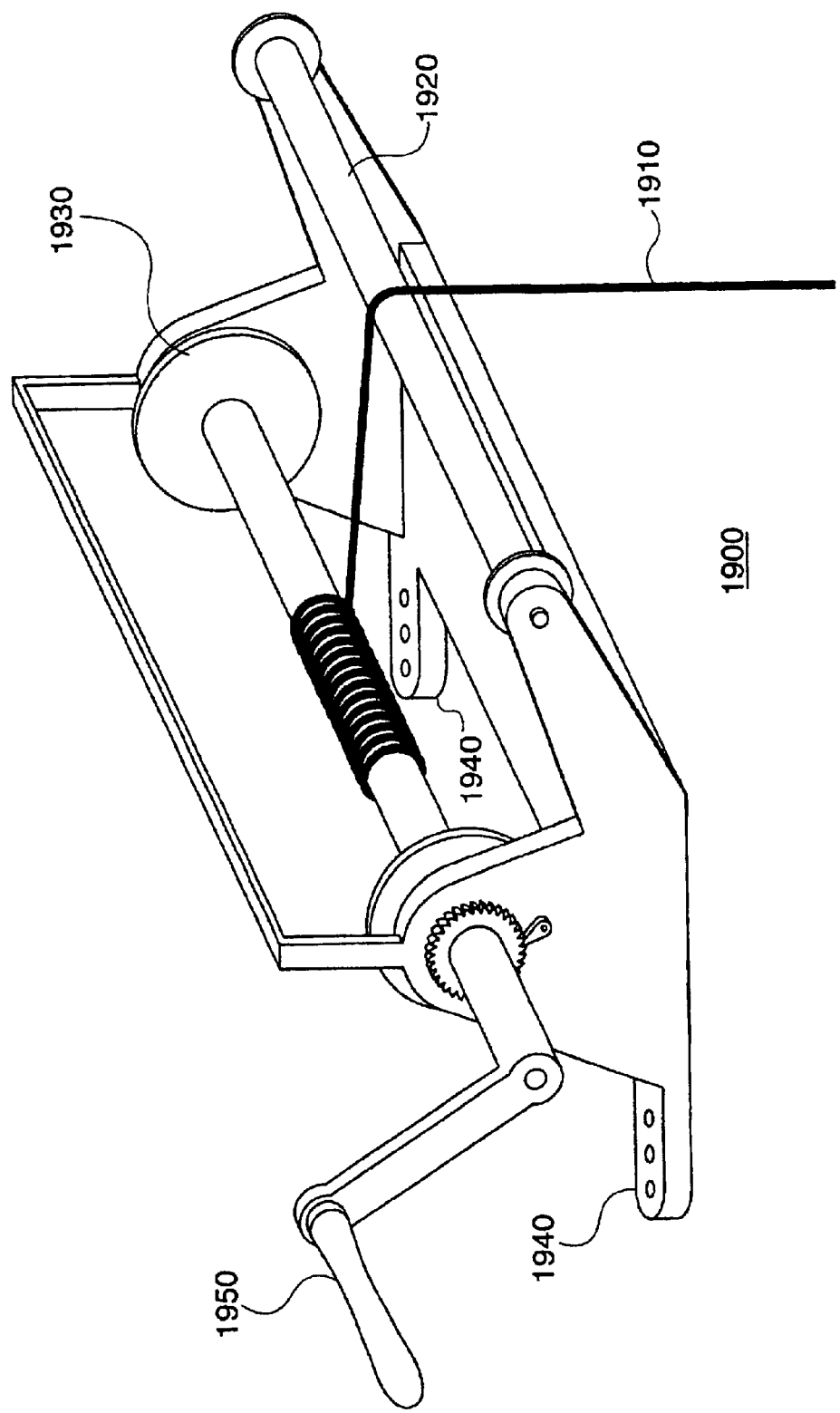

FIG. 142 is a perspective view of another embodiment of the present invention, a ROOFWINCH™, which is provided to allow a roofer or other worker to lift materials and pump jack poles up to a roof.

Figure 143:
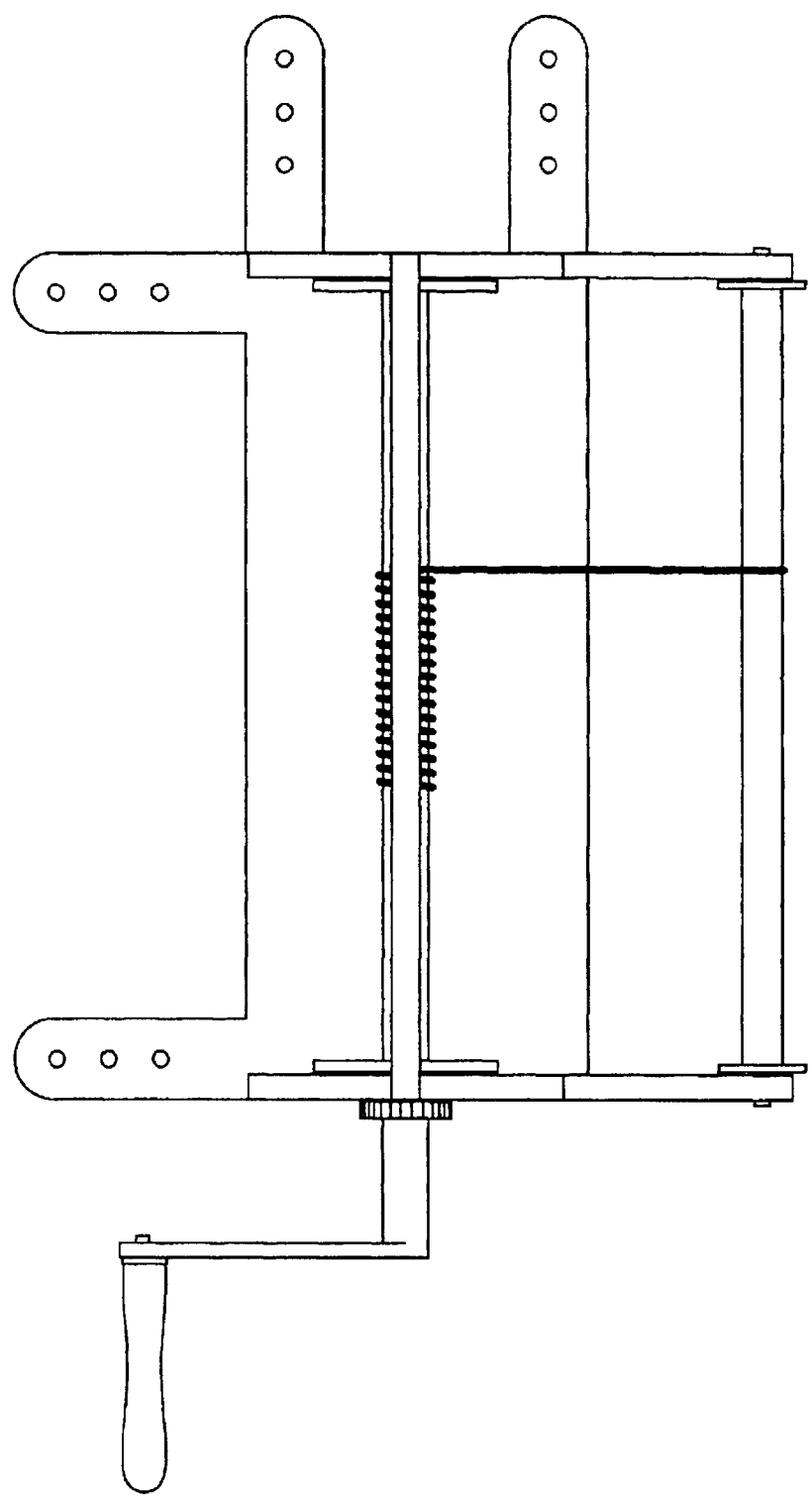

FIG. 143 is a top view of the apparatus of FIG. 142.

Figure 144:
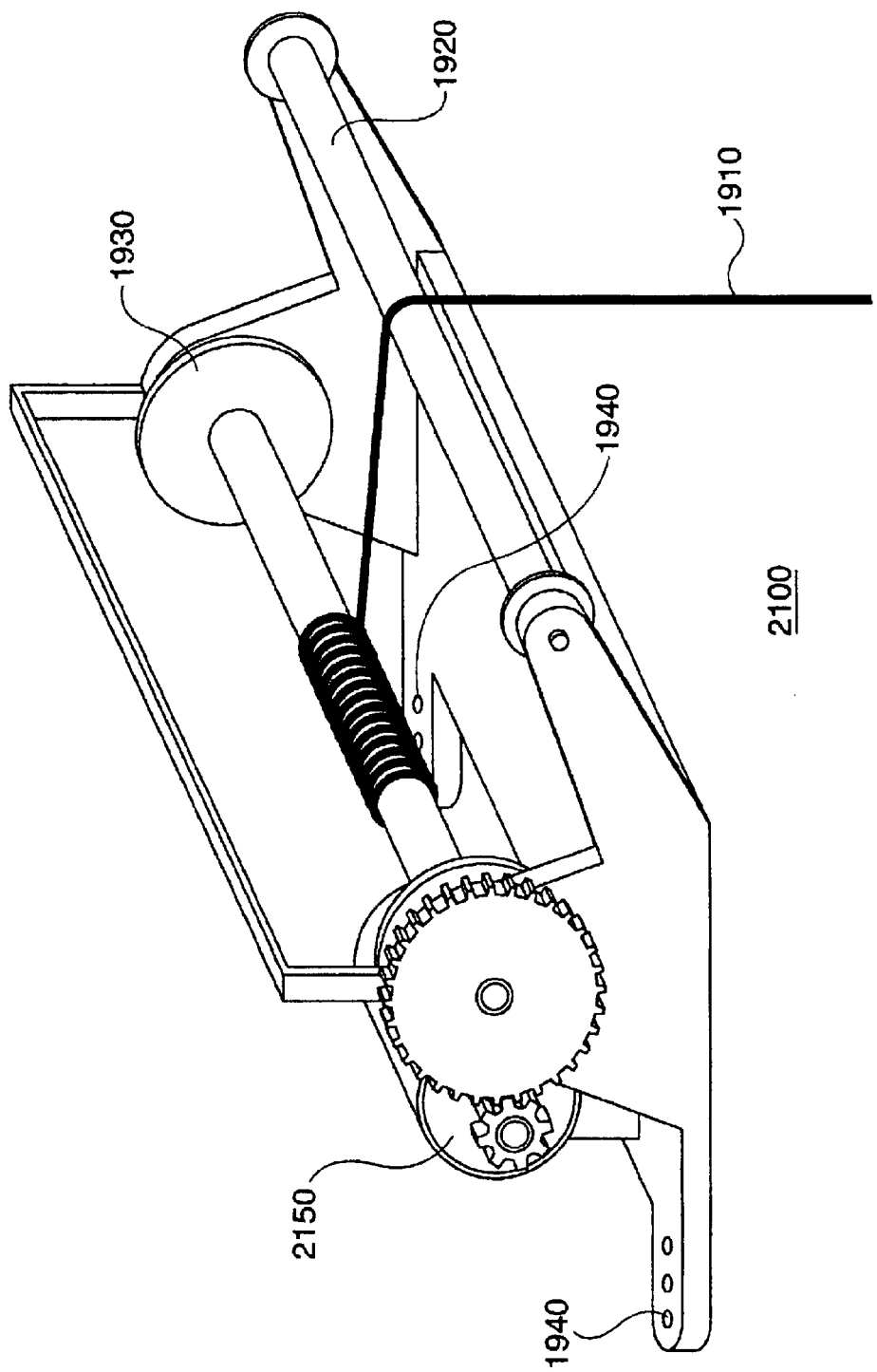

FIG. 144 is a perspective view of an alternative embodiment of the apparatus of FIG. 142.

Figure 145:
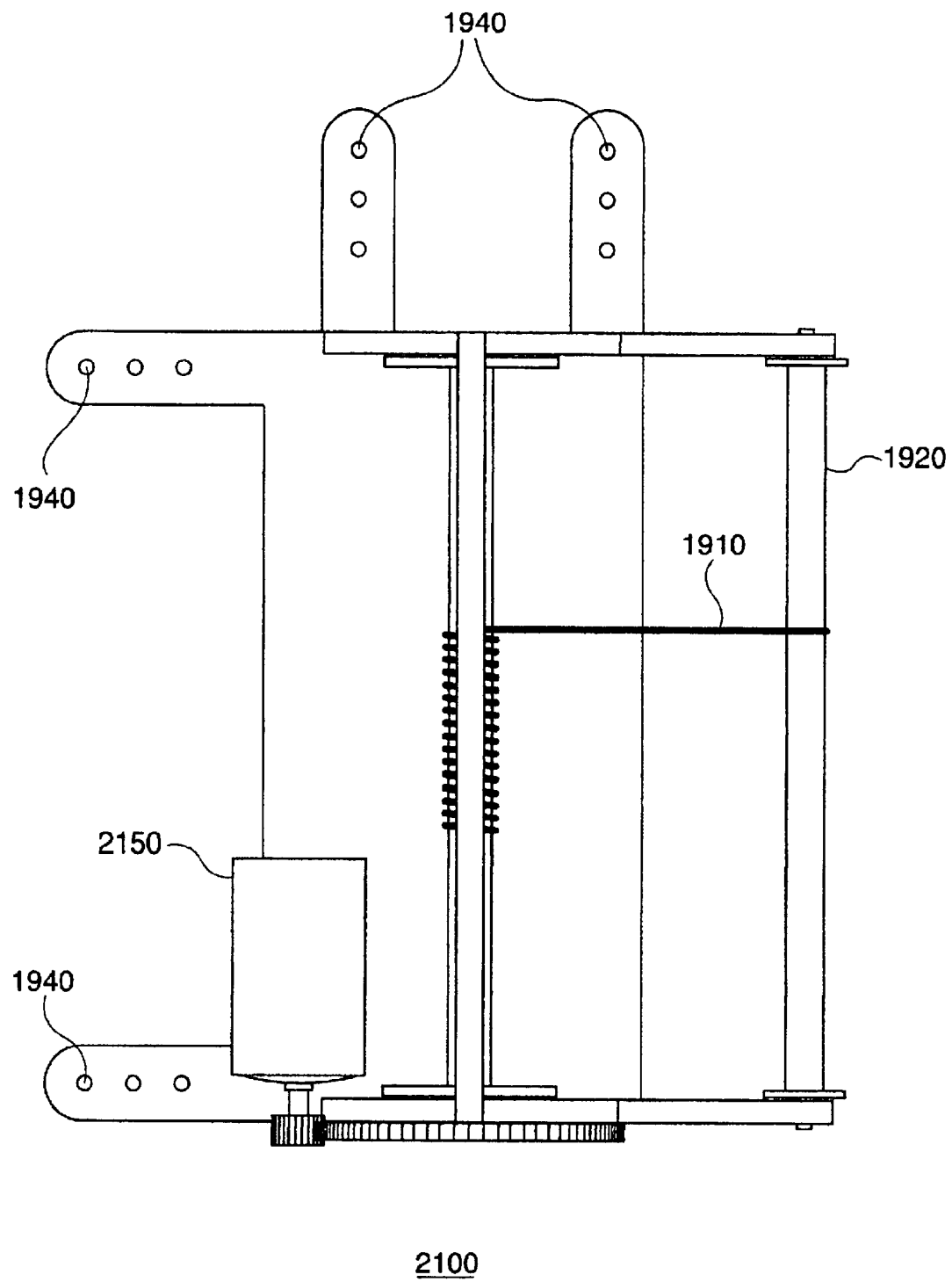

FIG. 145 is a top view of the apparatus of FIG. 144.

Figure 146:
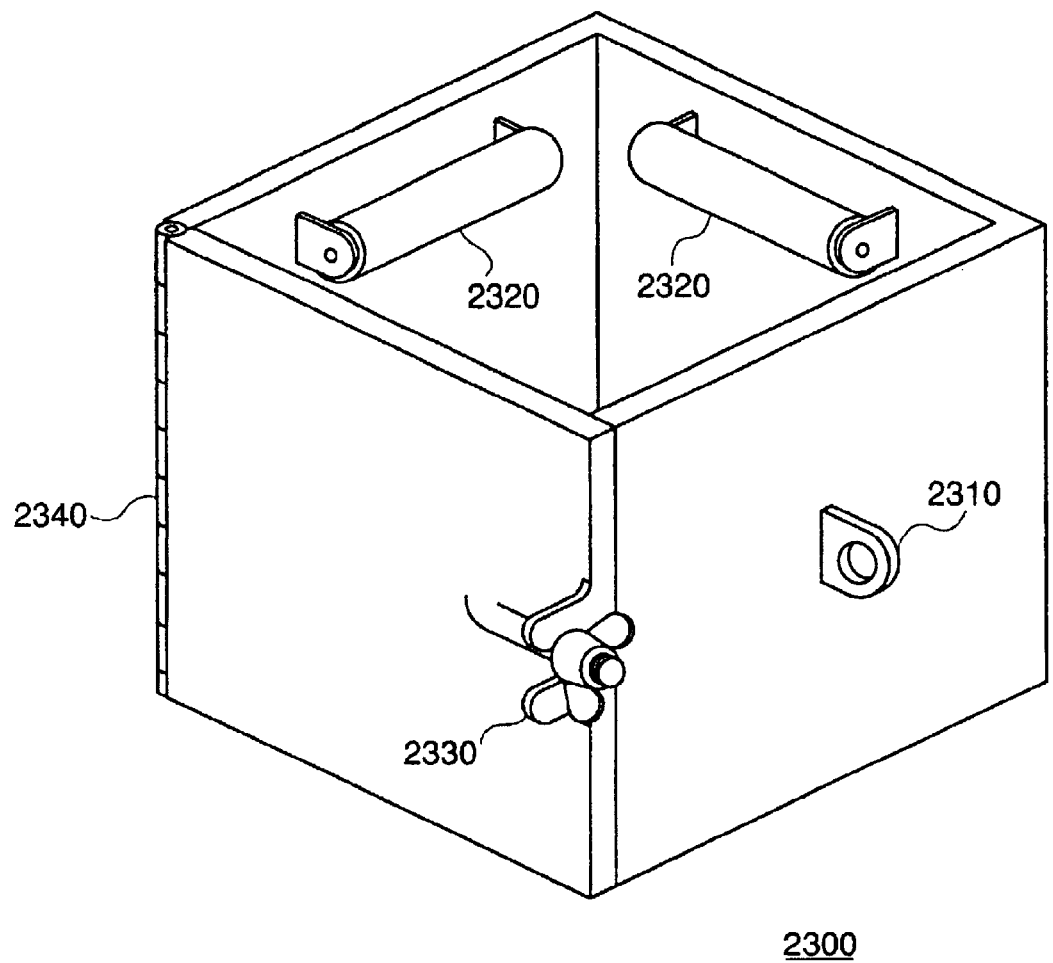

FIG. 146 is a perspective view of a pump jack pole holder of the present invention, for use with the ROOFWINCH™.

Figure 147:
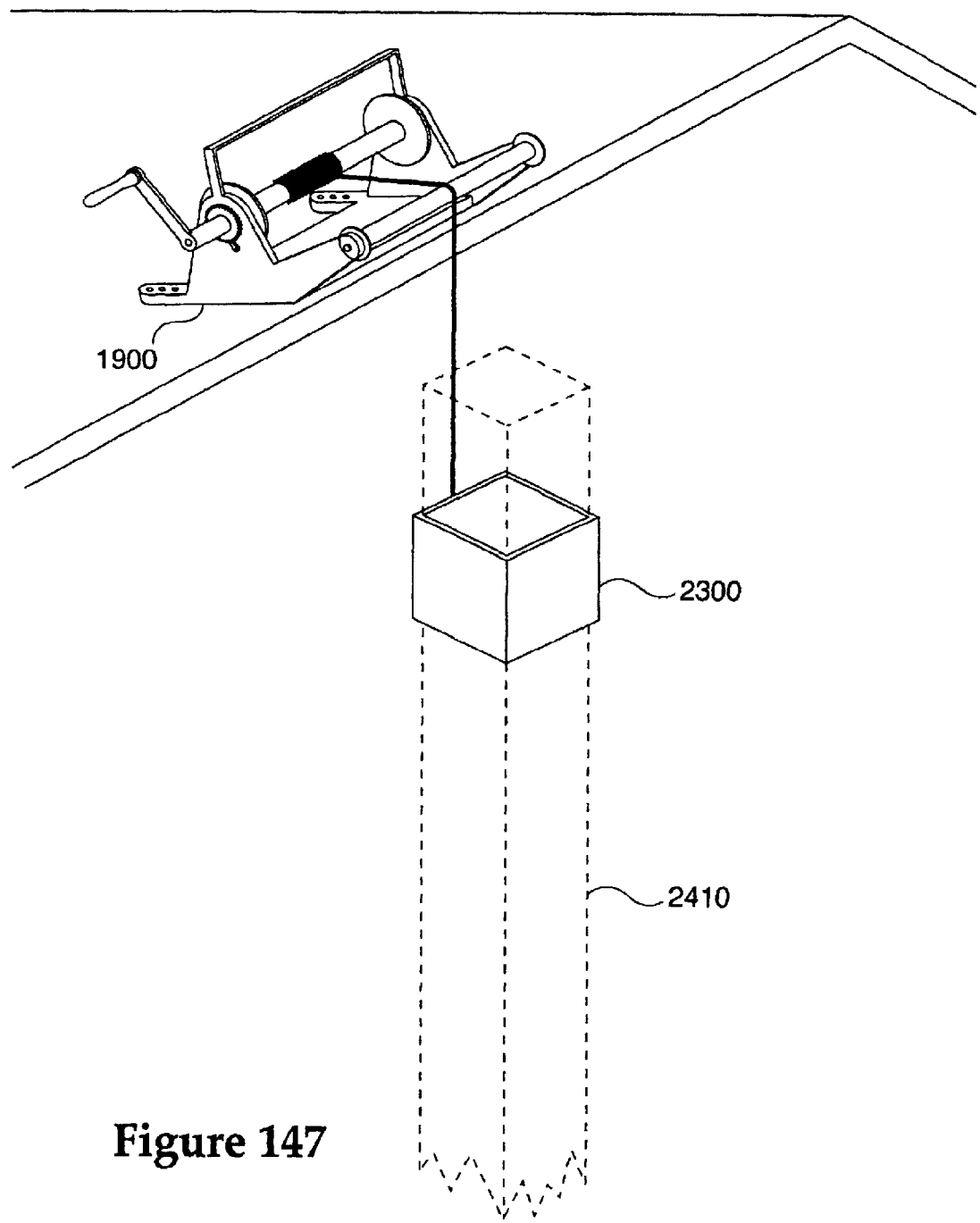

FIG. 147 is a perspective view of the apparatus of FIGS. 142–143 and FIG. 146 as used to haul up a pump jack pole.

Figure 148:
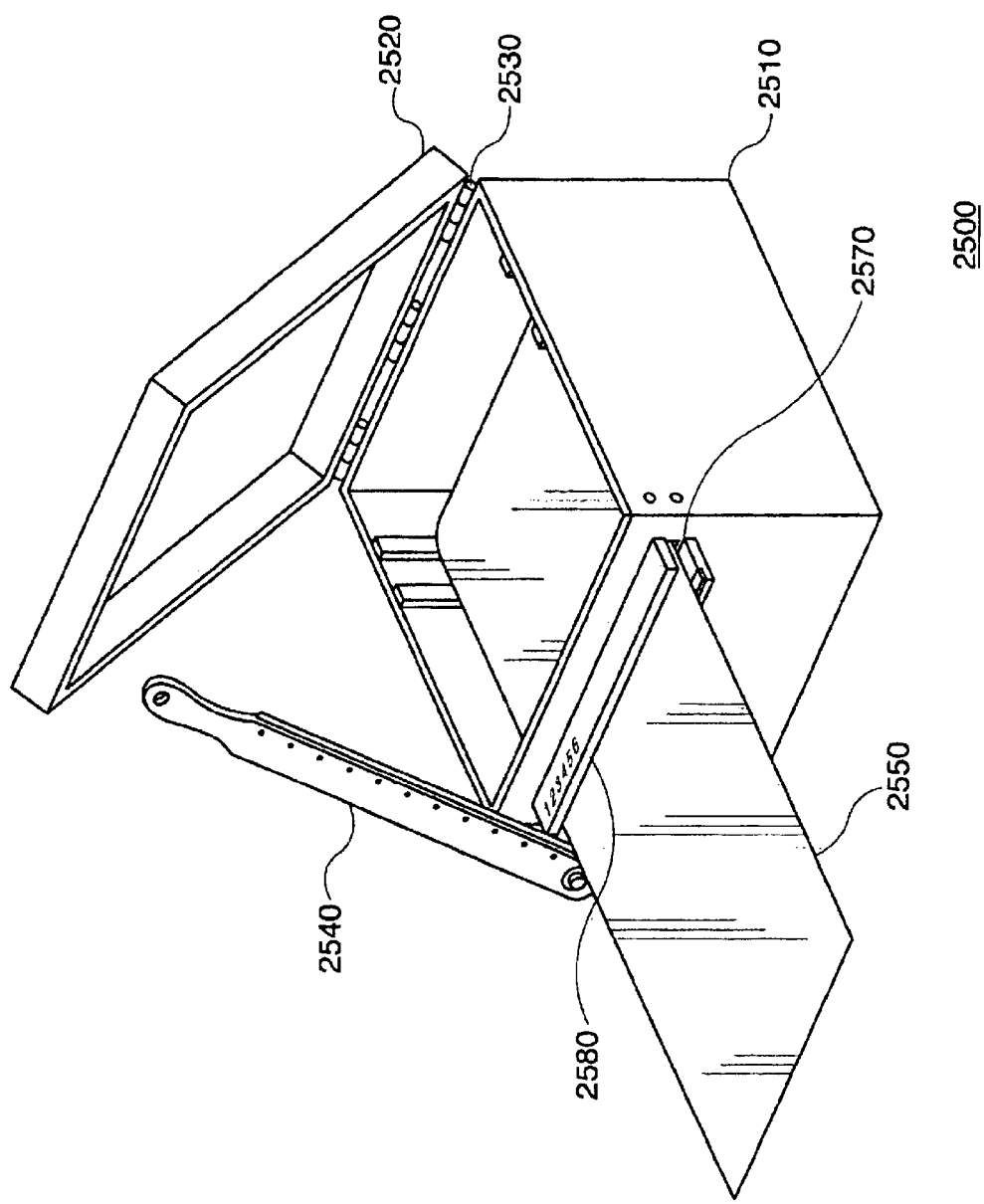

FIG. 148 is a perspective view of the FLASHING MASTER™ of the present invention.

Figures 149, 150:
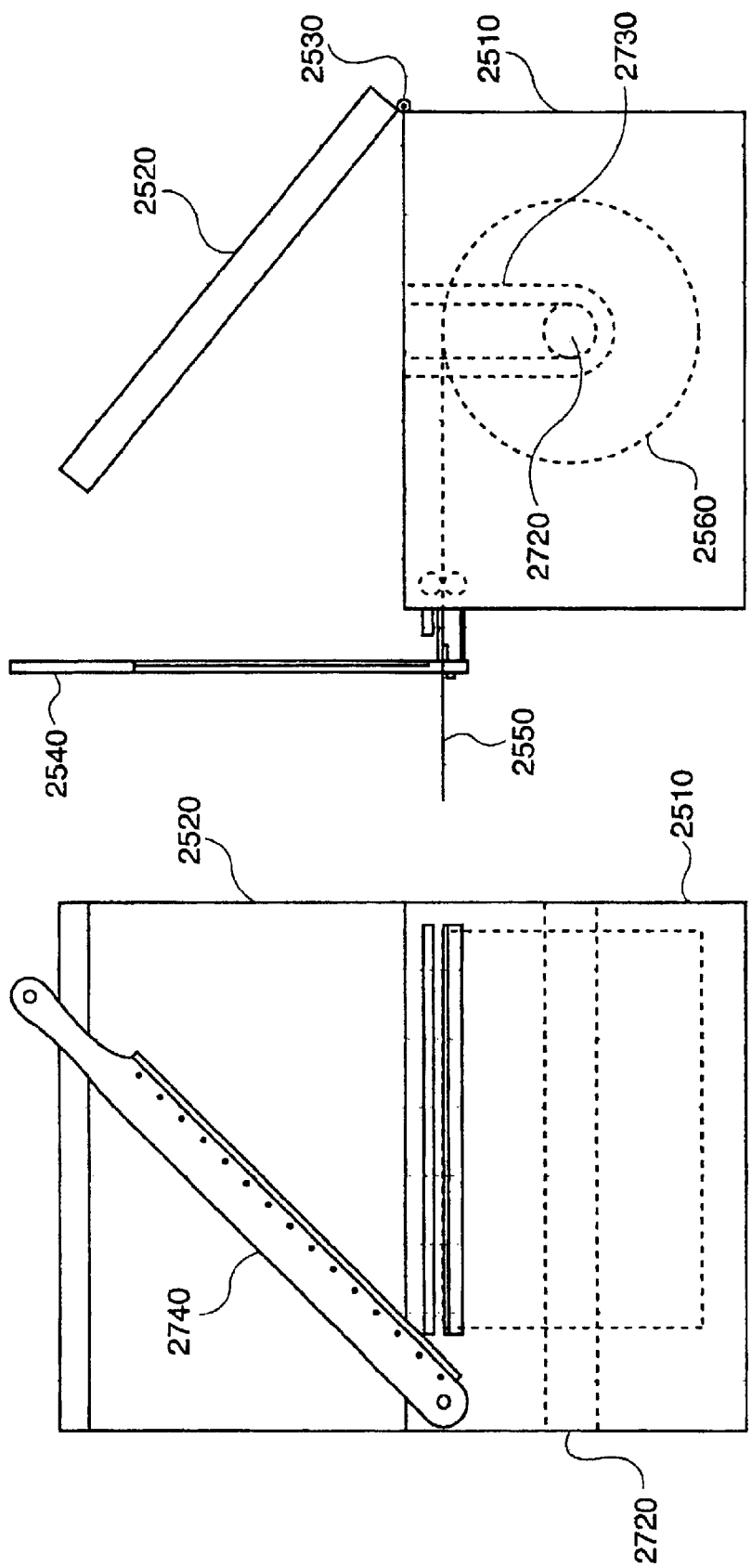

FIG. 149 is a front view of the FLASHING. MASTER™ of the present invention.

FIG. 150 is a side view of the FLASHING MASTER™ of the present invention.

Figure 151:
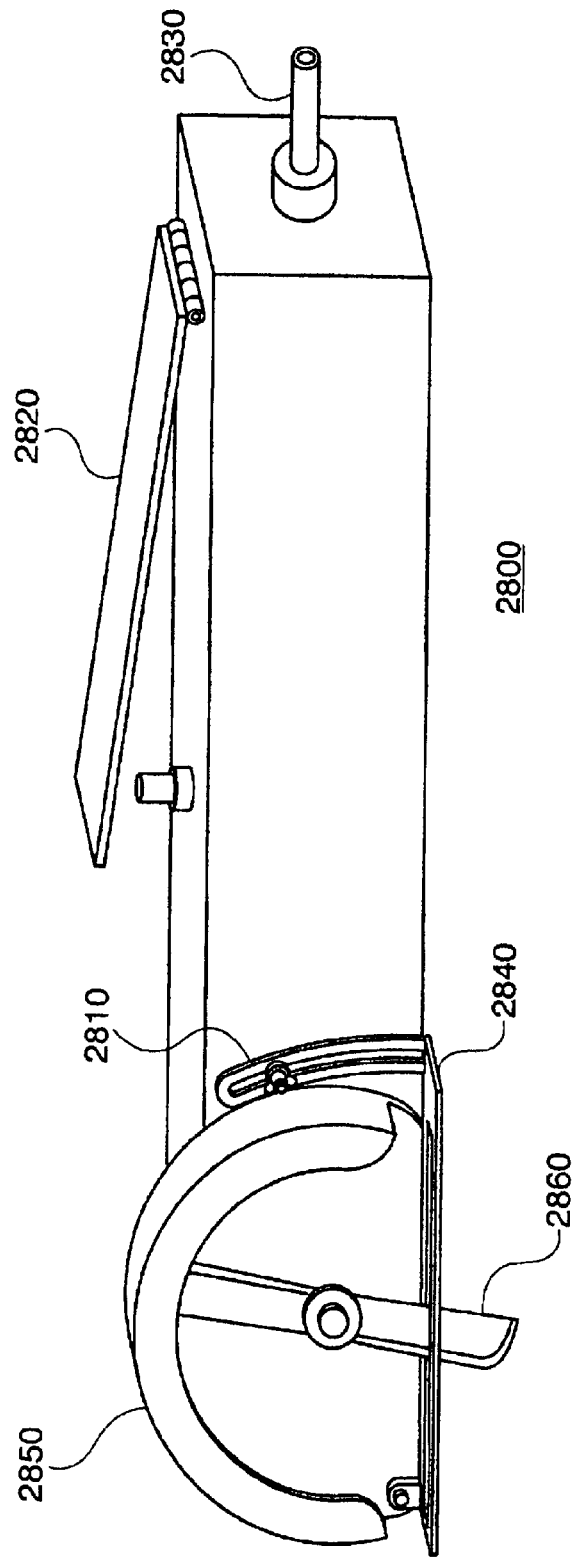

FIG. 151 is a side view of a pneumatic powered roof shingle cutting tool or SHINGLESAW™ of the present invention.

Figure 152:
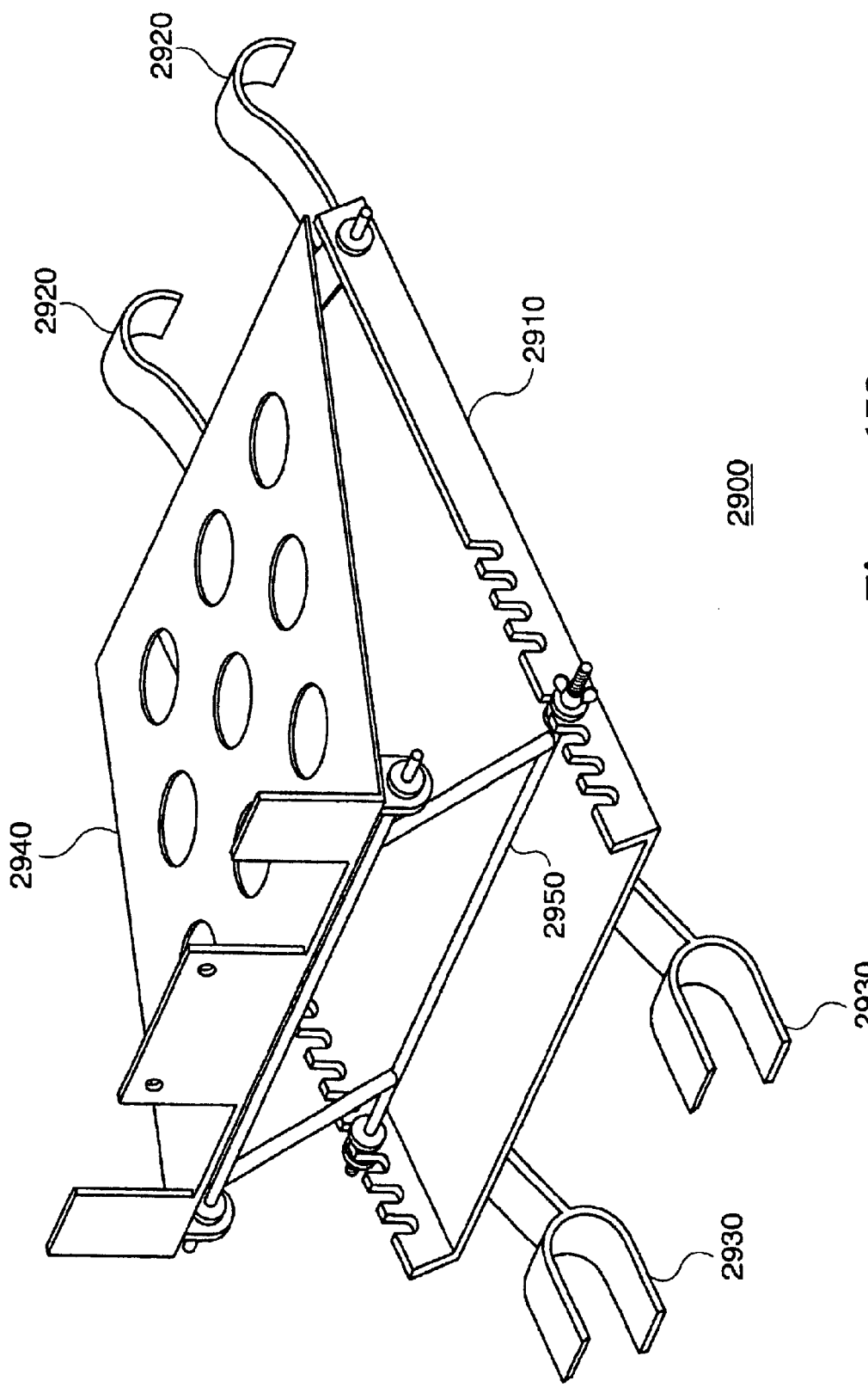

FIG. 152 is a perspective view of the ROOFLADDER™ adjustable ladder platform.

Figure 153:
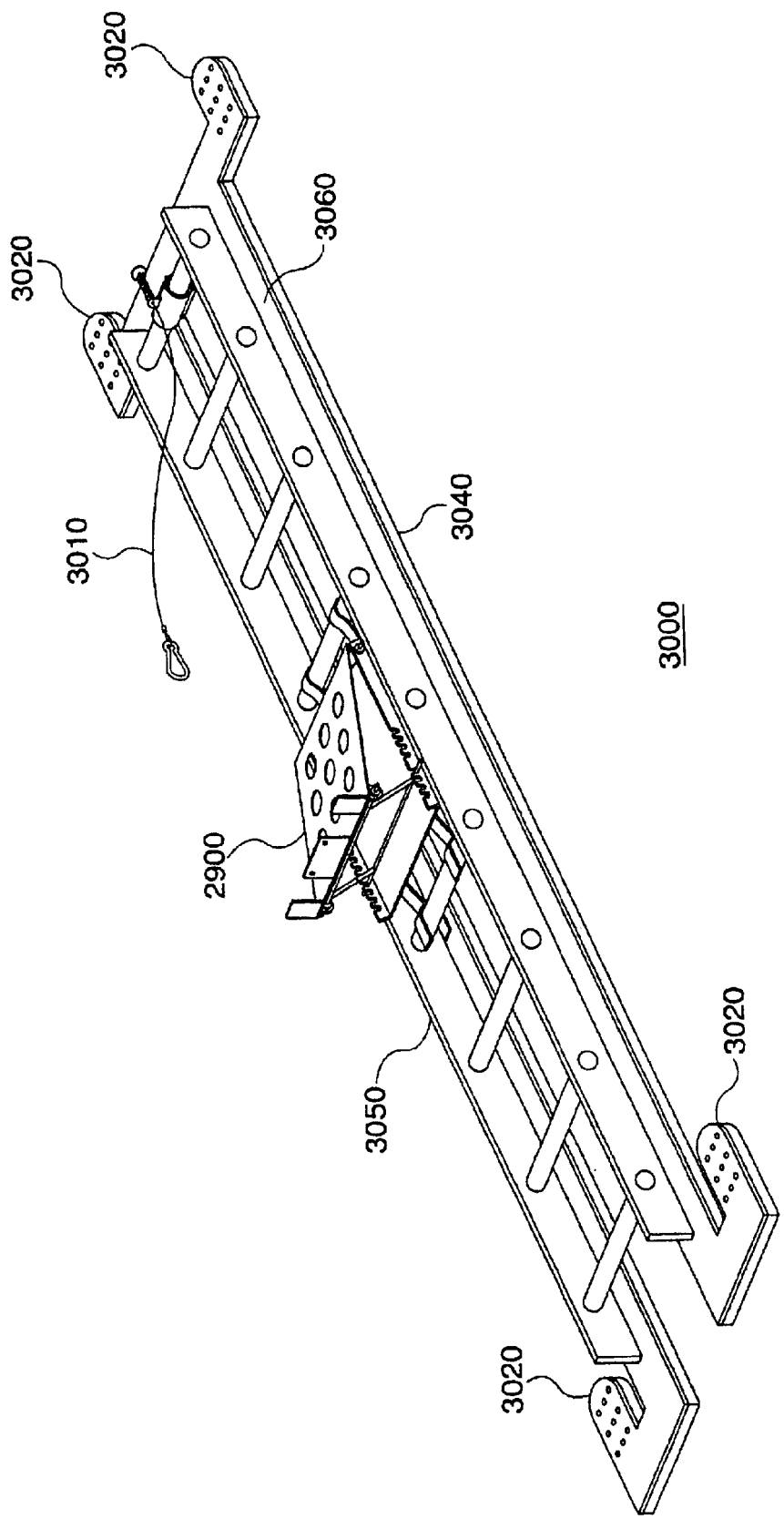

FIG. 153 a perspective view of the ROOFLADDER™ and safety strap.

Figure 154:
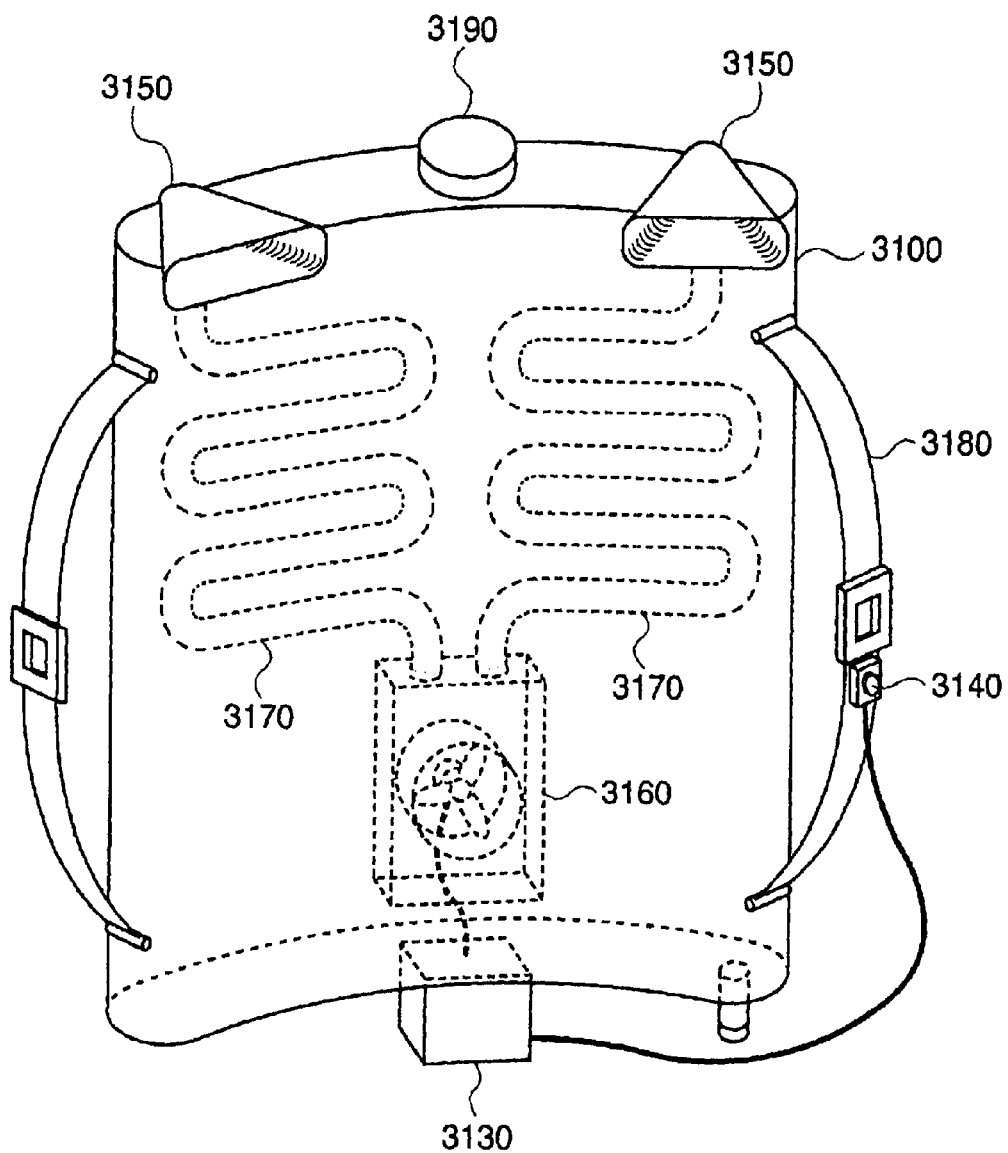

FIG. 154 is a perspective view of an alternative embodiment of the apparatus of FIG. 137.

Figure 155:
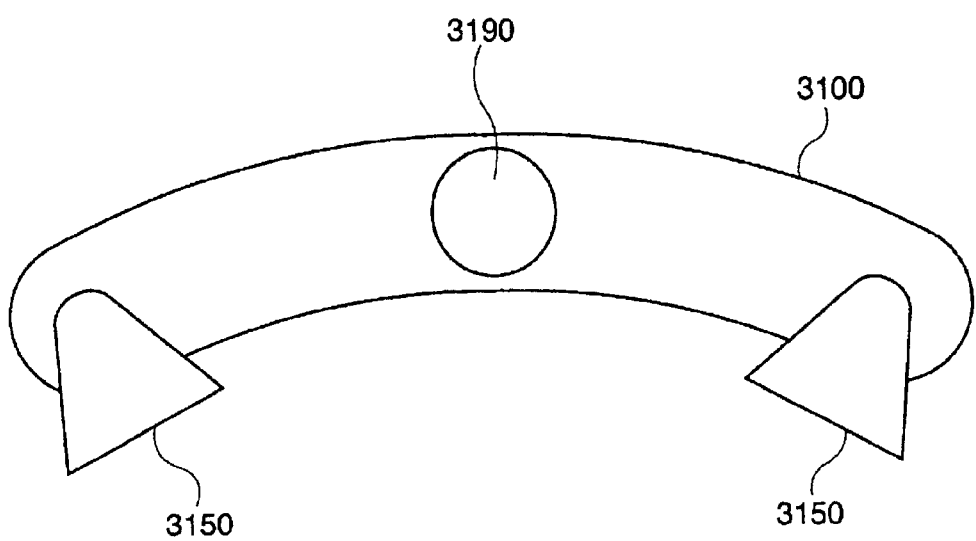

FIG. 155 is a top view of the apparatus of FIG. 154.

Figure 156:
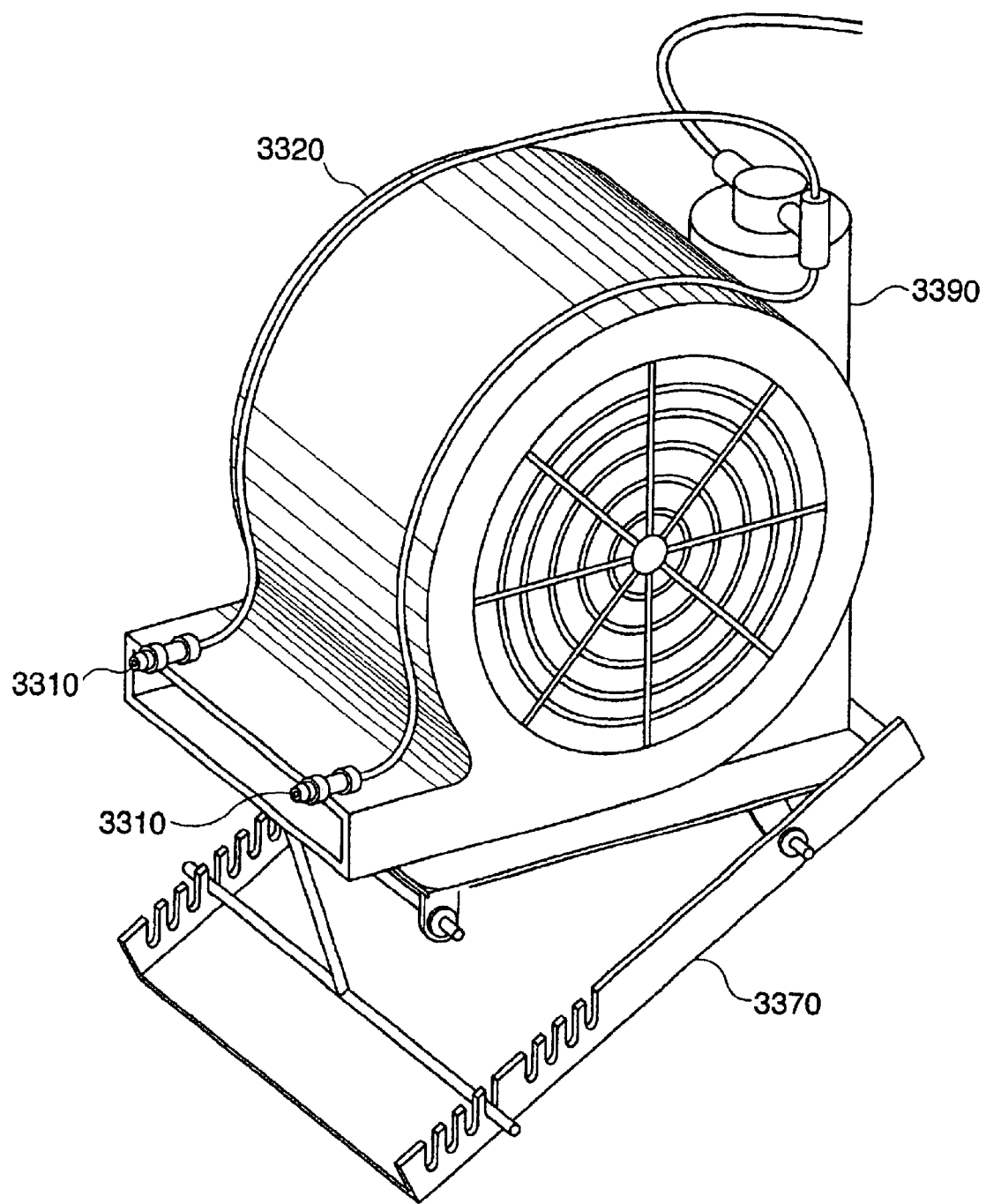

FIG. 156 is a perspective view of an alternative embodiment of the eighth embodiment of the present invention.

Figure 157:
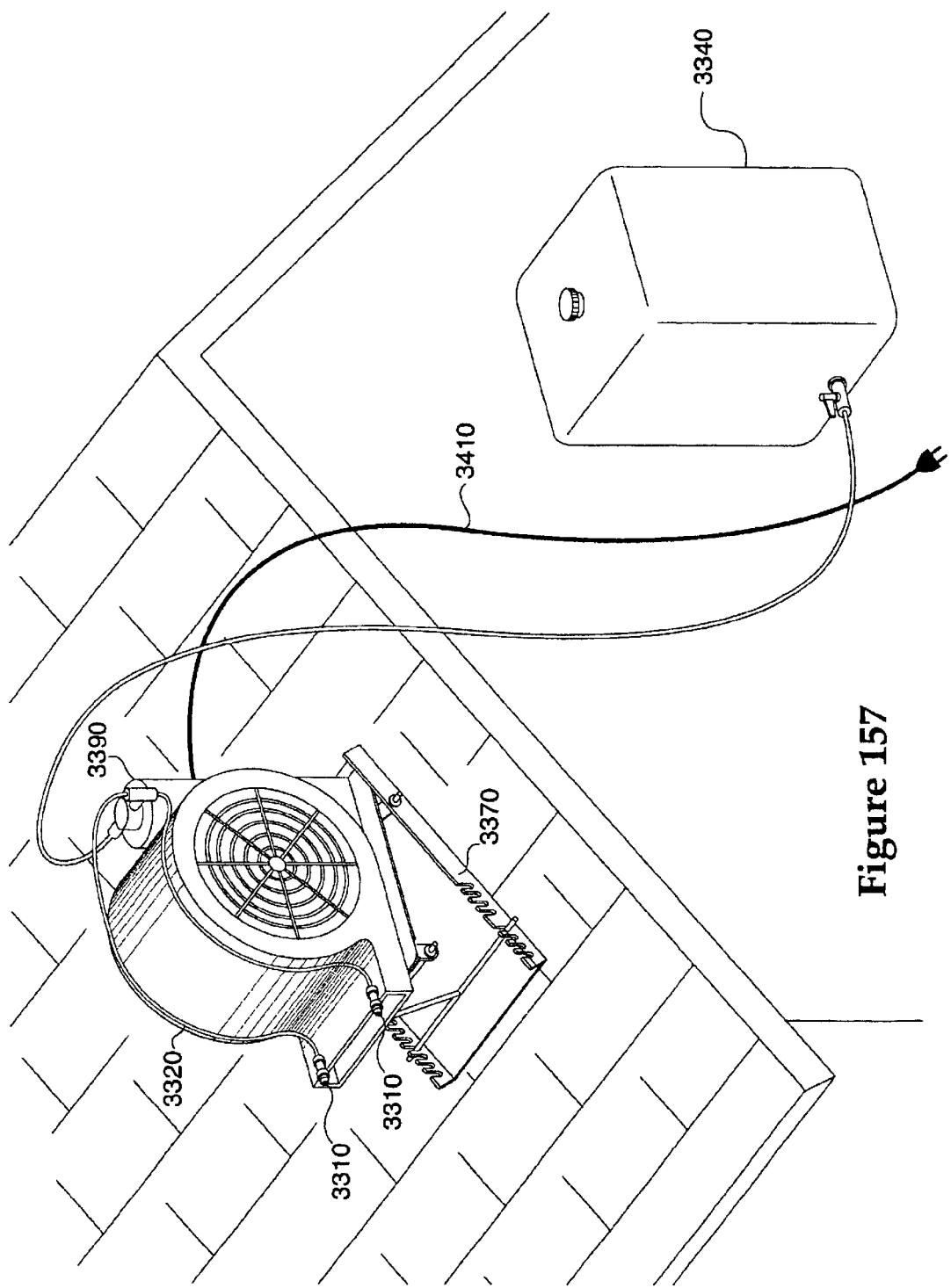

FIG. 157 is a perspective view of an alternative embodiment of the ninth embodiment of the present invention with an external water tank shown.

Figure 158:
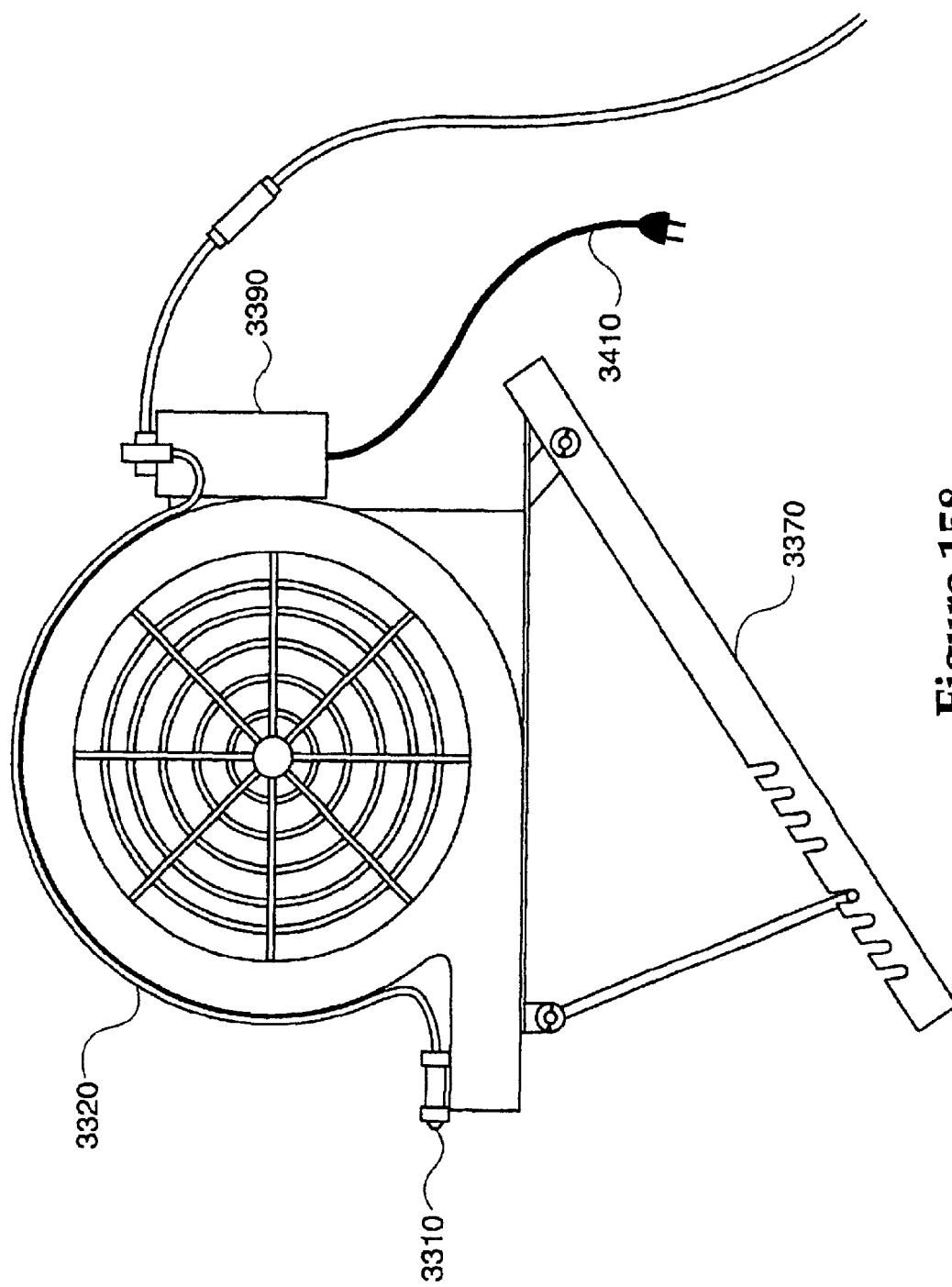

FIG. 158 is a side view of the alternative embodiment of the ninth embodiment of the present invention of FIG. 157.

Figure 159:
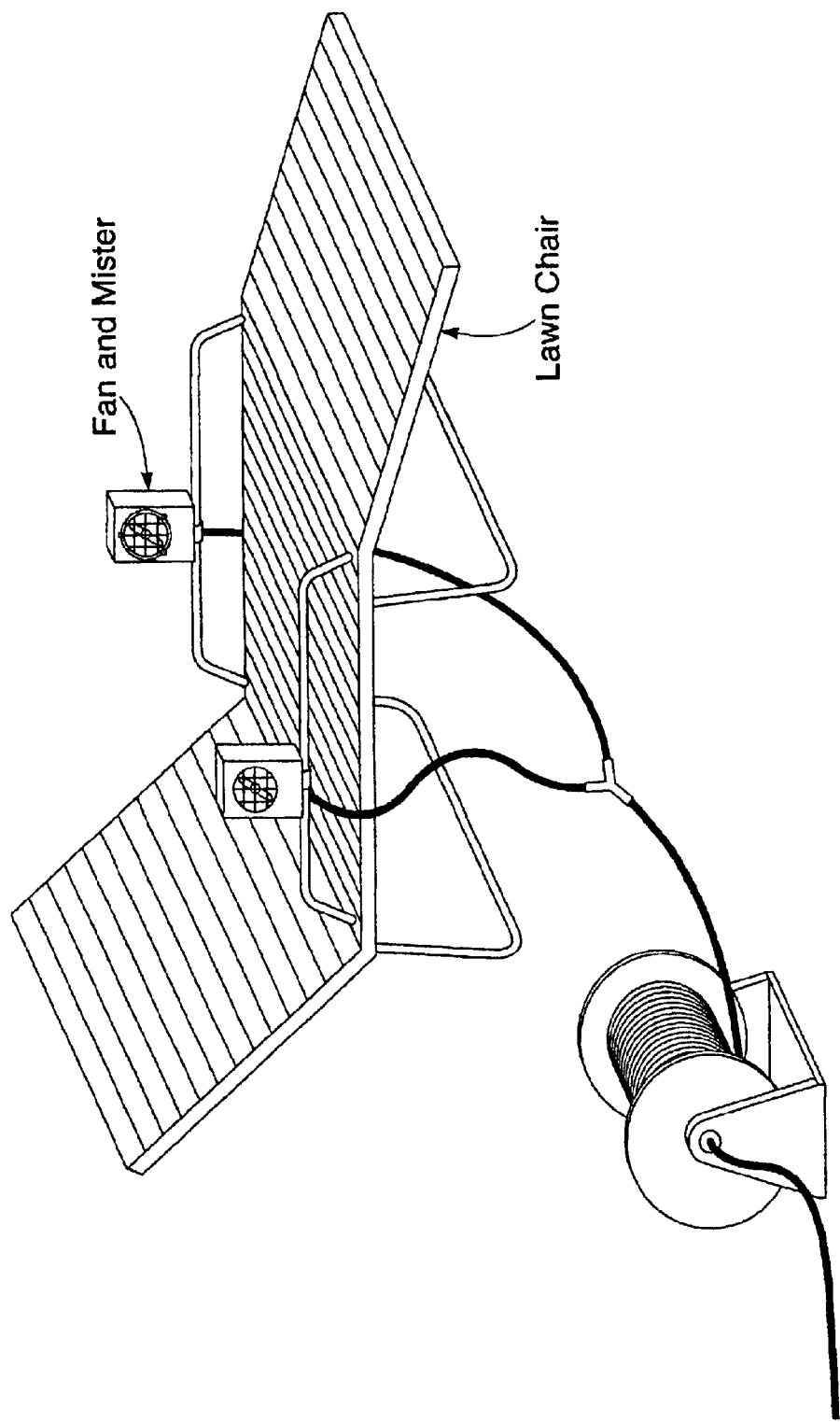

FIG. 159 is a perspective view of an alternative embodiment of the ROOFMISTER™, the SUNTAN CHAIR AND MISTER.

Figure 160:
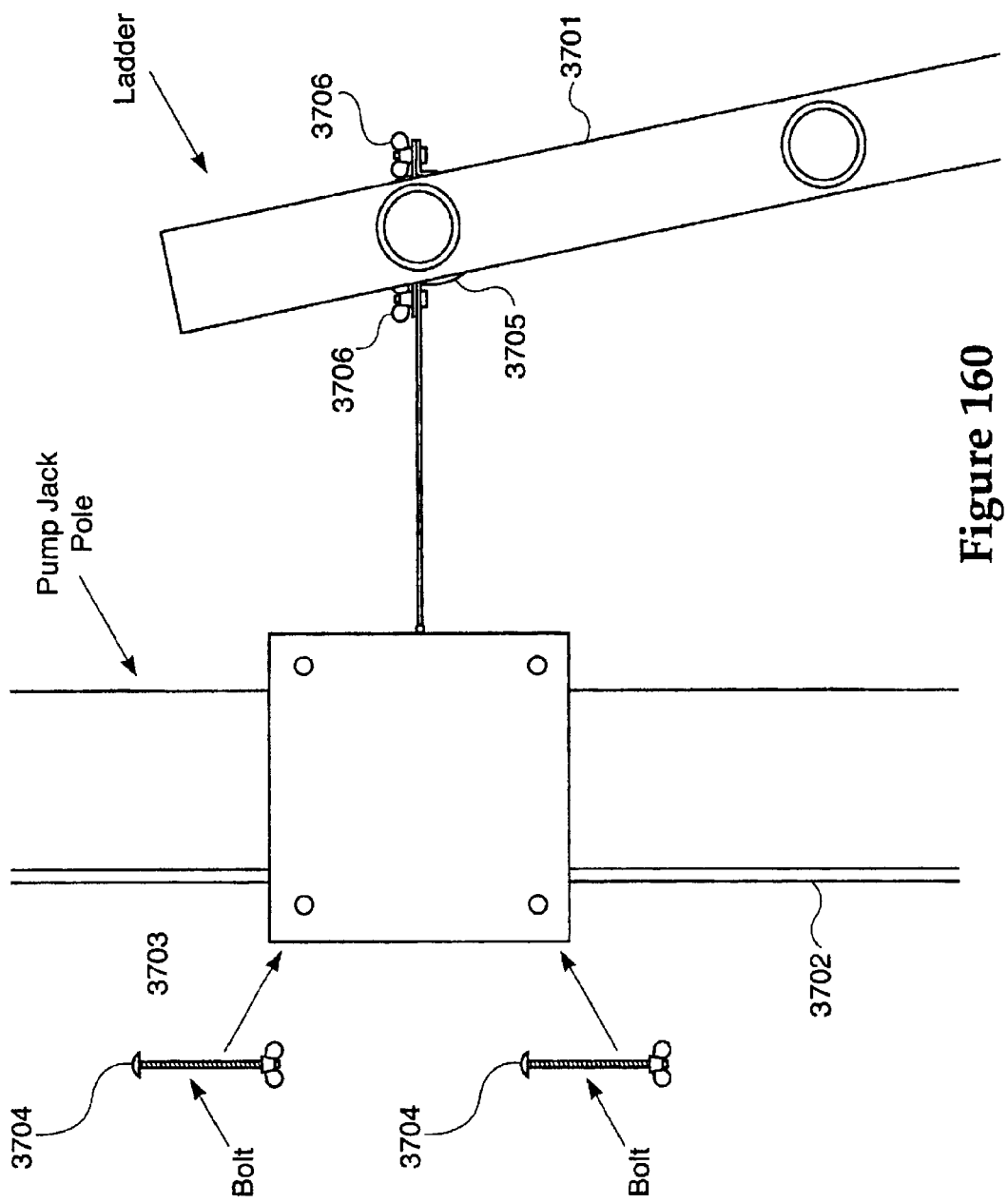

FIG. 160 is a side view of the LADDER BRACE™ of the present invention.

Figure 161:
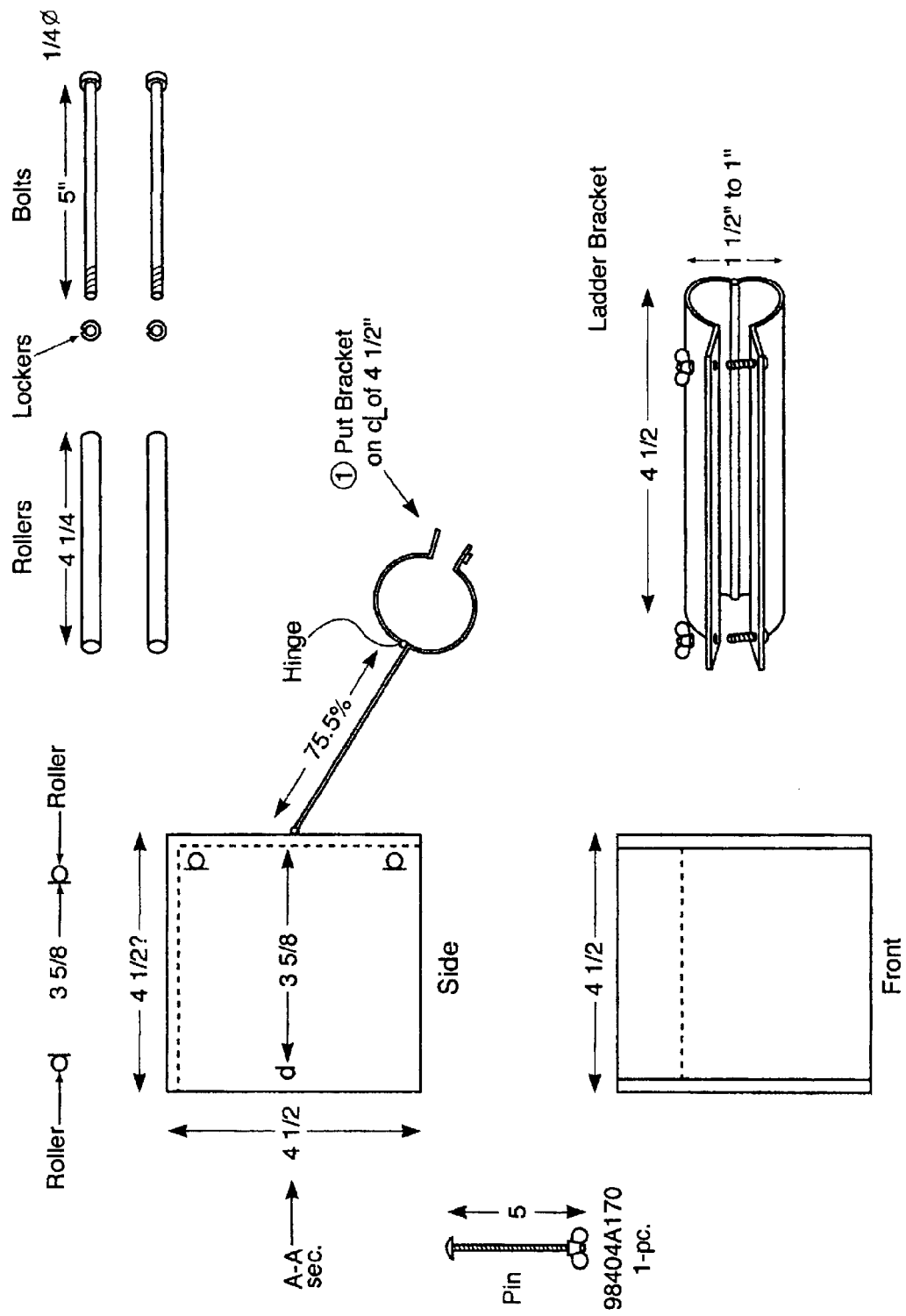

FIG. 161 contains several views of the components of the LADDER BRACE™ of the present invention.

Figure 162:
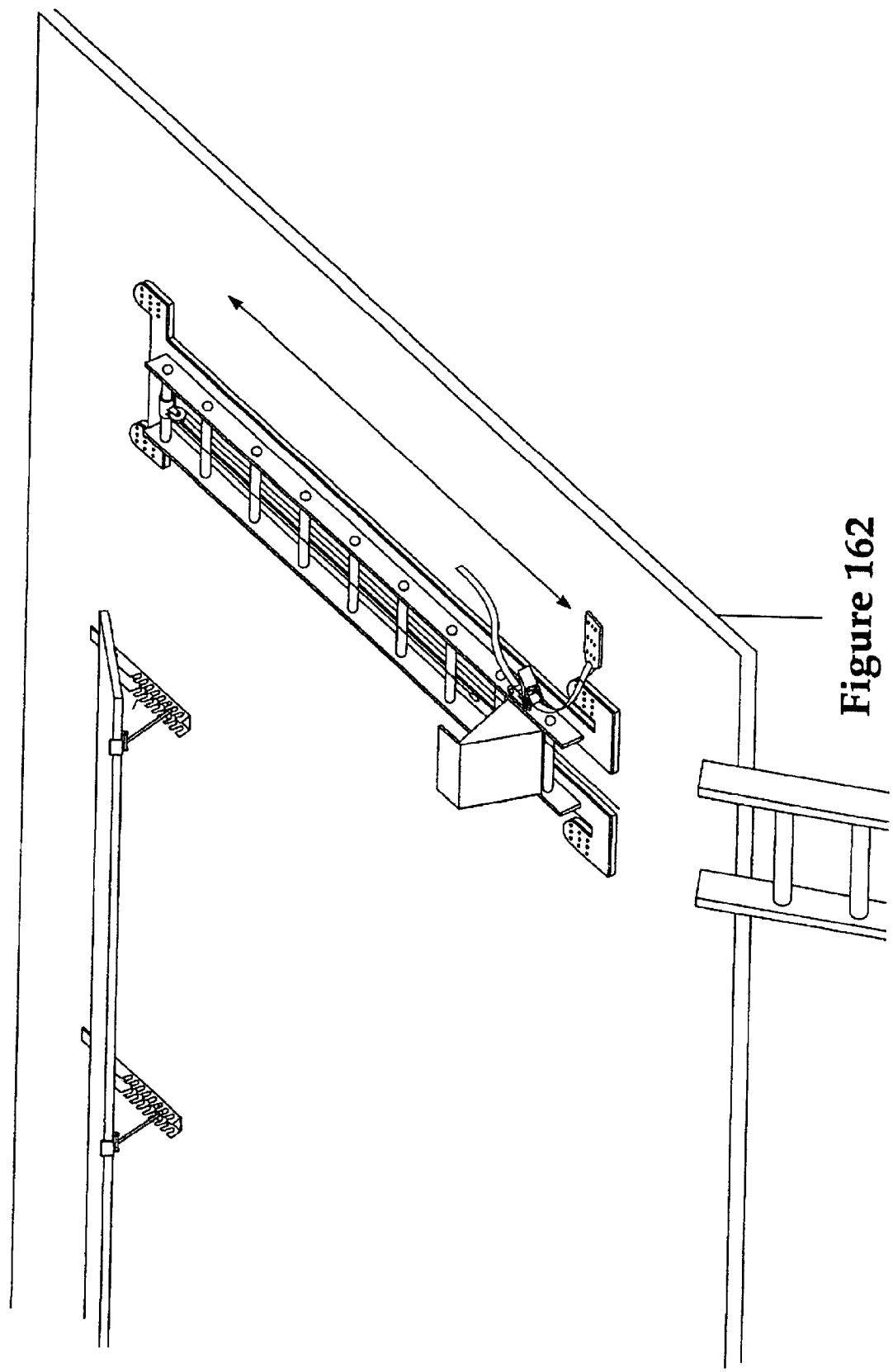

FIG. 162 is a perspective view of another embodiment of the ROOF HOIST™ of the present invention.

Figure 163:
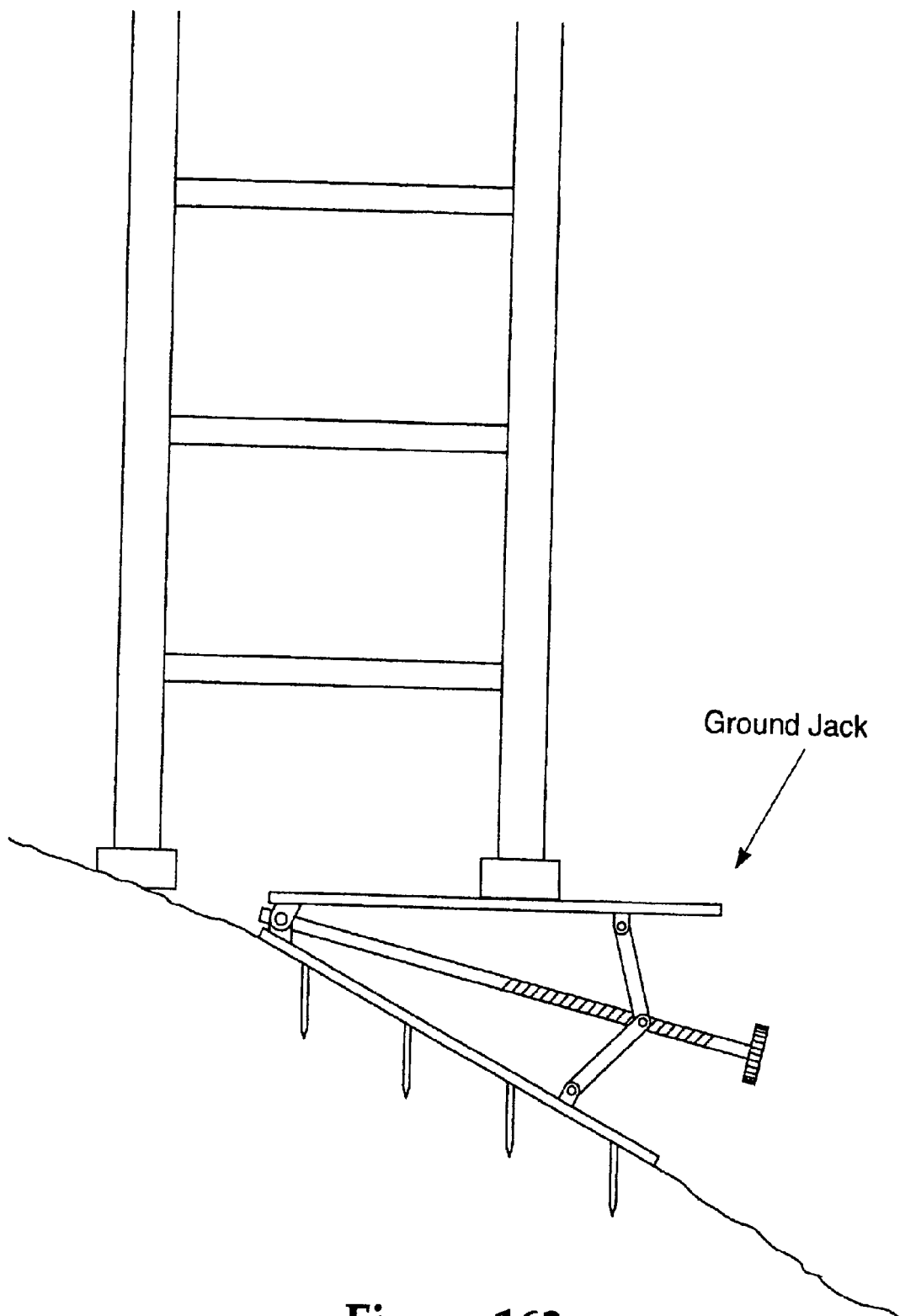

FIG. 163 is front view of the LADDER GROUND SUPPORT of the present invention.

Figure 164:
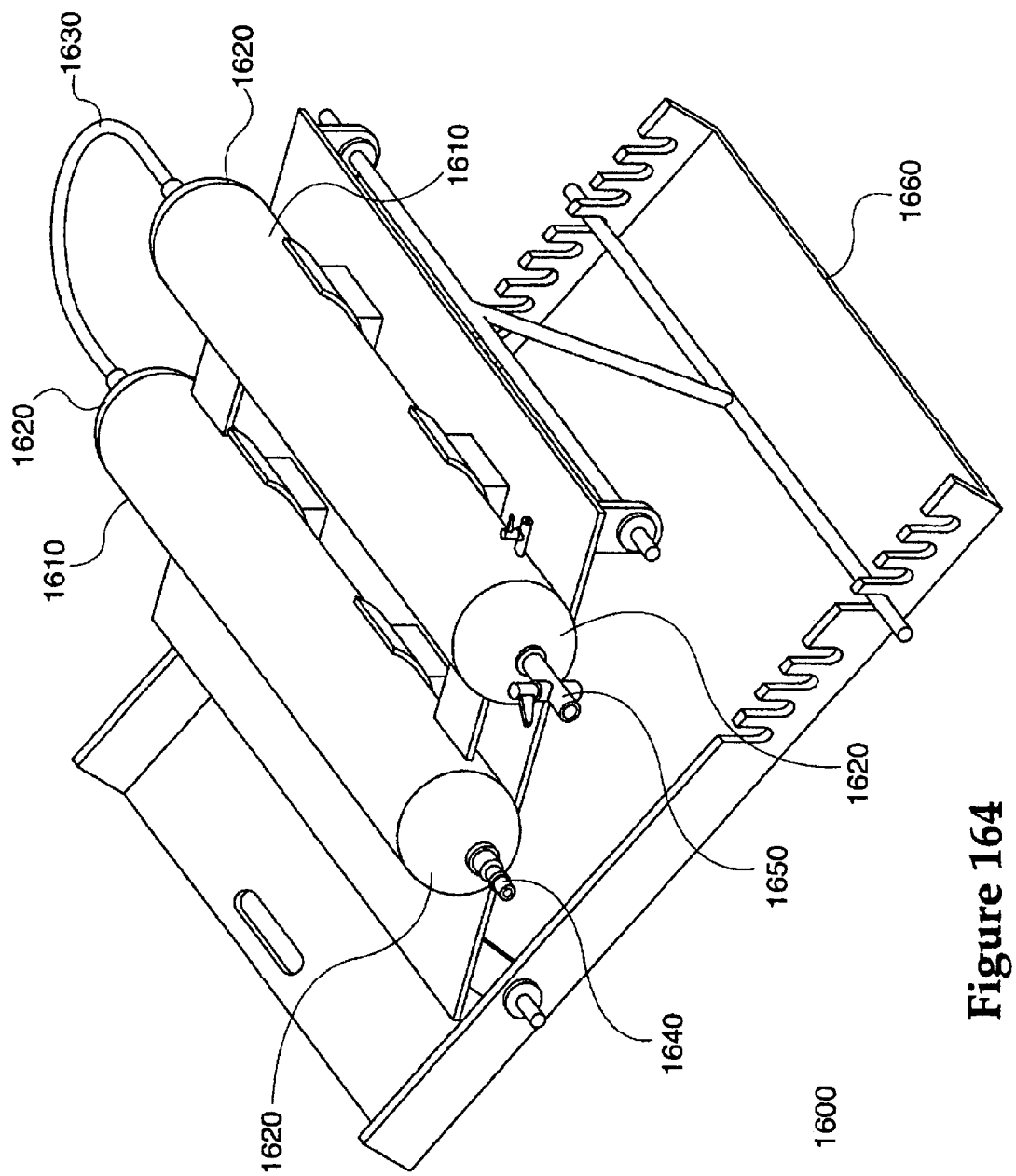

FIG. 164 is a perspective view of the ROOFTANK™ of one embodiment of the present invention, illustrating how two tanks may be connected in series with a hose or U-shaped tube, as attached to a support structure.

Figures 165, 166:
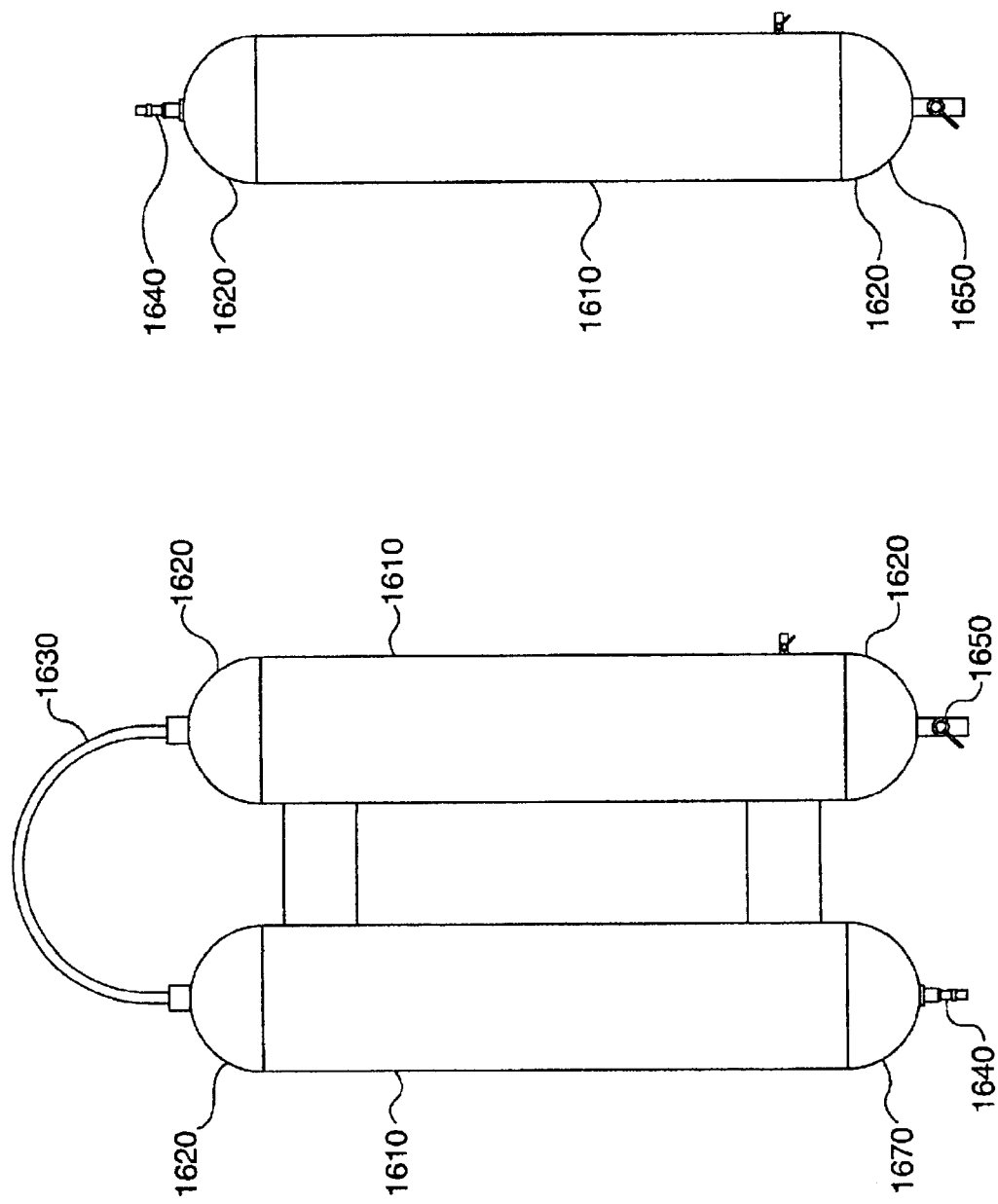

FIG. 165 is a top view of the ROOFTANK™ of one embodiment of the present invention, illustrating how two tanks may be connected in series with a hose or U-shaped tube.

FIG. 166 is a top view of the ROOFTANK™ of one embodiment of the present invention, illustrating a single tank which may be used by itself or in series with other tanks.

Figure 121:
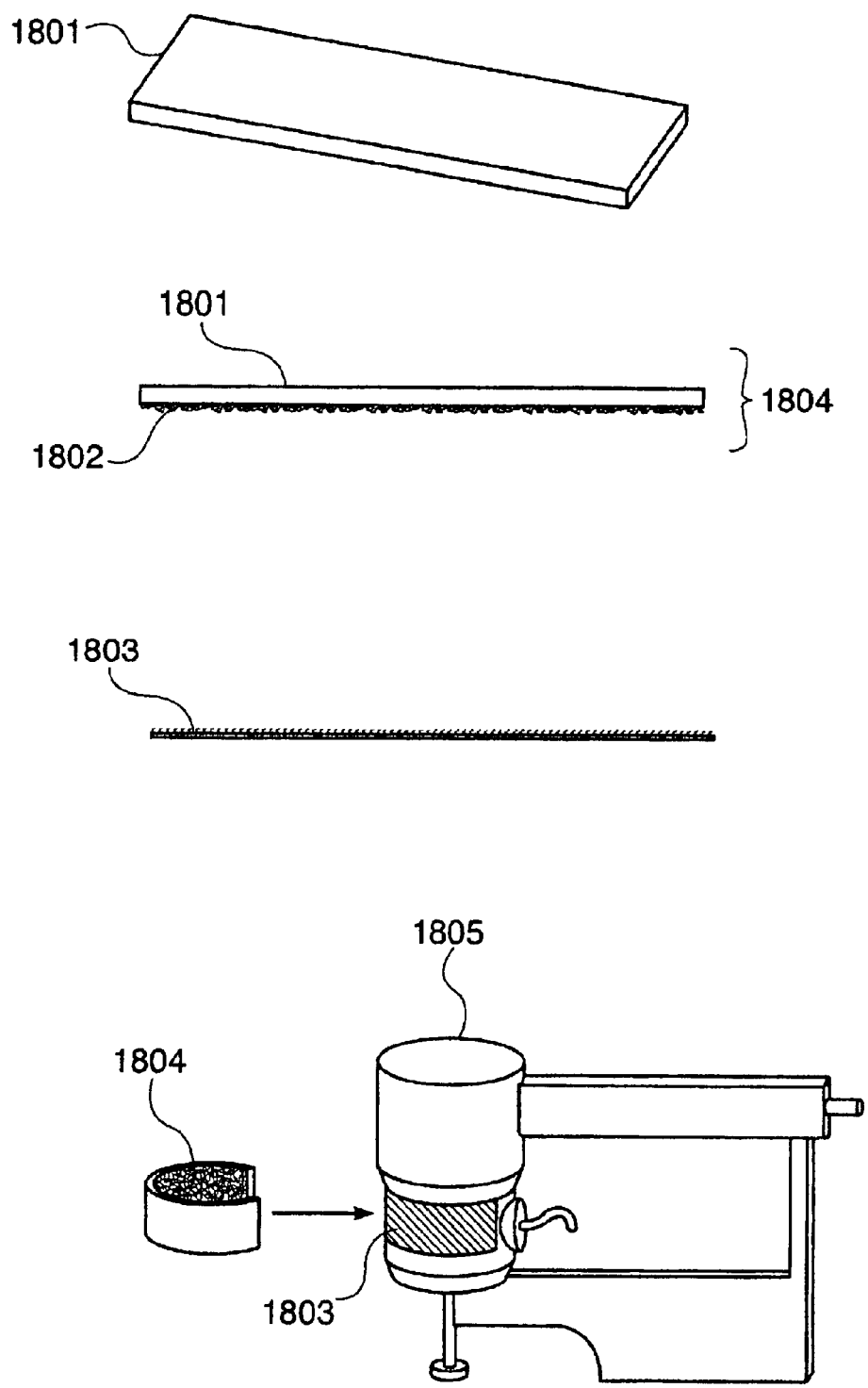
Figure 167:
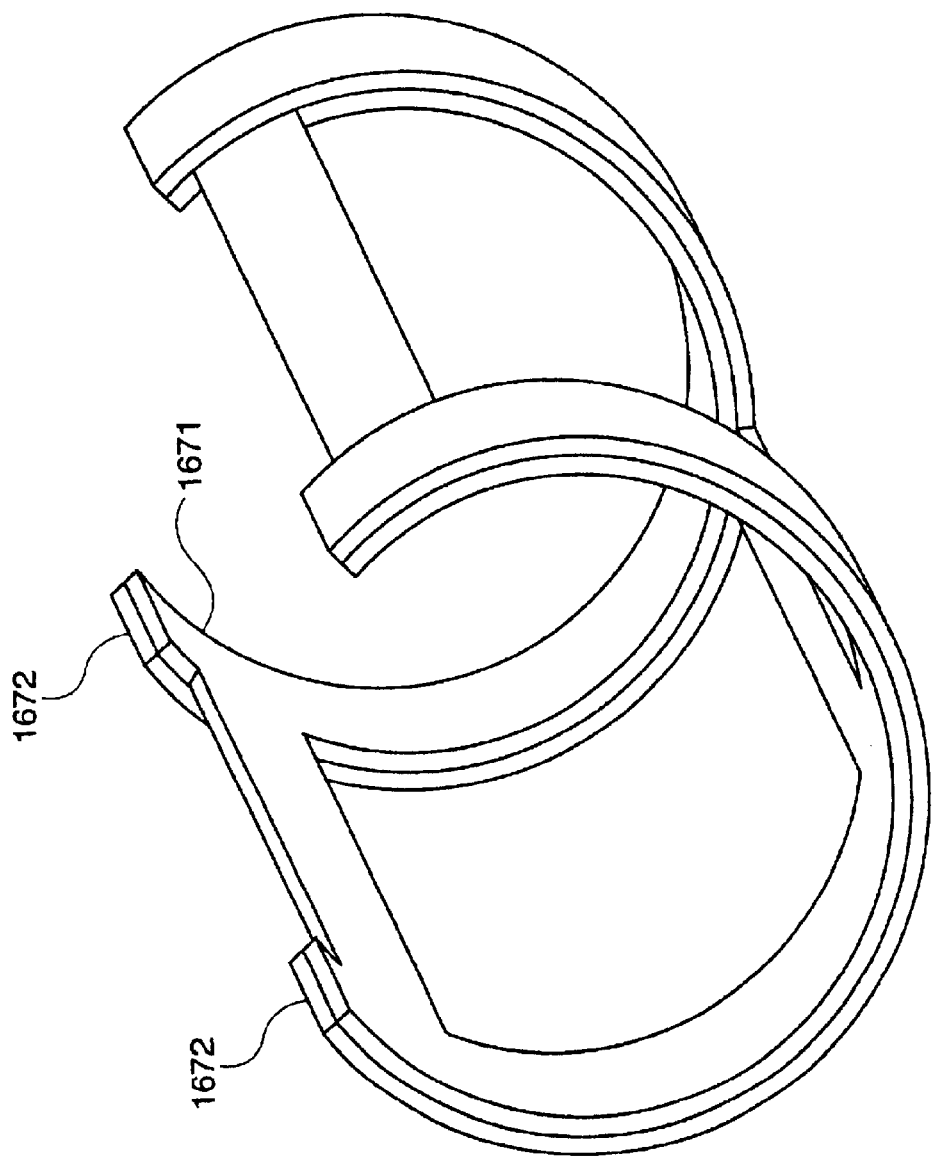

FIG. 167 is a perspective view of another embodiment of the apparatus of FIG. 121.

Figure 168:
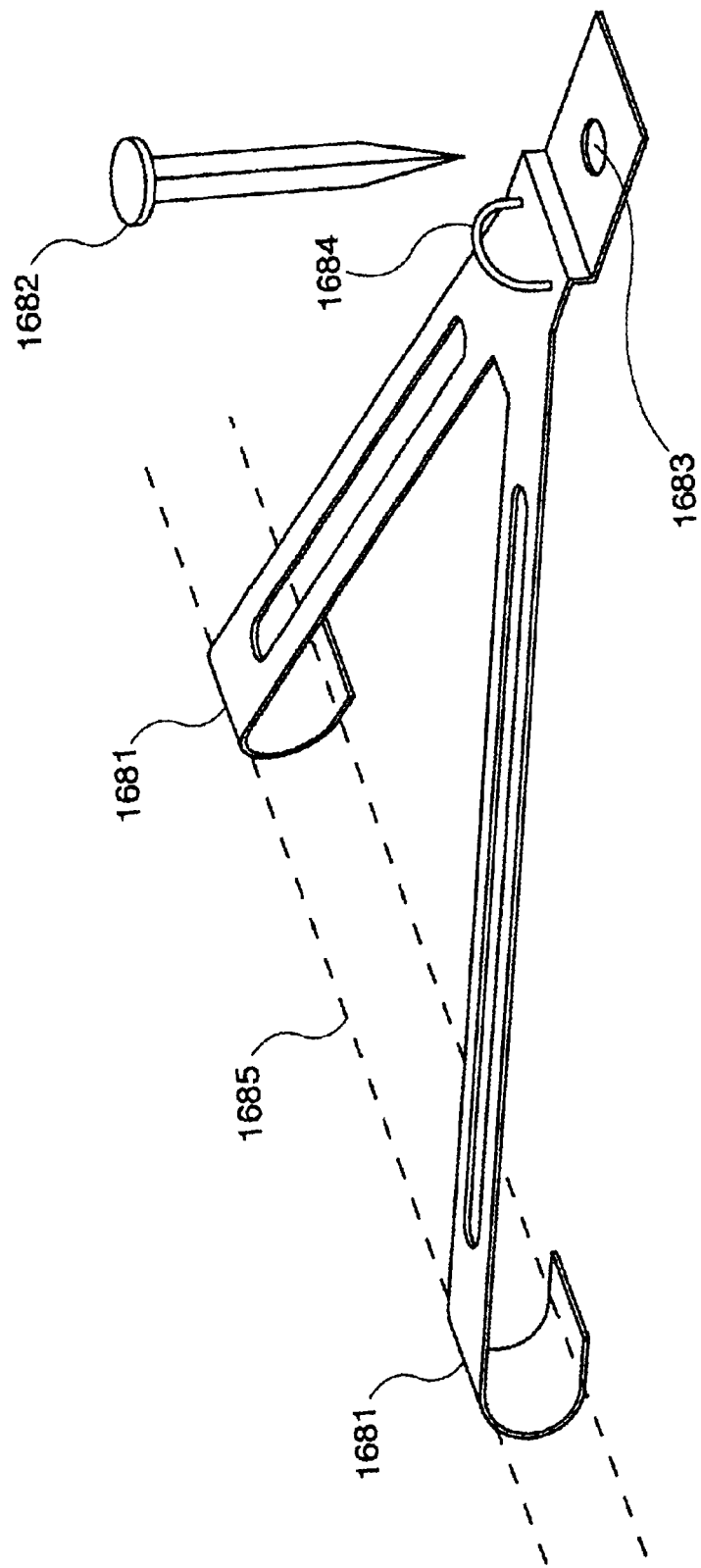

FIG. 168 is a perspective view of another embodiment of the SUREFOOT™ ladder bracing apparatus of the present invention.

Figure 169:
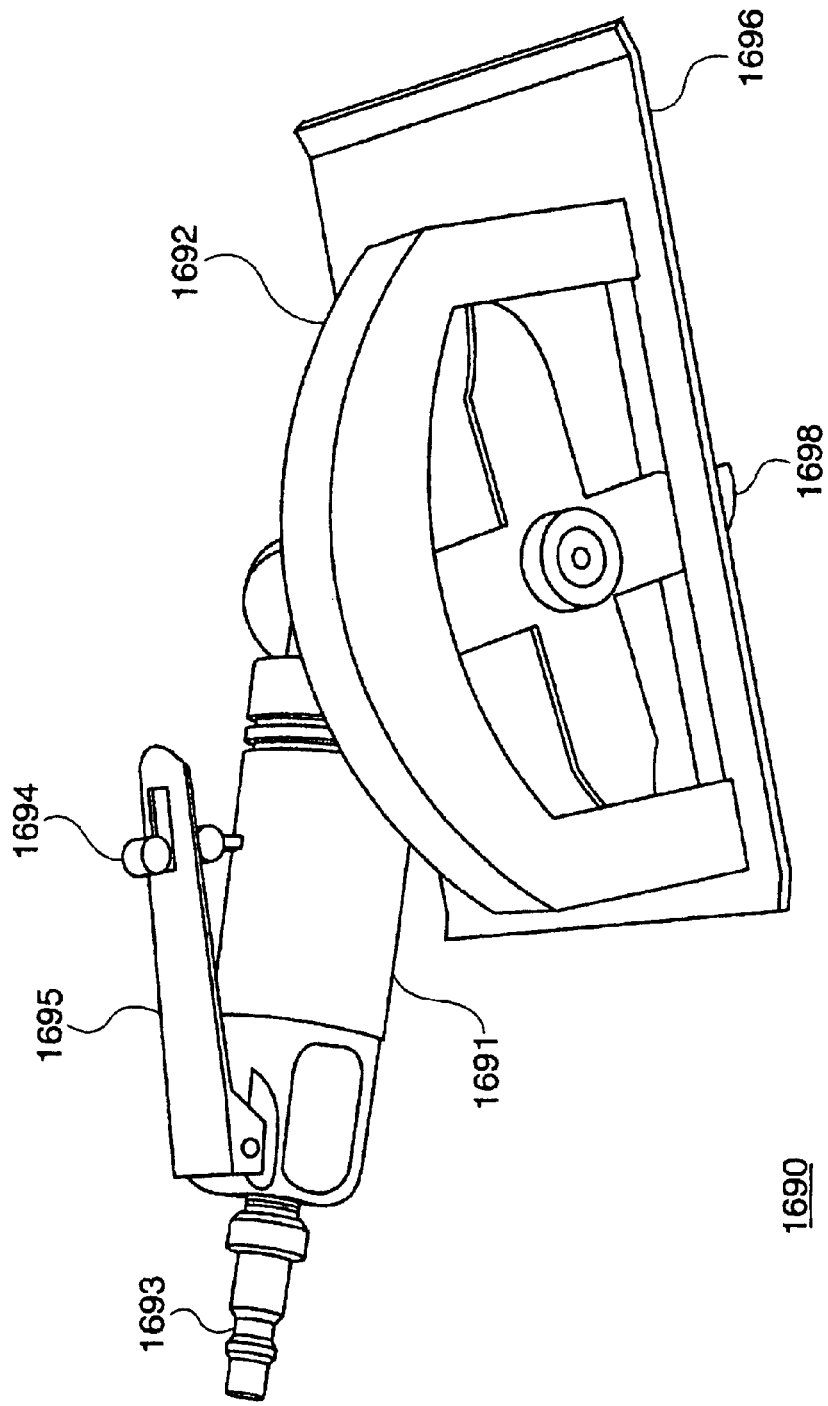

FIG. 169 is a front perspective view of another embodiment of the SHINGLESAW™ of the present invention.

Figure 170:
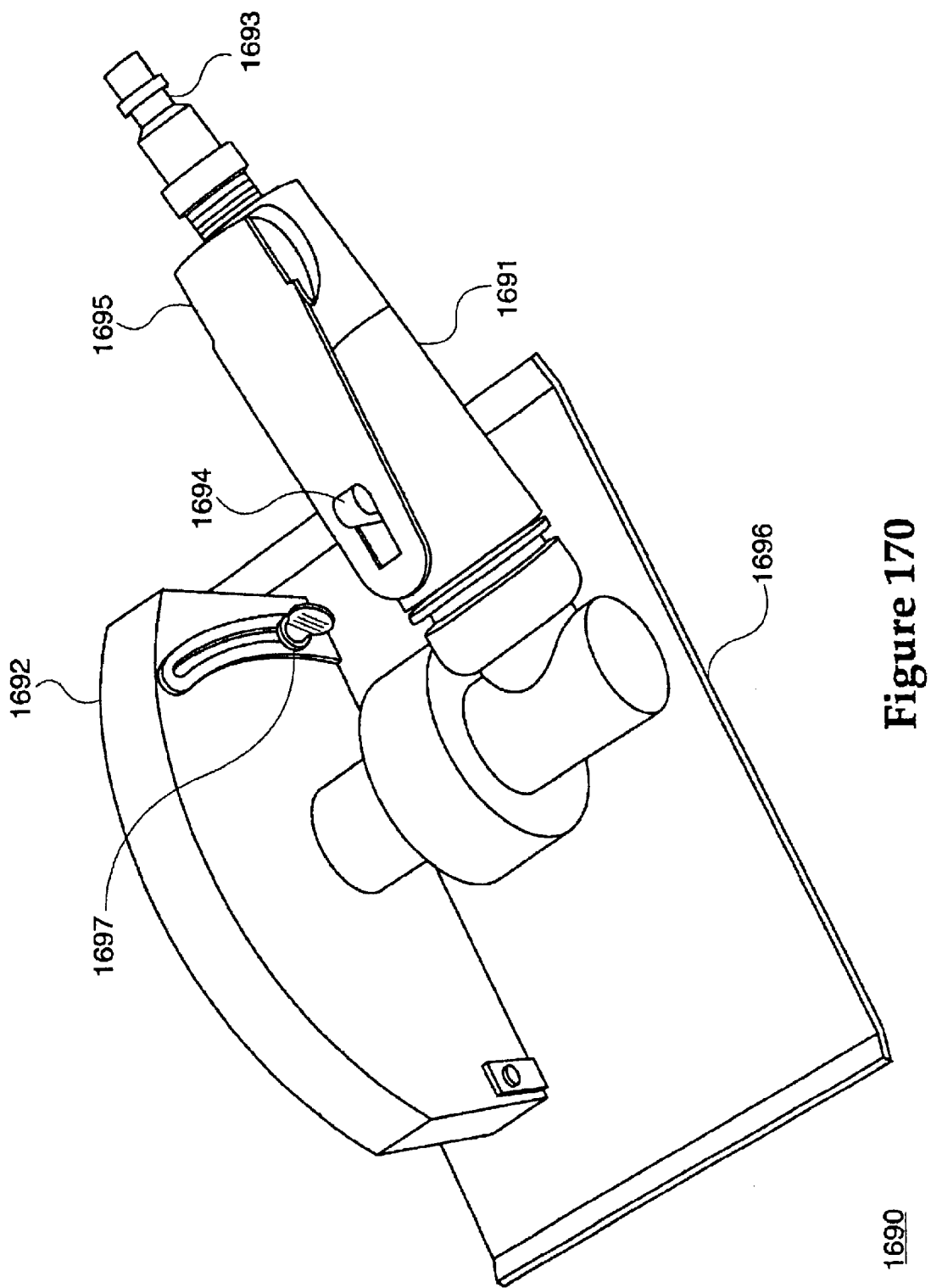

FIG. 170 is a rear perspective view of another embodiment of the SHINGLESAW™ of the present invention.

Figure 171:
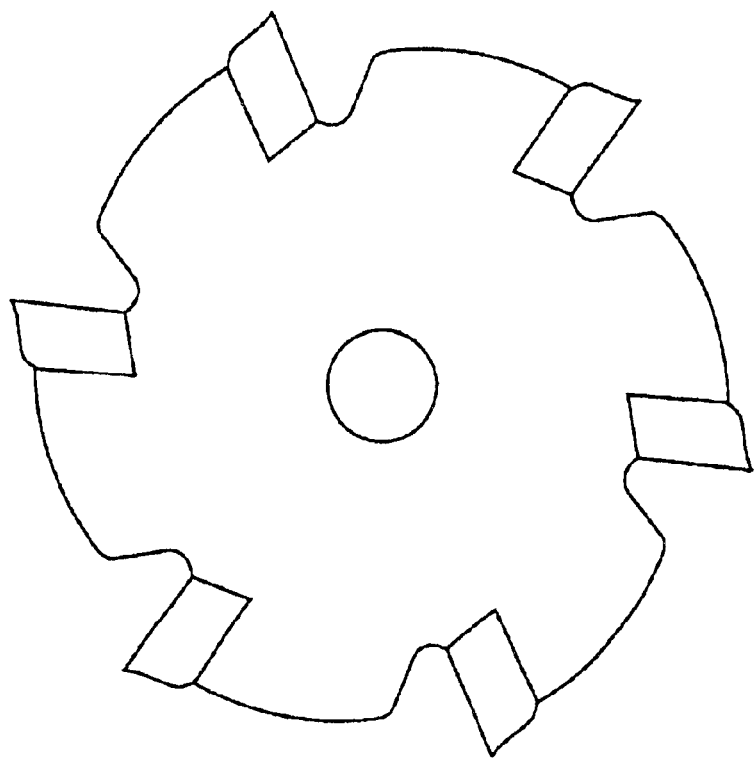

FIG. 171 is a side view of a blade design for the SHINGLESAW™ of the present invention.

Figure 172:
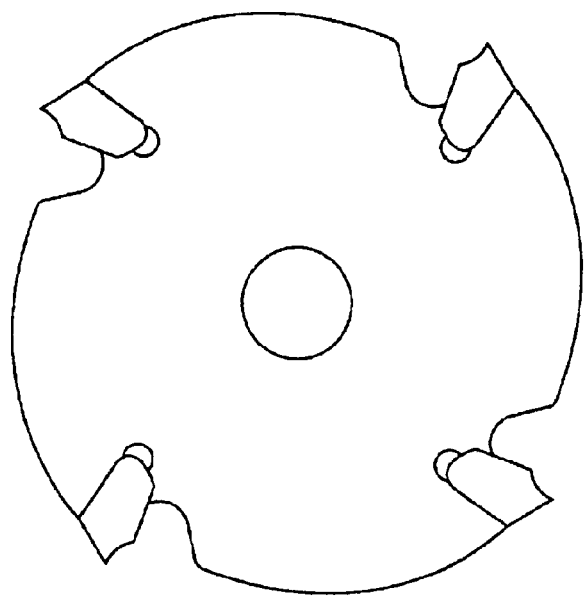

FIG. 172 is a side view of a second blade design for the SHINGLESAW™ of the present invention.

Figure 173:
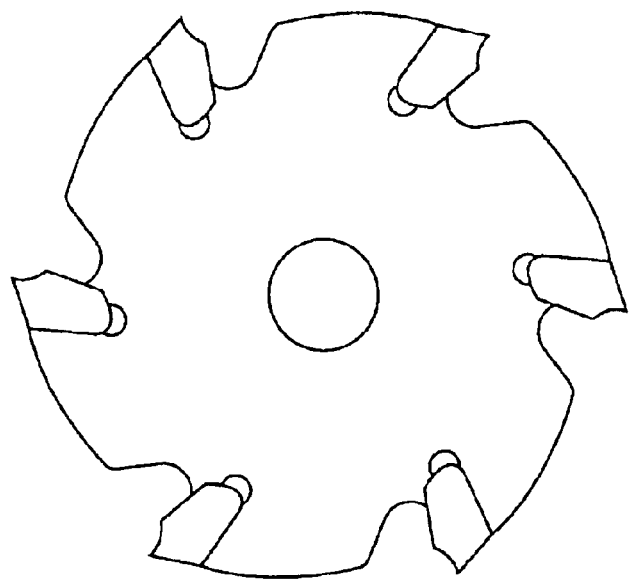

FIG. 173 is a side view of a third blade design for the SHINGLESAW™ of the present invention.

Figure 174:
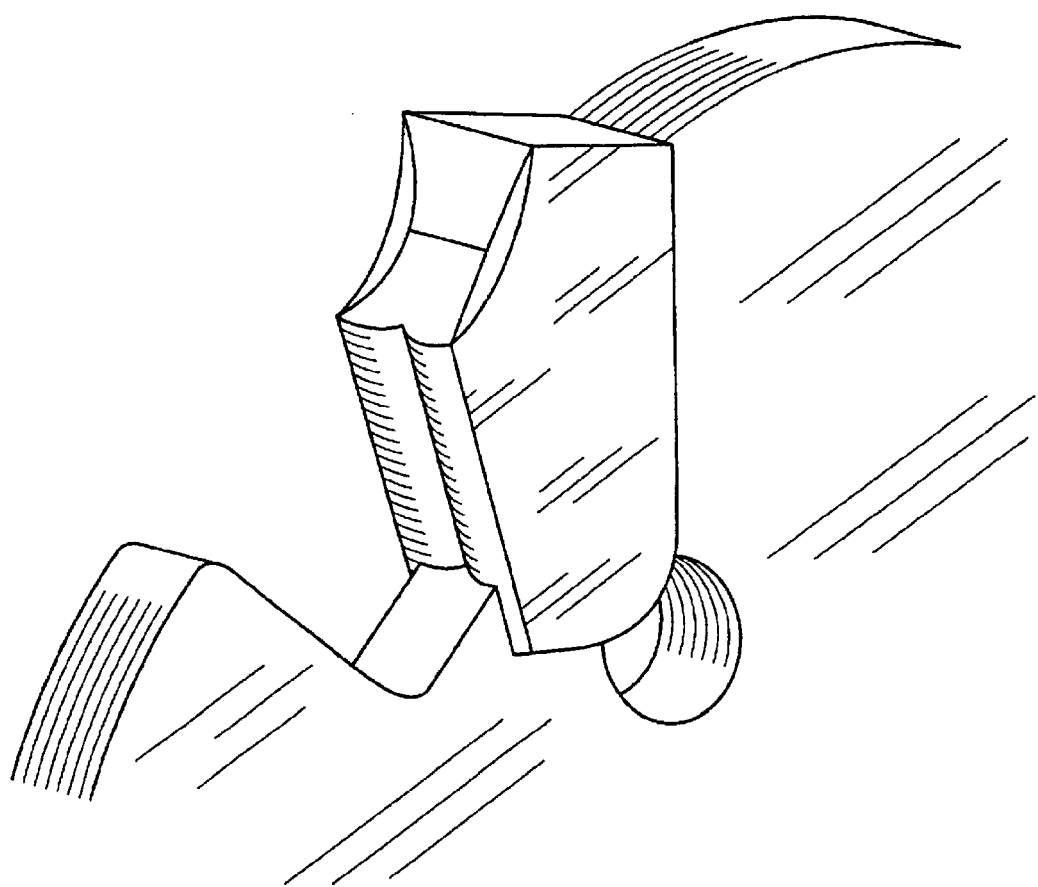

FIG. 174 is an enlarged perspective view of a blade tooth design for the SHINGLESAW™ of the present invention.

FIG. 175 is a side view of another embodiment of the SHINGLESAW™ of the present invention.

Figure 176:
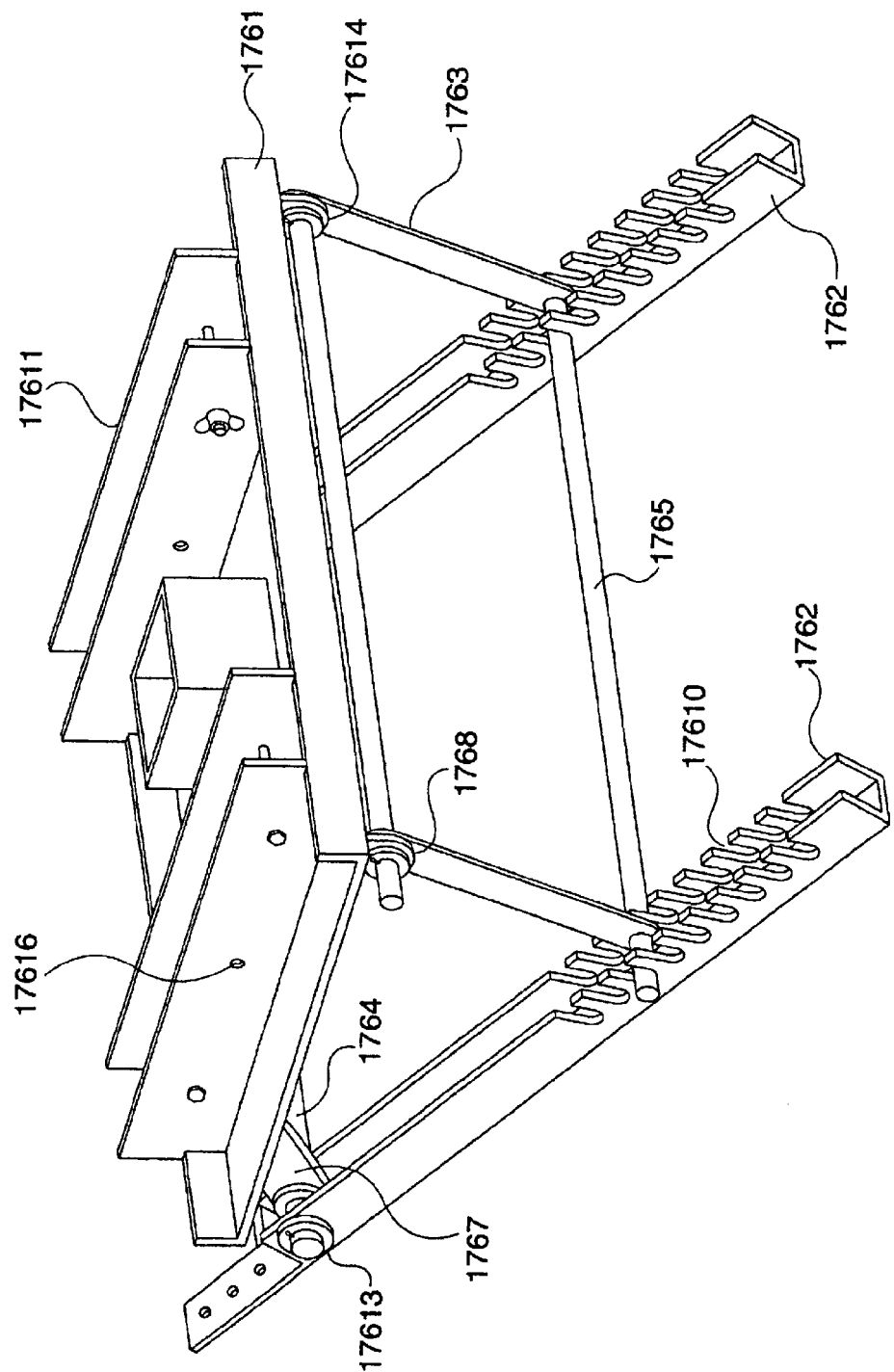

FIG. 176 is a perspective view of another version of the GABLEMASTER™ of the present invention, known as the MINIMASTER™.

Figure 177:
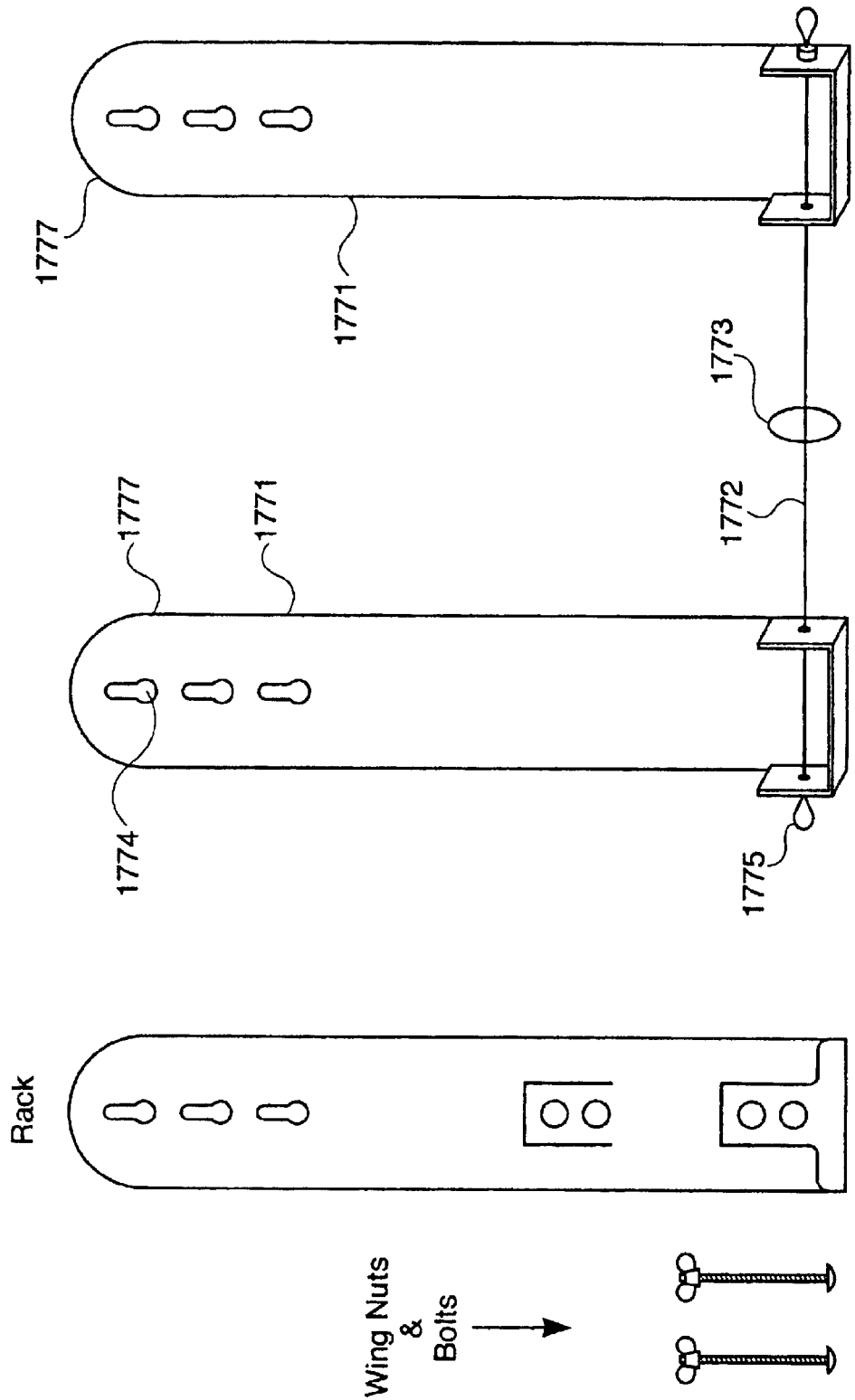

FIG. 177 is a front and side view of another embodiment of the SURETETHER™ of the present invention.

Figure 178:
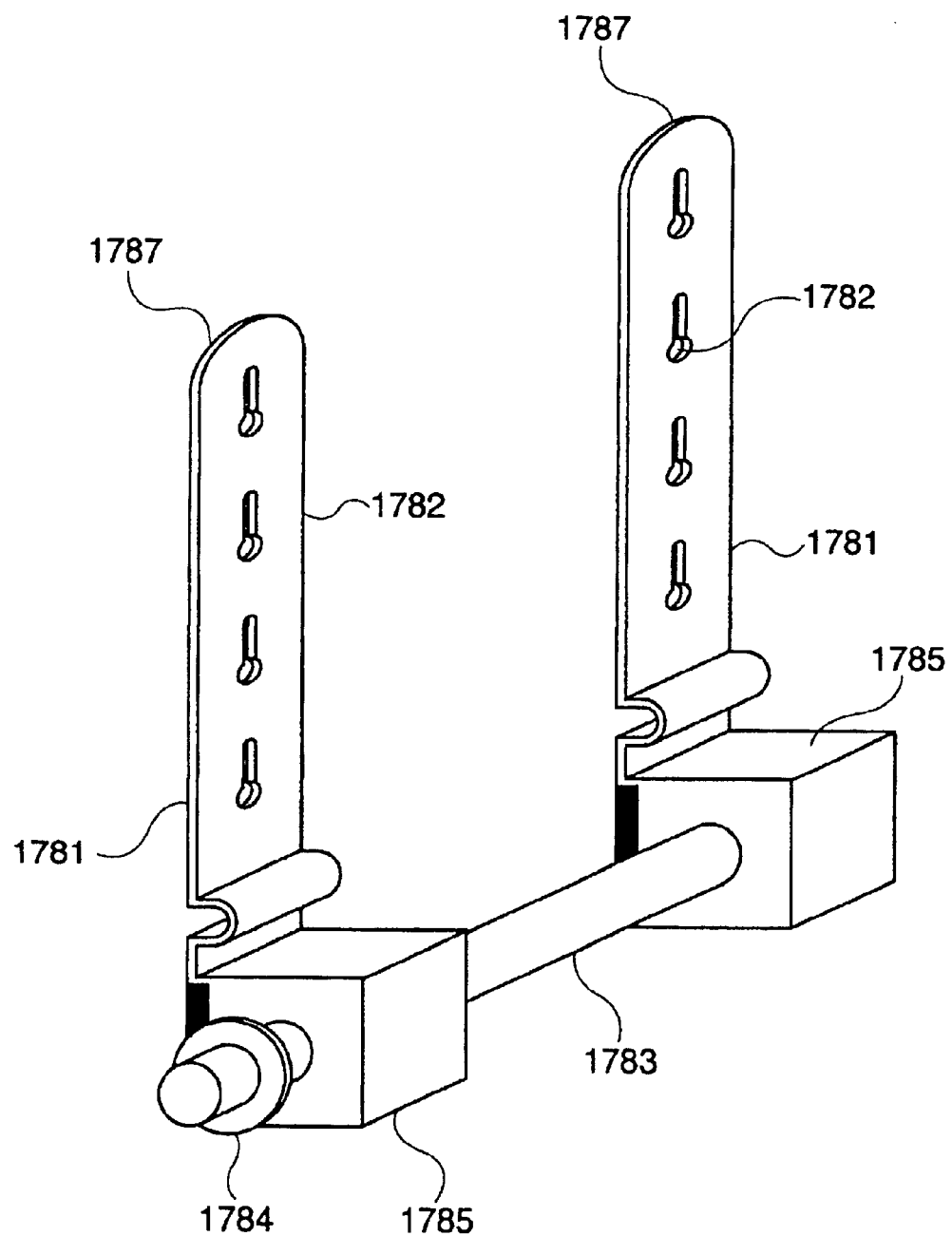

FIG. 178 is a perspective view of another embodiment of the SURETETHER™ of the present invention.

Figure 179:
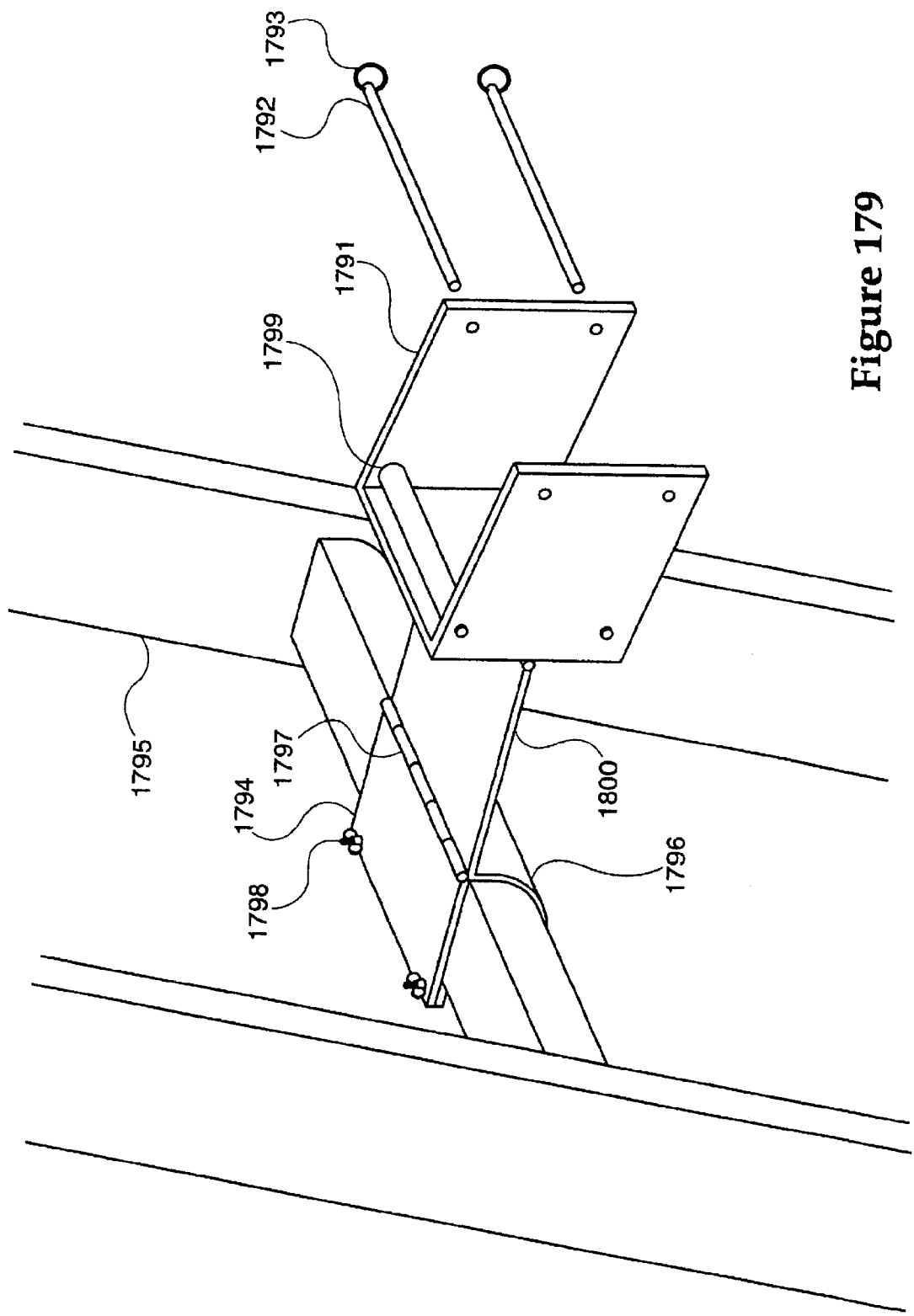

FIG. 179 is a front perspective view of another embodiment of the SUREFOOT™ of the present invention.

Figure 180:
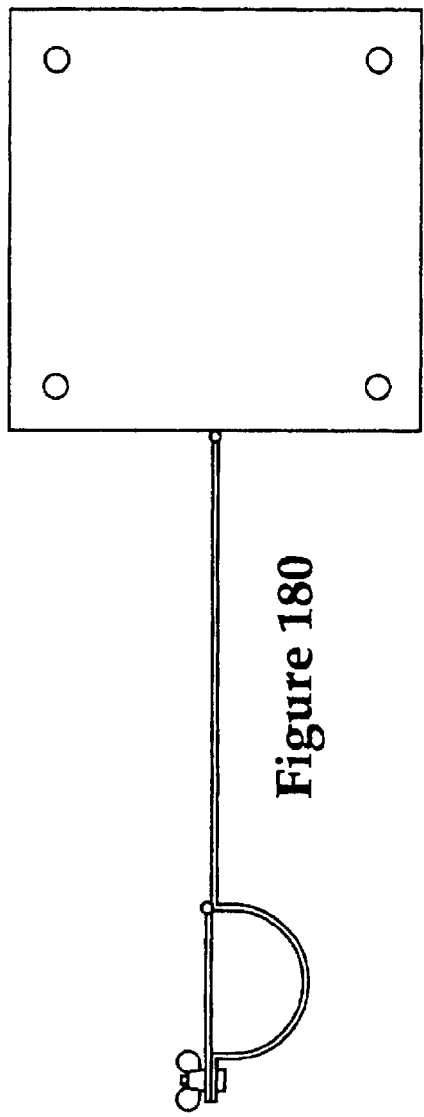

FIG. 180 is a side view of another embodiment of the SUREFOOT™ of the present invention of FIG. 179.

Figure 181:
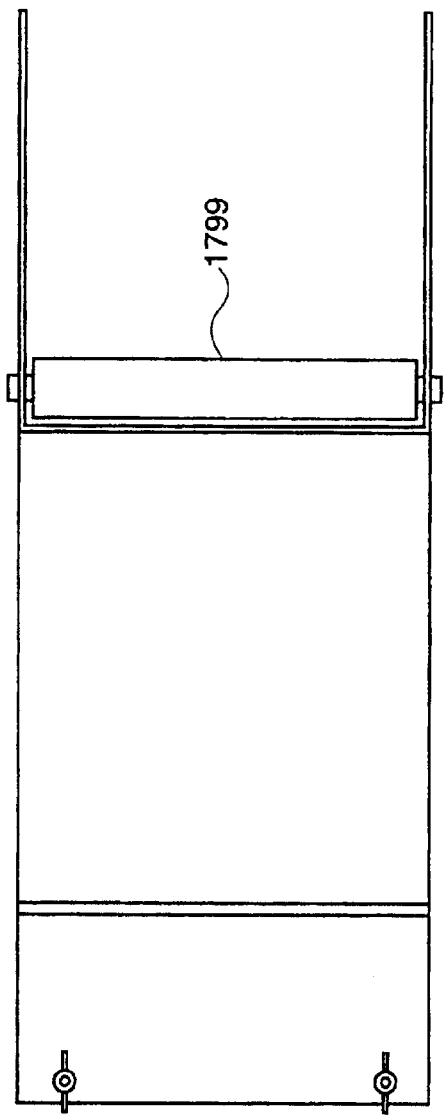

FIG. 181 is a top view of another embodiment of the SUREFOOT™ of the present invention of FIG. 179.

Figure 182:
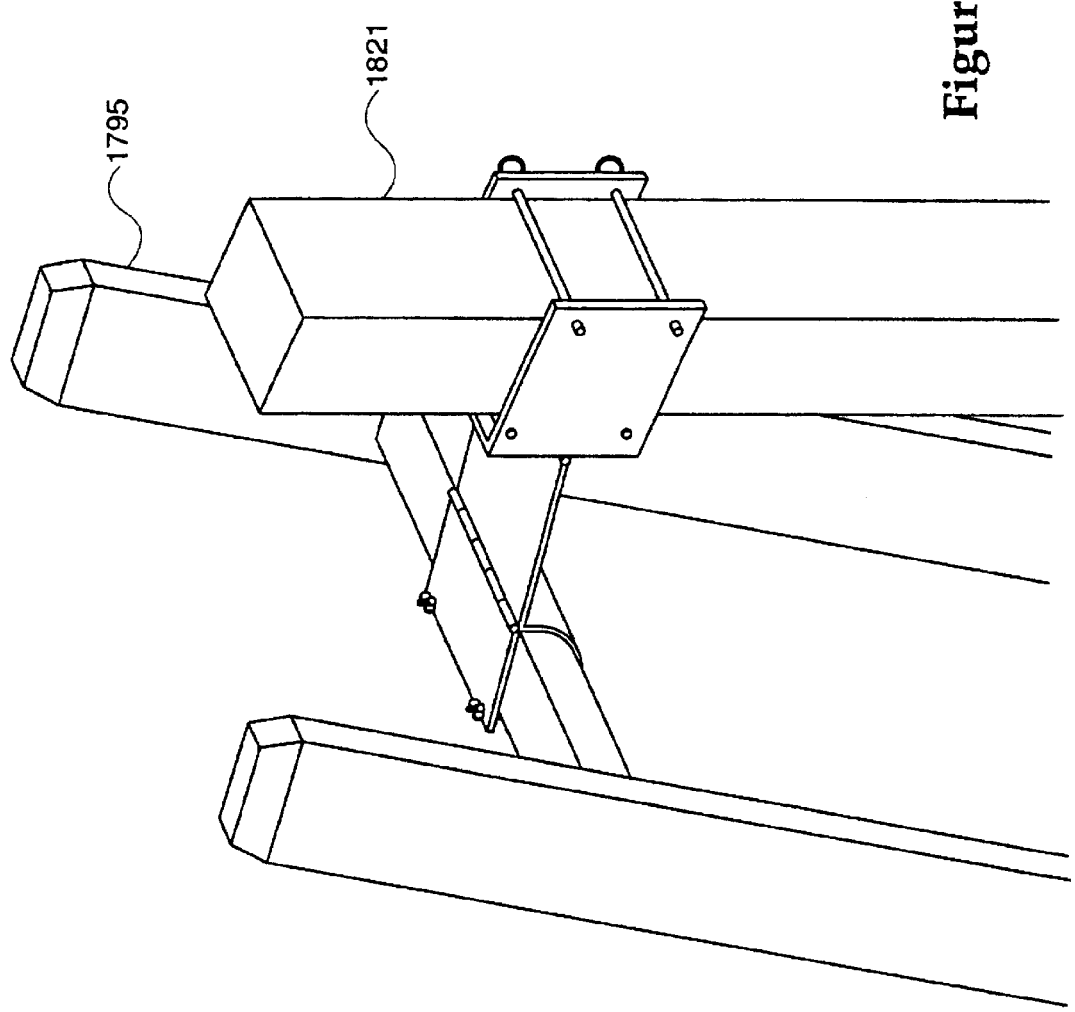

FIG. 182 is a rear perspective view of another embodiment of the SUREFOOT™ of the present invention.

Figure 183:
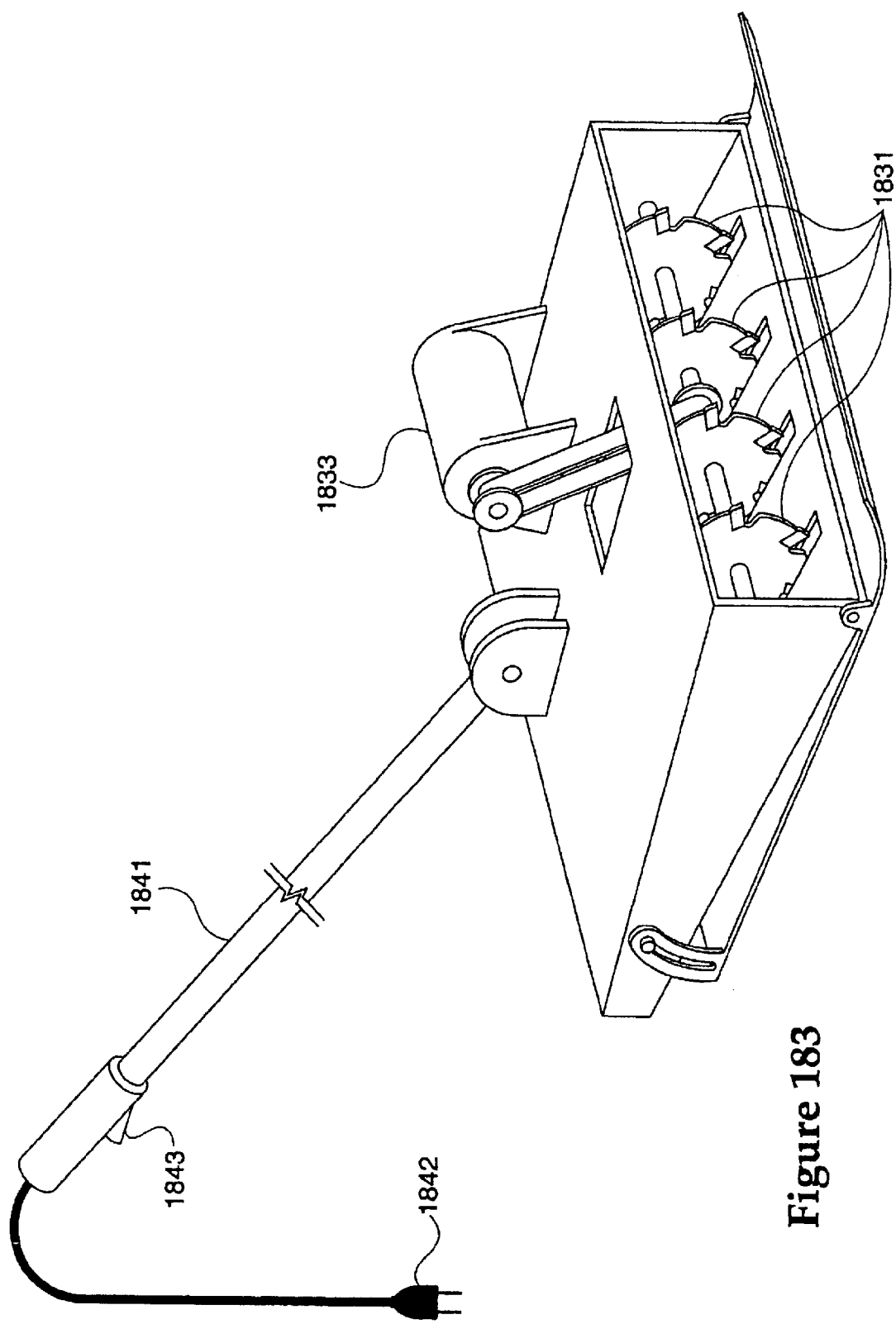

FIG. 183 is a perspective view of another embodiment of the SHINGLESAW™ of the present invention.

Figure 184:
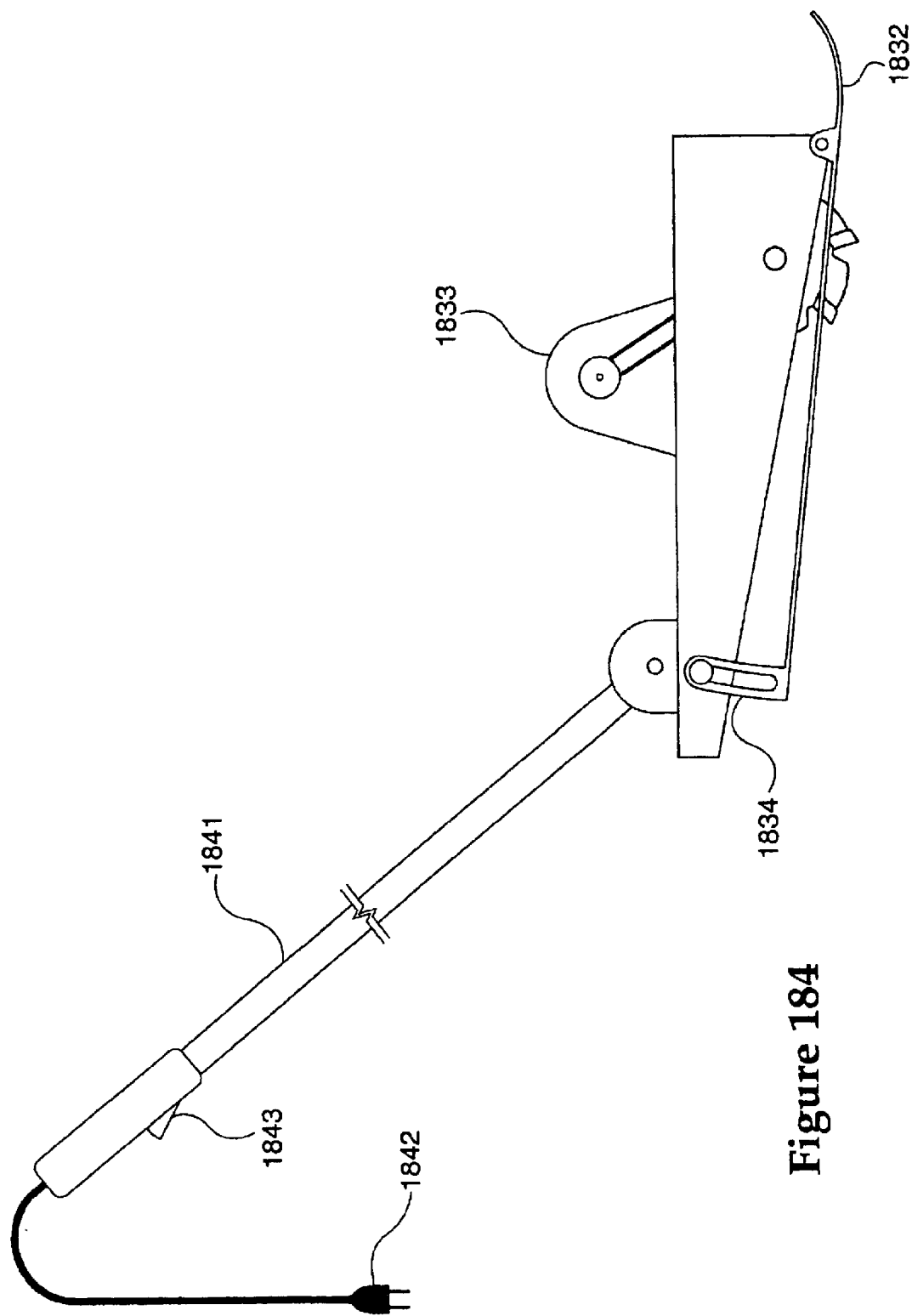

FIG. 184 is a side view of another embodiment of the SHINGLESAW™ of FIG. 183.

Figure 185:
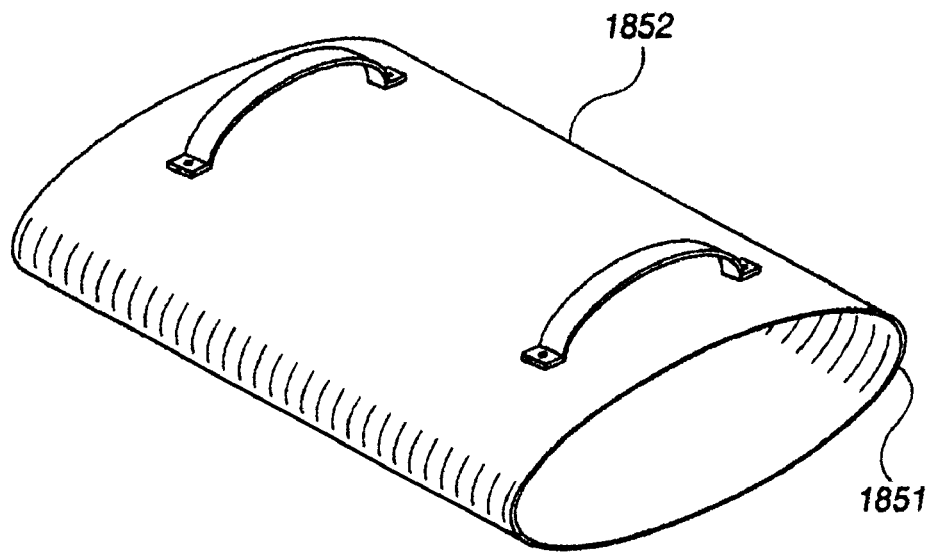

FIG. 185 is a top perspective view of the ROOFCAN™ roofer's garbage can of the present invention.

Figure 186:
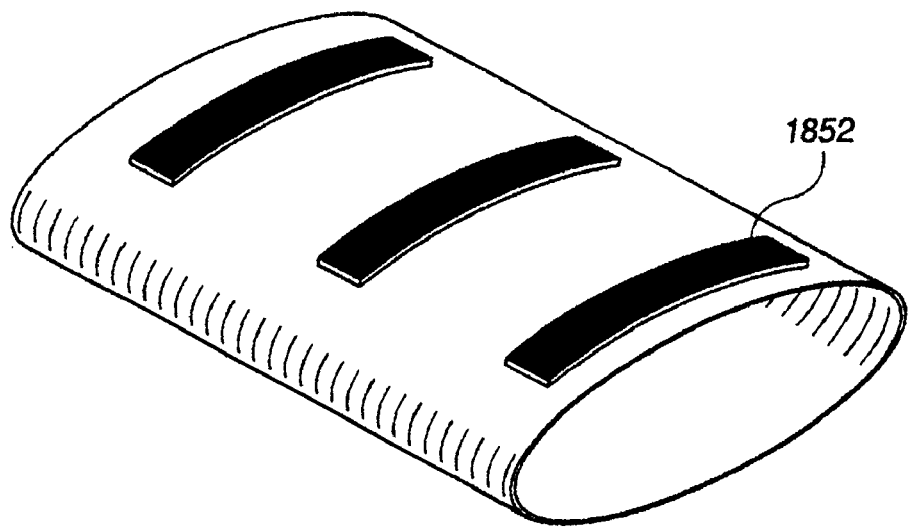

FIG. 186 is a bottom perspective view of the ROOFCAN™ roofer's garbage can of the present invention.

Figure 187:
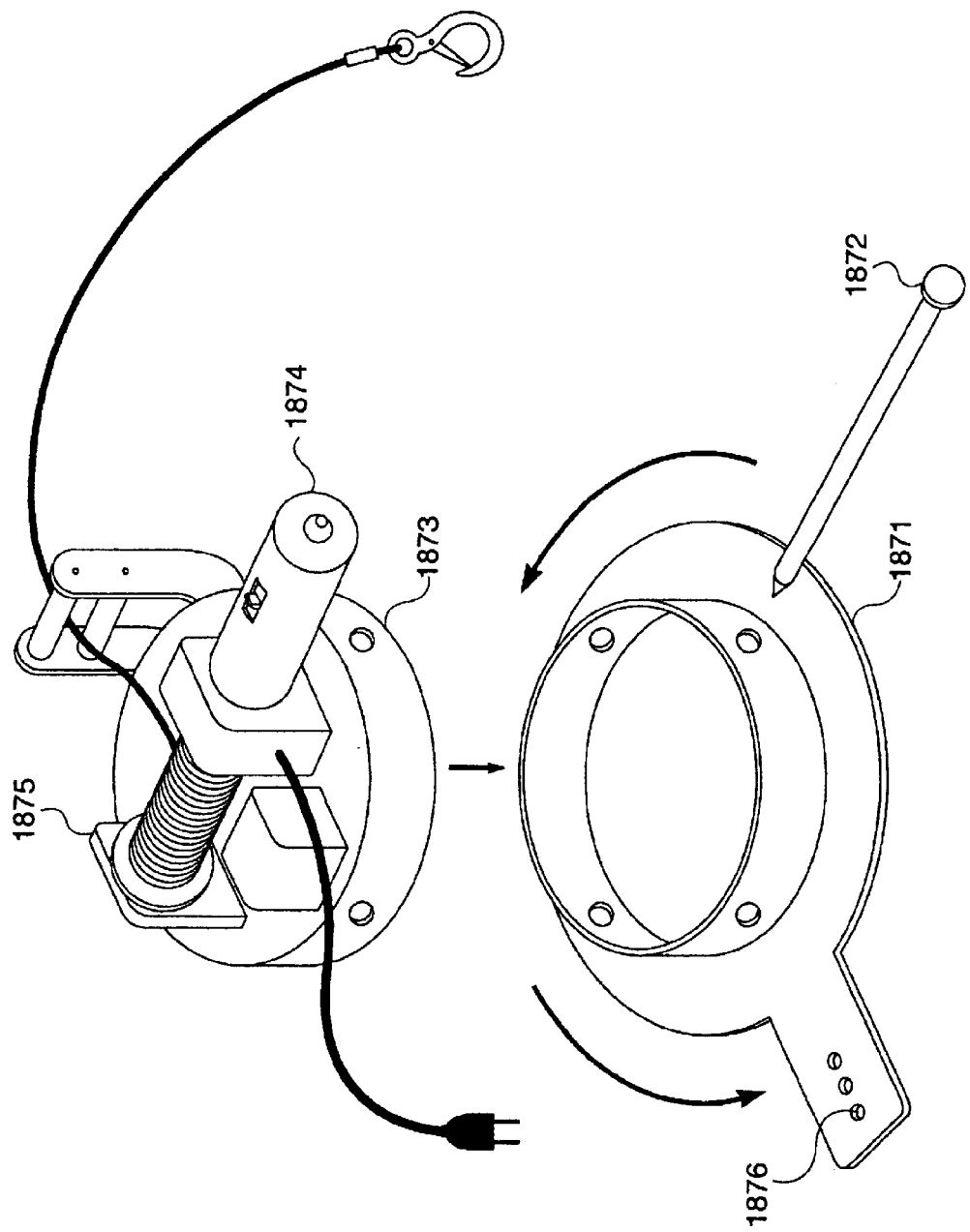

FIG. 187 is a perspective view of another embodiment of the ROOFER'S WINCH™ of the present invention.

Figure 188:
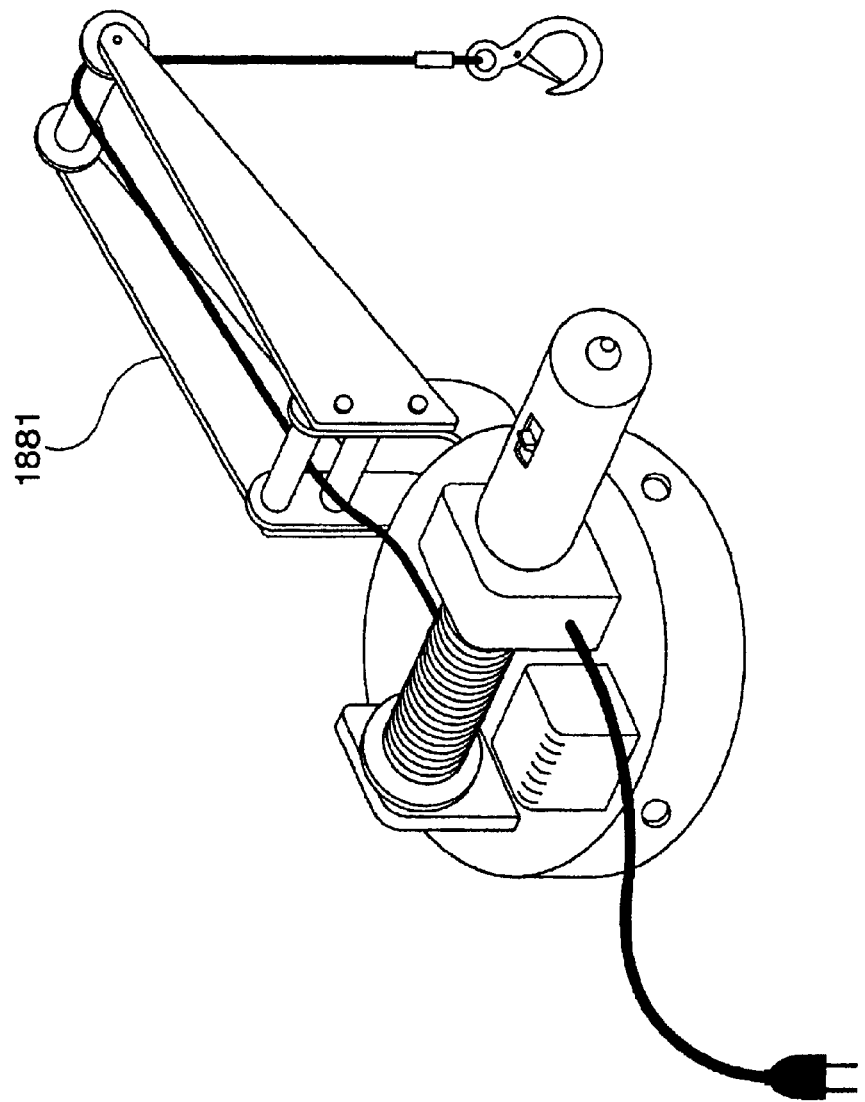

FIG. 188 is a perspective view of another embodiment of the ROOFER'S WINCH™ of the present invention.

Figure 189:
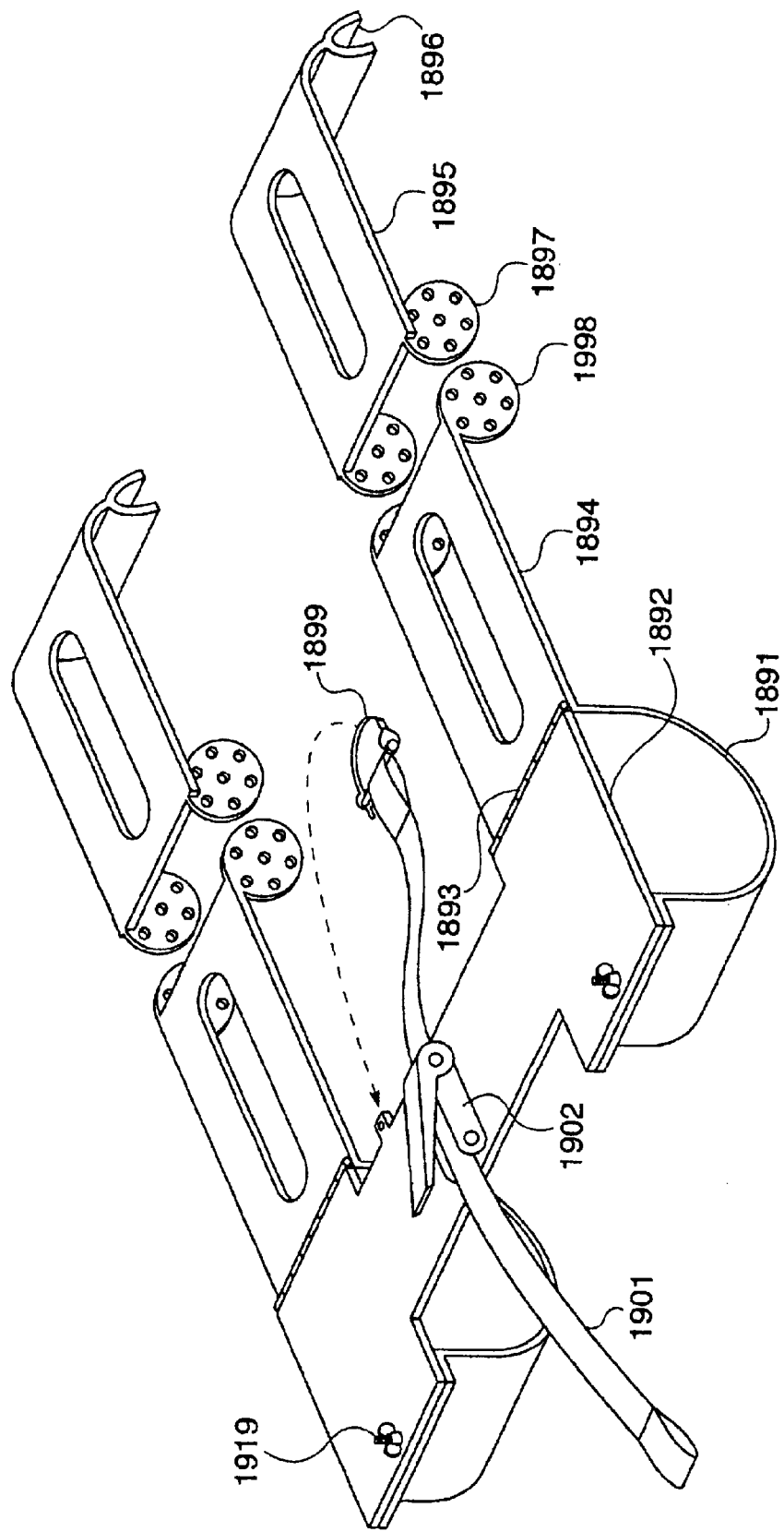

FIG. 189 is a perspective view of a first embodiment of the LADDER BUMP-OUT of the present invention.

Figure 190:
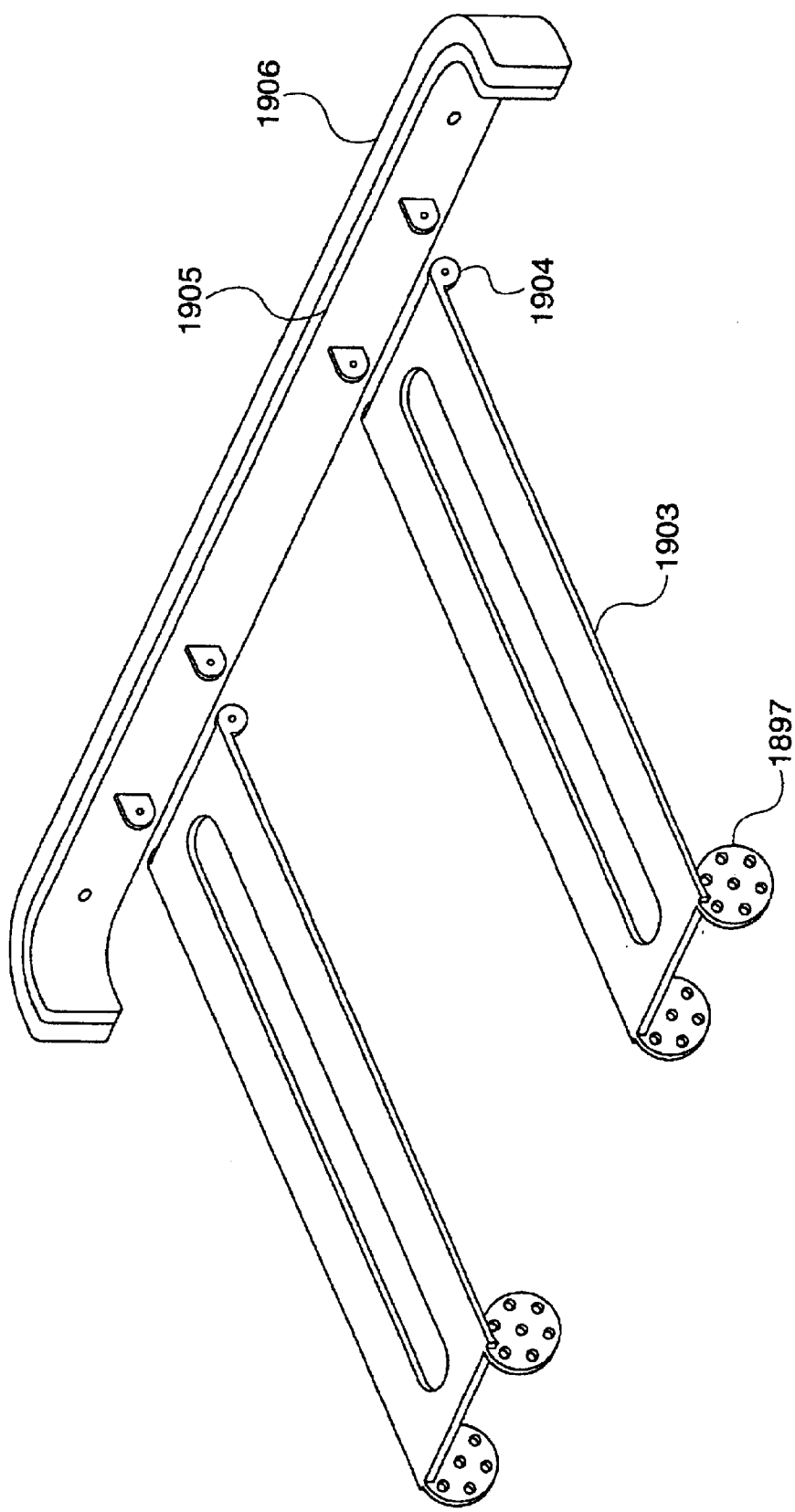

FIG. 190 is a perspective view of an exploded portion of the first embodiment of the LADDER BUMP-OUT of the present invention of FIG. 189.

Figure 191:
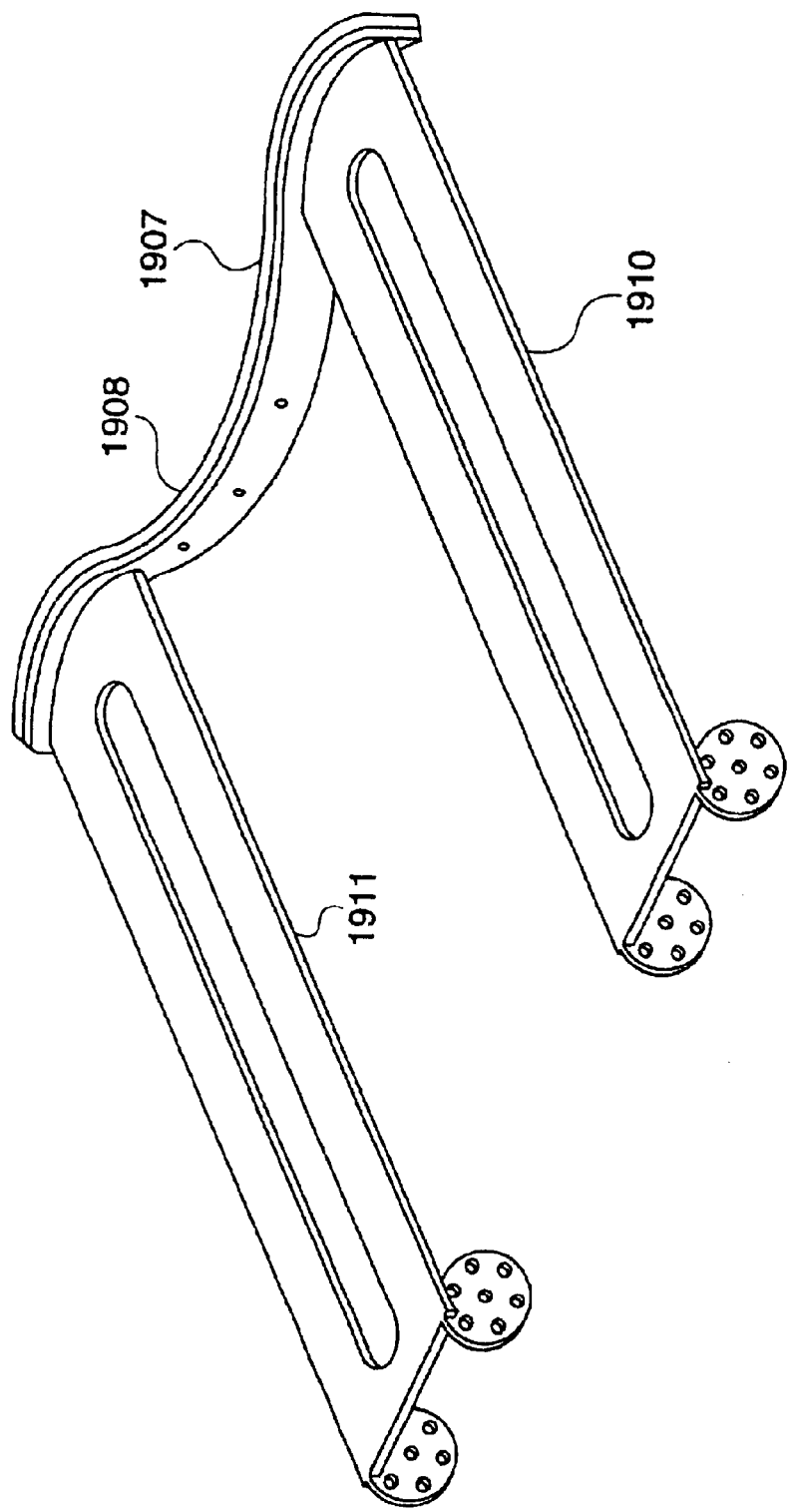

FIG. 191 is a perspective view of an exploded portion of an alternative embodiment of the LADDER BUMP-OUT of the present invention of FIG. 189.

DETAILED DESCRIPTION OF THE INVENTION

GABLEMASTER™ is an adjustable, lightweight, fully assembled aluminum platform which easily secures to roof truss layouts of two feet, 18 inches, and 16 inches (or other widths) on center and adjusts from 4/12 to 12/12 or other pitches. The GABLEMASTER™ eliminates makeshift devices or rental lifts because it easily installs on any pitched roof where extension ladders or pump jack poles are needed to set up scaffolding systems.

GABLEMASTER™ provides a level surface that secures ladders with adjustable steel bolts or pins. The product is ensured to provide safety for the user. The standard dimensions for this produce are 30" in length and 54" width, although other dimensional versions are permissible within the spirit and scope of the present invention. The GABLEMASTER™ invention will now be described in connection with FIGS. 1–11.

Figure 1:
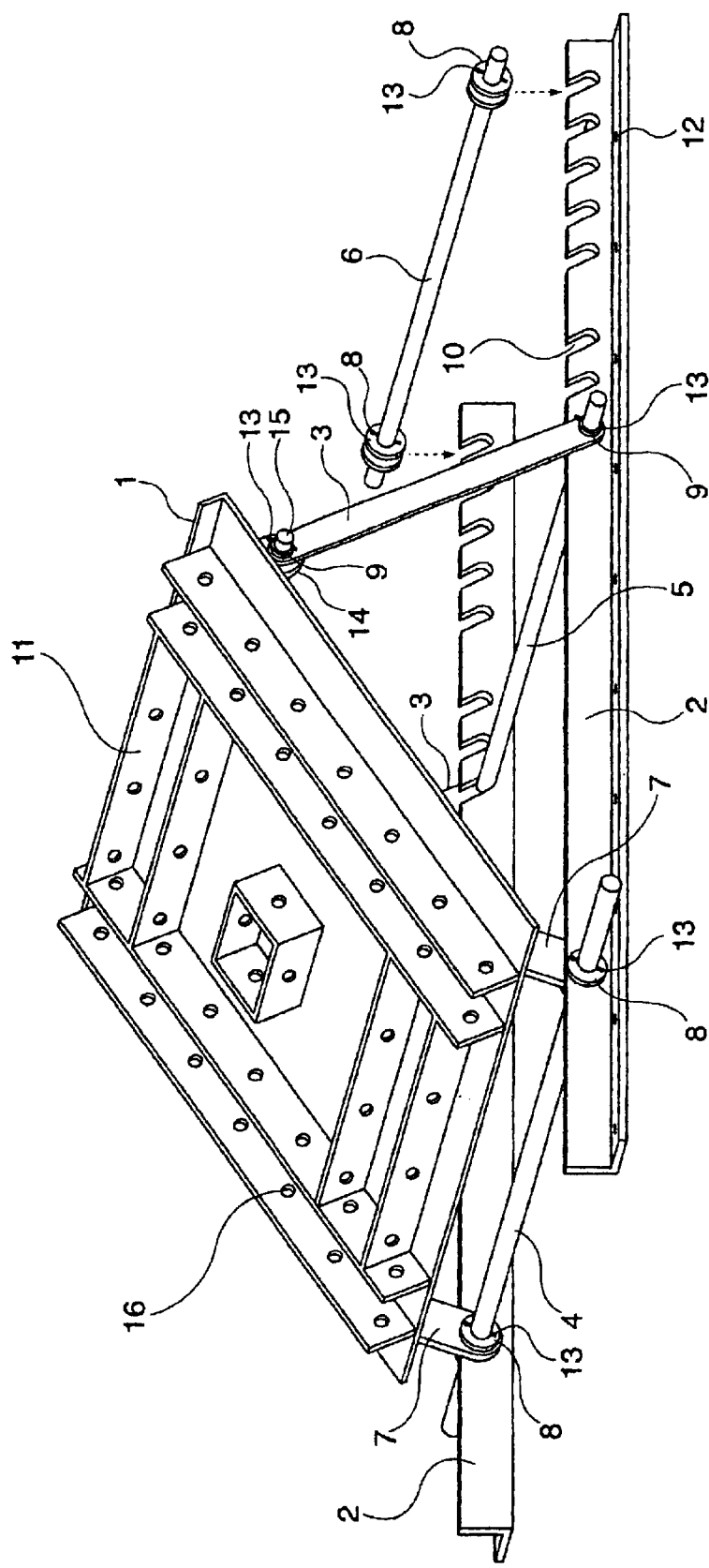
FIG. 1 is a perspective view of the ladder and scaffold support of the first embodiment of the present invention.

FIG. 1 is a perspective view of the ladder and scaffold support of the first embodiment of the present invention. Main support table 1 for the unit may support a ladder, siding jack, walking board, or the like and may be constructed from aluminum sheet of approximately ¼ inch in thickness. Support adjustment plates 11 may be provided from aluminum angle stock or flat plate welded to support table 1. In the alternative, support table 1 and adjustment plates 11 may be constructed from a single piece of cast aluminum.

Materials other than aluminum may be used, of course. However, for high strength and low weight, the inventor has found aluminum construction to work well. The apparatus of the present invention could be conceivably made of other metals (e.g., steel) or even from plastics or composites (e.g., fiberglass and/or carbon fiber construction) without departing from the spirit and scope of the present invention.

Pre-drilled holes 16 may be provided in support adjustment plates 11 at predetermined locations to secure a ladder leg, siding jack, or the like, as will be discussed below in connection with FIG. 5.

Main support bars 2 may be fabricated from aluminum channel and are designed to be fastened to a roof truss on 24" centers. Although not illustrated here, an additional support bar 2 may be provided in a slidable fashion on connecting rods 4 and 5. Such an additional support bar or bars may be used to secure the device to roof trusses which are not on 24" centers (e.g., 12" or 16" centers). Main support bars 2 may be secured to roof trusses by nailing or screwing through pre-drilled holes 12. If nails are used, double-headed nails are preferred, as they may be readily removed without damaging or marring the roof surface.

Typically, four to eight double-headed nails may be used to secure main support bars 2 to a roof truss. Eight or more predrilled nail holes may be provided in each of main support bars 2 in the preferred embodiment.

A plurality of grooves or notches 10 may be cut into support bars 2 to allow angle adjustment of main support table 1 to compensate for different roof pitches. Connecting rod 5 may be adjusted to a corresponding one of the notches 10 to provide correct support to main support table 1 via support bars 3. Support bars 3 may in turn be connected to main support table 1 via rod pin 15 and plate 14 in a pivoting fashion. Connecting rod 4 may rotate within the holes provided in main support bars 2 and rotatably support platform 1 via plates 7 to allow for rotation with angle adjustment.

Connecting rod 5 may be provided with spacers 9 and carter pins 13 to lock spacers 9 in place. Spacers 9 may provide proper alignment between connecting rod 5 and main support bars 2 to provide correct spacing for 24" (or the like) roof truss centers. In an alternative embodiment, multiple spacers or spacer positions may be provided to allow the apparatus to adjust to different roof truss spacings.

An additional connecting rod may be provided as safety rod 6, also provided with carter pins 13 and spacers 8. Safety rod 6 may be used to attach a tether line or the like. Such a tether line may be used to allow workers to secure themselves or materials, tools, supplies, or the like, to the apparatus. If the worker falls from the roof, the tether line may help break or interrupt their fall.

Figure 2:
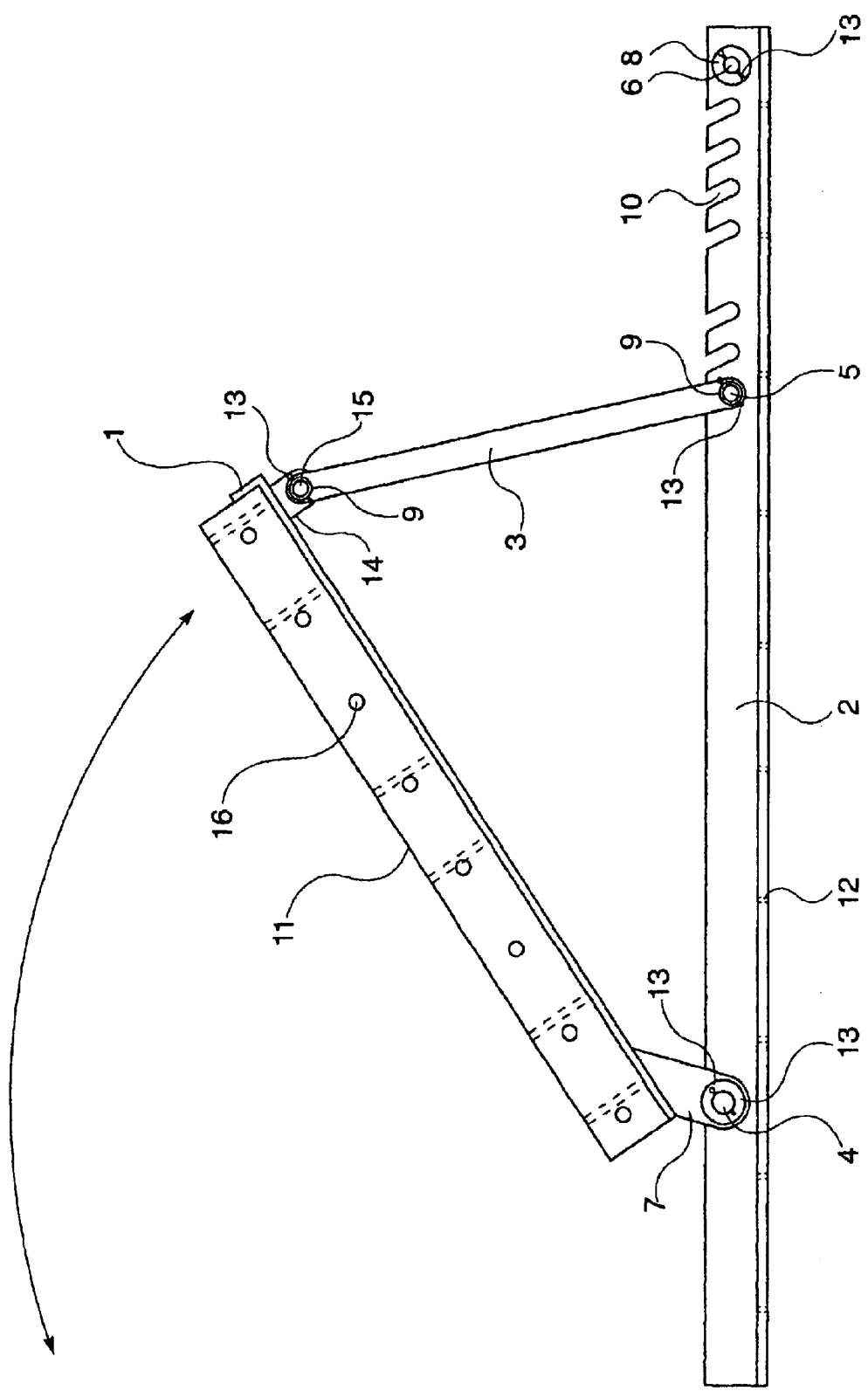
FIG. 2 is a side view of the ladder and scaffold support of the first embodiment of the present invention.

FIG. 2 is a side view of the ladder and scaffold support of the first embodiment of the present invention, illustrating how the angle of main support table 1 may be changed. The location and spacing of notches 10 is set to correspond to typical and popular roof pitches, and may allow adjustment from pitches from 4/12 to 12/12.

Figure 3:
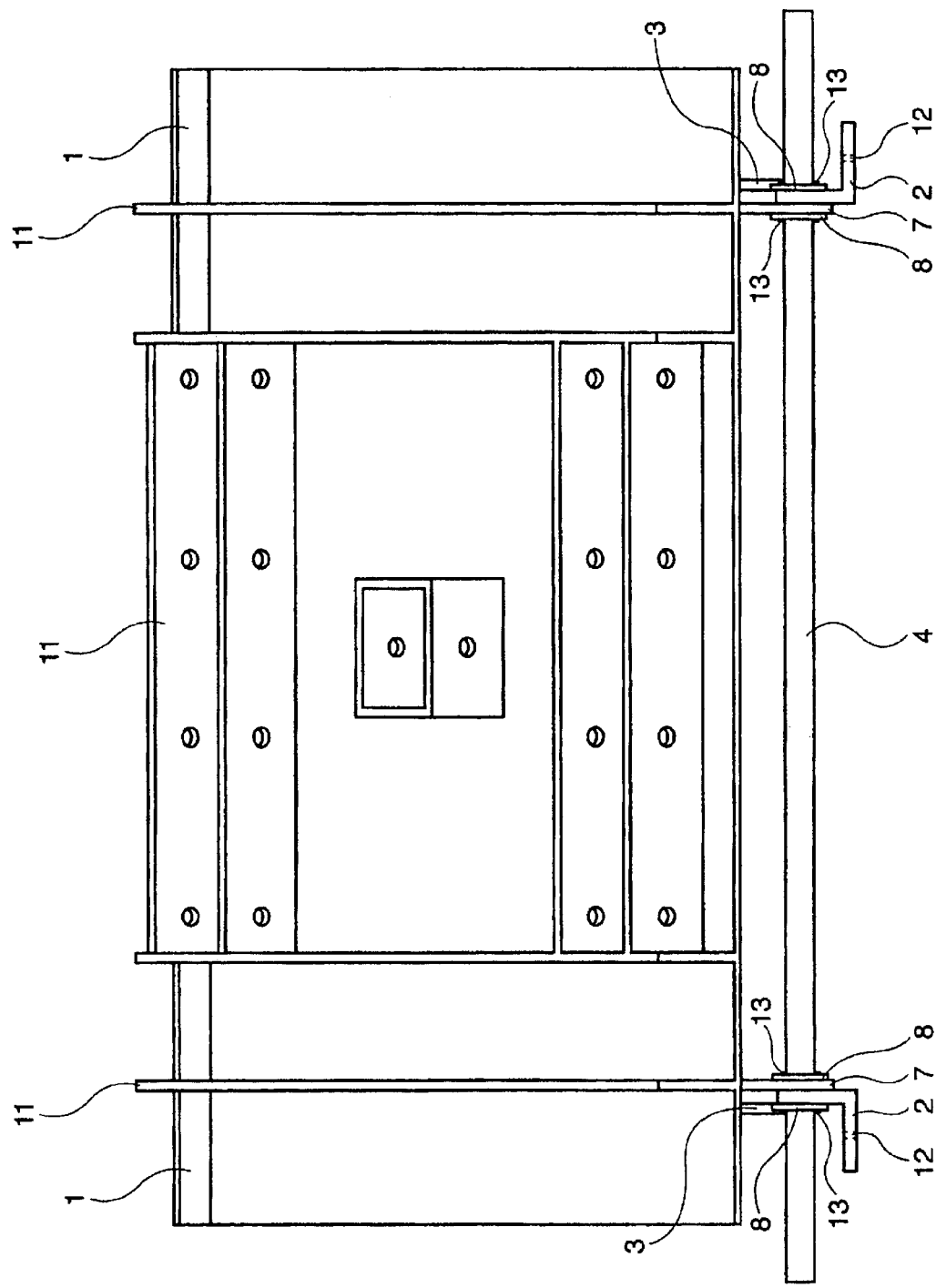
FIG. 3 is a top perspective view of the ladder and scaffold support of the first embodiment of the present invention.

FIG. 3 is a top perspective view of the ladder and scaffold support of the first embodiment of the present invention, providing another illustration of the arrangement of support adjustment plates 11. It should be noted that the particular arrangement of support adjustment plates 11 is by way of example only. Other configurations may be provided without departing from the spirit and scope of the present invention.

Figure 4:
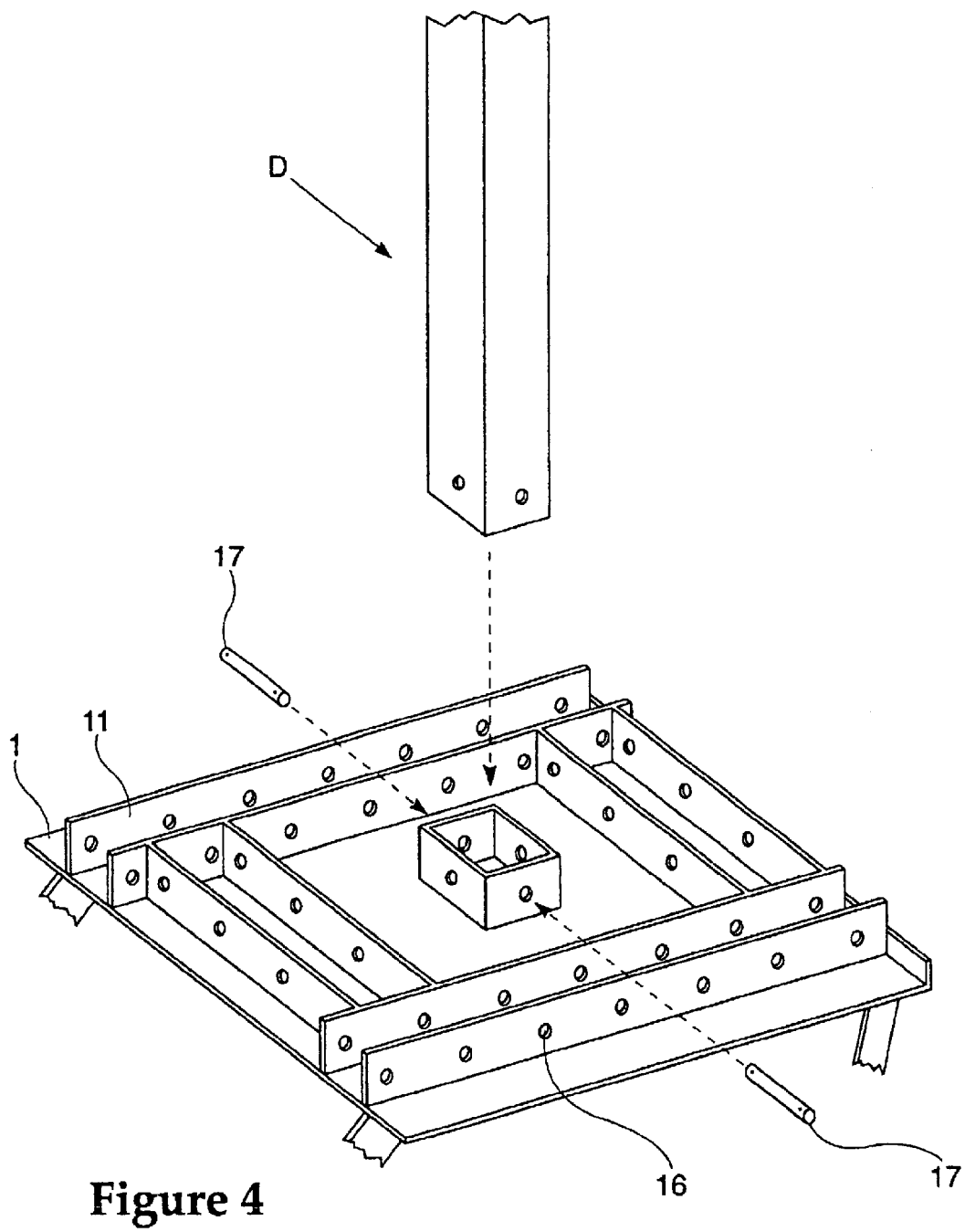
FIG. 4 is another perspective view of the ladder and scaffold support of the first embodiment of the present invention, illustrating how a siding jack post may be attached.

FIG. 4 is another perspective view of the ladder and scaffold support of the first embodiment of the present invention, illustrating how a siding jack post may be attached. Jack post d may comprise a portion of a scaffold assembly typically used in the industry for installing siding or the like. In some instances, it may be necessary to install siding or perform other siding work on a wall portion above an inclined roof section.

The present invention allows Prior Art scaffolding to be safely and easily installed above an inclined roof section. Other types of scaffolding and supports may also be supported by the present invention. As illustrated in FIG. 4, jack post D may be inserted between support adjustment plates 11 and secured with a pin or pins 17. The use of pins 17 and support adjustment plates 11 prevents ladder legs from slipping or other movement.

Figure 5:
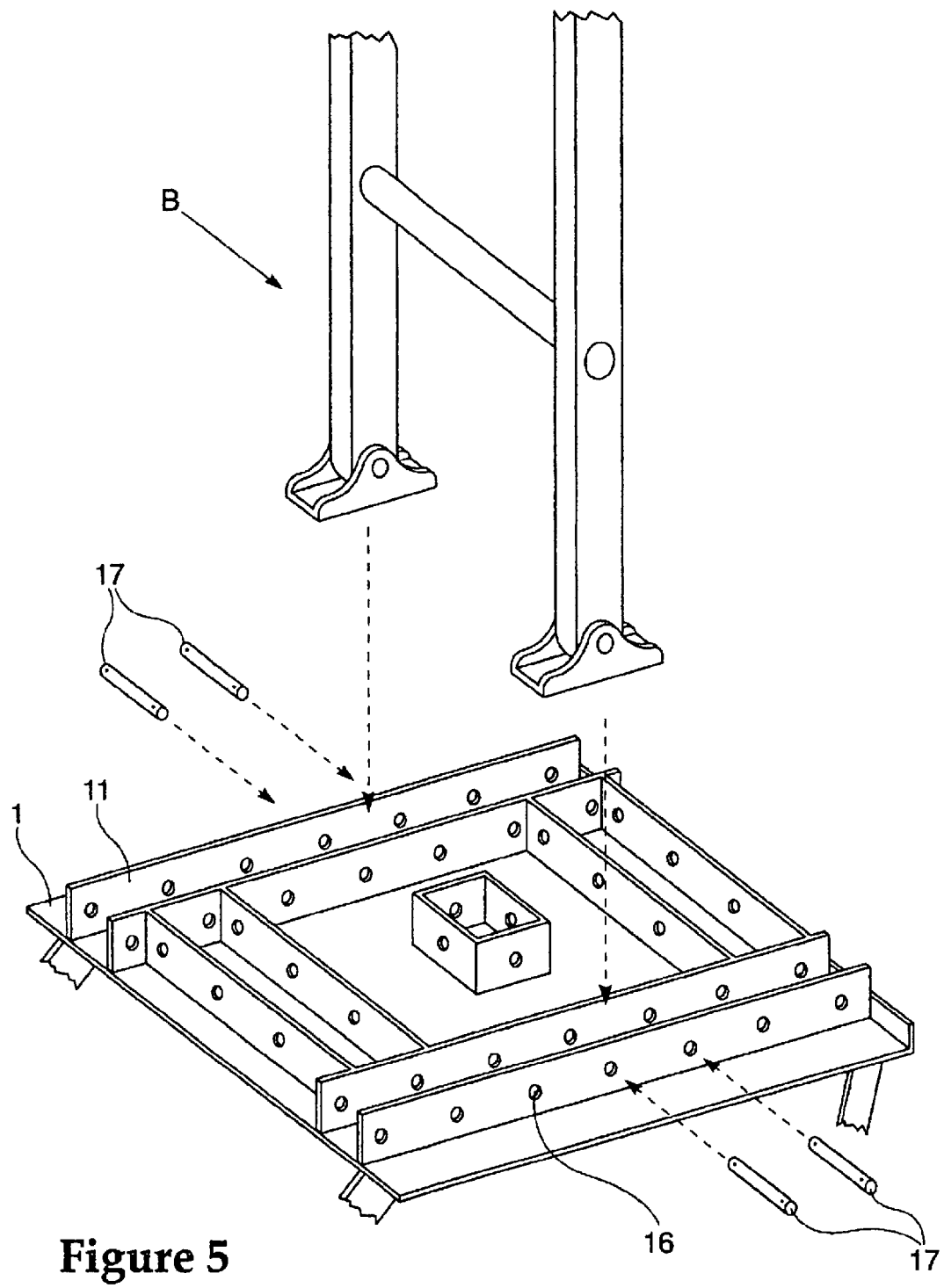
FIG. 5 is another perspective view of the ladder and scaffold support of the first embodiment of the present invention, illustrating how a ladder may be attached.
Figure 6:
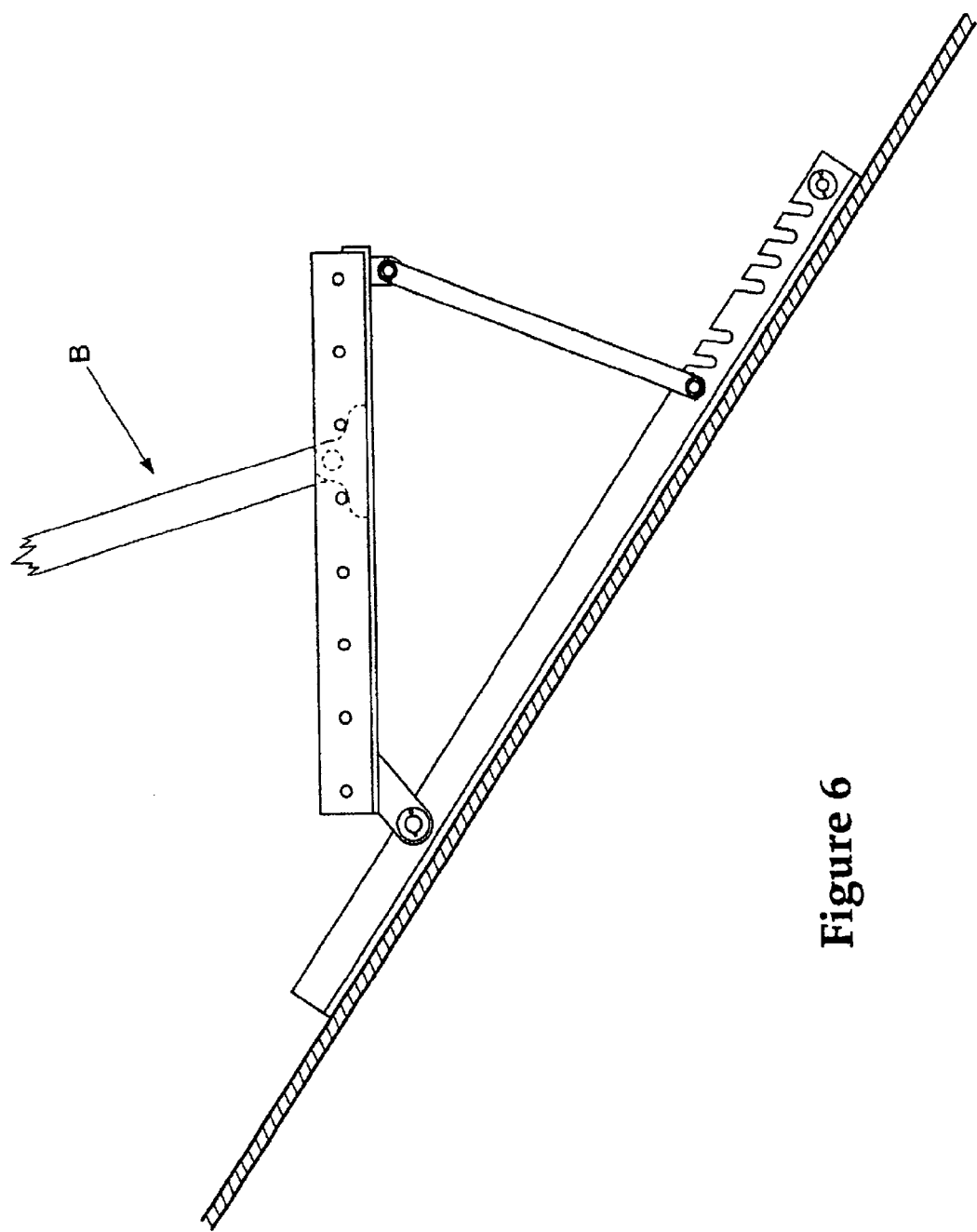
FIG. 6 is a side view of the ladder and scaffold support of another embodiment of the present invention, illustrating how a ladder may be attached.

FIG. 5 is another perspective view of the ladder and scaffold support of the first embodiment of the present invention, illustrating how a ladder may be attached. FIG. 6 is a side view of the ladder and scaffold support of the first embodiment of the present invention, illustrating how a ladder may be attached. As illustrated in FIGS. 5 and 6, Legs of ladder B may rest between support adjustment plates 11. Support adjustment plates 11 may be spaced apart a standard distance of a typical aluminum, wood, or fiberglass construction ladder so as to readily accommodate such a ladder.

Lock pins 17 may be inserted into pre-drilled holes 16 to secure ladder B. As illustrated in FIG. 5, ladder B may be provided with feet (as is typical of such Prior Art ladders) which are locked into place between support adjustment plates 11 via lock pins 17. The use of lock pins 17 and support adjustment plates 11 prevents ladder B from slipping or other movement. Note that the ladder structure need not be modified by drilling or other changes which might void the ladder warranty or alter the structural characteristics of the ladder.

Legs of ladder B may rest between support adjustment plates 11. Support adjustment plates 11 may be spaced apart a standard distance of a typical aluminum, wood, or fiberglass construction ladder so as to readily accommodate such a ladder.

Other features may be added to the apparatus of the first embodiment of the present invention. For example, additional support adjustment plates 11 may be provided to secure a horizontal walkboard, scaffold, or the like to the apparatus.

Figure 7:
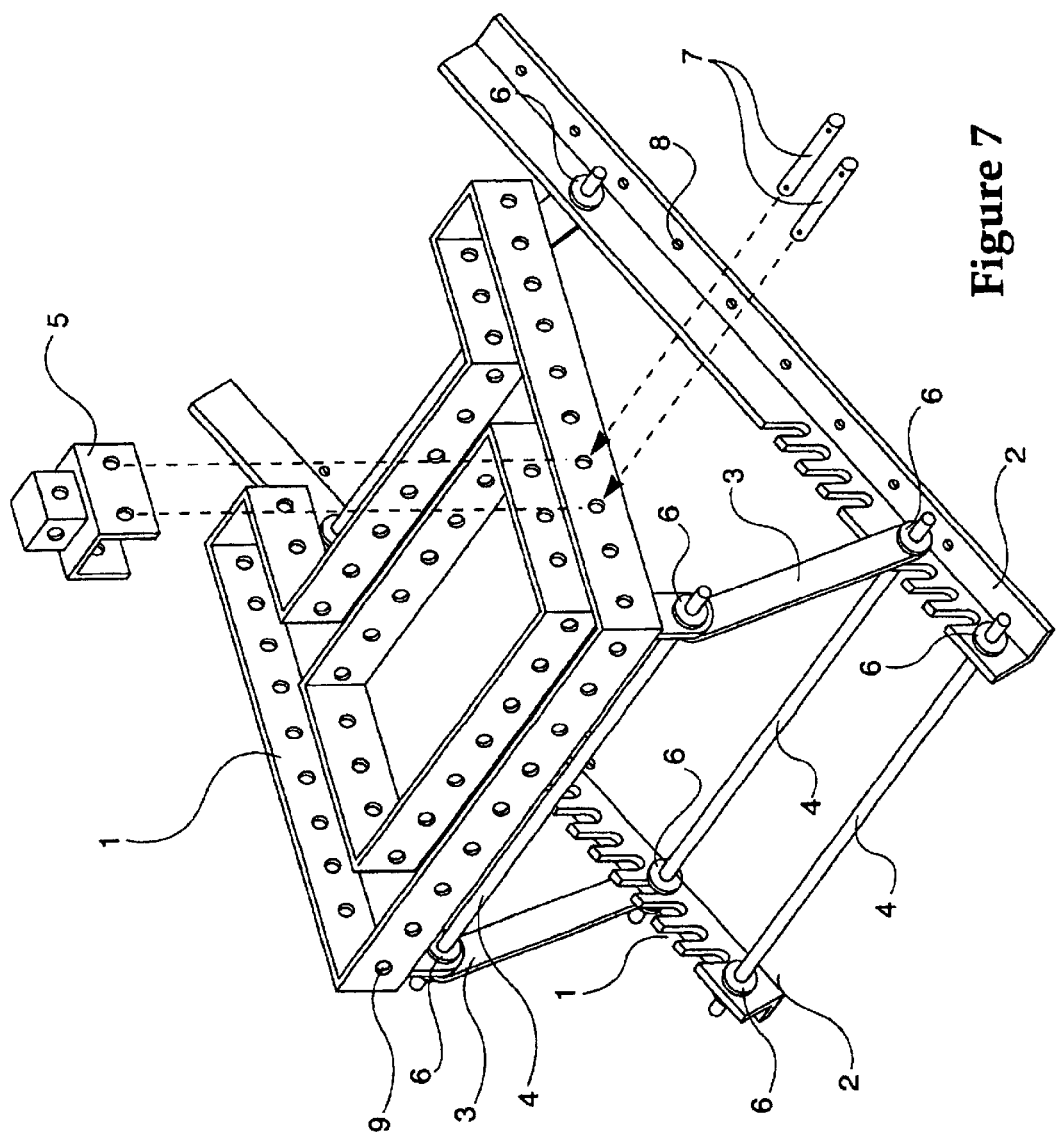
FIG. 7 is a perspective view of a modified version of FIGS. 1–6 with a movable jack post support.
Figure 8:
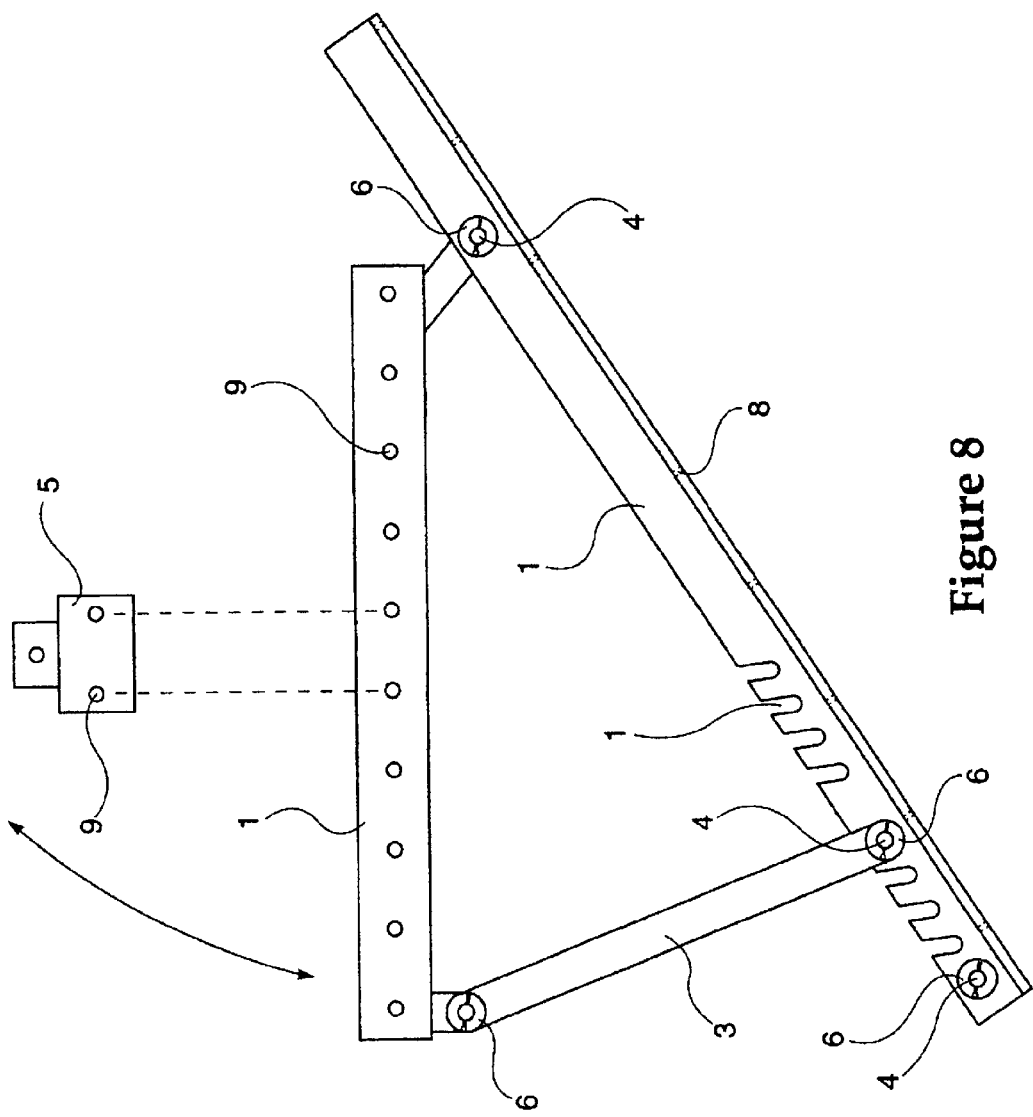
FIG. 8 is a side view of a modified version of FIGS. 1–6 with a movable jack post support.
Figure 9:
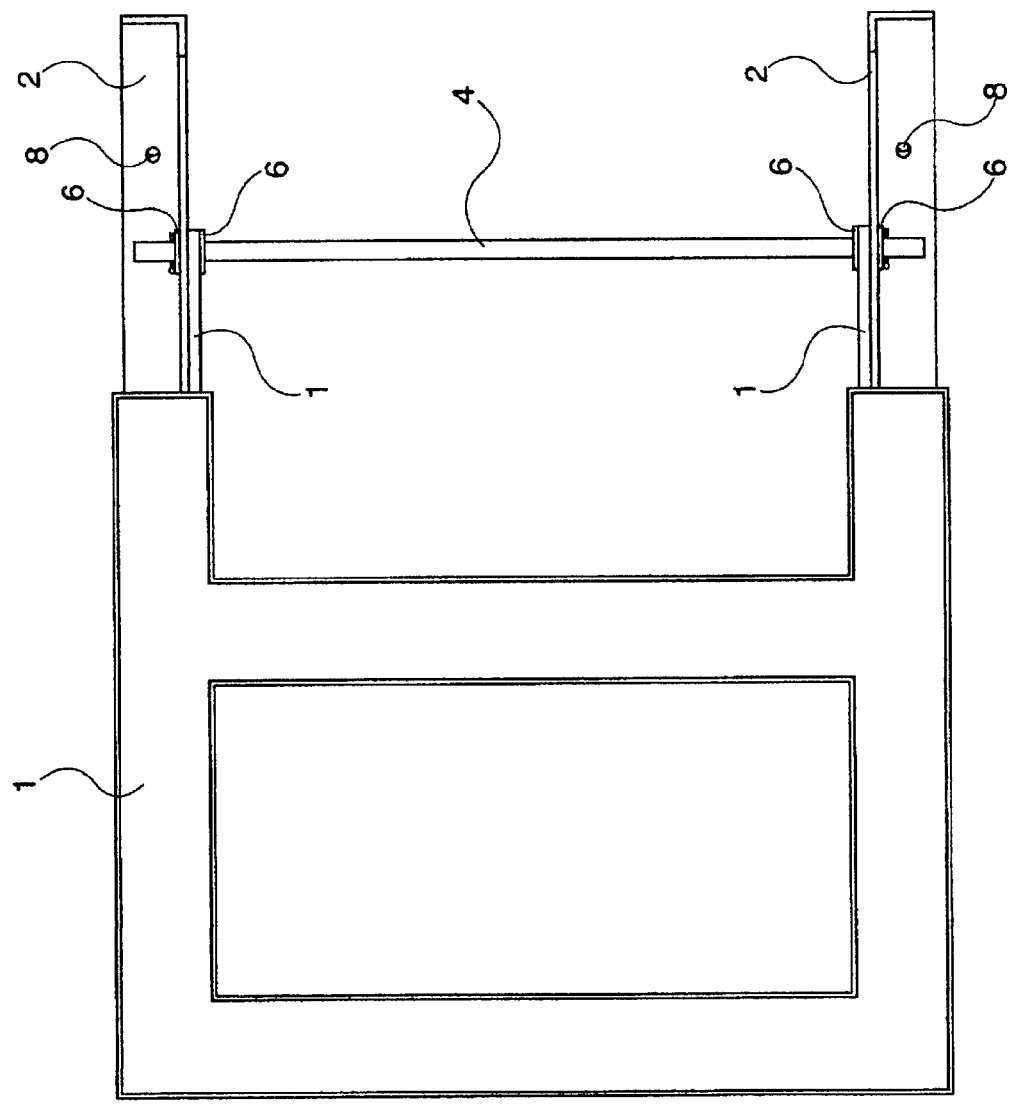
FIG. 9 is a top view of a modified version of FIGS. 1–6 with a movable jack post support.
Figure 10:
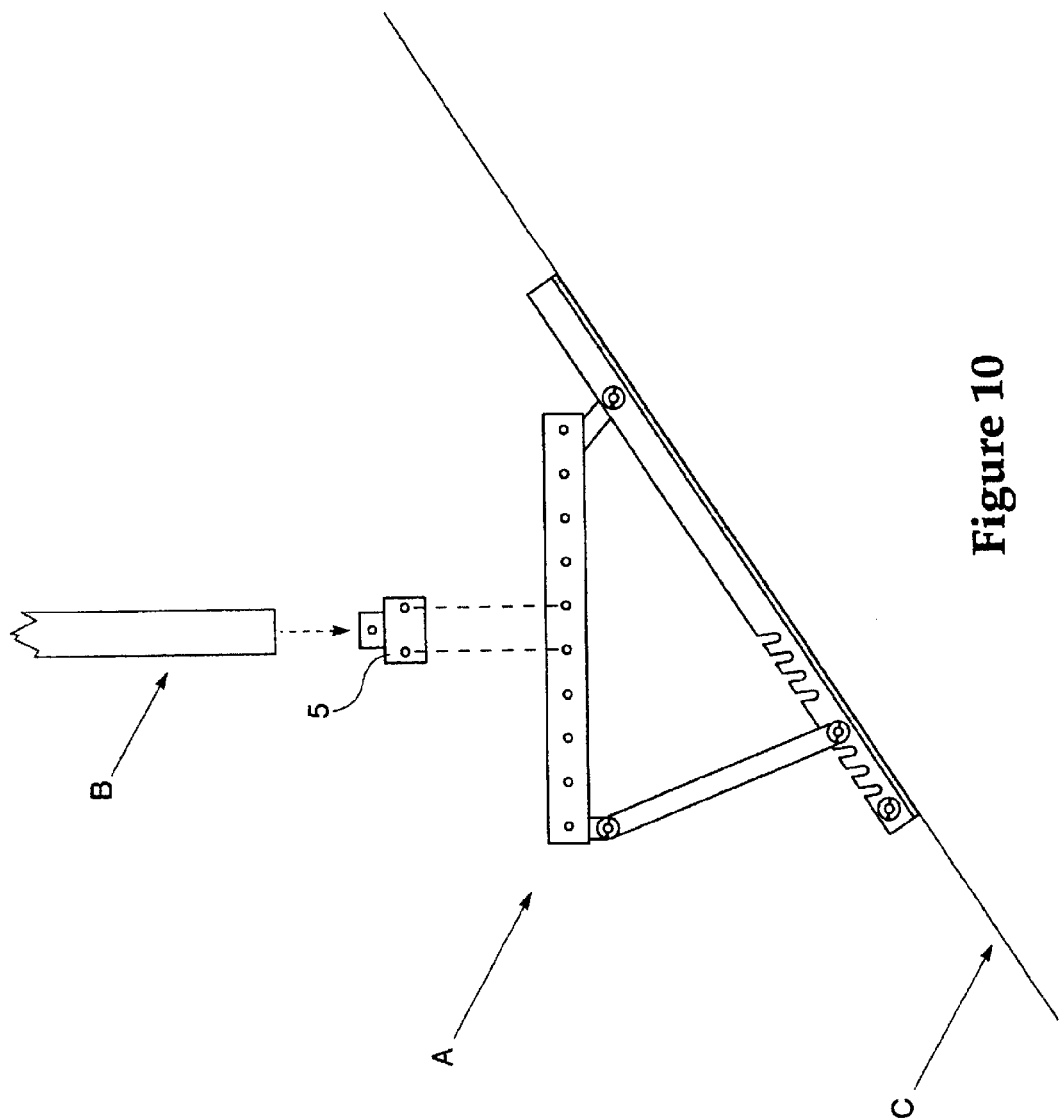
FIG. 10 is a top view of a modified version of FIGS. 1–6 with a movable jack post support.

FIG. 7 is a perspective view of a modified version of FIGS. 1–6 with a movable jack post support. FIG. 8 is a side view of a modified version of FIGS. 1–6 with a movable jack post support. FIG. 9 is a top view of a modified version of FIGS. 1–6 with a movable jack post support. FIG. 10 is a top view of a modified version of FIGS. 1–6 with a movable jack post support.

In this modified version of FIGS. 7–10, a jack post mount 5 may be provided. Jack post mount 5 may be advantageously mounted to a number of positions within rails 1, secured by pins 7. Thus, the device need not be relocated if a jack post needs to be moved or positioned a few inches from the center portion of the platform (as in FIGS. 1–6).

It should be noted that the GABLEMASTER™ may also be used to support materials and supplies in addition to, or in when not being used as, a scaffold or ladder support. Squares of shingles, water coolers, tools, and other supplies may be placed upon the surface of the GABLEMASTER™ of FIGS. 1–10, which may be adjusted to prevent such materials from sliding off the roof.

Figure 11:
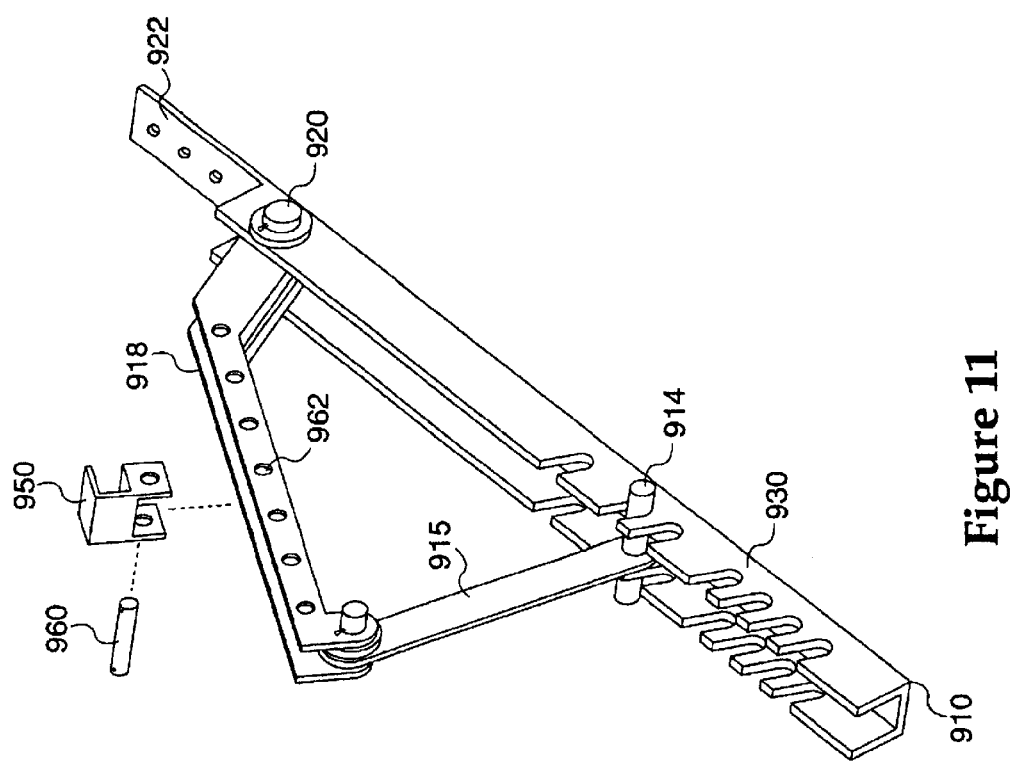
FIG. 11 is a perspective view of another embodiment of the material and supply support of the present invention, wherein a lightweight adjustable material and supply or scaffold board support is provided

FIG. 11 is a perspective view of yet another alternative embodiment of the invention, wherein a lightweight adjustable material and supply or scaffold support is provided. In this variation, a single channel having U-shaped cross-section may be provided, each with an adjustable support pole. Connected to the support pole though a pivot joint is an adjustable support channel which has its other end hinged to single channel. The support pole may be adjusted to achieve a suitable angle of adjustment corresponding to roof incline. A number of these devices may be used to support a scaffold board on a roof by means of a scaffold securing clip.

Referring to FIG. 11, a number of channels 910 having a U-shaped cross-section may be provided, each with an adjustable support pole 915. Connected to the support pole 915 though a pivot joint 950 is an adjustable platform support channel 918 which has its other end hinged to channel 910 through pivot 920. The support poles 915 may be adjusted to achieve a suitable angle of adjustment corresponding to roof incline by inserting bar 914 into one of notches 930. Notches 930 may be provided at intervals corresponding to standard roof pitches.

Support channel 918 may be used to support a scaffold platform, which could be a plank or board, or a specialized platform (e.g., aluminum scaffold platform) constructed for such purpose. When a number of the devices of FIG. 11 are attached to a roof via nailing holes 922, at the same height, a platform or board may be placed atop support channel 918, secured by clip 850 held in place by pin 960 though one of holes 962. Holes 962 may be spaced at regular intervals corresponding to plank or platform sizes and/or roof pitch. In use, the other side of the plank or platform would be held in place by the roof itself.

ROOFSTOCKER™ and ROOFER'S RACK™ provide adjustable platforms which allow a roofer to store materials safely on an inclined roof surface. The ROOFER'S RACK™ is an adjustable platform system designed to hold slate tiles, cedar shakes, terra cotta tiles, and other roofing accessories, tools, and materials. It may be placed at shoulder level, eliminating the up-and-down motion associated with prior art use of a scaffold board for material storage, thereby also eliminating the fatigue factor associated with installing these types of roofing materials. The ROOFER'S RACK™, because of its compact and lightweight design can be moved freely as work progresses, allowing for quicker installation time.

In its preferred embodiment, the ROOFSTOCKER is a lightweight, fully assembled aluminum platform composed of two units which can be used individually or in combination. Individually, the unit may support up to 2000 pounds of materials in one embodiment, whereas combined units may support up to 4000 pounds in another embodiment.

The addition of fourteen inch safety rails prevents materials such as tile and slate from falling off the roof. The platform easily adjusts to roof truss layouts of two feet, 18-inch and 16 inch on center, as well as other dimensions. The ROOFSTOCKER™ increases safety for employees and customers and decreases liability to the contractor. A custom tarp may be made to cover materials on the ROOFSTOCKER™. Standard size in the preferred embodiment is 54" in length and 42" in width.

Figure 12:
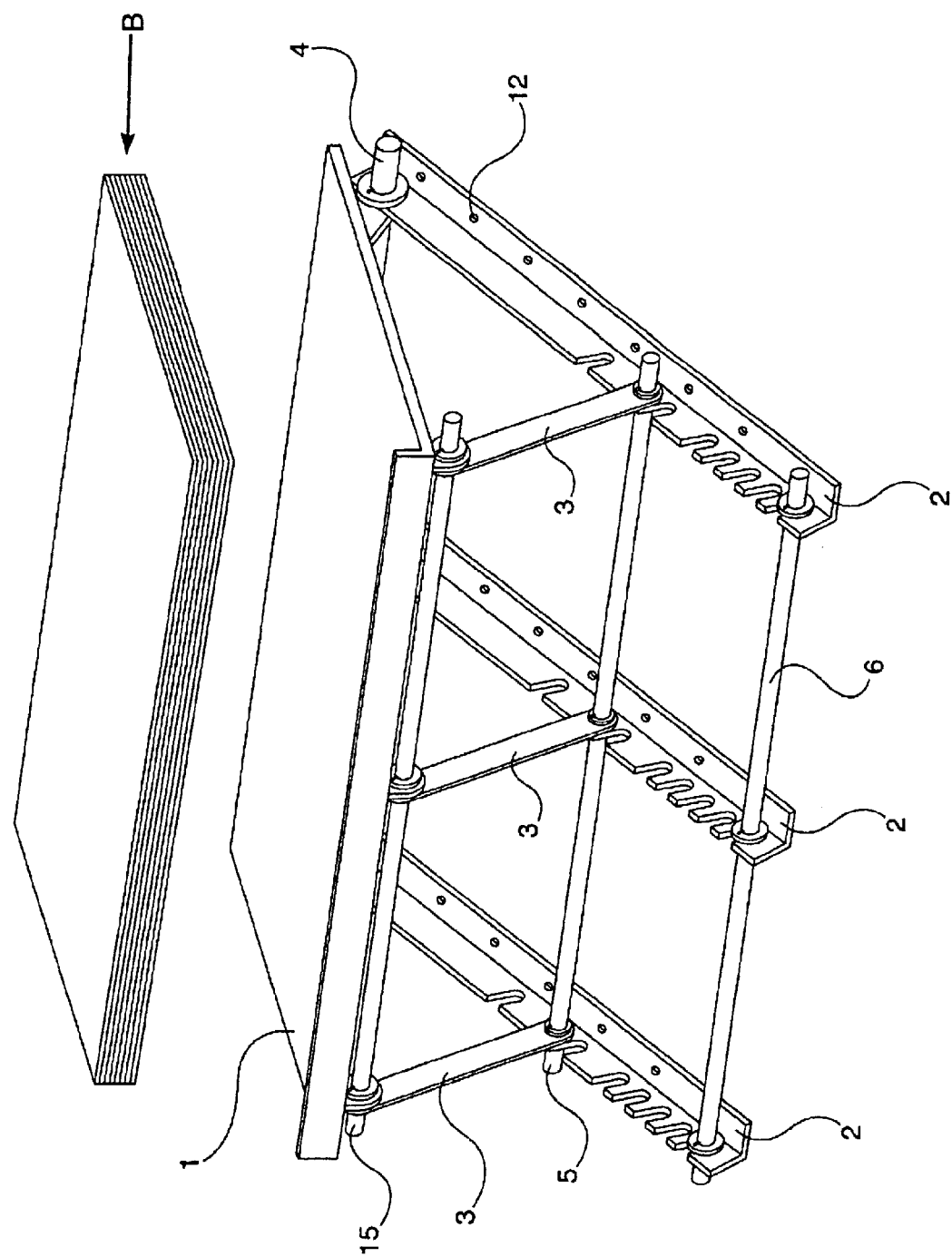
FIG. 12 is a perspective view of another embodiment of the material and supply support of the present invention.

Both the ROOFER'S RACK™ and ROOFSTOCKER™ will now be described in more detail in connection with FIGS. 12–26. FIG. 12 is a perspective view of the material and supply support of the second embodiment of the present invention. Main support table 1 for the unit may be used to support a package or packages of roofing shingles, tools, roofing materials, or the like represented by element B in FIG. 12.

Main support table 1 may be constructed from aluminum sheet of approximately ¼ inch in thickness. A lip or lips may be added, preferably as shown, on the outboard side of the apparatus, to prevent materials B from slipping off the surface of support table 1. Support table 1 and the lip or lips 11 may also be constructed from a single piece of cast aluminum. A texture (e.g., ribbing, cross-checking, or the like) may be applied to the surface of support table 1 to prevent materials from slipping off the surface.

Materials other than aluminum may be used, of course. However, for high strength and low weight, the inventor has found aluminum construction to work well. The apparatus of the present invention could be conceivably made of other metals (e.g., steel) or even from plastics or composites (e.g., fiberglass and/or carbon fiber construction) without departing from the spirit and scope of the present invention.

Main support bars 2 may be fabricated from aluminum channel and are designed to be fastened to a roof truss on 24" centers. The center support bar 2 may be provided in a slidable fashion on connecting rods 4 and 5. Such a slidable support bar or bars 2 may be used to secure the device to roof trusses which are not on 24" centers (e.g., 12" or 16" centers). Main support bars 2 may be secured to roof trusses by nailing or screwing through pre-drilled holes 12. If nails are used, double-headed nails are preferred, as they may be readily removed without damaging or marring the roof surface.

Typically, four to eight double-headed nails may be used to secure main support bars 2 to a roof truss. Eight or more predrilled nail holes may be provided in each of main support bars 2 in the preferred embodiment. Other numbers of support bars 2 may be used (e.g., 2, 4, 5, 6, or more) to alter the size and width of the apparatus. For example, a larger apparatus may be made with four support bars. However, to maintain lightweight construction and to limit the amount of roof obscured by the apparatus, the inventor has found that three support bars on 24 inch centers to be the preferred embodiment.

A plurality of grooves or notches 10 may be cut into support bars 2 to allow angle adjustment of main support table 1 to compensate for different roof pitches. Connecting rod 5 may be adjusted to a corresponding one of the notches 10 to provide correct support to main support table 1 via support bars 3. Support bars 3 may in turn be connected to main support table 1 via rod pin 15 and plate 14 in a pivoting fashion. Connecting rod 4 may rotate within the holes provided in main support bars 2 and rotatably support platform 1 via plates 7 to allow for rotation with angle adjustment.

Connecting rod 5 may be provided with spacers 9 and carter pins 13 to lock spacers 9 in place. Spacers 9 may provide proper alignment between connecting rod 5 and main support bars 2 to provide correct spacing for 24" (or the like) roof truss centers. In an alternative embodiment, multiple spacers or spacer positions may be provided to allow the apparatus to adjust to different roof truss spacings.

An additional connecting rod may be provided as safety rod 6, also provided with carter pins 13 and spacers 8. Safety rod 6 may be used to attach a tether line or the like. Such a tether line may be used to allow workers to secure themselves or materials, tools, supplies, or the like, to the apparatus. If the worker falls from the roof, the tether line may help break or interrupt their fall.

Figure 13:
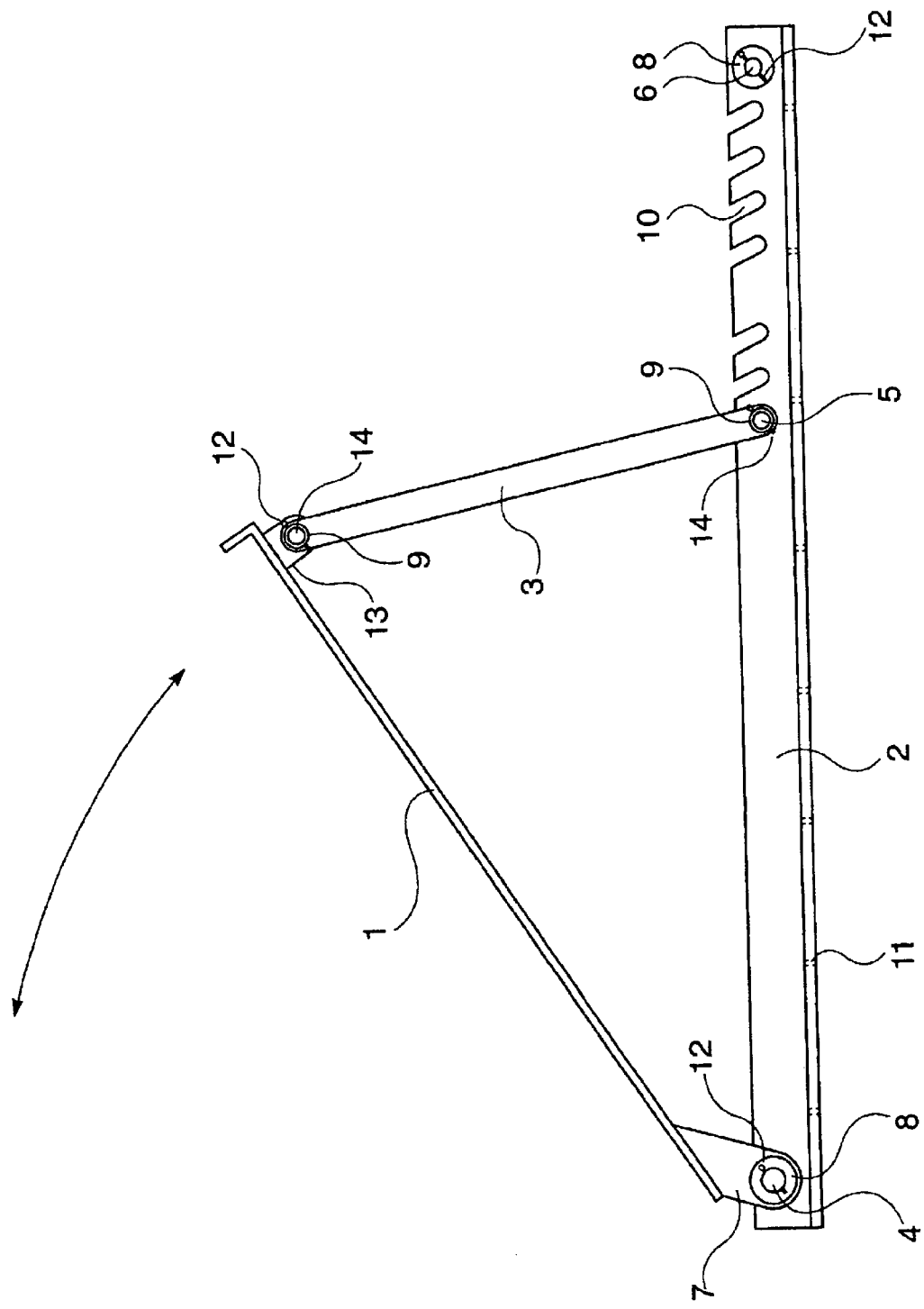
FIG. 13 is a side view of the material and supply support of the second embodiment of the present invention.

FIG. 13 is a side view of the material and supply support of the second embodiment of the present invention, illustrating how the angle of main support table 1 may be changed. The location and spacing of notches 10 is set to correspond to typical and popular roof pitches, and may allow adjustment from pitches from 4/12 to 12/12.

Figure 14:
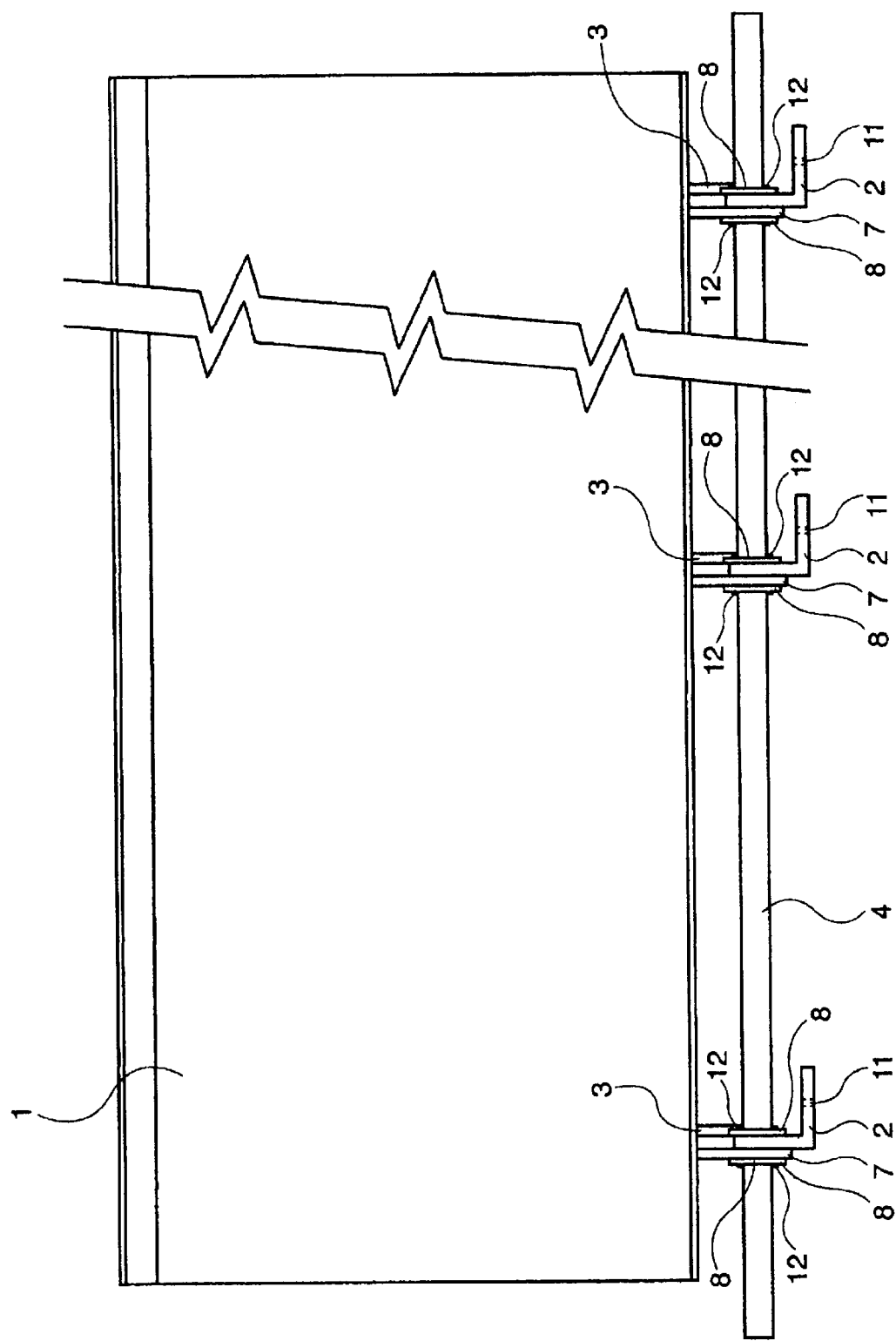
FIG. 14 is a top perspective view of the material and supply support of the second embodiment of the present invention.

FIG. 14 is a top perspective view of the material and supply support of the second embodiment of the present invention, providing another illustration of the apparatus. It should be noted that the particular arrangement of the lip on main support table 1 is by way of example only. Other configurations may be provided without departing from the spirit and scope of the present invention.

Figure 15:
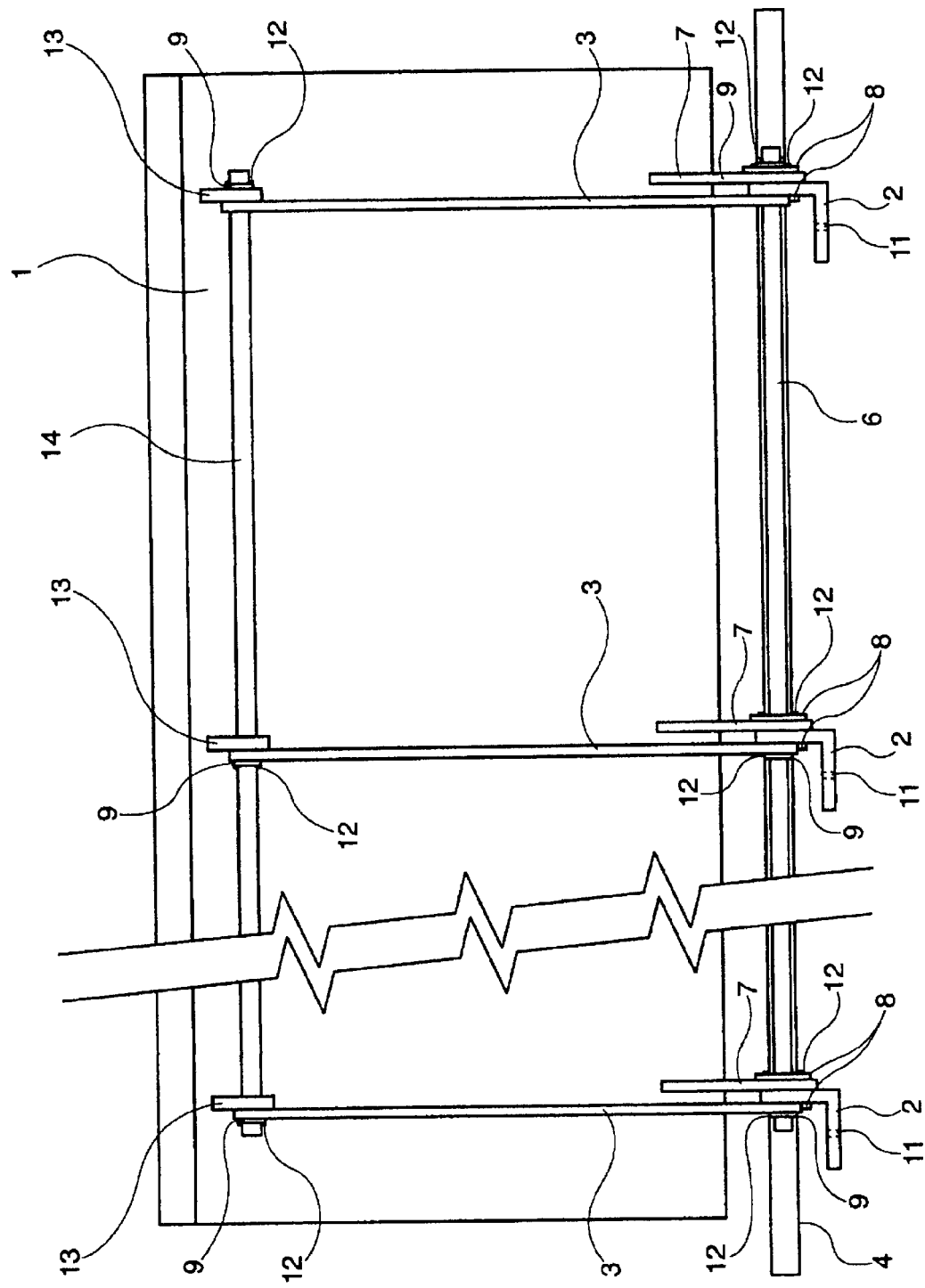
FIG. 15 is a bottom perspective view of the material and supply support of the second embodiment of the present invention.
Figure 16:
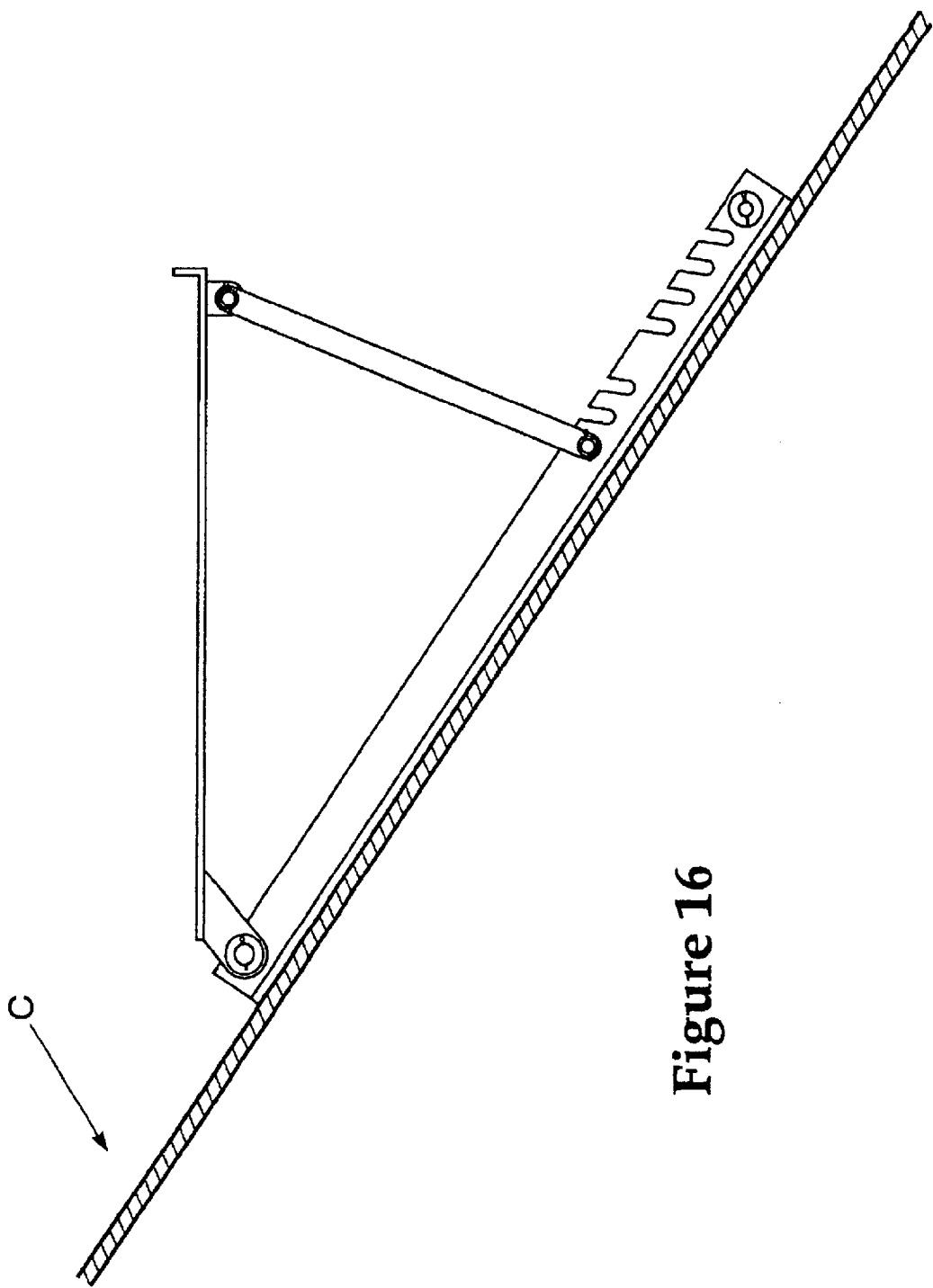
FIG. 16 is another side view of the material and supply support of the second embodiment of the present invention.

FIG. 15 is a bottom view of the material and supply support of the second embodiment of the present invention. FIG. 16 is another side view of the material and supply support of the second embodiment of the present invention, as installed on a roof.

Figure 17:
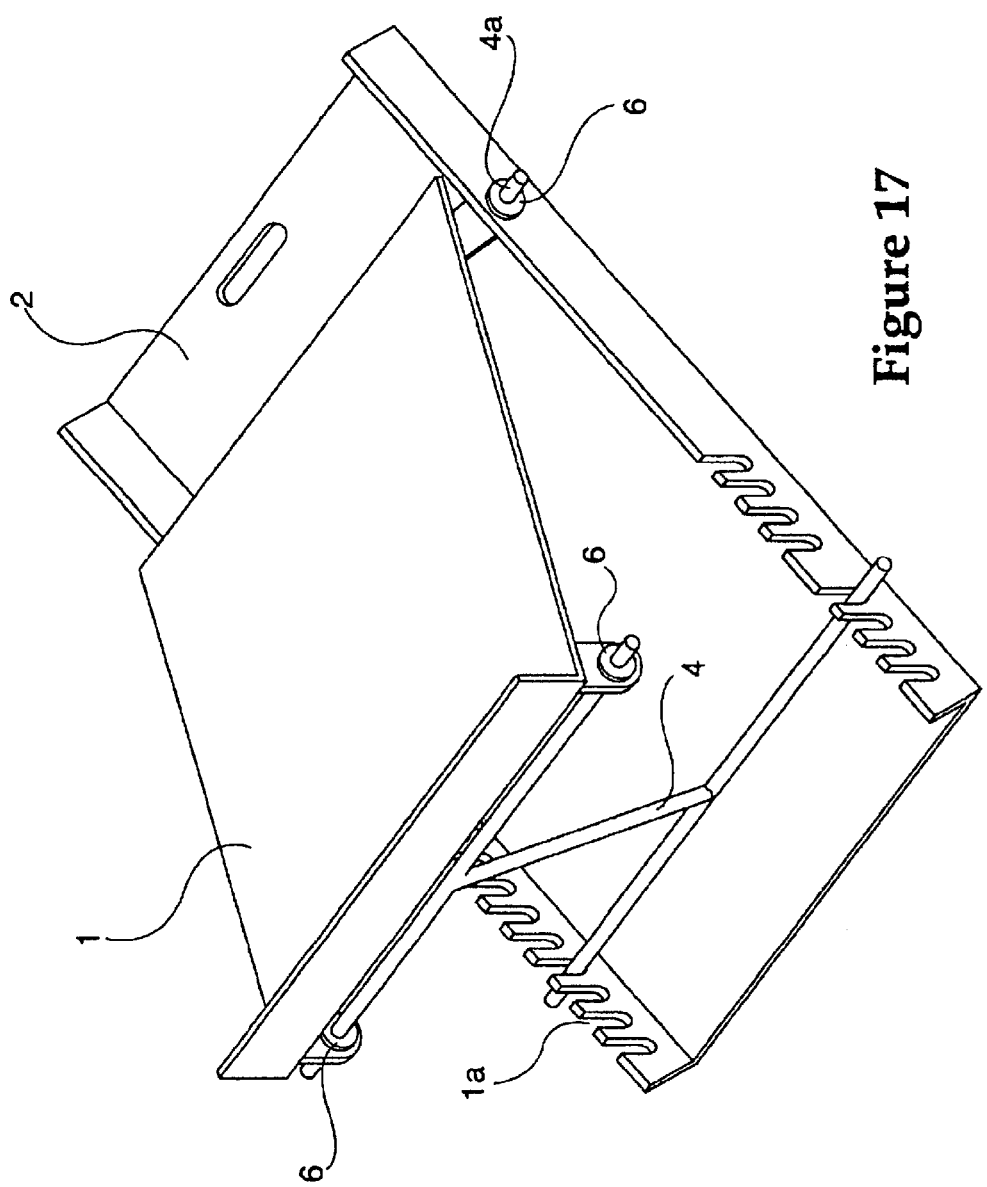
FIG. 17 is a perspective view of a material holder in another embodiment of the present invention.

FIG. 17 is a perspective view of a material holder in another embodiment of the present invention. The water cooler support may be marketed under the name WATERMATE™, a trademark of the inventor. Roof plate 2 may be backed with a layer of rubber foam (not shown) (e.g., 1" thick, medium density foamed polyurethane or upholstery type foam commonly found in fabric stores). Roof plate 2, having a substantial surface area and being backed with the foam layer, will tend to grip the roof surface and not slide off. The Foam layer tends to conform to the rough surface of the roof and thus does not readily slip off. Foam layer may be sufficient to support a water jug which may comprise, for example, a five gallon IGLOO™ water cooler.

By using a layer of foam as opposed to nailing or screwing, the support of FIG. 17 may be readily moved from place to place on the roof. Alternately, one or more nail holes may be provided to secure the apparatus or act as a safety backup to the foam layer.

In alternative embodiment of FIG. 17, the lip shown may be bend downward or left off the design, and a foam padding or the like provided to provide a "personal scaffold" for sitting, standing, or kneeling on an inclined surface. Such a personal scaffold may be used by a roofer to provide a comfortable work surface.

Figure 18:
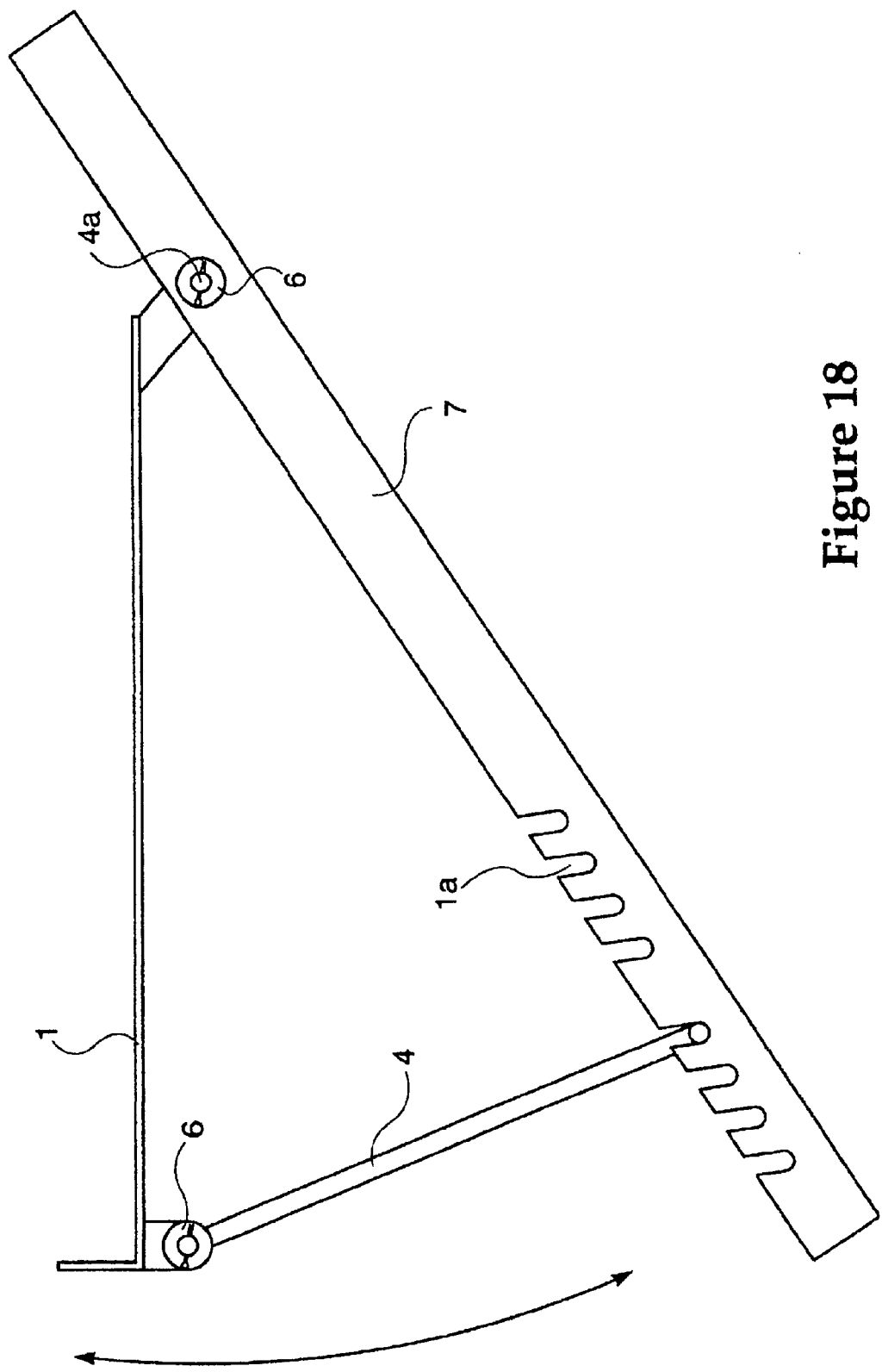
FIG. 18 is a side view of a material holder in another embodiment of the present invention.
Figure 19:
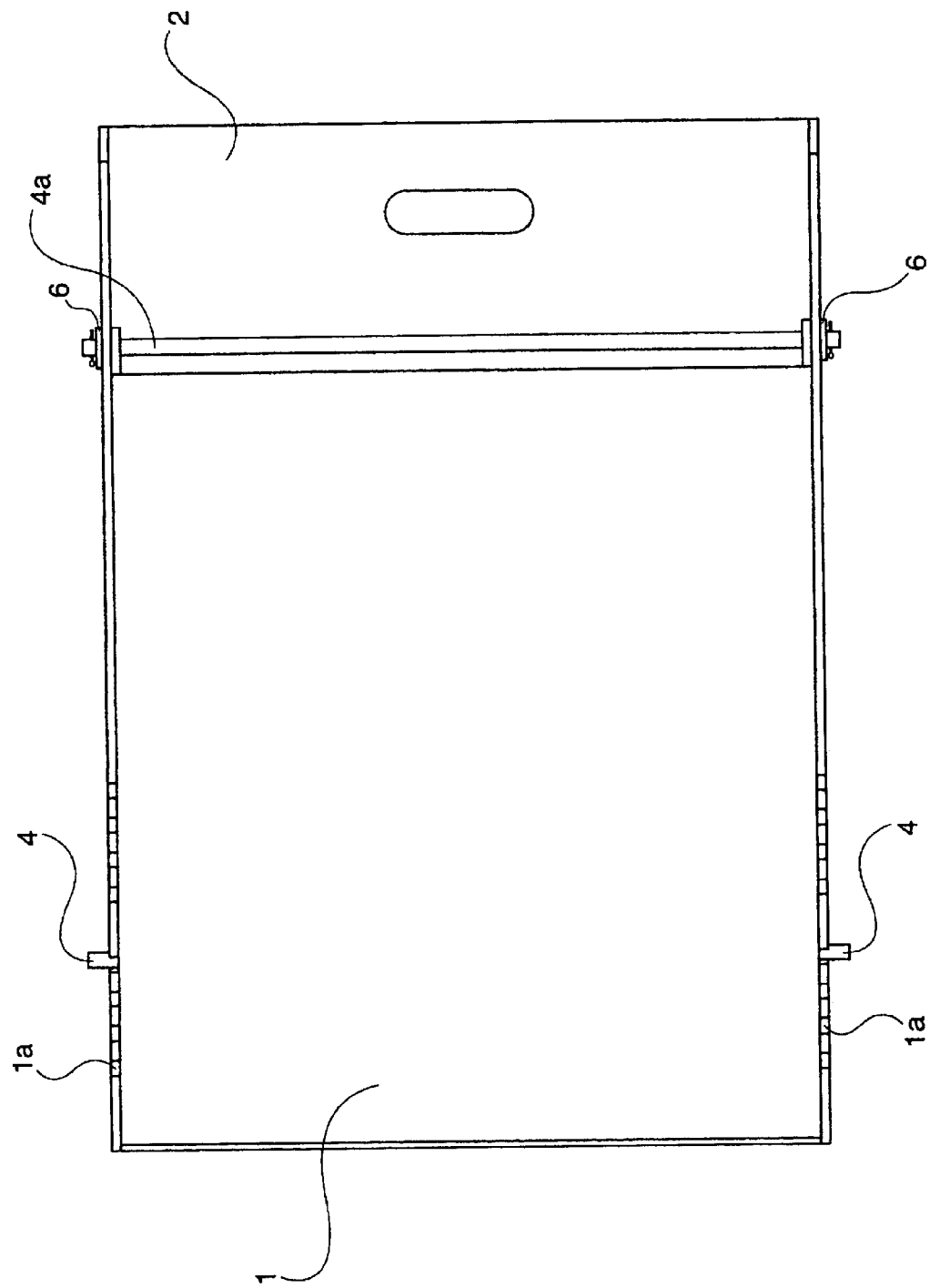
FIG. 19 is a top view of a material holder in another embodiment of the present invention.
Figure 20:
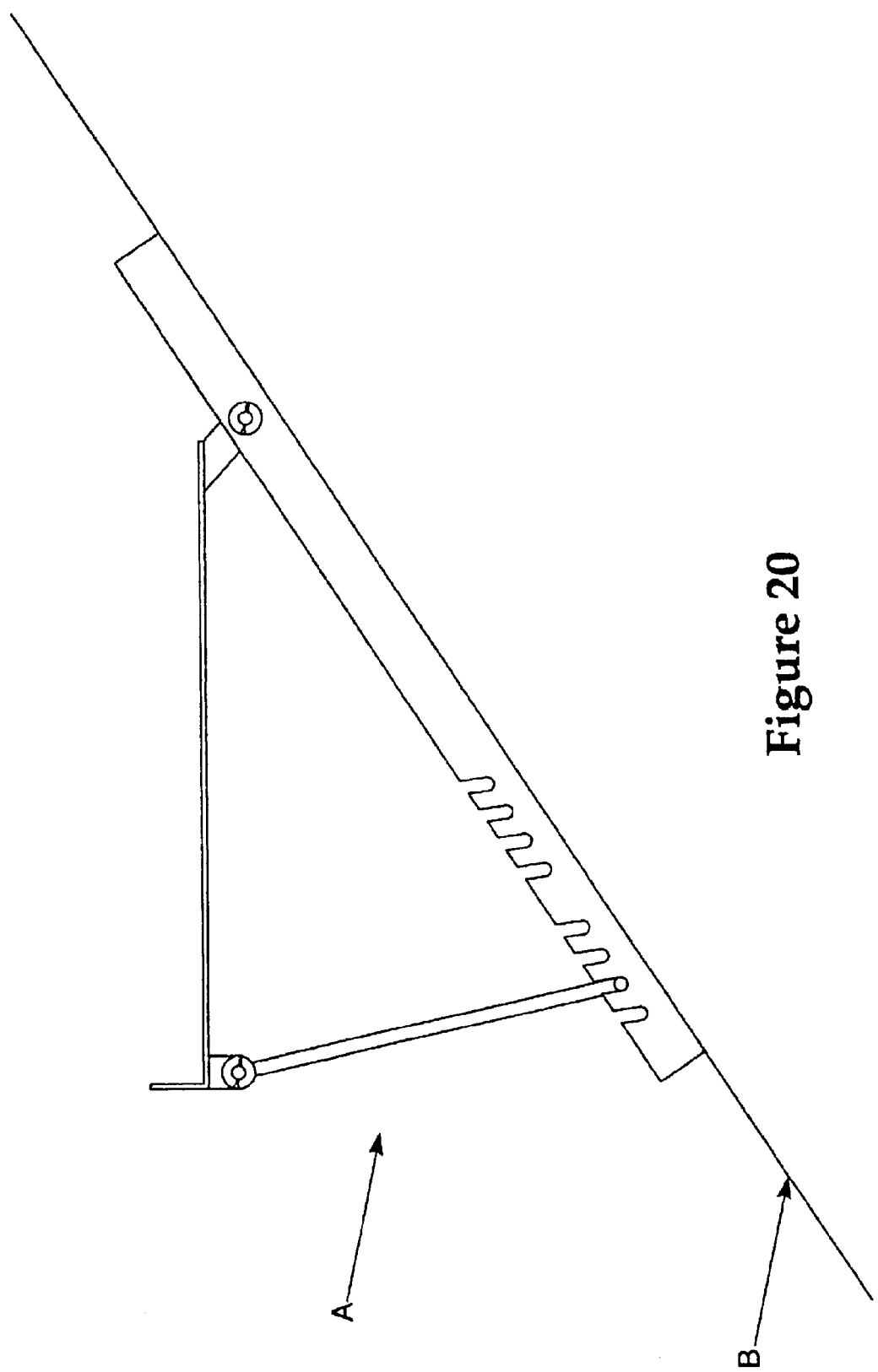
FIG. 20 is another side view of a material holder in another embodiment of the present invention.
Figure 22:
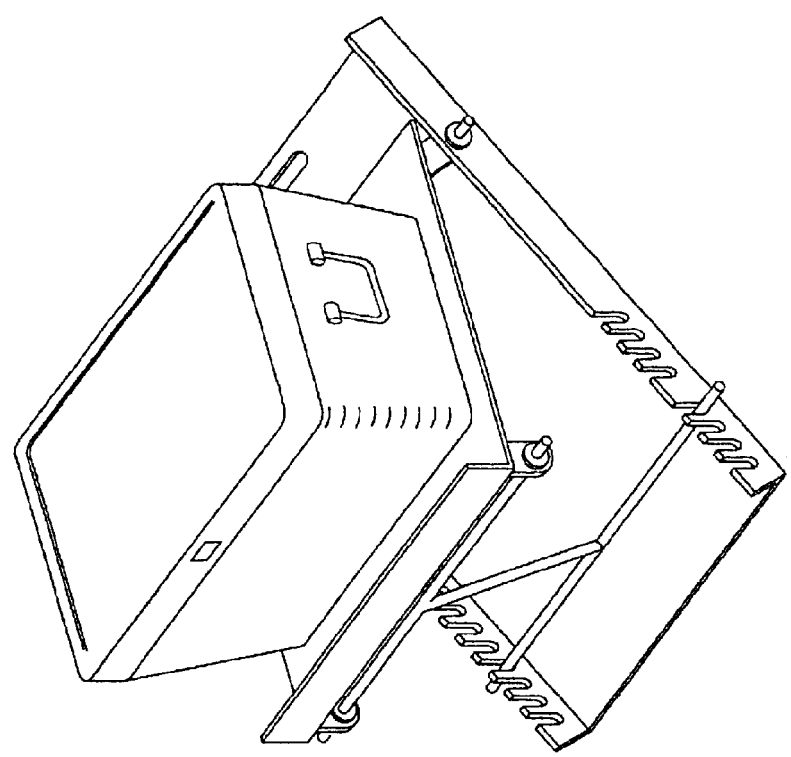
FIG. 22 is a perspective view of the material holder of the present invention illustrating the apparatus supporting a cooler.
Figure 21:
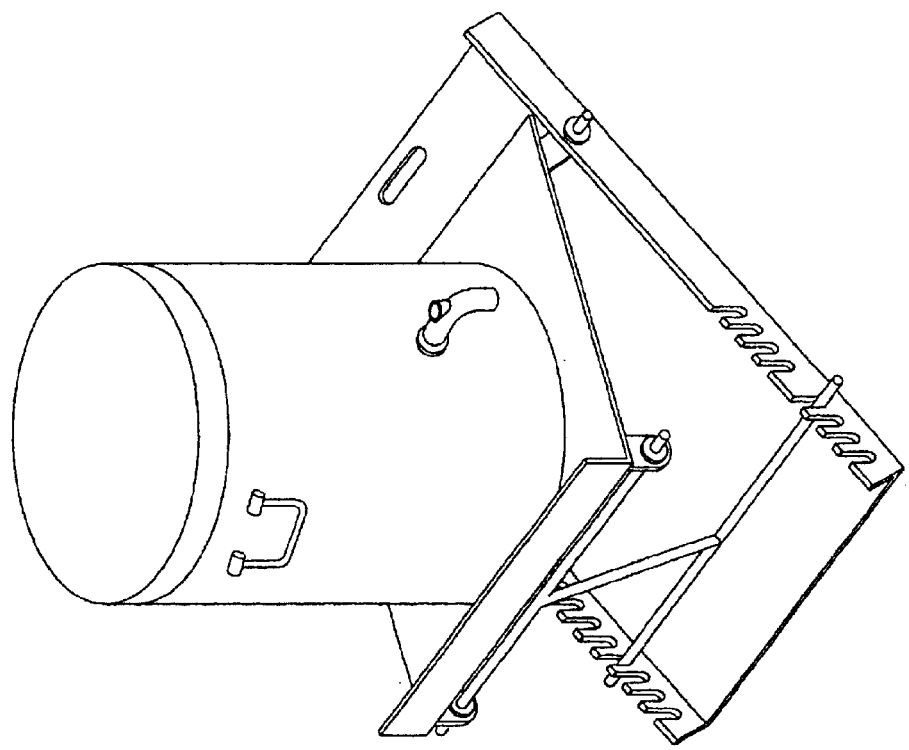
FIG. 21 is a perspective view of the material holder of the present invention illustrating the apparatus supporting a water jug.

FIG. 18 is a side view of a material holder in another embodiment of the present invention. Support platform 1 may support materials, a cooler, or a water jug. Pivots 6 hold adjustment bar 4 which may be plated into notches 1a in roof plate 2. The other end of platform 1 may rotate with respect to roof plate 2 via shaft 4a. FIG. 19 is a top view of a material holder in another embodiment of the present invention. FIG. 20 is another side view of a material holder in another embodiment of the present invention. FIG. 21 is a perspective view of the material holder of the present invention illustrating the apparatus supporting a water jug. FIG. 22 is a perspective view of the material holder of the present invention illustrating the apparatus supporting a cooler.

Figure 23:
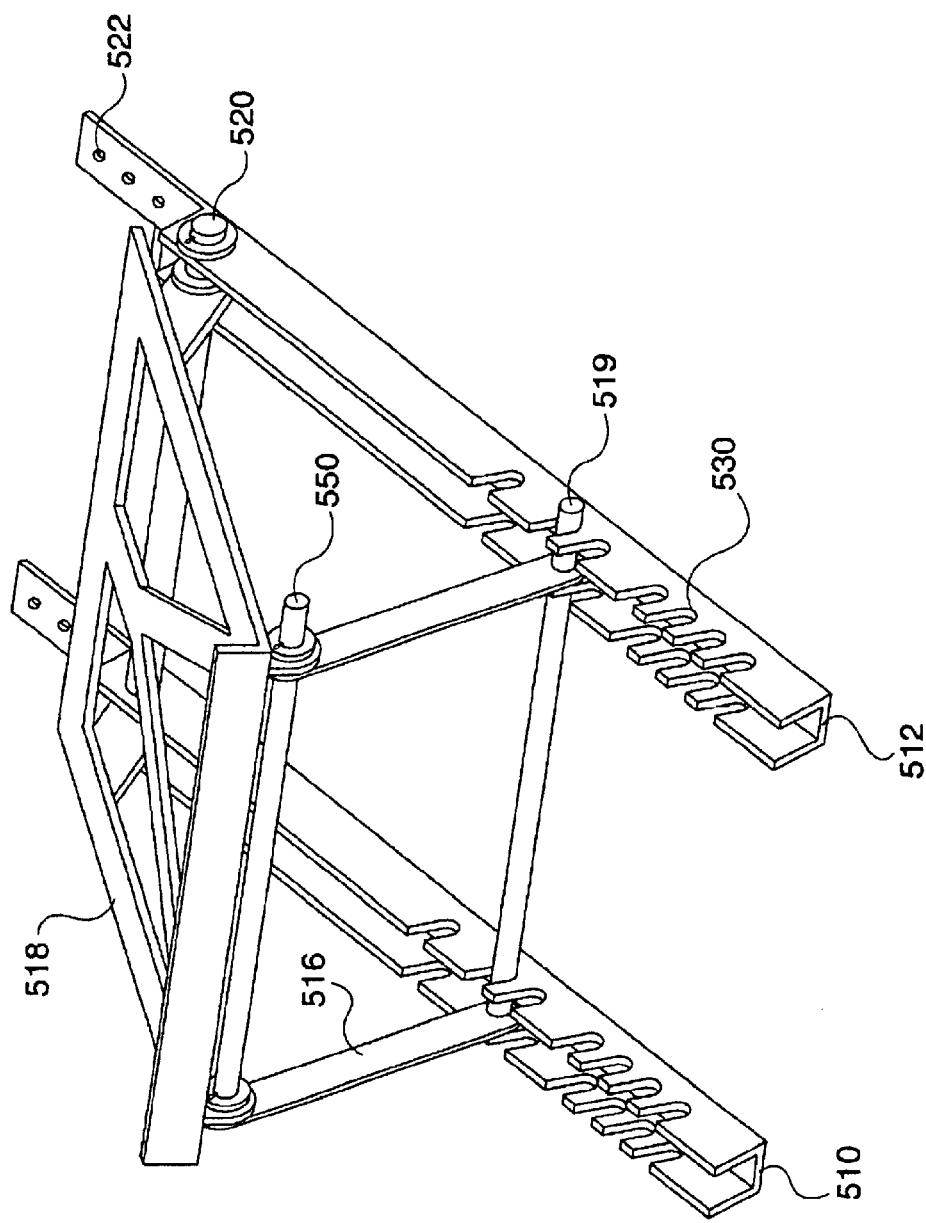
FIG. 23 is a perspective view of another embodiment of the material holder of the present invention, in which two channels having U-shaped cross-sections may be provided, each with an adjustable support pole.
Figure 24:
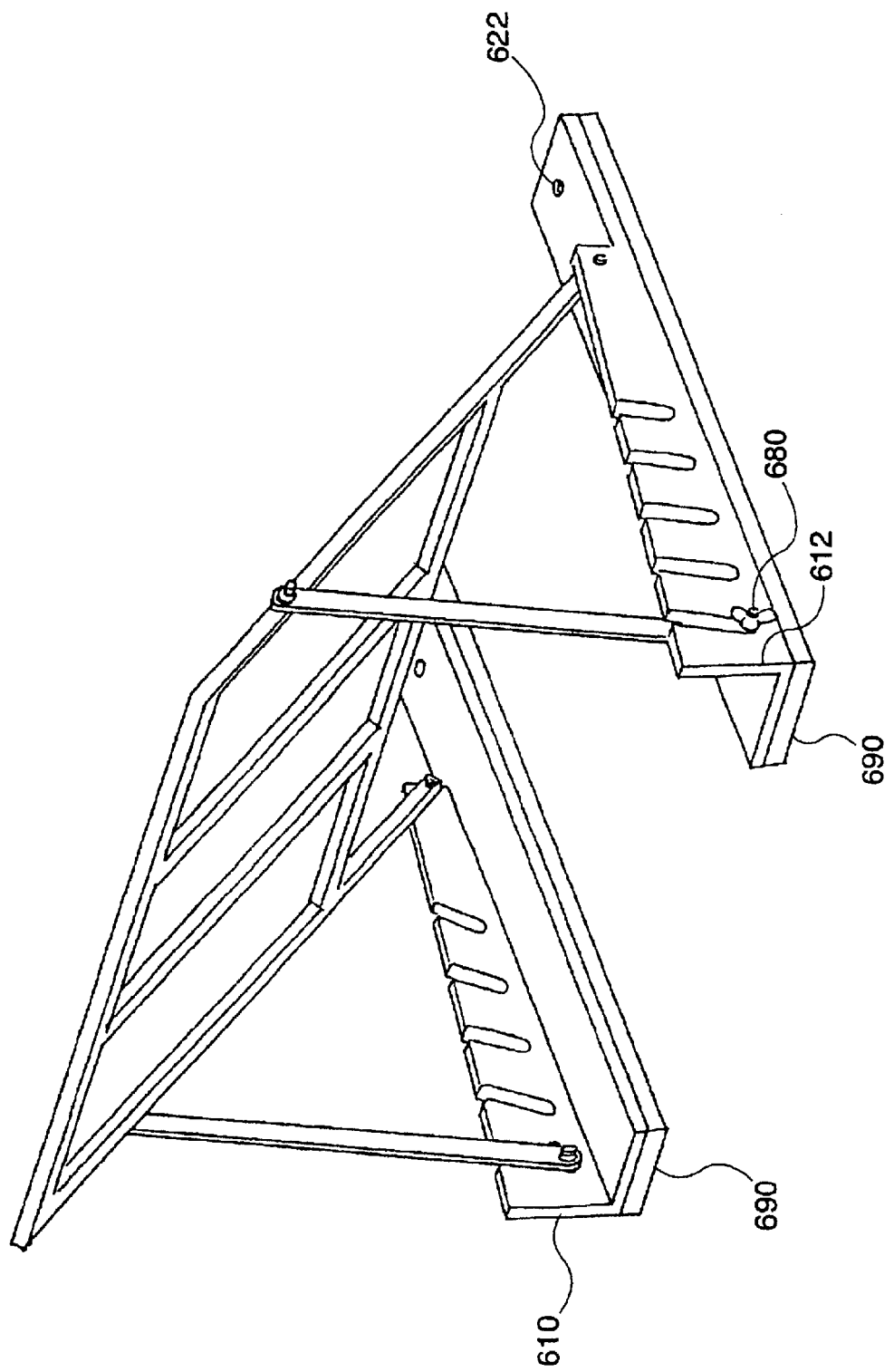
FIG. 24 is perspective view of an alternative version of the apparatus of FIG. 23.

FIG. 23 is a perspective view of another embodiment of the material support of the present invention, in which two channels having U-shaped cross-sections may be provided, each with an adjustable support pole. FIG. 24 is an alternative version of the apparatus of FIG. 23.

Referring to FIGS. 23 and 24, a lightweight adjustable material and supply support is provided which may be marketed under the name ROOFSTOCKER™, a trademark of the inventor. In this variation, two channels 510, 512 having U-shaped cross-sections may be provided, each with an adjustable support pole 515, and 516, respectively.

Connected to the support poles though a pivot joint 550 is an adjustable platform 518 which has its other end hinged to the channels 510, 512, through pivot 520. The support or poles 515, 516 may be adjusted to achieve a suitable angle of adjustment corresponding to roof incline by inserting bar 514 into one of notches 530. Notches 530 may be provided at intervals corresponding to standard roof pitches.

Platform 518 may be provided as a planar table, with one or more edge rails to prevent materials from falling off the platform. The platform may be sized to accommodate a standard package size of shingles or a shingle "square". Roofing materials stored on a roof may be stored on the platform in a level manner and thus reduce the likelihood that such materials will fall off. Smaller versions of the platform may be provided for holding tools and the like, and specialized version may be provided for specific applications such as holding a 5-gallon IGLOO™ water cooler.

In the particular version of this embodiment, the device is designed with light weight construction in mind. Platform 518 may be made of tubing or may be provided with lightening holes. The use of the channels 510, 512 (as opposed to a flat base) further reduces weight. Overall weight of the apparatus may be reduced as much as 40w. Nailing holes 522 may be provided to secure the apparatus to a roof.

In the embodiment of FIG. 24, L-shaped channels 610, 612 are provided in place of the U-shaped channels of FIG. 23. In addition, polyurethane foam layers 690 may be provided in addition to nailing holes 622. Note also the alternative use of wingnuts 680 to secure the legs to the slots.

Figure 25:
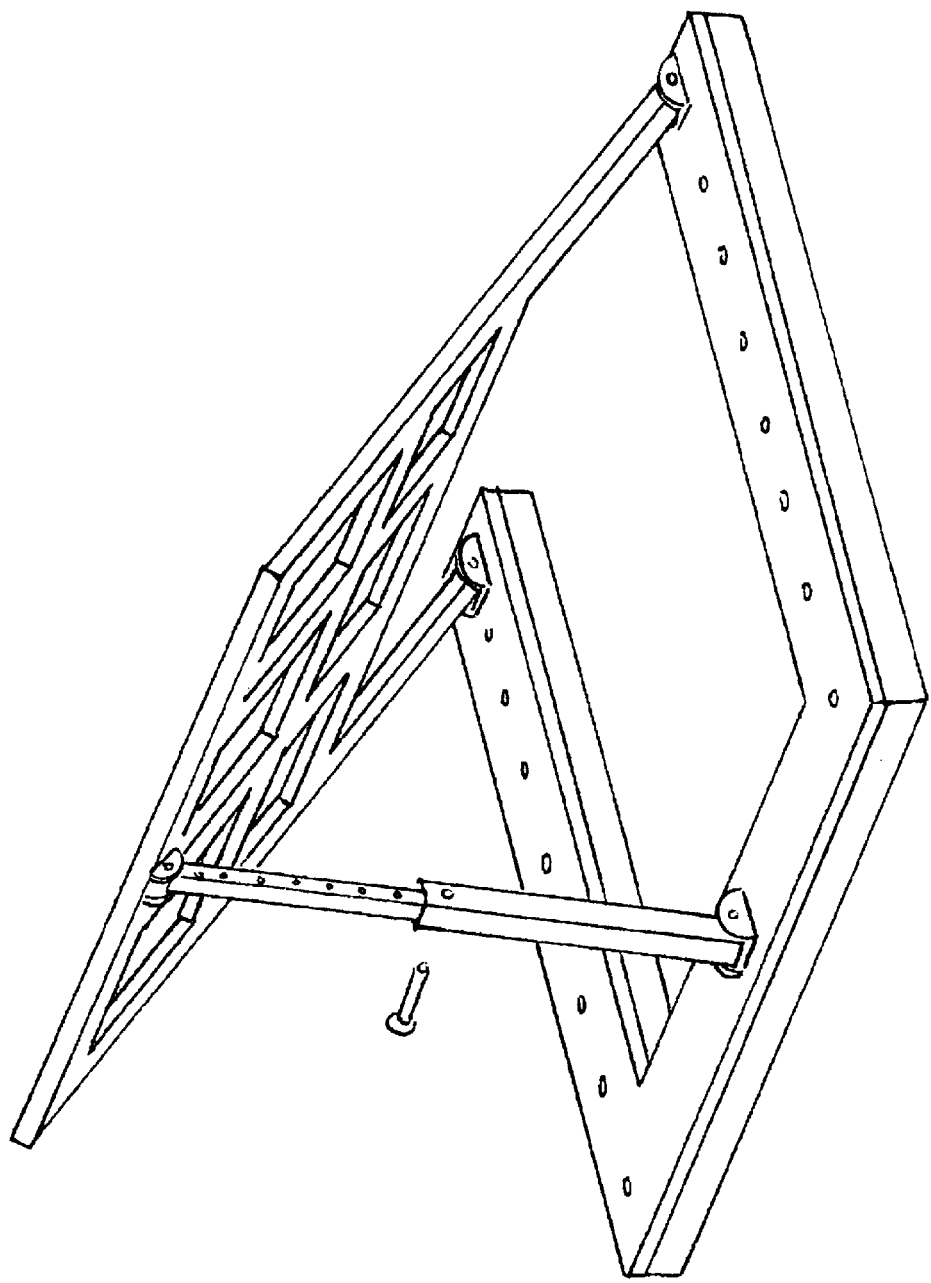
FIG. 25 is a perspective view of another embodiment of the material holder of the present invention.
Figure 26:
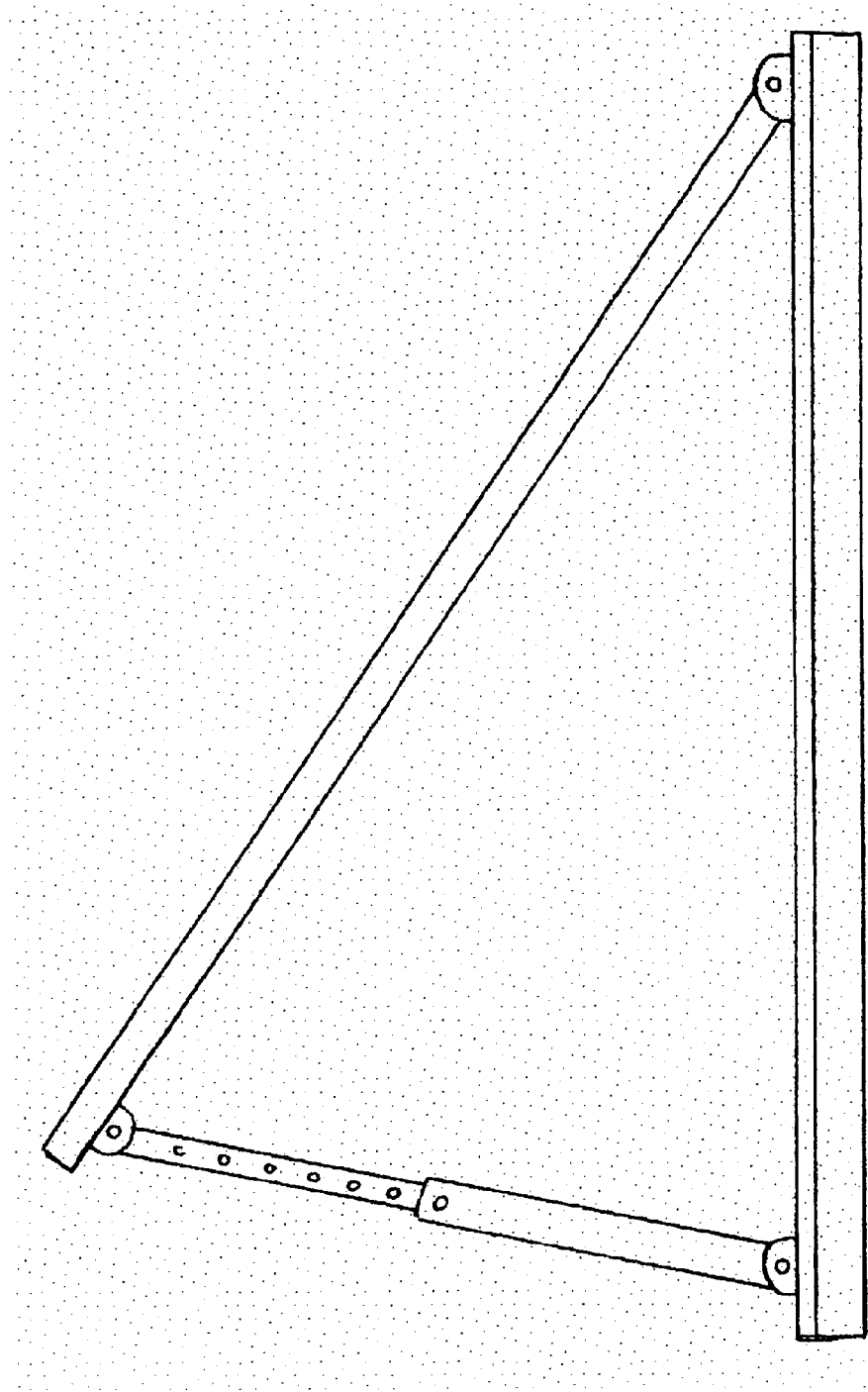
FIG. 26 is a side view of the embodiment of FIG. 25.

FIG. 25 is a perspective view of the second embodiment of the present invention. FIG. 26 is a side view of the second embodiment of the present invention. In a second embodiment of the present invention, a lightweight adjustable material and supply support is provided which may be marketed under the name ROOFSTOCKER™, a trademark of the inventor. A U-shaped backing plate is provided with a one or more adjustable support poles. Connected to the support pole though a pivot joint is an adjustable platform which has its other end hinged to the backing plate. The support pole (or poles) may be adjusted to achieve a suitable angle of adjustment corresponding to roof incline.

The platform may be provided as a planar table, with one or more edge rails to prevent materials from falling off the platform. The platform may be sized to accommodate a standard package size of shingles or a shingle "square". Roofing materials stored on a roof may be stored on the platform in a level manner and thus reduce the likelihood that such materials will fall off. Smaller versions of the platform may be provided for holding tools and the like, and specialized version may be provided for specific applications such as holding a 5-gallon IGLOO™ water cooler.

In the particular version of this embodiment, the device is designed with light weight construction in mind. The platform may be made of tubing or may be provided with lightening holes. The use of a U-shaped base (as opposed to a flat base) further reduces weight. Overall weight of the apparatus may be reduced as much as 40%.

Nail holes are provided on the U-shapes channel to allow the device to be secured to a roof by use of hardened nails, screws, or the like. The size of the U-shaped portion corresponds to the spacing of roof trusses.

UTILITYMATE™ ROOFER'S TOOLBOX holds enough materials to complete roof repairs and most counter flashing in a one-step process, increasing worker productivity by eliminating repeated trips for more supplies. The roofer's toolbox can be placed on a pitched roof without required fastening devices such as nails or screws, to prevent it from sliding off the roof. It is lightweight and can be freely moved to any location on the roof. In the preferred embodiment it is approximately 38" in length and 12" in width. The UTILITYMATE™ ROOFER'S TOOLBOX will now be described in connection with FIGS. 27–32.

Figure 27:
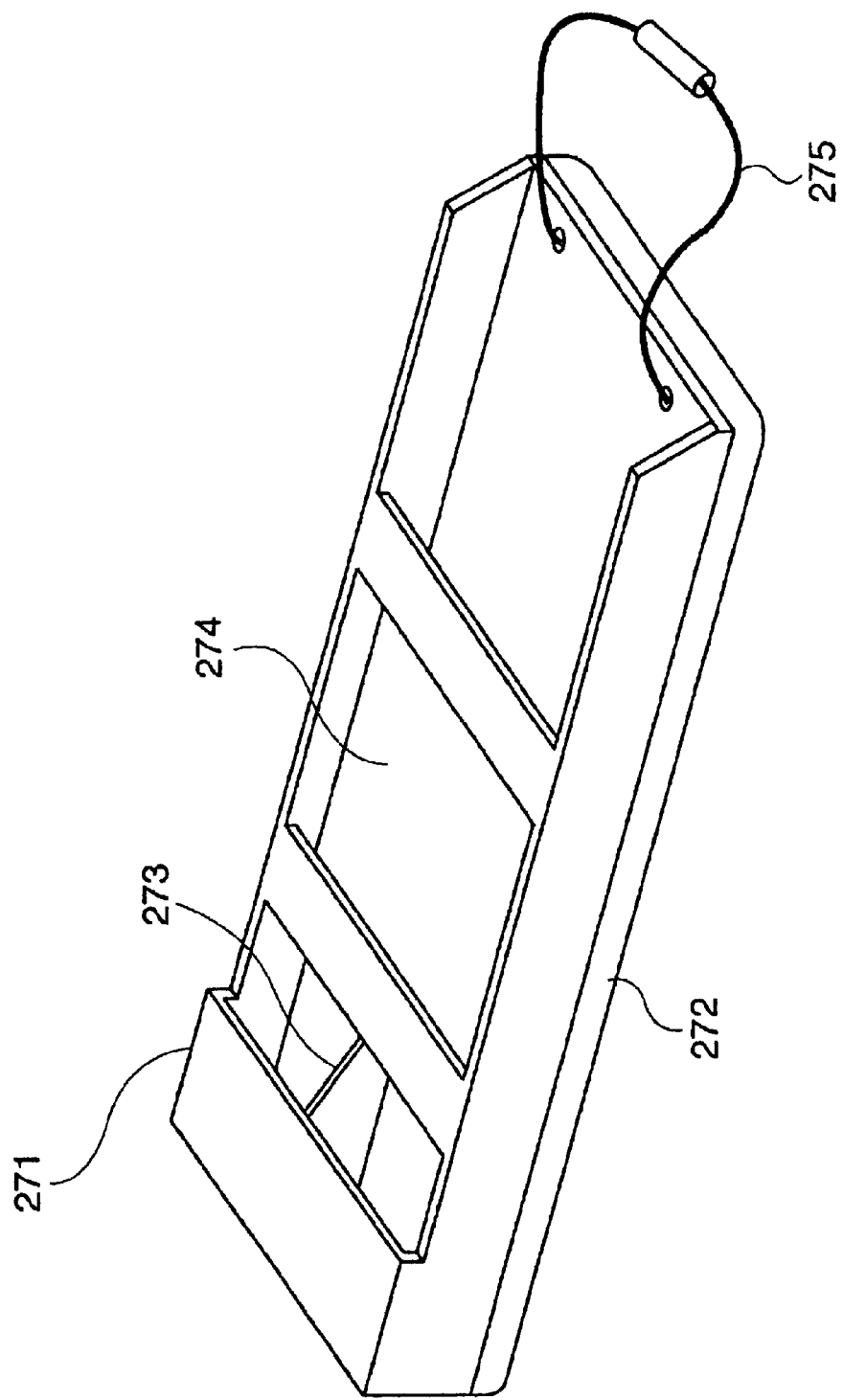
FIG. 27 is a perspective view of one embodiment of the material and supply tray of the present invention.

FIG. 27 is a perspective view of the material and supply tray of the third embodiment of the present invention. In the third embodiment of the present invention, which may be marketed under the name UTILITYMATE™, a trademark of the inventor, a tool tray 271 is provided which may be backed with a layer of foam 272 to prevent the tray from slipping off the roof, while allowing the tray to be freely moved along and up and down the roof, as work progresses.

The tool tray may comprise a flat lower portion backed with a layer of medium density expanded polyurethane foam 272, the type commonly sold for upholstery in upholstery and fabric shops, although other types of foam or elastic material may be used without departing from the spirit and scope of the present invention. A number of compartments with or without dividers 273 may be provided in the tray for holding nails, shingles, tubes of roofing compound, tools, and the like.

Lower compartments may be divided by divider 273 for holding nails, small tools, and the like. The middle compartment may be lined with another layer of foam 274 in order to secure tubes of roofing mastic, cement, caulk, or the like. Such tubes are constantly tending to roll off a pitched roof, and the use of the foam secures such tubes in the center compartment regardless of whether one tube or a multiple number of tubes are present. A nylon rope and handle 275 may be provided to allow the tray to be carried up a ladder and also slid across the roof surface.

Figure 28:
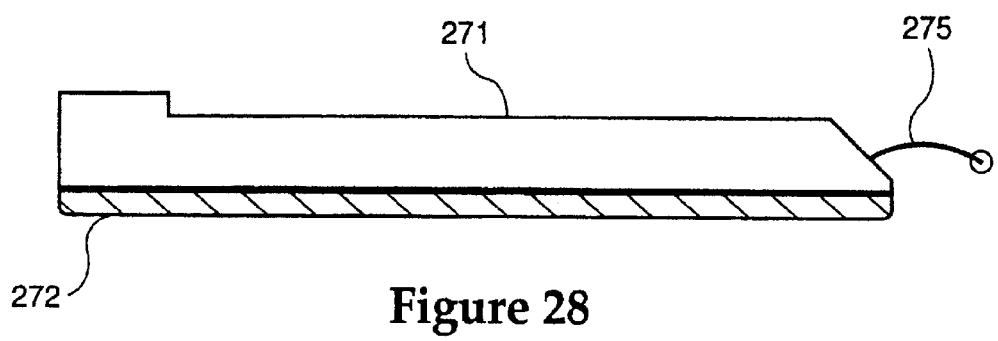
FIG. 28 is a side view of the material and supply tray of FIG. 27.

FIG. 28 is a side view of the material and supply tray of the third embodiment of the present invention. This side view better illustrates foam layer 272.

Figure 29:
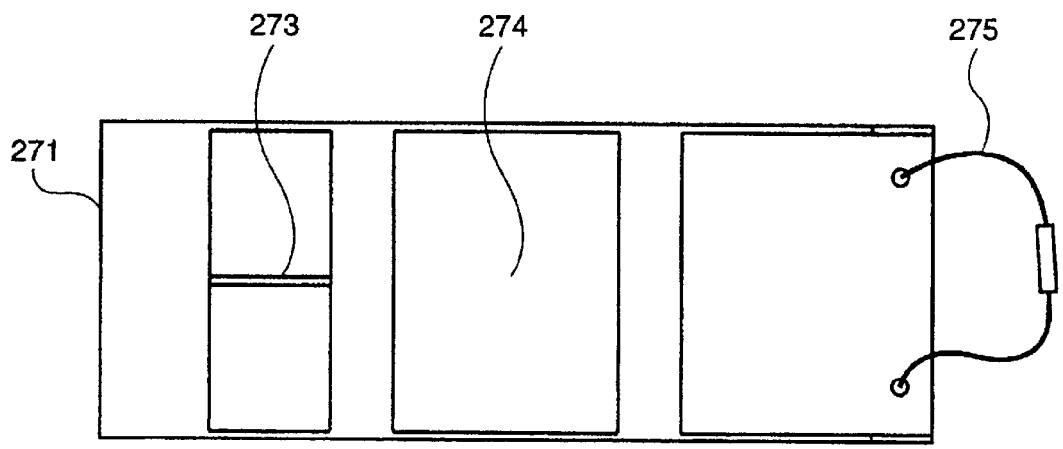
FIG. 29 is a top view of the material and supply tray of the FIG. 27.
Figure 30:
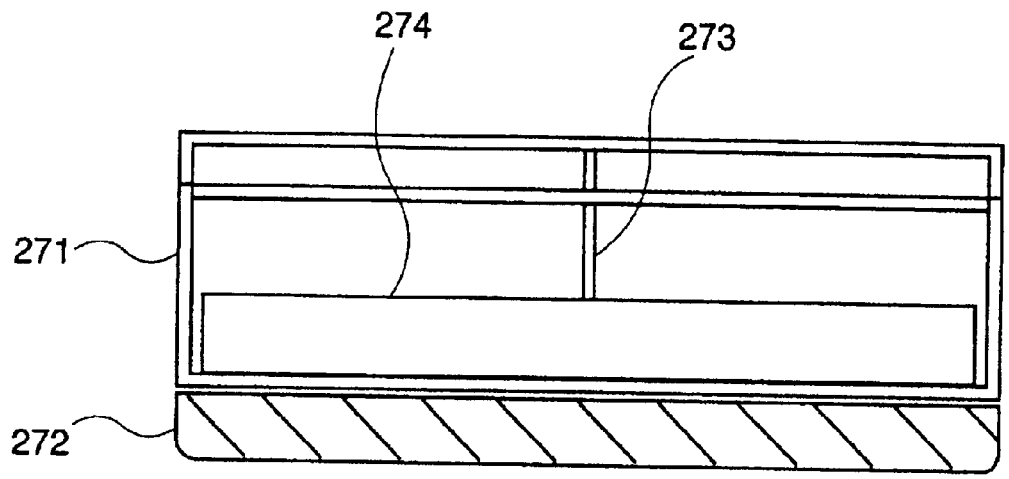
FIG. 30 is an end view of one end of the material and supply tray of FIG. 27.
Figure 31:
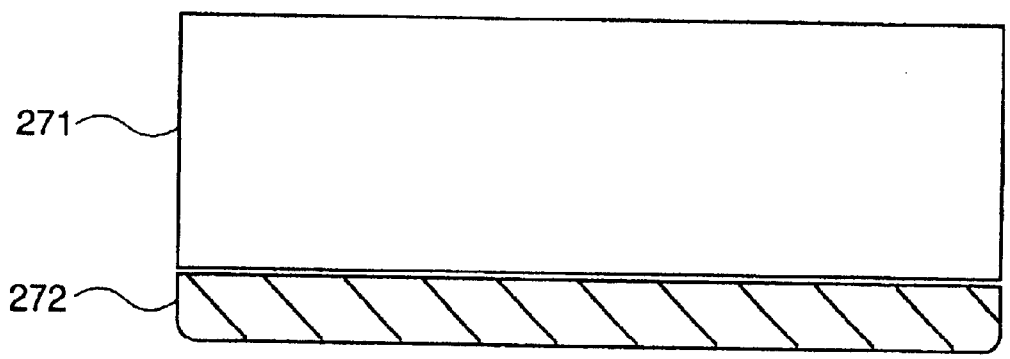
FIG. 31 is an end view of another end of the material and supply tray of FIG. 27.

FIG. 29 is a top view of the material and supply tray of the third embodiment of the present invention. FIG. 30 is an end view of one end of the material and supply tray of the third embodiment of the present invention. This view better illustrates the arrangement of the compartments and the interior foam layer 274. FIG. 31 is an end view of another end of the material and supply tray of the third embodiment of the present invention.

Figure 32:
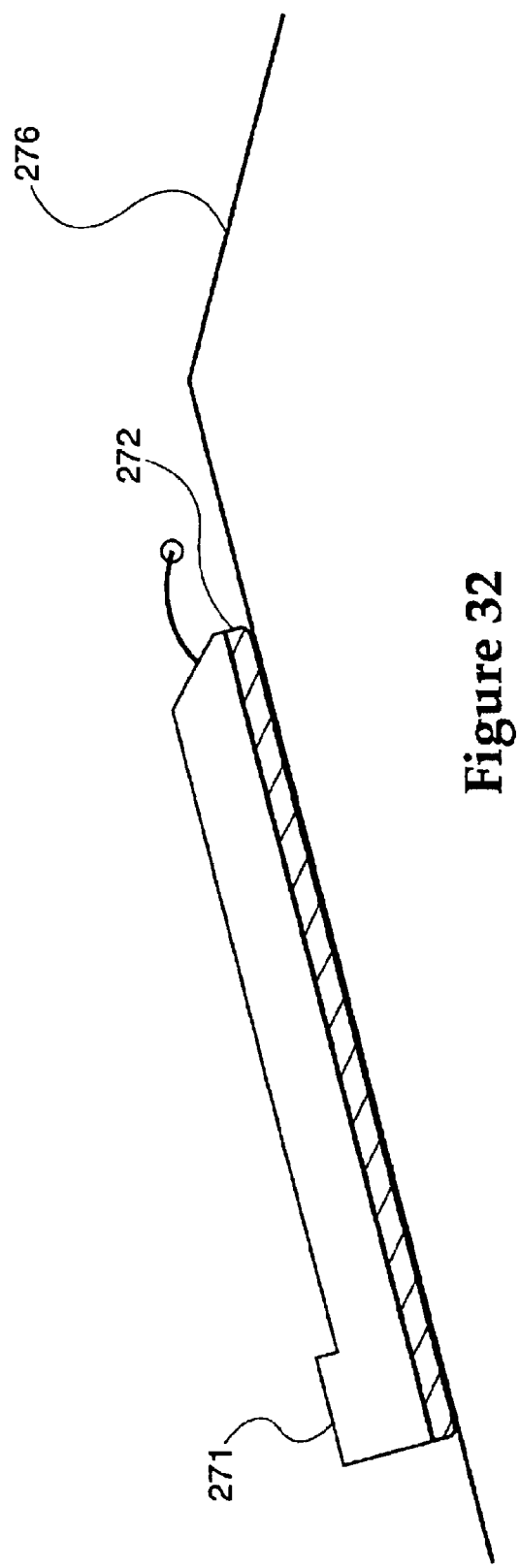
FIG. 32 is a side view of the material and supply tray of FIG. 27, illustrating the invention in place on a roof.

FIG. 32 is a side view of the material and supply tray of the third embodiment of the present invention, illustrating the invention in place on a roof. When placed on a roof 276 of reasonable pitch, the foam layer 272 matches the contours of the rough roofing surface, providing increased surface area in which to grip the roof. As a result, tray 271 will not tend to slip or slide off of roof 276 as would a tray with a smooth lower surface (e.g., metal or wood tool tray).

The material and supply tray of FIGS. 27–32 may be suitably modified for working with slate. A specialized version may be provided for slate work and marketed under the name SLATEMATE™, a trademark of the present inventor. Working with slate presents special problems for a roofer. Specialized slate nails must be used and slates need to be carefully stored and moved, lest they crack. Also, specialized slate tools may be required for slate work. Slate work is time consuming and thus expensive. Any time saved on a slate job can significantly reduce the costs of using slate as a roofing material.

The SLATEMATE™ may be sized slightly larger than the version in FIGS. 27–32. The unit may be made, for example, 28 inches wide and 30 inches tall to accommodate slate "shingles" as well as slate nails. The unit may be lined with foam to secure the slates as well as to help prevent them from cracking.

An even longer version of the SLATEMATE™ may be provided with an external holder for a slate tool, which is used for removing slate nails. Such an apparatus may allow a roofer to move about a slate roof, repairing broken slates, without having to make multiple trips to a toolbox and without having to reach down to a Prior Art toolbox on a scaffolding or the like. The SLATEMATE™ can be placed right on the roof, adjacent or next to the place being repaired or installed. Little reaching is thus required, improving the worksite ergonomics considerably.

SHINGLE SLED™ is an aluminum sled which may be provided with wheels. SHINGLE SLED™ may hold an entire bundle of shingles in place during installation. Optional wheels allow the unit to be moved with ease as work progresses, saving time and money. IN the preferred embodiment, SHINGLE SLED™ is approximately 41 inches in length and 13 inches wide. SHINGLE SLED™ will now be described in more detail in connection with FIGS. 33–39.

Figure 33:
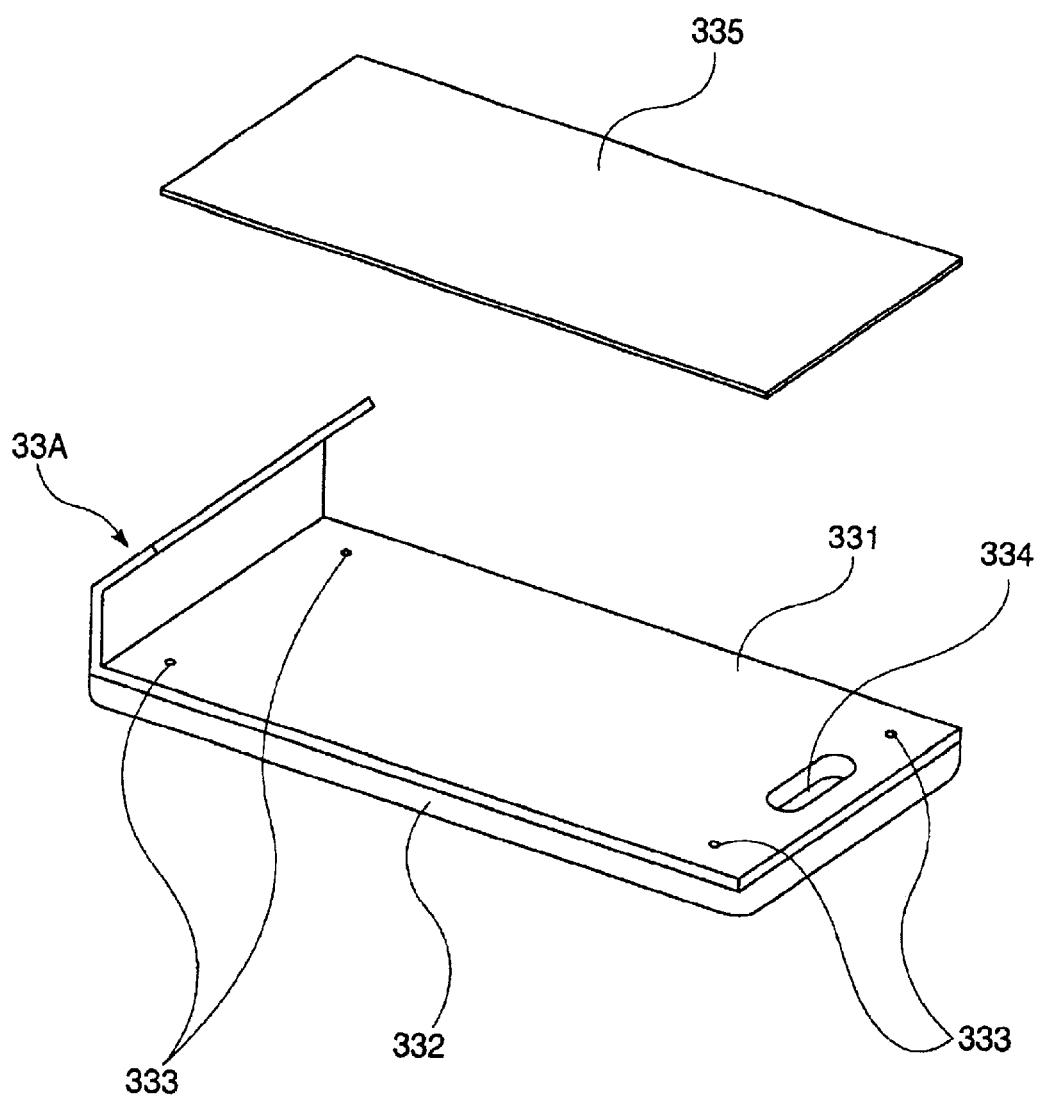
FIG. 33 is a perspective view of a material holding apparatus of the present invention.

FIG. 33 is a perspective view of a material holding apparatus of the present invention. In this embodiment of the present invention, which may also be marketed under the name UTILITYMATE™, a trademark of the inventor, a tool tray 1 is provided which may be backed with a layer of foam 332 to prevent the tray from slipping off the roof, while allowing the tray to be freely moved along and up and down the roof, as work progresses. The tool tray may comprise a flat lower portion 331 backed with a layer of medium density expanded polyurethane foam 332, the type commonly sold for upholstery in upholstery and fabric shops. Other types of elastic foam may be used within the spirit and scope of the present invention.

A handle hole 334 may be provided to allow the tray to be moved readily from one place to another. A lip 33A may be formed to prevent materials (e.g., shingle 335) from falling off tray 331. Hole 333 may be provided for nailing or to secure foam 332 to tray 331. Note that foam 332 may be attached to tray 331 via a velcro backing or the like to facilitate replacement of foam 332 in the event foam 332 becomes worn from use on a roof.

Figure 34:
FIG. 34 is a side view of a portion of material holding apparatus of the present invention.
Figure 35:
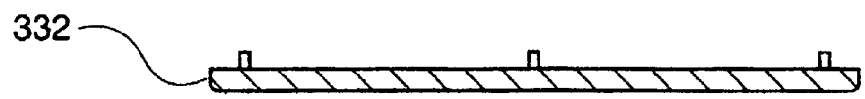
FIG. 35 is a side view of a portion of a material holding apparatus of the present invention.
Figure 36:
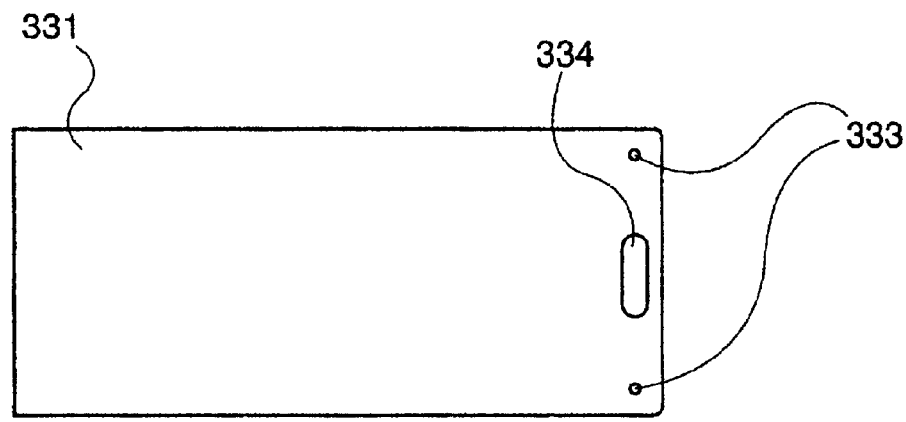
FIG. 36 is a top view of a material holding apparatus of the present invention.
Figure 37:
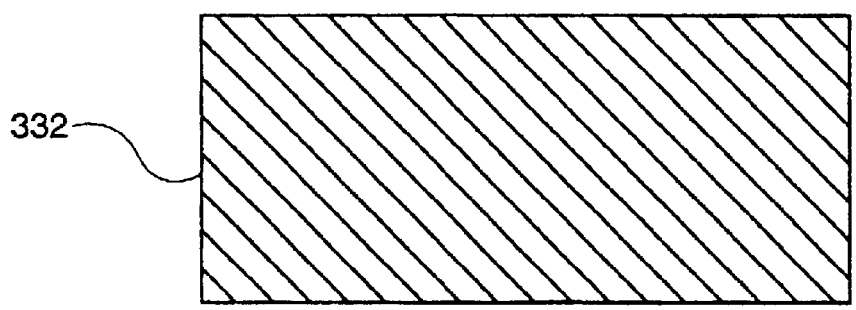
FIG. 37 is a bottom view of a material holding apparatus of the present invention.

FIG. 34 is a side view of a portion of material holding apparatus of the present invention showing tray 331. FIG. 35 is a side view of a portion of a material holding apparatus of the present invention showing foam layer 332. FIG. 36 is a top view of a material holding apparatus of the present invention. FIG. 37 is a bottom view of a material holding apparatus of the present invention.

Figure 38:
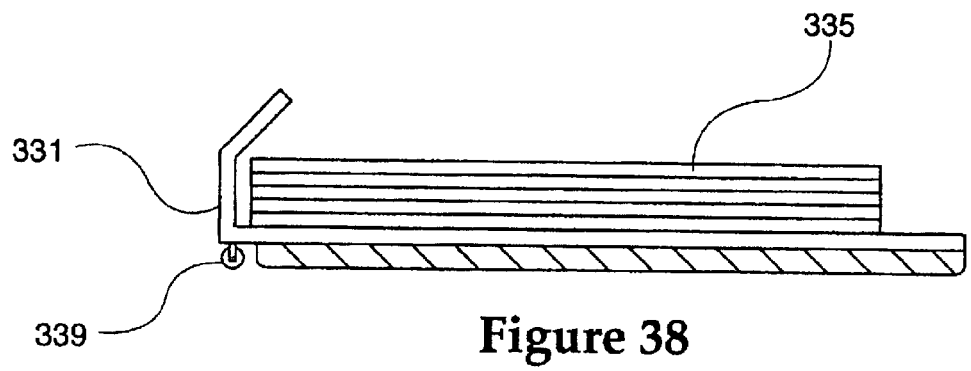
FIG. 38 is a side view of a material holding apparatus of the present invention showing materials loaded on the device.
Figure 39:
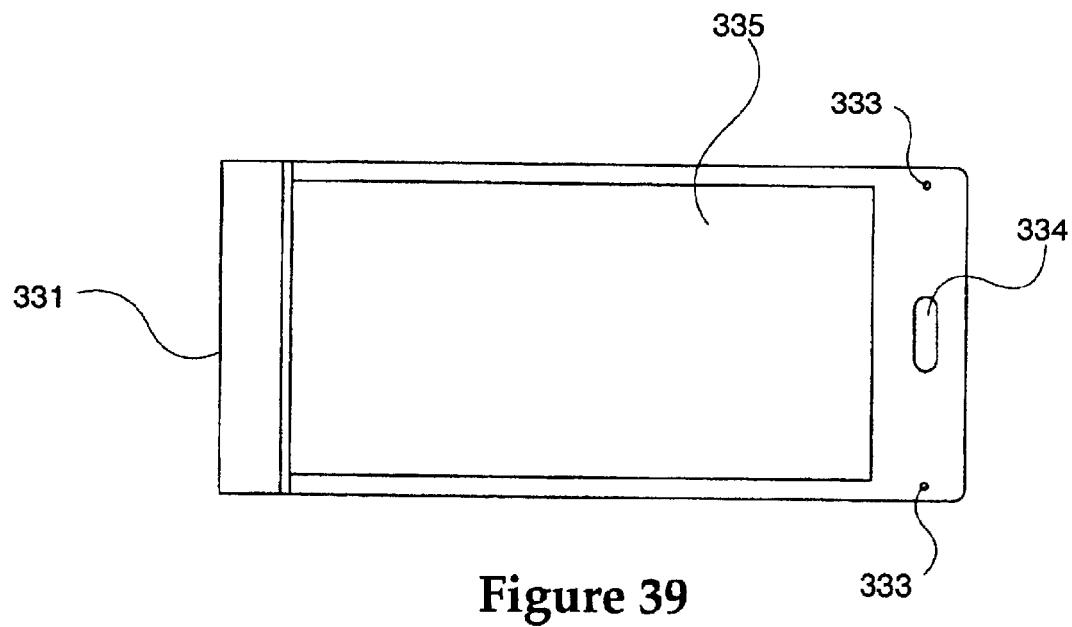
FIG. 39 is a top view of a material holding apparatus of the present invention showing materials loaded on the device.

FIG. 38 is a side view of a material holding apparatus of the present invention showing shingles 335 loaded on the device. FIG. 38 also illustrates how optional wheels or rollers 339 may be mounted to the underside of the device at one end to allow the opposite end to be lifted and the entire assembly rolled across a roof surface. Wheels or rollers 339 may be substituted by a half-round ¾" PVC skid pipe, bolted to the sled at one or both ends. This PVC round pipe half allows the sled to be slid along a roof surface by lifting one end, so as to reduce wear on the foam padding (shown in dashed lines). FIG. 39 is a top view of a material holding apparatus of the present invention showing materials loaded on the device.

SHINGLESTOCKER™ provides a means for securing bundles of shingles on a roof in a manner which prevents them from blowing or falling off. A bundle of shingles may be placed inside the C-channel shape of SHINGLE-STOCKER™ and additional shingle bundles stacked on top of the device, preferably at the peak of a roof, where two of such devices are provided, on one each side of the peak. The SHINGLESTOCKER™ will now be described in connection with FIGS. 40–43.

Figure 40:
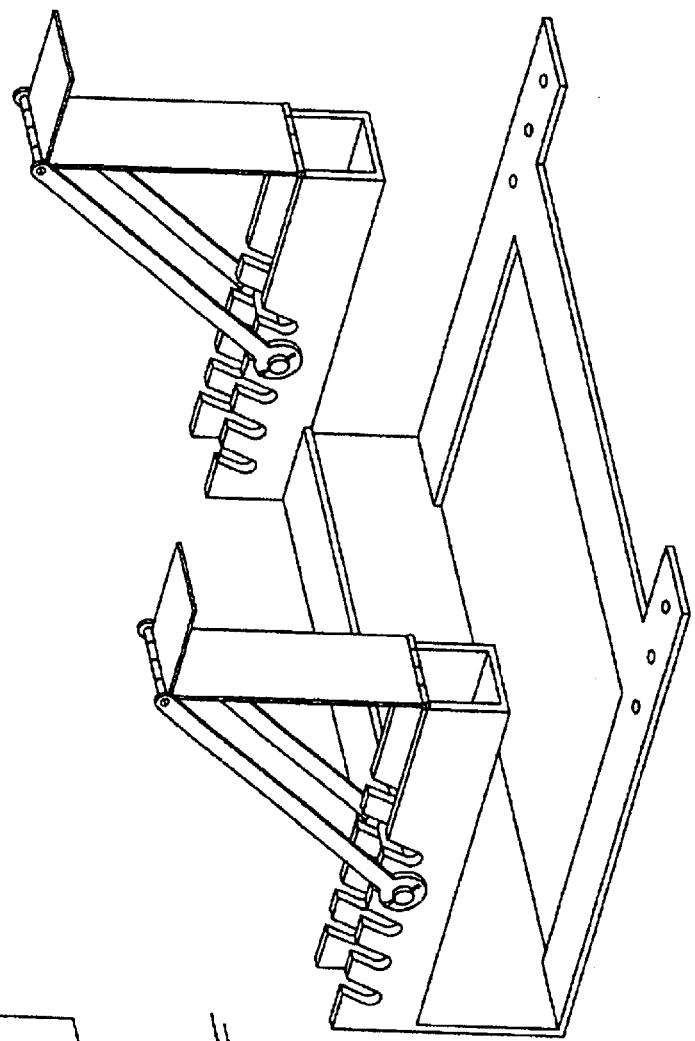
FIG. 40 is a perspective view of the SHINGLE-STOCKER™ of the present invention.
Figure 41:
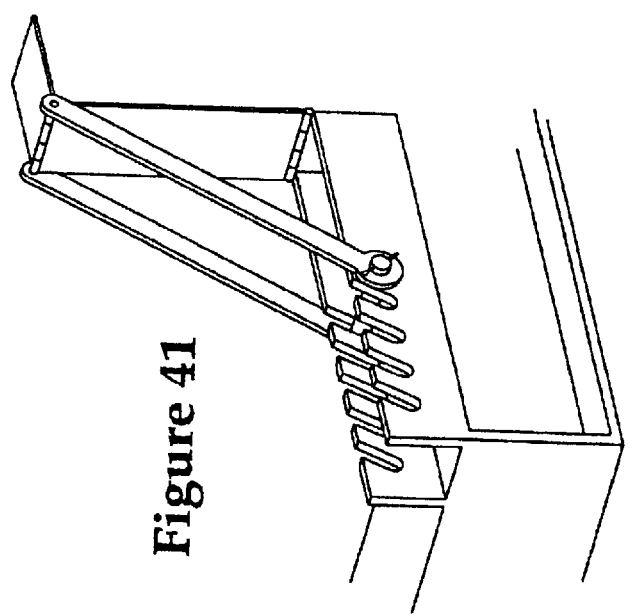
FIG. 41 is another perspective view of the SHINGLE-STOCKER™ of the present invention from the opposite side of FIG. 40.

FIG. 40 is a perspective view of the SHINGLE-STOCKER™ of the present invention. FIG. 41 is another perspective view of a portion of the SHINGLESTOCKER™ of the present invention from the reverse side of FIG. 40. Shingles in the Prior art may be stocked to a roof structure by placing shingle packages on either side of a roof peak, securing the packages with nails or a 2"×4" nailed to the roof structure, and then stacking the shingle packages atop the two packages into a square or rectangular pile. In more than one instance, the weight of the shingles causes the lower packages to come unnailed or even pull up the 2"×4"s and the whole pile falls to the ground.

Figure 42:
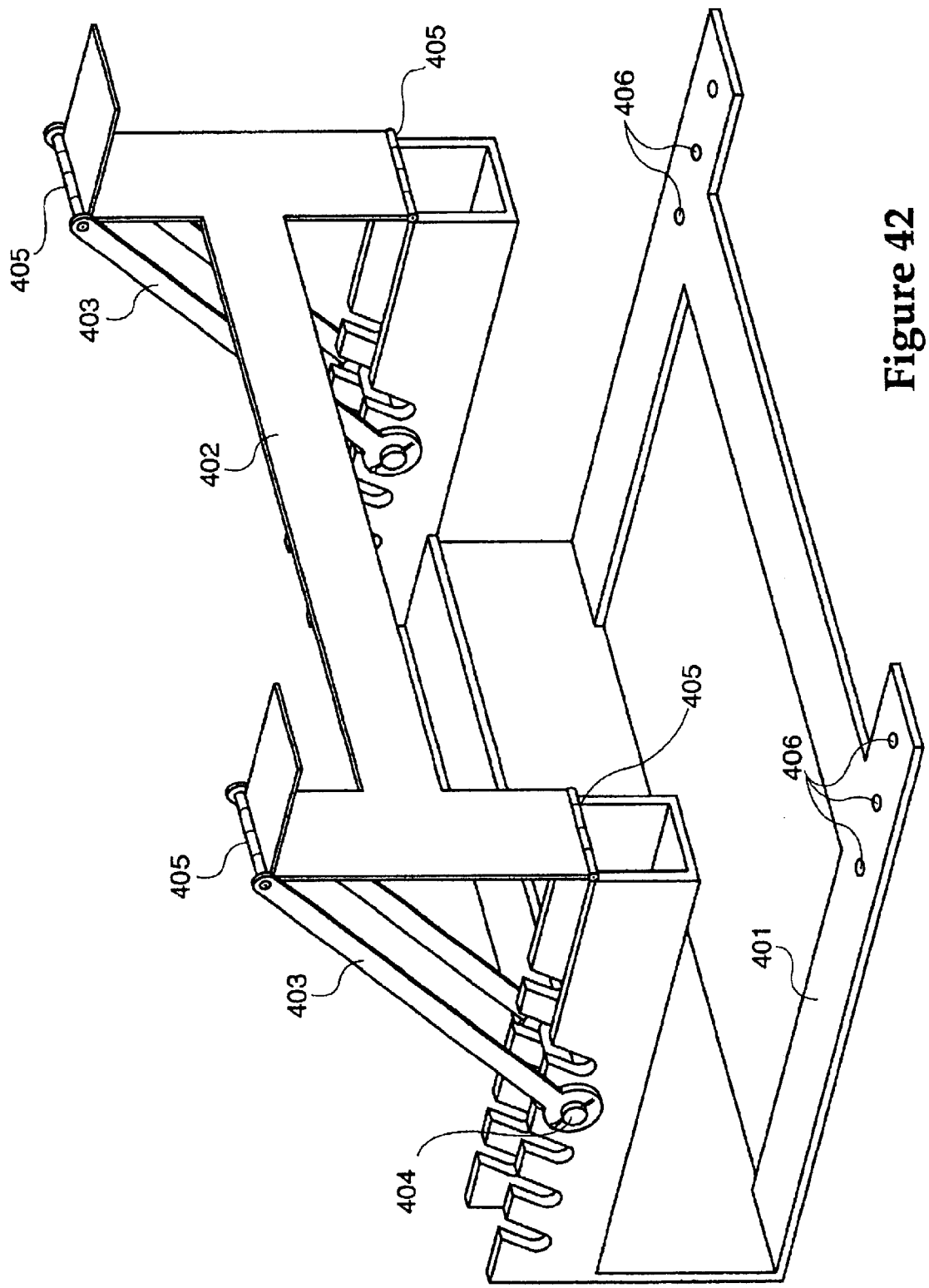
FIG. 42 is another perspective view of the SHINGLE-STOCKER™ of the present invention.
Figure 43:
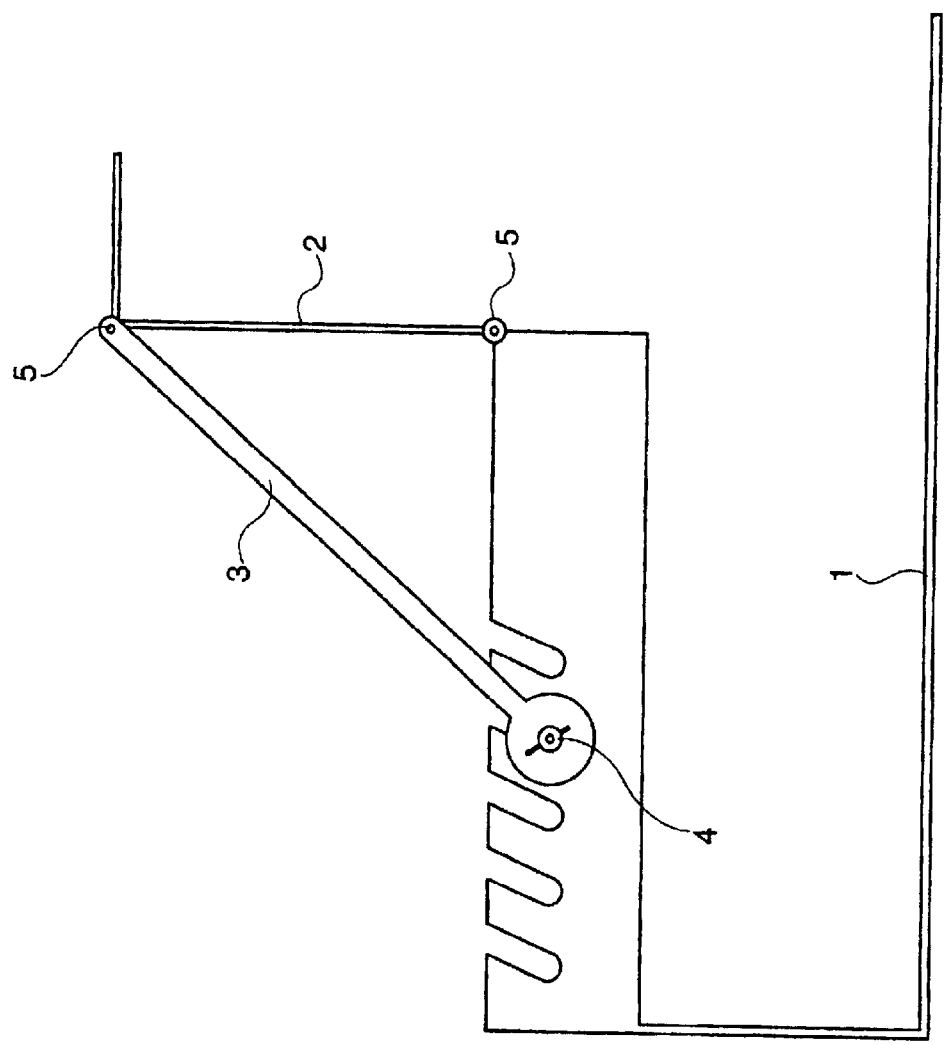
FIG. 43 is a side view of the SHINGLESTOCKER™ of the present invention.

In the embodiment of FIGS. 40–43, a bracket is provided to secure these lower stacks to the roof structure. FIG. 42 is a prospective view of the SHINGLESTOCKER™ of the present invention. Nail holes 406 may be provided 24" or 16" on center (or other roof joist width). A pair of these brackets may be secured to either side of the roof peak and a package of shingles placed therein. Support 402 may be adjusted for roof pitch via arms 403 in notches 404 pivoted by hinges 405. Once in place on either side of the roof peak, the brackets provide a flat and stable platform for additional packages of shingles. FIG. 43 is a side view of the SHINGLESTOCKER™ of the present invention.

ROOFER'S BRACKET™ is a one-piece bracket designed to secure roofing materials and scaffolding boards to any pitched roof. ROOFER'S BRACKET™ can be nailed to all roof truss systems, including 16 inch on center, 18 inch on center, and 2 foot on center. This bracket is very versatile and can be used to safely secure roofing materials to the peak of a roof, or two together can serve as a scaffolding system for installing a roof. This product insures a safe environment for employees and customers at low cost. The ROOFER'S BRACKET™ is the safest product of its kind in the roofing industry as it is designed to be nailed to two trusses versus the standard one truss system. In the preferred embodiment it is 34 inches in length and 10.5 inches in width. The ROOFER'S BRACKET™ will now be described in connection with FIGS. 44–47.

Figure 44:
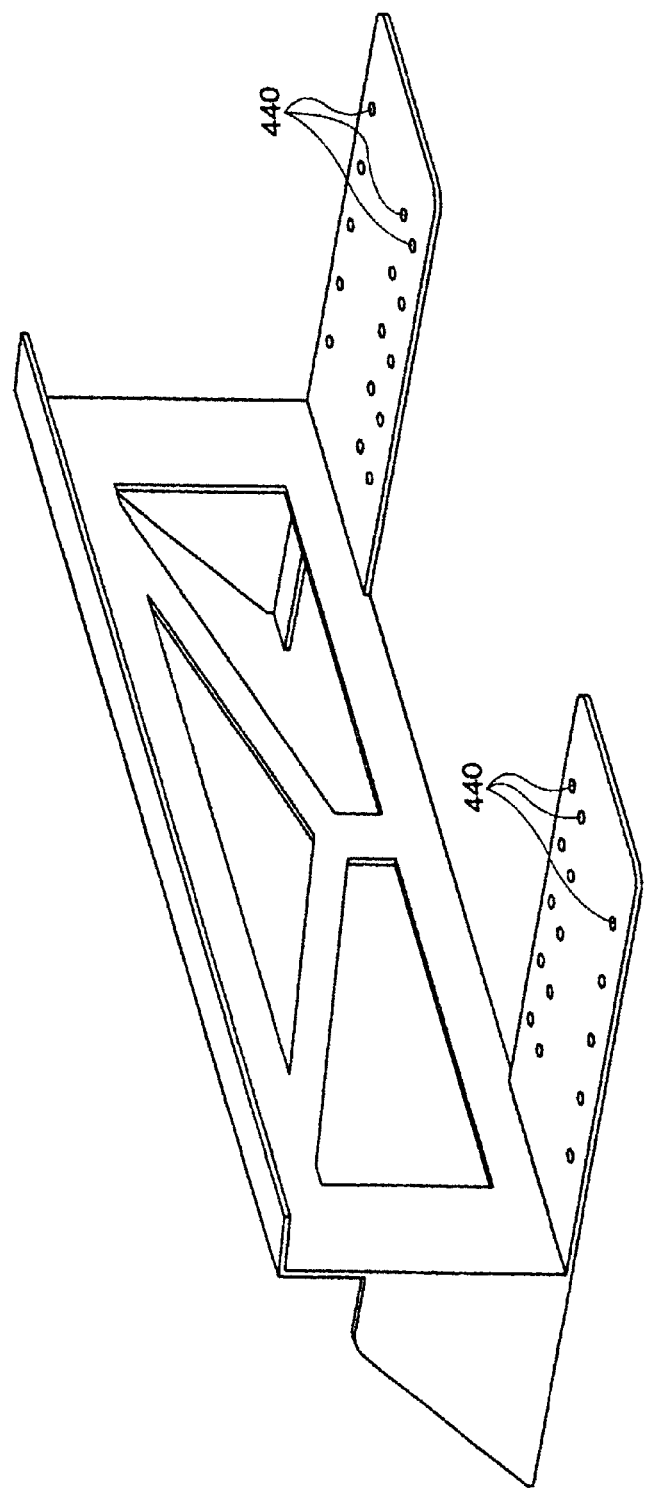
FIG. 44 is a perspective view of the ROOFER'S BRACKET™ Of the present invention.
Figure 45:
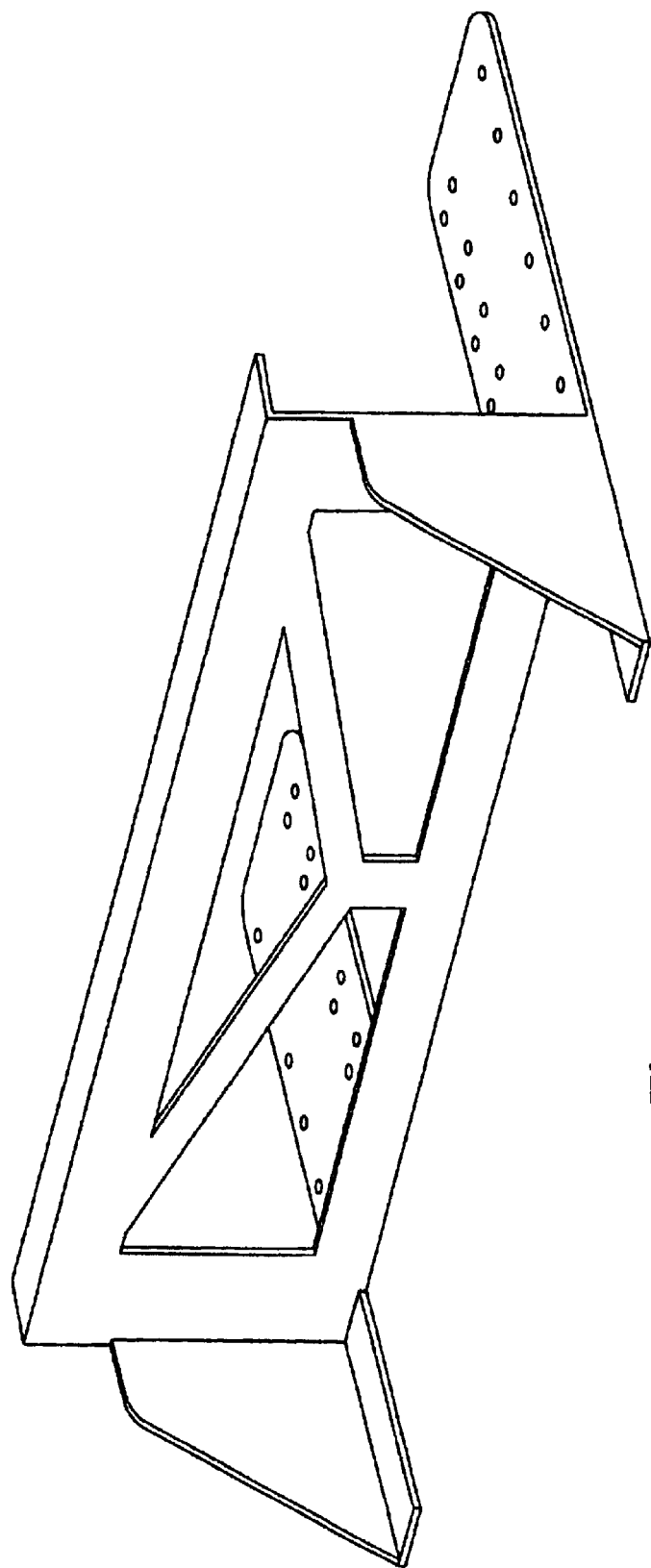
FIG. 45 is another perspective view of the ROOFER'S BRACKET™ of the present invention.
Figure 46:
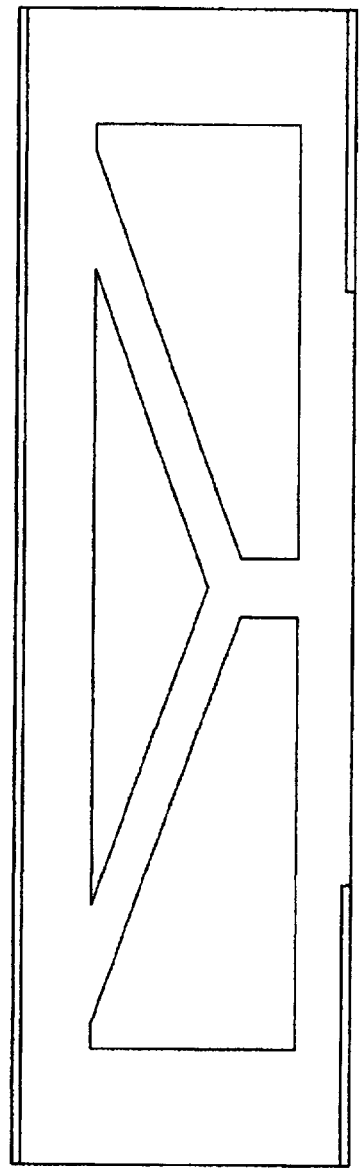
FIG. 46 is a front view of the ROOFER'S BRACKET™ of the present invention.
Figure 47:
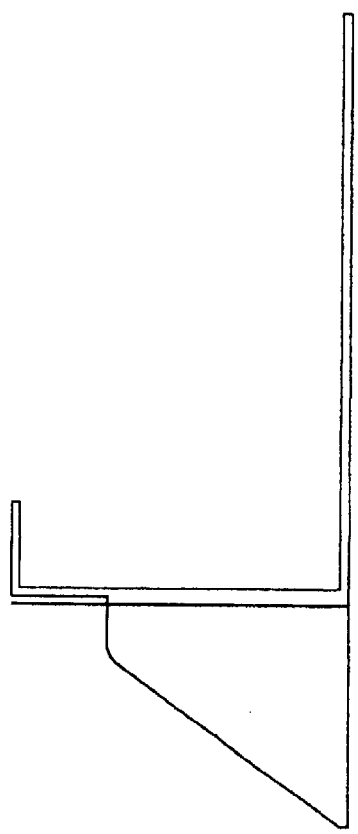
FIG. 47 is a side view of the ROOFER'S BRACKET™ of the present invention.

FIG. 44 is a perspective view of the ROOFER'S BRACKET™ of the present invention. FIG. 45 is another perspective view of the ROOFER'S BRACKET™ of the present invention. FIG. 46 is a front view of the ROOFER'S BRACKET™ of the present invention. FIG. 47 is a side view of the ROOFER'S BRACKET™ of the present invention.

The ROOFER'S BRACKET™ apparatus may be used in a similar manner to the apparatus of FIGS. 40–43. Multiple nail holes 440 may be provided at different roof joist spacings (e.g., 16, 18, 20 inches) so that the devices can be readily secured to roof trusses with a few nails or screws. The apparatus may be re-sized for cedar or other type shingles, as well as traditional asphalt (fiberglass) shingles, and moreover is not provided with an adjustable hinging mechanism. Once one bracket is placed on either side of a roof peak, a package or bundle of shingles may be placed in the bracket. Additional bundles of shingles may be stacked in a square or rectangle atop these shingles.

LADDER BRACKET™ is a one piece bracket designed to secure extension ladders to any pitched roof. LADDER BRACKET™ eliminates the need to set up scaffolding when doing roof repairs or working on steep pitched roofs. LADDER BRACKET™ can be moved quickly to new work areas and is safer to use than nailed wood. It holds the ladder securely so it can't jump out of or bounce off its footing. In the preferred embodiment, LADDER BRACKET™ is 34 inches in length and 6.5 inches wide. LADDER BRACKET™ will be described in more detail in connection with FIG. 48.

Figure 48:
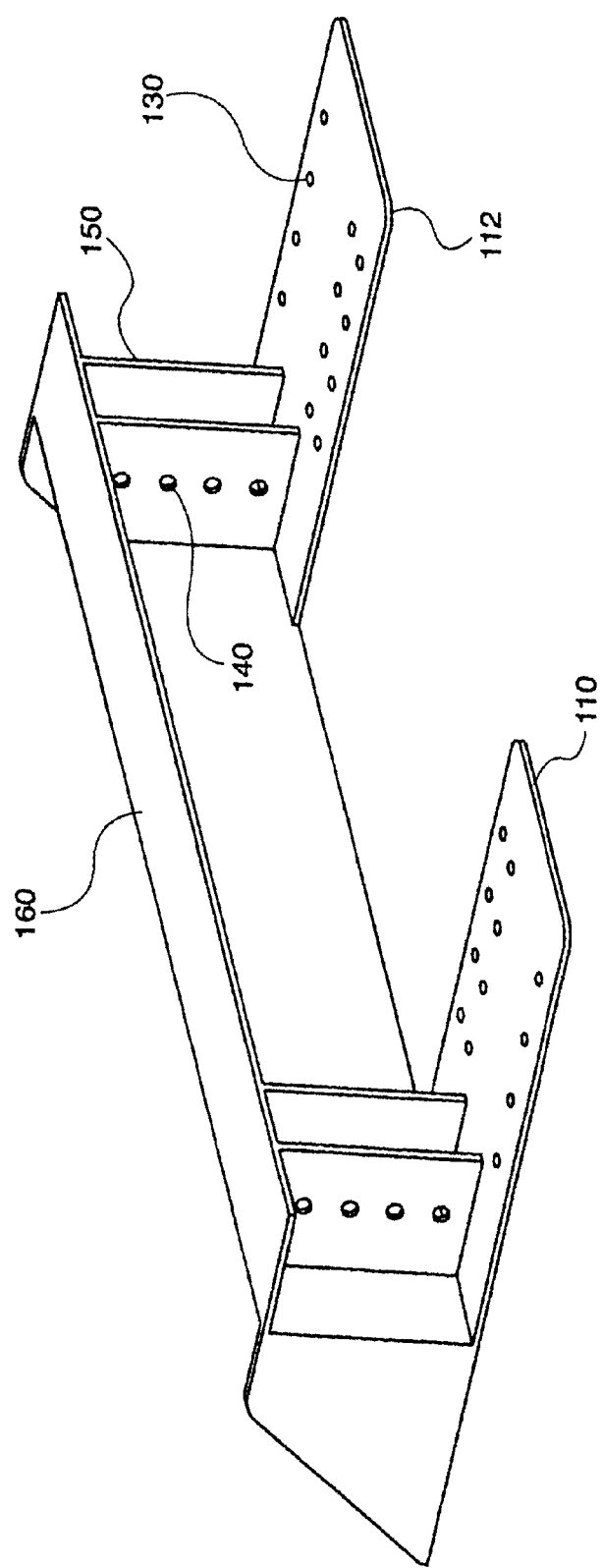
FIG. 48 is a perspective view of a roof ladder holder of the present invention.

FIG. 48 is a perspective view of a roof ladder holder of the present invention. In this embodiment, a bracket for holding a ladder on a sloped roof is provided. Ladder legs may be locked into the bracket using pins, bolts, or the like, such that the ladder will not fall off the sloped roof. This invention has particular application when a roofer needs to climb an existing roof to the peak when no safety rope, guide wire, scaffolding, or ladder is in place. The bracket may be nailed to the roof, a ladder slid up the roof and the bottom of the ladder secured to the ladder bracket.

Ladder bracket may comprise nailing plates 110 and 112 provided with nailing holes 130. A cross-beam 160 may connect nailing plates 110 and 130, which may be suitably spaced at an interval corresponding to roof truss spacings (e.g., 18", 24" or the like). Plates 150 may be provided on each nailing plate 110, 112, and attached to cross-beam 160. Plates 150 may be in pairs on each of nailing plate 110, 112, respectively, and each pair may be spaced apart by an amount slightly larger than a standard aluminum ladder size. Holes 140 may be provided to allow bolts or pins to be used to secure a ladder leg between plates 150.

The apparatus of FIG. 48 may also be used to support materials or the like by combining two units together and providing a 2"×6" board or the like between the two units. Nail holes (not shown) may be provided in the bracket to hold the 2"×6" to the apparatus of FIG. 6. The 2"×6" may be placed in the side portion of the apparatus, adjacent the ladder pocket, so that the unit may be use to support a ladder and also double as a material support.

The SUREFOOT™ series of products are designed to secure ladders to roofs, ground, walls, and the like, to prevent the numerous ladder injuries which occur every year. SUREFOOT™ products are a series of safety devices designed to secure all types of ladders used in all types of situations. These products are easily attached to ladders without the need of installing nuts and bolts or drilling into the ladders, and potentially weakening them. They can be quickly transferred from one ladder to another. SUREFOOTS™ equipment ensures stability, thereby preventing accidents, which can result in liability claims for the business owner. The SUREFOOTS™ products will now be described in connection with FIGS. 49–69.

Figure 49:
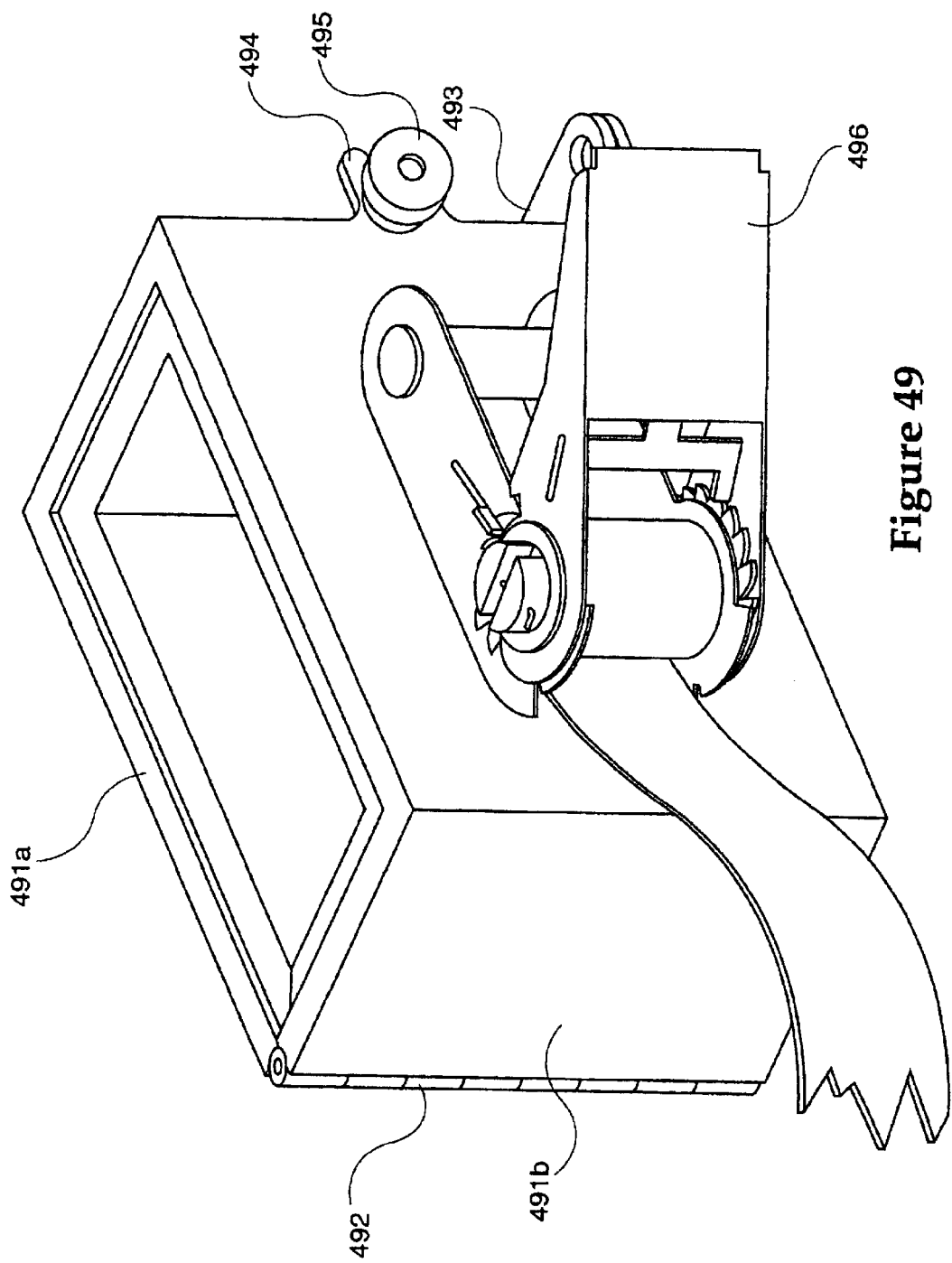
FIG. 49 is a perspective view of one version of the SUREFOOT™ embodiment of the present invention with a ratchet strap attached.

FIG. 49 is a perspective view of one version of the SUREFOOT™ embodiment of the present invention with a ratchet strap attached. The Sure-Foot in this embodiment may include a box clamp device encompassing parts 491*a* and 491*b* which may be wrapped around a ladder leg. The box clamp device 491*a*, 491*b* may be lined with foam rubber to securely grip various ladder leg sizes without damaging or marring the ladder leg.

A threaded shaft may be provided with knurled knob 495 to lock portion 491*a* to 491*b* around a ladder leg. Knurled knob 495 may be secured to the device via a small chain to prevent it being dropped or lost. Lock hasp 493 may be provided to securely lock the device to a ladder to prevent theft or to prevent an unauthorized worker from removing the device before work is complete.

Figure 50:
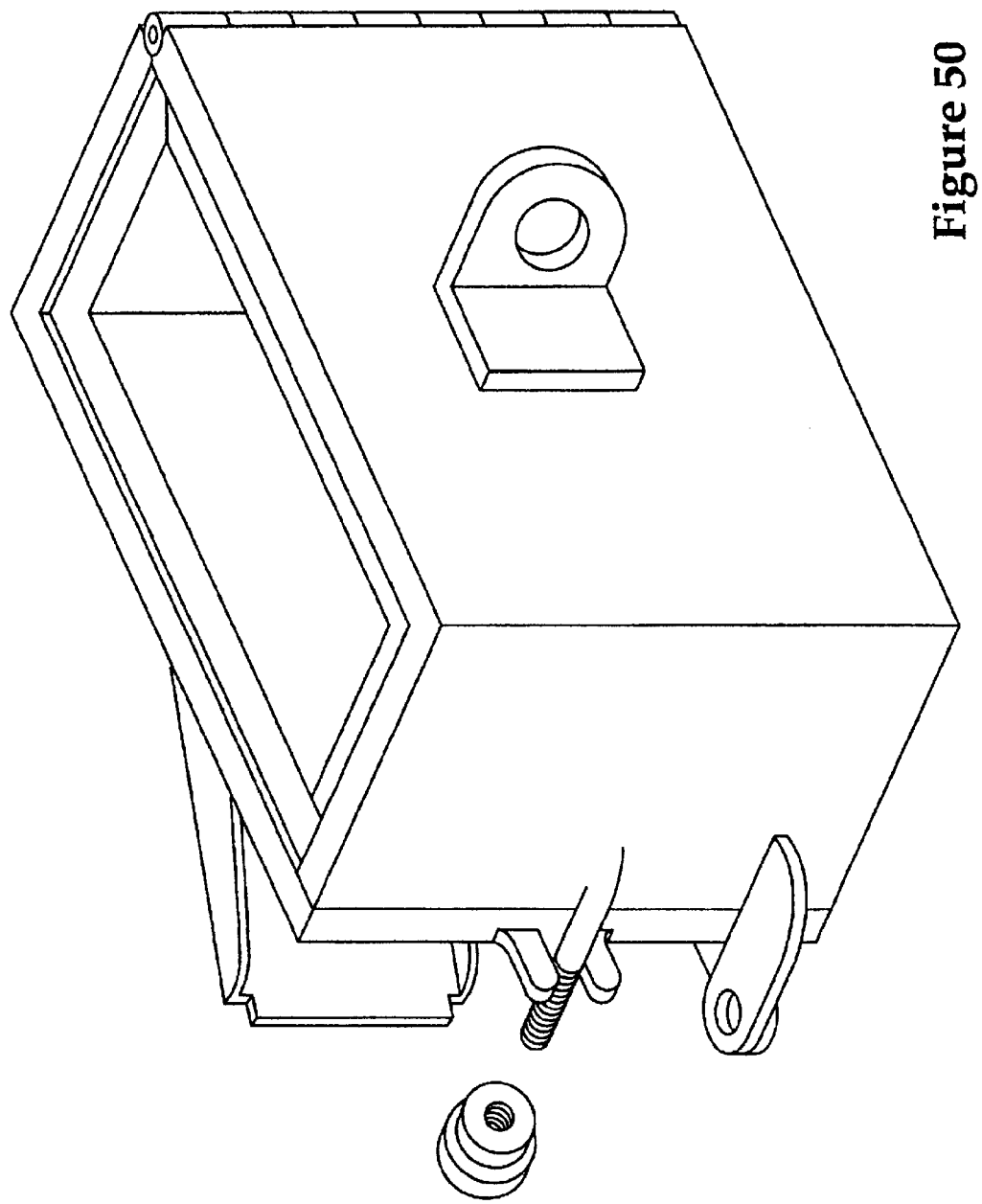
FIG. 50 is a perspective view of one version of the SUREFOOT™ embodiment of the present invention with a ratchet strap attached, showing the reverse side.
Figure 51:
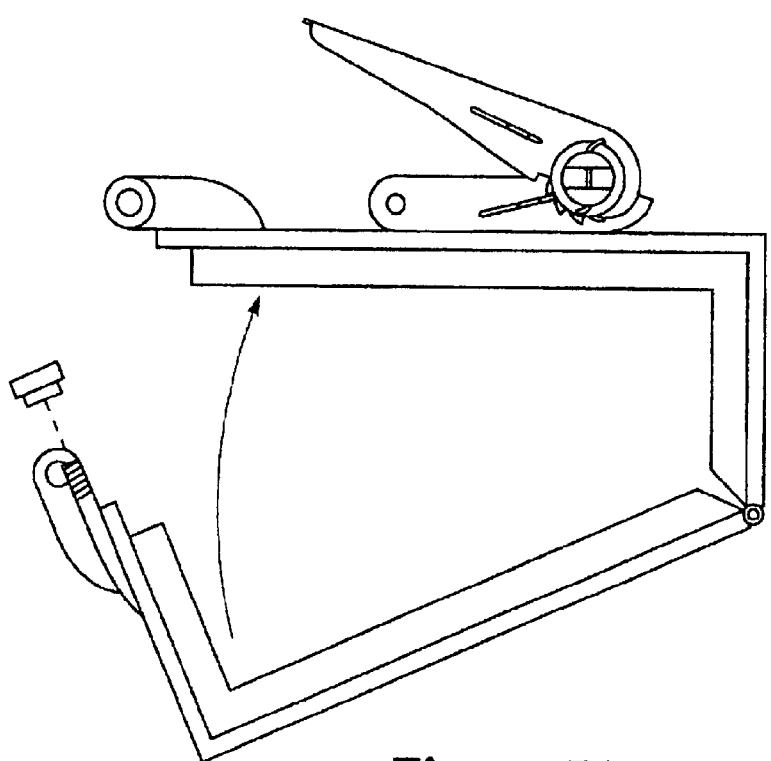
FIG. 51 is a top view of one version of the SUREFOOT™ embodiment of the present invention with a ratchet strap attached, shown open.

FIG. 50 is a perspective view of one version of the SUREFOOT™ embodiment of the present invention with a ratchet strap attached, showing the reverse side. FIG. 51 is a top view of one version of the SUREFOOT™ embodiment of the present invention with a ratchet strap attached, shown open. The ratchet strap mechanism is known in the art. The ratchet strap may be wound around a beam, telephone pole, girder, or attached to a nailing plate or the like. The ratchet strap mechanism may then be drawn tight to secure the ladder. The use of multiple devices on a ladder may secure it (e.g., one on each leg at the top of the ladder and/or at the bottom of the ladder).

Figure 52:
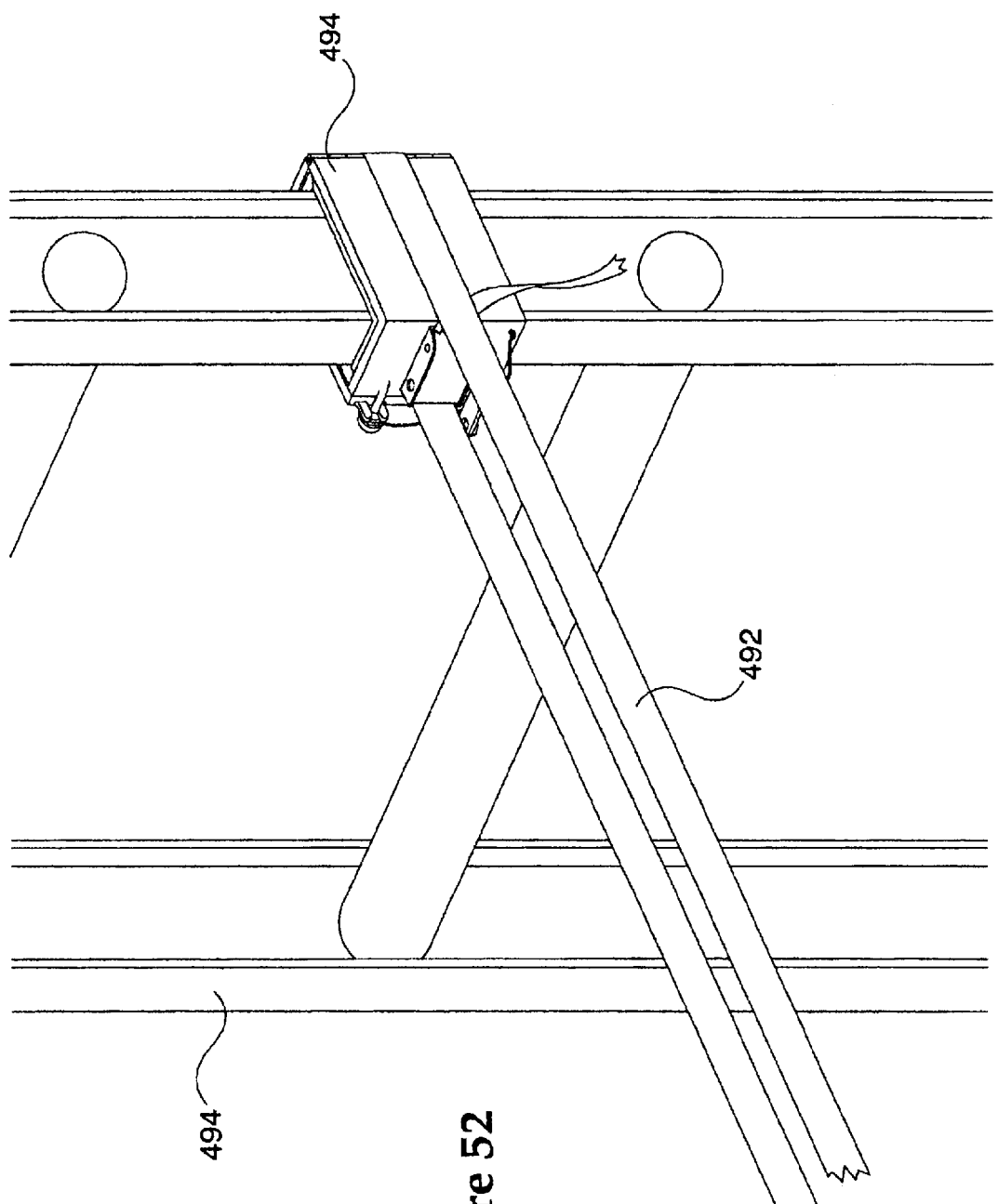
FIG. 52 is a perspective view of one version of the SUREFOOT™ embodiment of the present invention with a draw-tight strap attached shown attached to a ladder.

FIG. 52 is a perspective view of one version of the SUREFOOT™ embodiment of the present invention with a draw-tight strap attached shown attached to a ladder. A draw-tight strap 492, also known in the art, may be used to more readily secure the ladder 494 than the ratchet strap.

Figure 53:
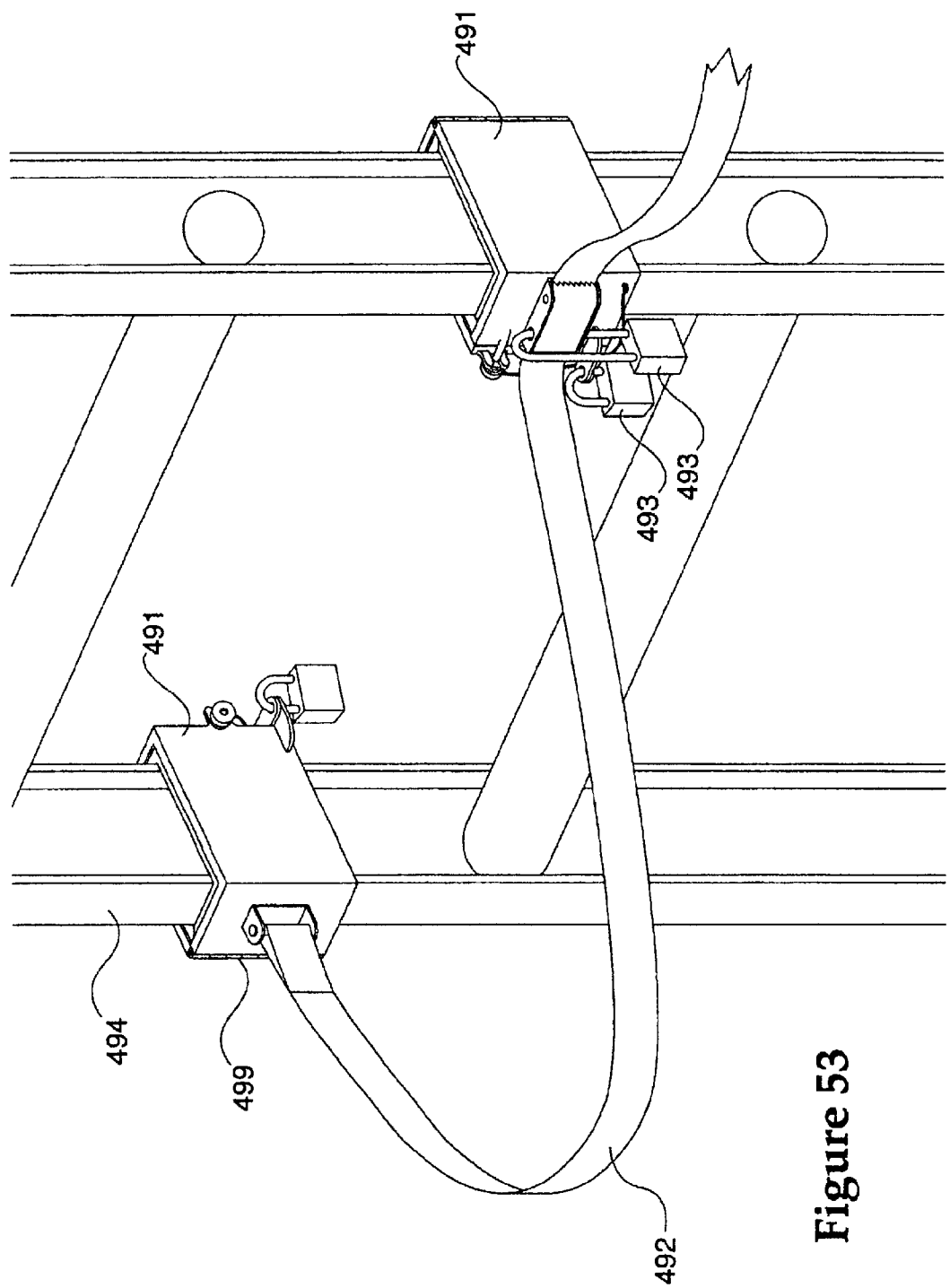
FIG. 53 is a perspective view of one version of the SUREFOOT™ embodiment of the present invention with two units attached to a ladder and coupled to each other through a draw-tight strap attached to each unit.

FIG. 53 is a perspective view of one version of the SUREFOOT™ embodiment 491 of the present invention with two units attached to a ladder and coupled to each other through a draw-tight strap attached to each unit. In this embodiment, for example, the ladder 494 may be readily and securely attached to a telephone pole or the like. Note the use of locks 493 to prevent the strap from being released. The draw-tight strap may be modified from the prior art by providing a drilled hole in the buckle to allow insertion of lock 493. In the embodiment of FIG. 53, a second clamp 491 is provided with a securing pin and bracket 499 to retain one end of strap 492.

Figure 54:
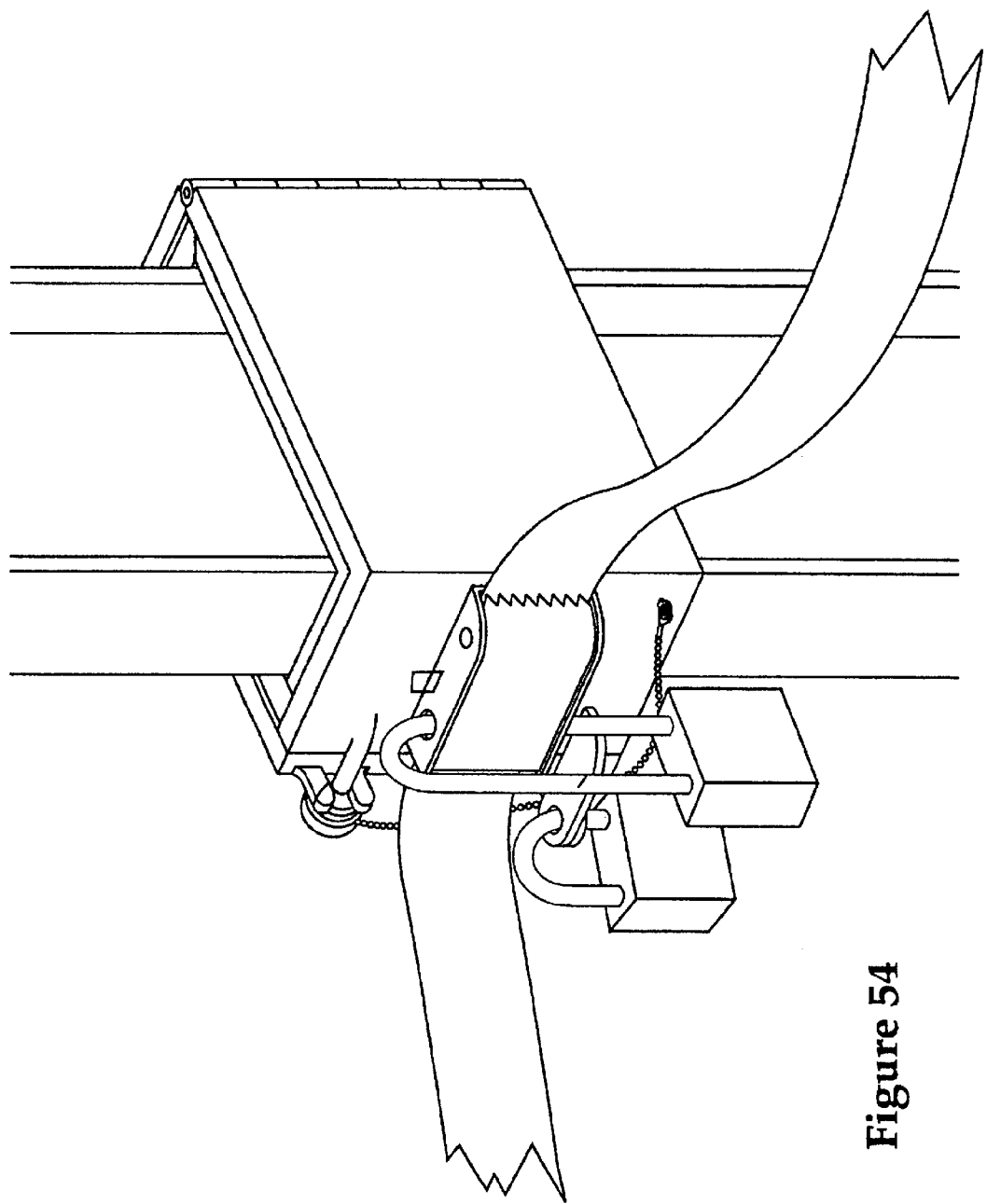
FIG. 54 is a detail perspective view of one version of the SUREFOOT™ embodiment of FIG. 2H.

FIG. 54 is a detail perspective view of one version of the SUREFOOT™ embodiment of FIG. 53. Note the use of a security chain to hold the knurled knob from falling.

Figure 55:
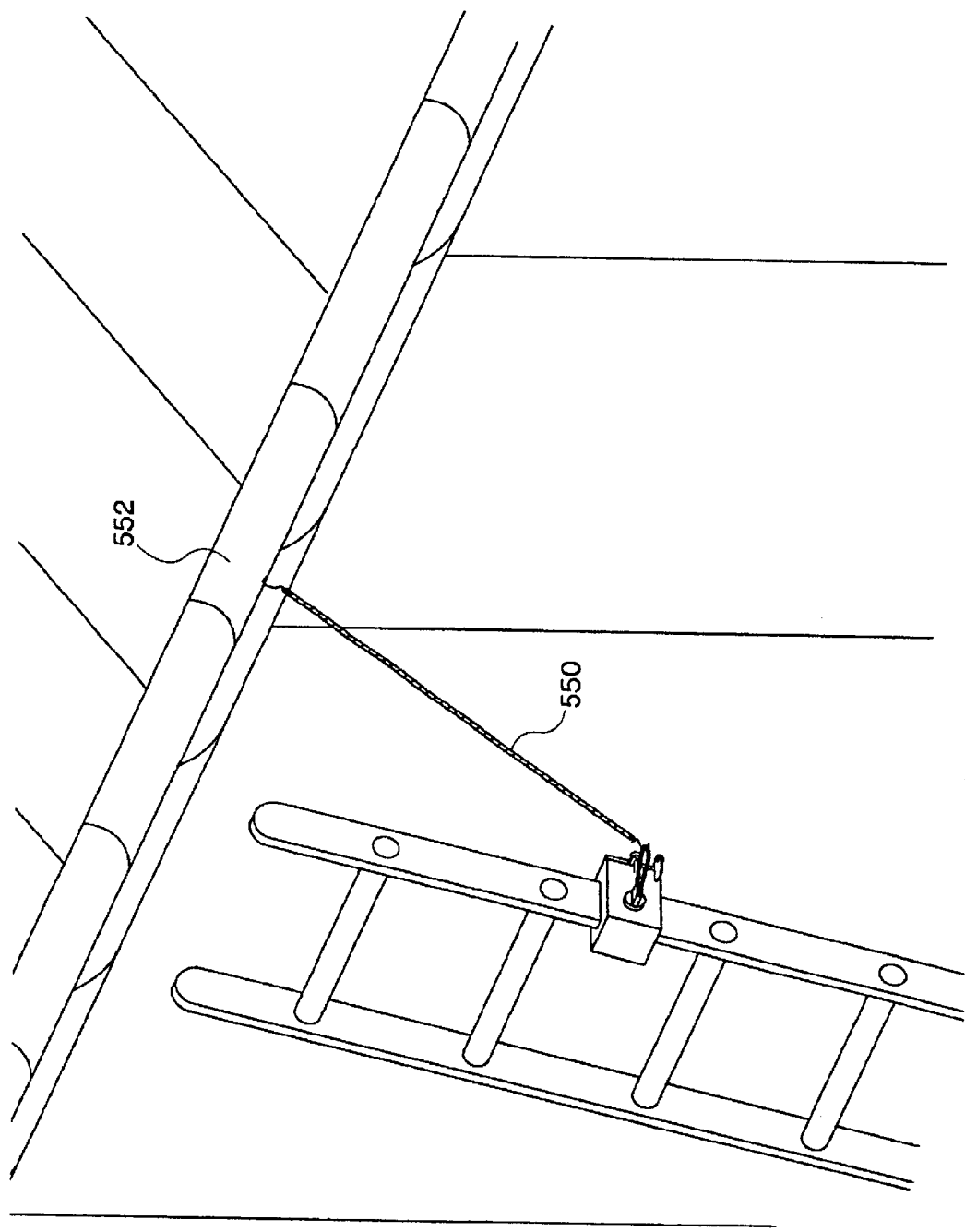
FIG. 55 is a perspective view of one version of the SUREFOOT™ embodiment of the present invention shown attached to a ladder, secured to a gutter spike via a bungee chord.

FIG. 55 is a perspective view of one version of the SUREFOOT™ embodiment of the present invention shown attached to a ladder, secured to a gutter spike via a bungee chord 550. In this embodiment, bungee chord 550 may be used to steady the ladder. Preferably, two chords 550 may be used, one on each side of the ladder. The SUREFOOT™ may be provided with a hook 552 for the bungee chord to attach to, as will be described in more detail below.

Figure 56:
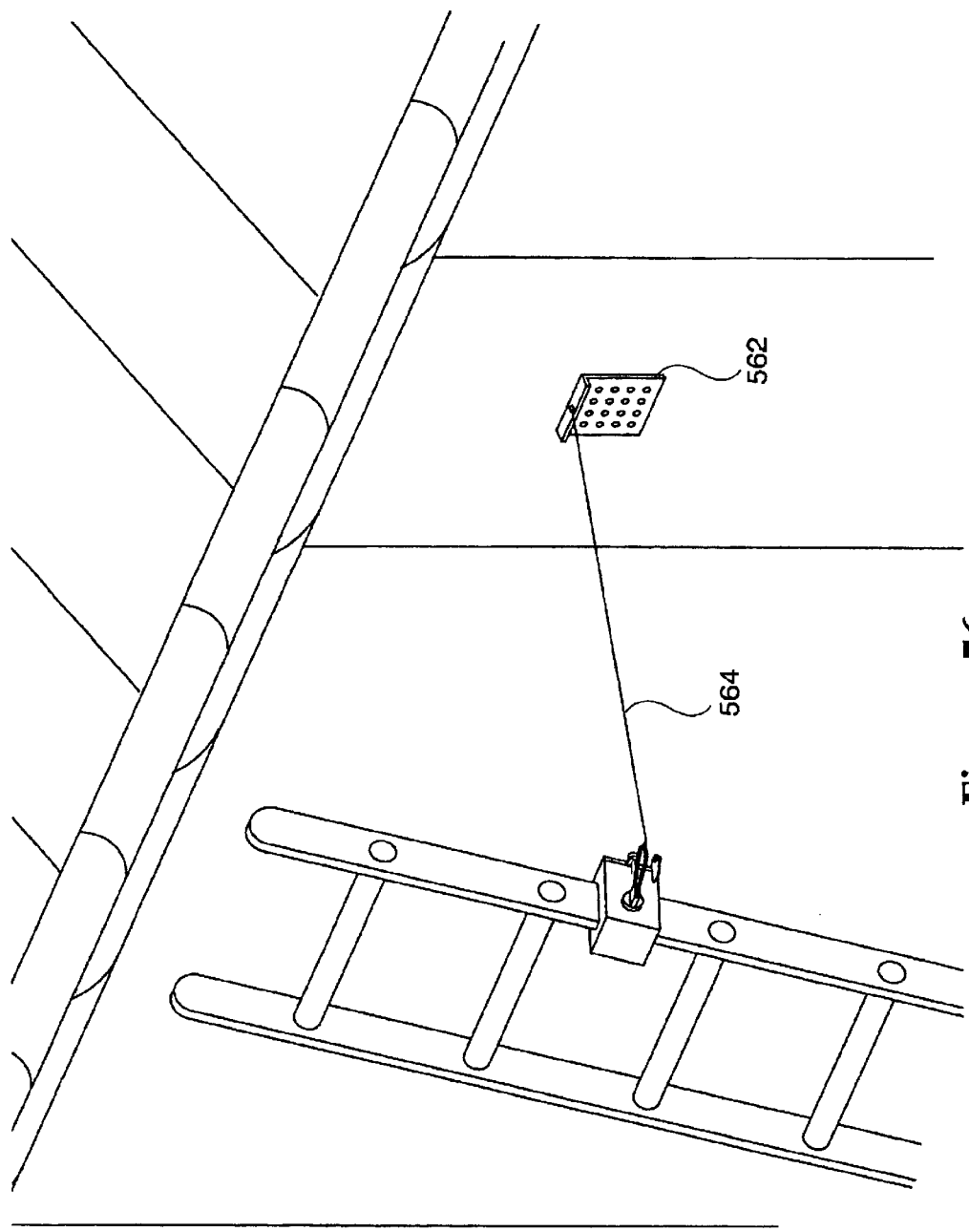

FIG. 56 is a perspective view of one version of the SUREFOOT™ embodiment of the present invention shown attached to a ladder, secured to a nailing plate 562 via a bungee chord, cable, or the like 564. Nailing plate 562 may be attached to a wall or roof temporarily by nails or screws. Cable or bungee 564 may then couple the sure foot to the nailing plate.

Figure 57:
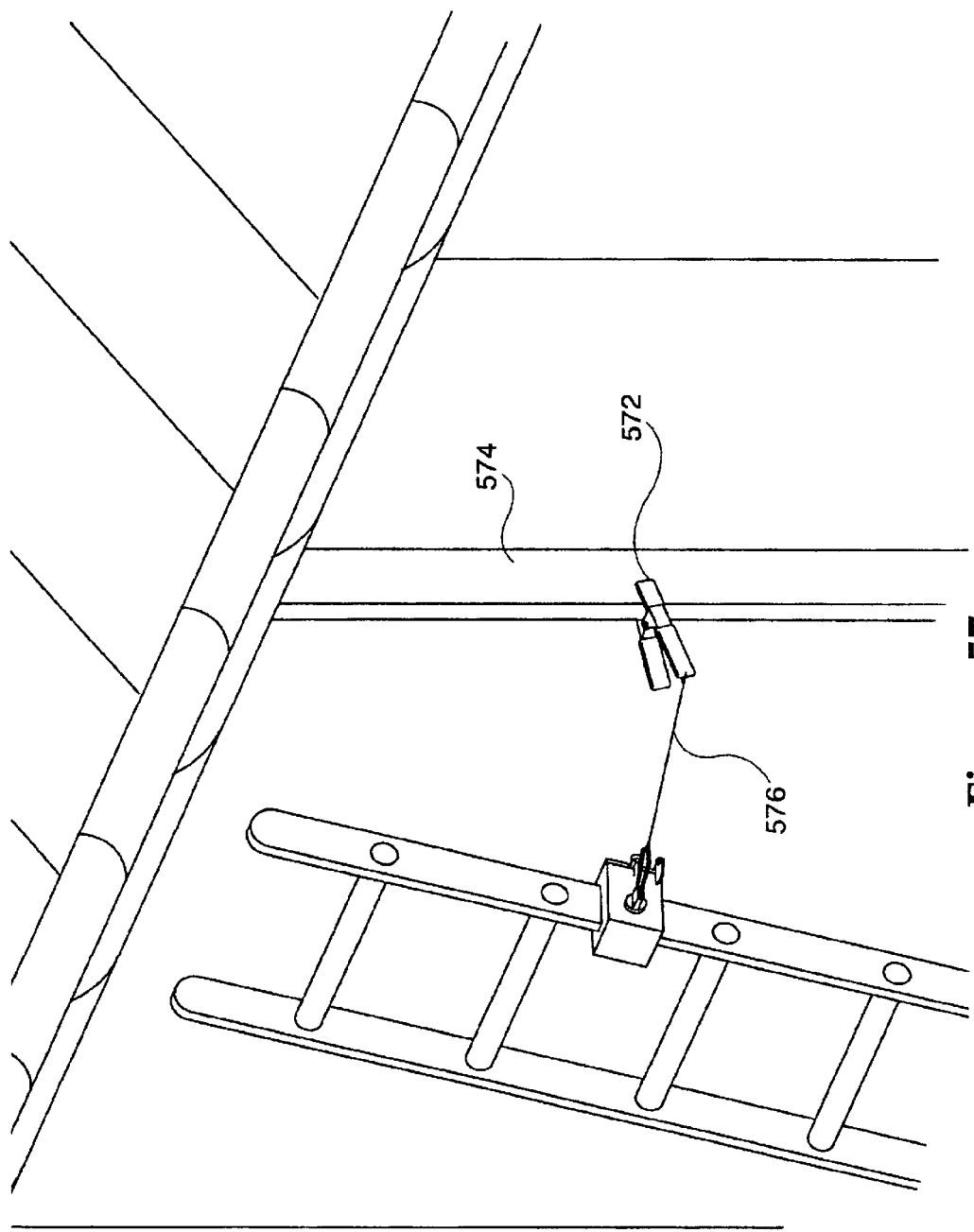

FIG. 57 is a perspective view of one version of the SUREFOOT™ embodiment of the present invention shown attached to a ladder, secured to a beam 574 using a pressure clamp 572 and a bungee chord, cable or the like 576. Again, the purpose of this embodiment is to steady the ladder, not necessarily hold the entire weight of a person or materials.

Figure 58:
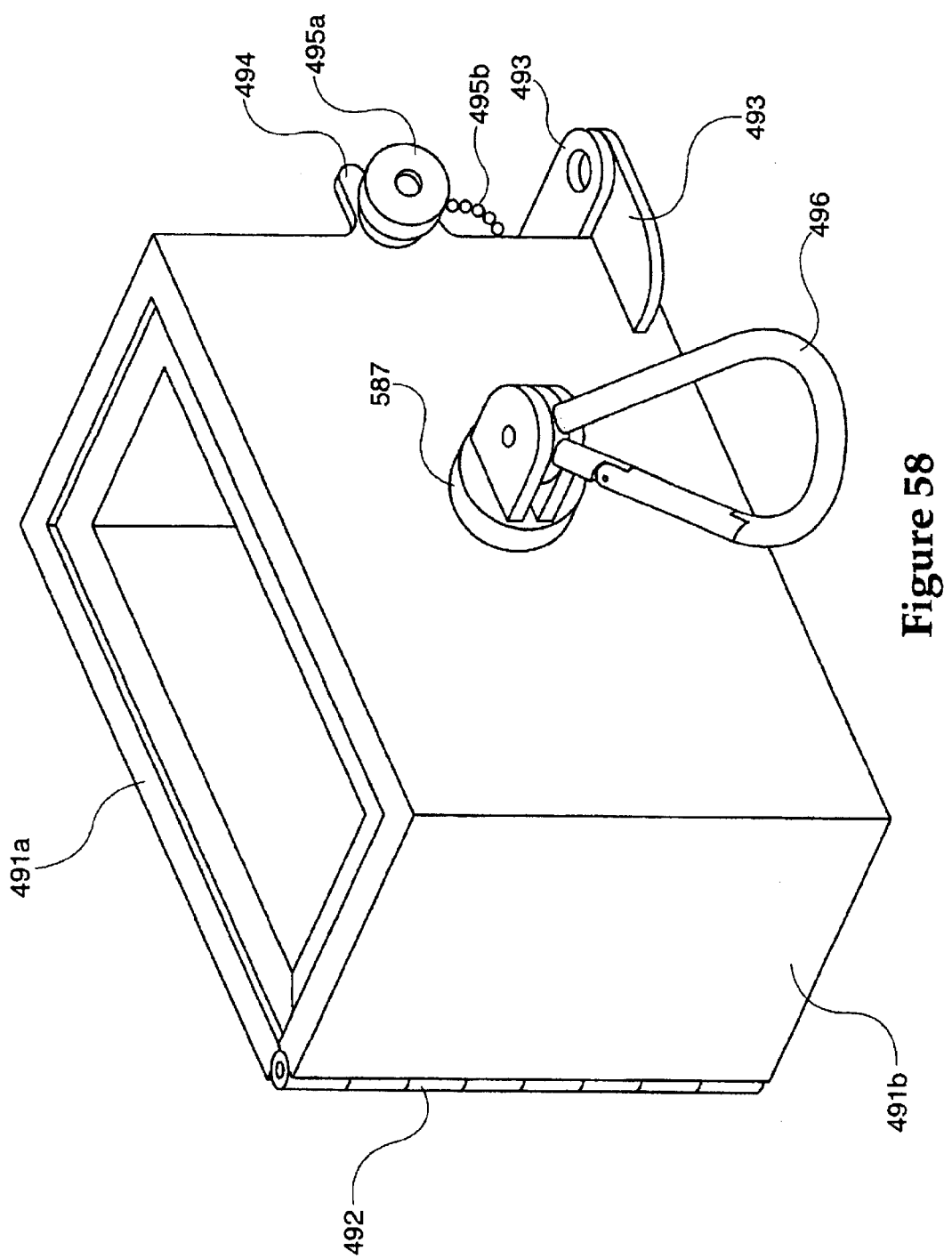

FIG. 58 is a perspective view of another version of the SUREFOOT™ embodiment of the present invention illustrating the swivel clip for use with a bungee, cable, or the like. Clip 587 may be mounted to the sure foot through swivel 587. Clip 587 may be similar to that used in climbing gear and the like. Note the chain 495*b* securing the knurled knob 495*a*.

Figure 59:
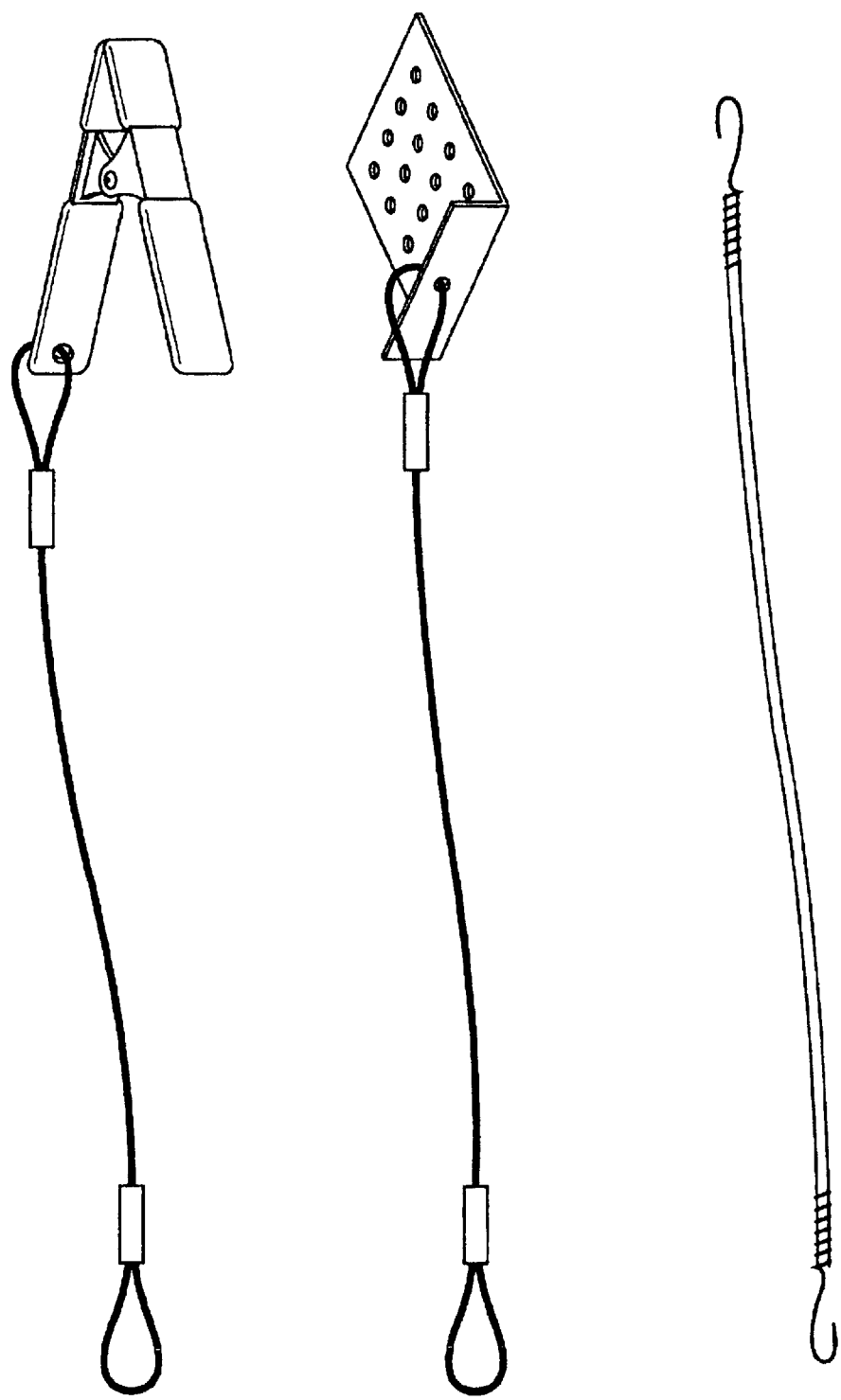
FIG. 59 is a perspective view of three attachment accessories for the swivel clip (or other embodiments) of the SUREFOOT™ embodiment of the present invention.

FIG. 59 is a perspective view of three attachment accessories for the swivel clip (or other embodiments) of the SUREFOOT™ embodiment of the present invention. The top element shows a cable (coated spiral wound stainless steel ¼" cable or the like) attached to a clamp via crimp fittings or the like. The center element shows the same cable attached to a nailing plate. The bottom element is a common bungee chord. Each of these elements may be attached to swivel clip 587 at one end, and attached to a roof or structure at the other.

Figure 60:
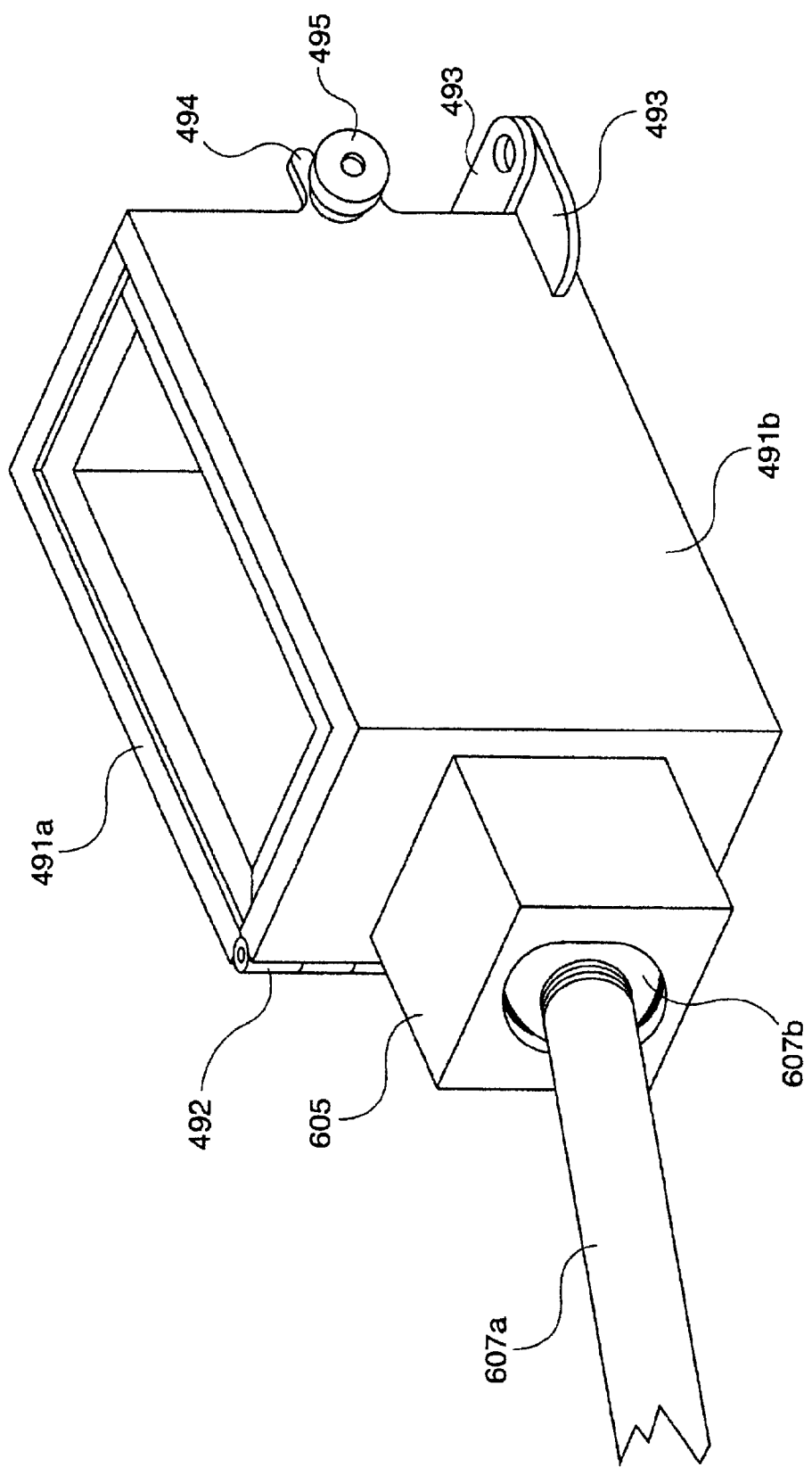
FIG. 60 is a perspective view of yet another version of the SUREFOOT™ embodiment of the present invention, with a pivot jointed shaft.
Figure 61:
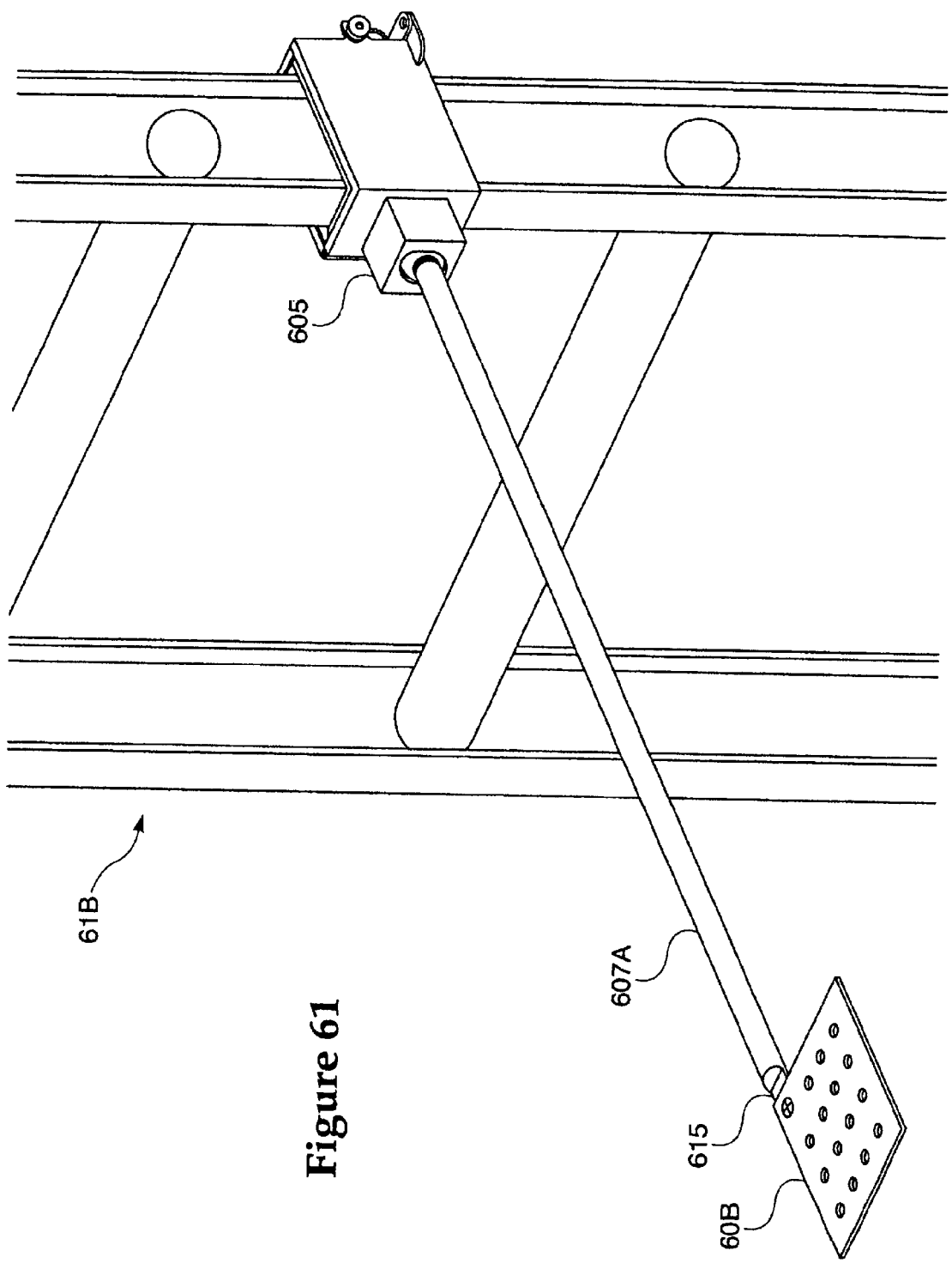
FIG. 61 is a perspective view of yet another version of the SUREFOOT™ embodiment of the present invention, with a pivot jointed shaft, shown attached to a ladder, with the shaft attached to a nailing plate.

FIG. 60 is a perspective view of yet another version of the SUREFOOT™ embodiment of the present invention, with a pivot jointed shaft. Pivot socket 605 is mounted to the sure foot at one end thereof. Socket 605 receives ball 607*b* which is coupled to shaft 607*a*. FIG. 61 is a perspective view of yet another version of the SUREFOOT™ embodiment of the present invention, with a pivot jointed shaft, shown attached to a ladder 61B, with shaft 607*a* attached to nailing plate 608.

Once attached to ladder 61B, nailing plate 608 may be moved to an advantageous position on a roof, wall, or stud and nailed or screwed in place to hold the ladder. Pivot joint 605 allows freedom in placement of nailing plate 608. Nailing plate 608 may be provided with a swivel joint 615 of limited rotation or another ball and socket type joint such as 605.

FIG. 62 is a perspective view of another version of the SUREFOOT™ embodiment of the present invention, illustrating the pivot shaft and nailing plate. FIG. 63 is a side view of another version of the SUREFOOT™ embodiment of the present invention, illustrating the pivot shaft and nailing plate. Pivot ball 607*b* may be secured to shaft 607*a* by set screw 609*a*. Screw 610*a* and nut 610*b* may secure shaft 607*a* to nailing plate 608 in a semi-rotatable or fixed manner. Nailing or screw holes 611 may be provided in nailing plate 608.

Figure 64:
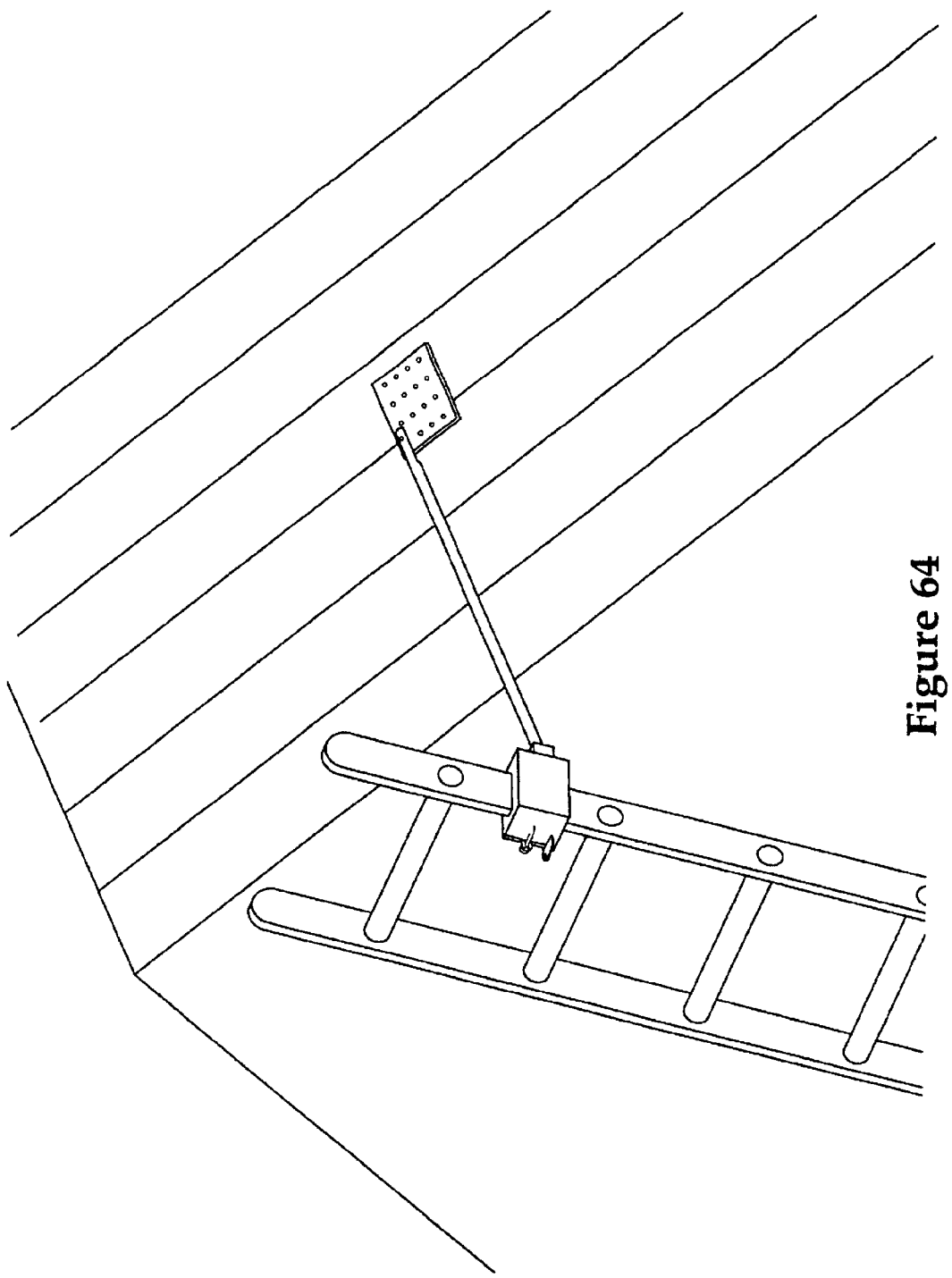
FIG. 64 is a perspective view of another version of the SUREFOOT™ embodiment of the present invention with the pivot shaft, illustrating how the apparatus, attached to a ladder, may attached to a roof via a nailing plate.

FIG. 64 is a perspective view of another version of the SUREFOOT™ embodiment of the present invention with the pivot shaft, illustrating how the apparatus, attached to a ladder, may attached to a roof via a nailing plate.

Figure 65:
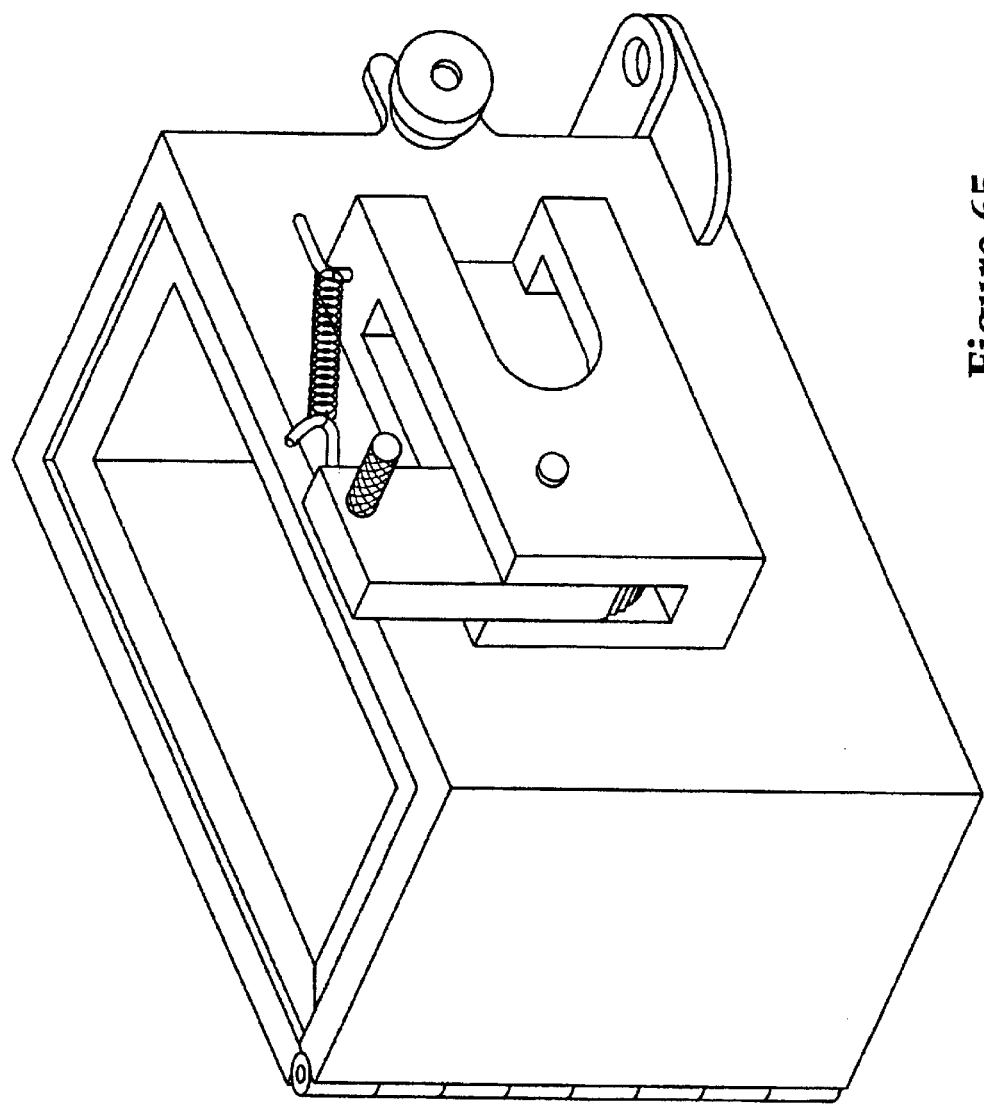
FIG. 65 is a perspective view of another version of the SUREFOOT™ embodiment of the present invention with a rope clamp.
Figure 66:
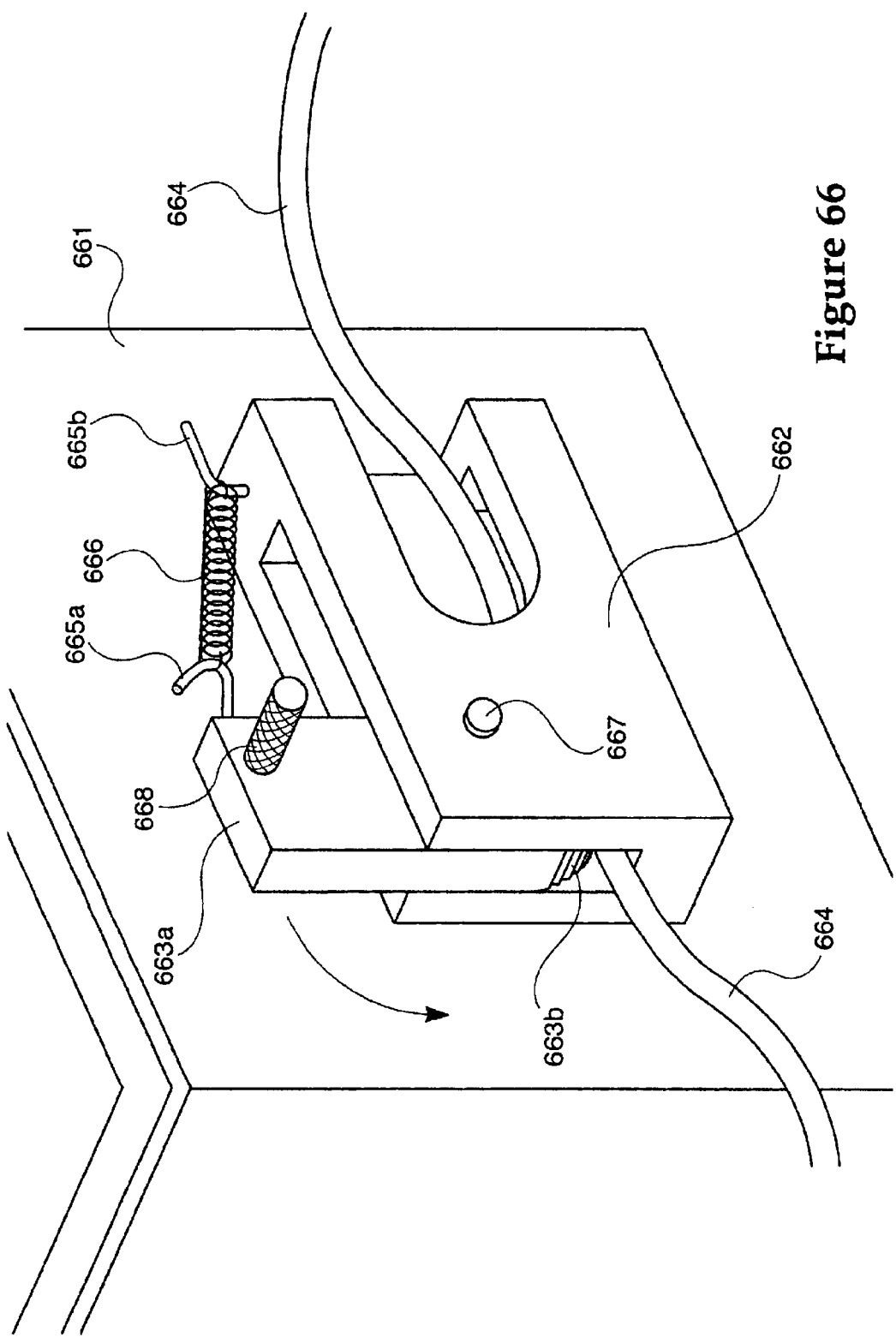
FIG. 66 is a perspective view of another version of the SUREFOOT™ embodiment of the present invention with a rope clamp, showing details of the rope clamp.

FIG. 65 is a perspective view of another version of the SUREFOOT™ embodiment of the present invention with a rope clamp. Such rope clamps per se are known in the nautical arts. A rope may be fed through the rope clamp and secured to a beam, telephone pole, nailing plate, or the like. FIG. 66 is a perspective view of another version of the SUREFOOT™ embodiment of the present invention with a rope clamp, showing details of the rope clamp.

Rope clamp 662 mounted to sure foot 661, may include catch 663*a* with teeth 663*b* rotatably mounted via pin 667. Spring 666 attached to catch 663*a* and clamp 662 via pins 665*a* and 665*b* holds catch 663*a* in tension. Knurled knob 668 may be used to release tension on catch 663*a* to release a rope 664 from the rope clamp.

Figure 67:
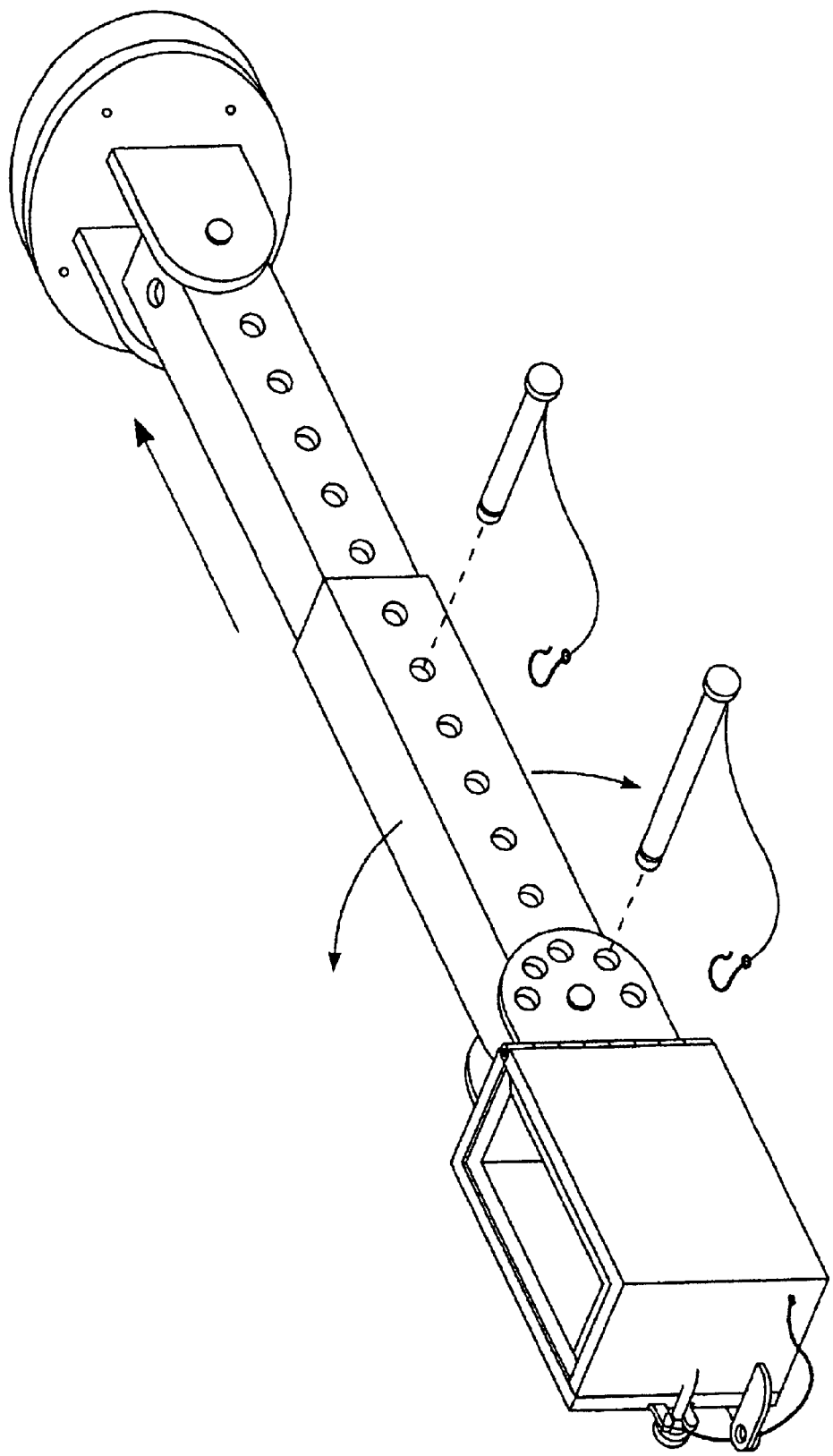
FIG. 67 is a perspective view of another version of the SUREFOOT™ embodiment of the present invention with an attached pivot leg and rubber covered foot.
Figure 68:
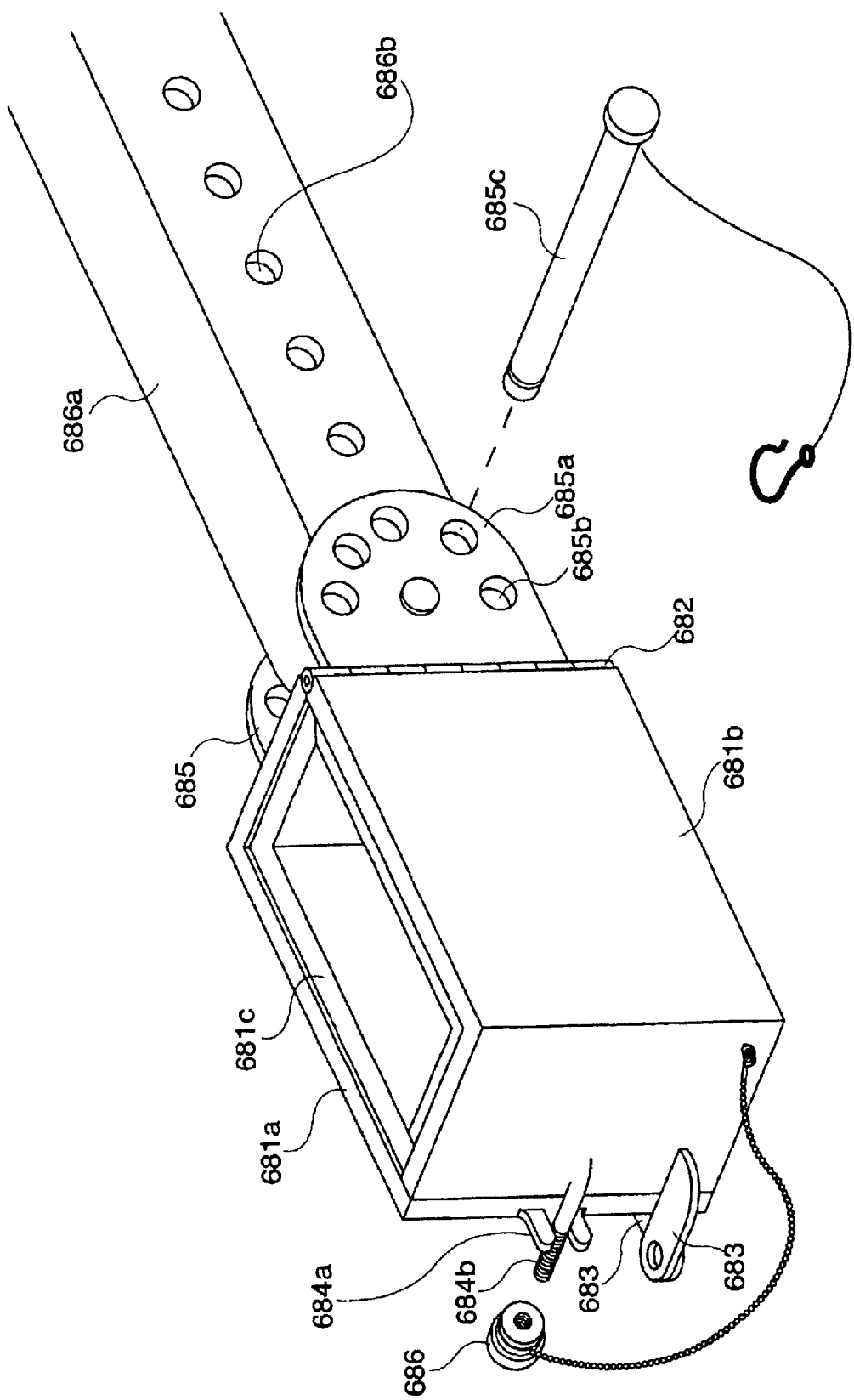
FIG. 68 is a perspective view of another version of the SUREFOOT™ embodiment of the present invention with an attached pivot leg and rubber covered foot showing more detail from FIG. 4A.

FIG. 67 is a perspective view of another version of the SUREFOOT™ embodiment of the present invention with an attached pivot leg and rubber covered foot. FIG. 68 is a perspective view of another version of the SUREFOOT™ embodiment of the present invention with an attached pivot leg and rubber covered foot showing more detail from FIG. 67. Referring to FIGS. 67 and 68, pivot 685 comprising side plates 685a may be mounted to one end of sure foot 681 with a plurality of adjustment holes 685b. Leg 686a may be mounted to side plates via a bolt or pin and adjusted for angle using pin 685c with attached clip (note safety string for clip).

Figure 69:
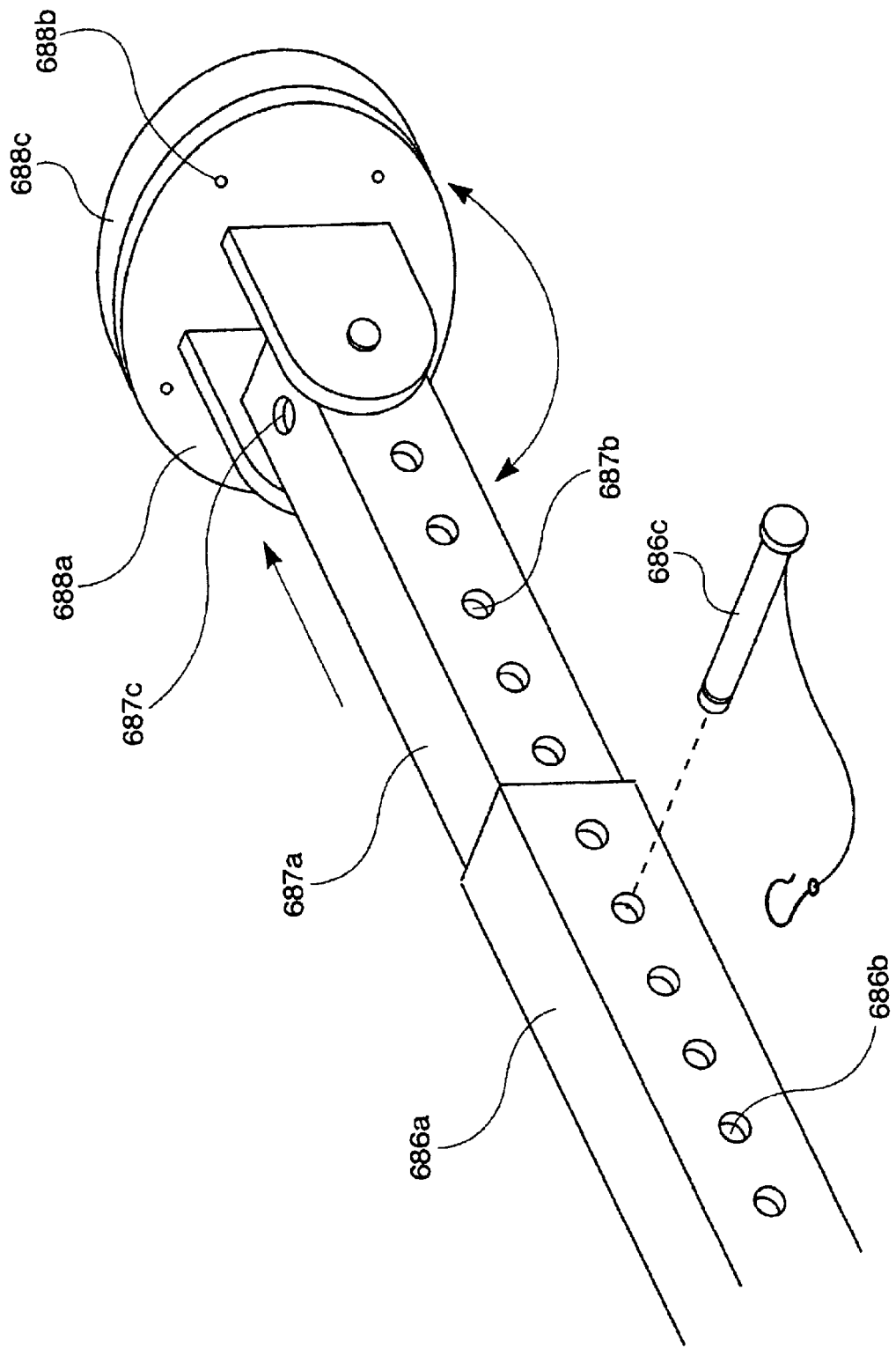
FIG. 69 is a perspective view of another version of the SUREFOOT™ embodiment of the present invention with an attached pivot leg and rubber covered foot, showing detail of the foot attachment.

FIG. 69 is a perspective view of another version of the SUREFOOT™ embodiment of the present invention with an attached pivot leg and rubber covered foot, showing detail of the foot attachment. Referring to FIGS. 68 and 69, foot 688a may be covered with urethane foam 688c to provide grip. Nails holes 688b may also be provided to accept temporary nailing or screwing. Foot 688a may be mounted to lower leg portion 687a via a pivot. Upper leg portion 686a may be adjustably attached to lower leg portion 687a via another pin 686c and clip (note again safety string or wire for clip).

In use, the device may be attached to a ladder leg an nailed to a roof, wall or other surface (either at the top or bottom of the ladder). In addition, the device may be used by attaching to the bottom of a ladder to steady the ladder as an extra leg, or to act as a ladder extension for one leg when, for example, setting up a ladder on steps. In addition, the device may be used to hold a ladder away from a wall to prevent gutters form being crushed.

Figure 70:
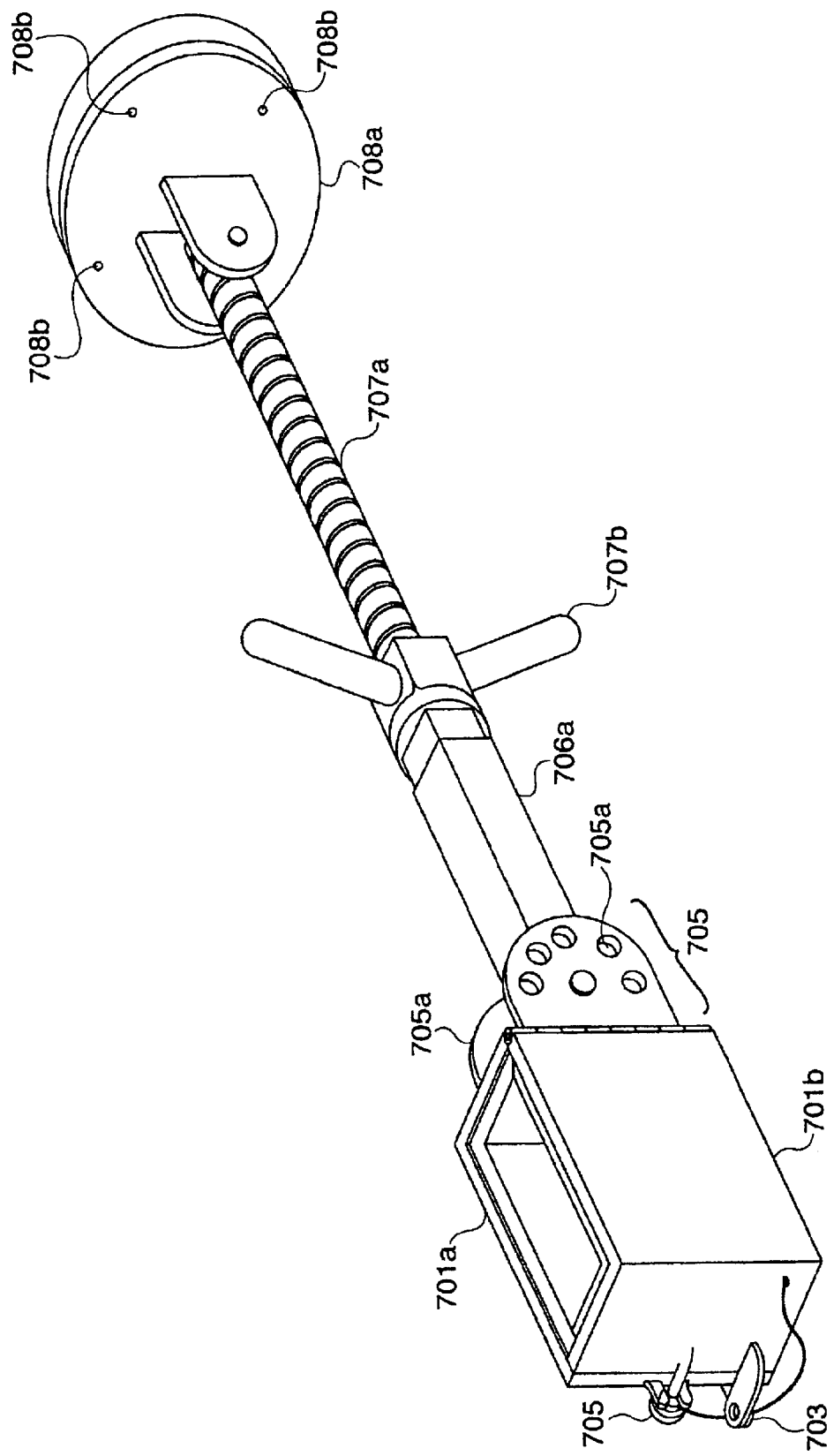
FIG. 70 is a perspective view of an alternative embodiment of the SUREFOOT™.

FIG. 70 is a perspective view of an alternative embodiment of the SUREFOOT™ embodiment of the present invention. The SUREFOOT™ in this embodiment may include a box clamp device encompassing parts 701a and 701b which may be wrapped around a ladder leg. The box clamp device 701a, 701b may be lined with foam rubber to securely grip various ladder leg sizes without damaging or marring the ladder leg.

A threaded shaft may be provided with knurled knob 705 to lock portion 701a to 701b around a ladder leg. Knurled knob 705 may be secured to the device via a small chain or cable to prevent it being dropped or lost. Lock hasp 703 may be provided to securely lock the device to a ladder to prevent theft or to prevent an unauthorized worker from removing the device before work is complete.

Pivot 705 comprising side plates 705a may be mounted to one end of sure foot 701 with a plurality of adjustment holes 705b. upper leg portion 706a may be mounted to side plates via a bolt or pin and adjusted for angle using a pin (not shown) with attached clip (with a safety string for the clip).

Foot 708a may be covered with urethane foam 708c to provide grip. Nails holes 708b may also be provided to accept temporary nailing or screwing. Foot 708a may be mounted to lower leg portion 707a via a pivot.

Upper leg portion 706a may be adjustably attached to lower leg portion 707a via a screw jack mechanism comprising threaded lower leg portion 707a, internally threaded upper leg portion 706a and locking wing-nut 707b. In use, the device may be attached to a ladder leg and nailed to a roof, wall or other surface (either at the top or bottom of the ladder). In addition, the device may be used by attaching to the bottom of a ladder to steady the ladder as an extra leg, or to act as a ladder extension for one leg when, for example, setting up a ladder on steps. In addition, the device may be used to hold a ladder away from a wall to prevent gutters form being crushed.

Figure 71:
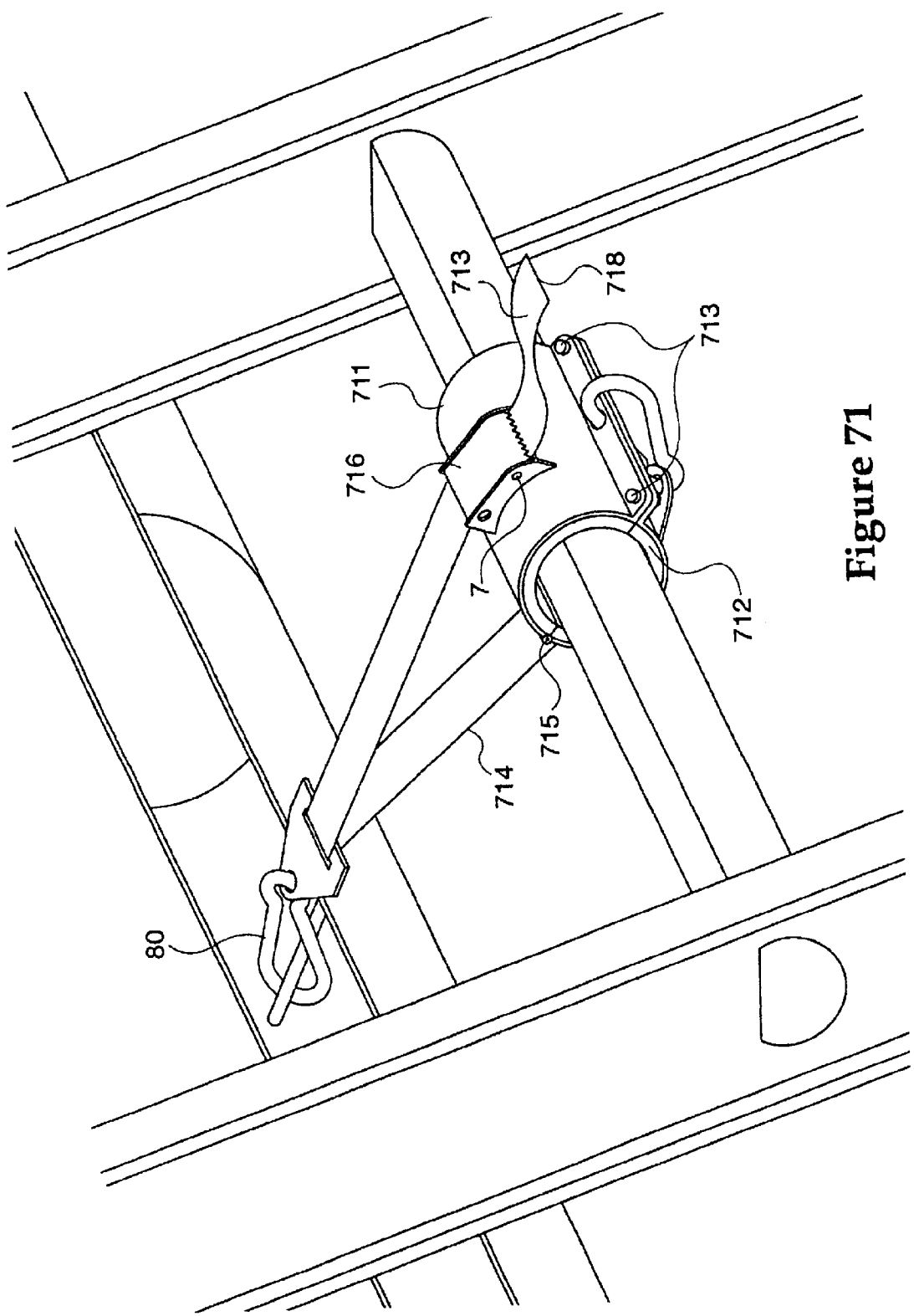
FIG. 71 is a perspective view of an alternative embodiment of the SUREFOOT™

FIG. 71 is a perspective view of a alternative embodiment of the SUREFOOT™ invention. In the embodiment of FIG. 8, the SUREFOOT™ apparatus is adapted for use in securing ladders by the rung rather than the side rail. This technique may be applied to all embodiments of the SUREFOOT™ set forth above.

The apparatus of FIG. 71 may operate in a similar manner as the SUREFOOT™ embodiments set forth above, except that the shape has been optimized for a ladder step. Other shapes may also be used (e.g., hexagon) without departing from the spirit and scope of the present invention.

Clamp 711 may be mounted to a ladder step, or the like. Clamp 711 may be lined with compressible foam rubber 712 so as to securely grip various ladder step cross-sections without slipping. Clamp 711 may be provided in two halves joined by hinge 715. The two halves may be attached though use of bolts or fasteners 713 which may be further secure by use of a safety clip as illustrated. The safety clip doubles as an attachment point for strap 714.

Strap 714 may be tightened by passing an end portion 718 through buckle 716 which is provided with a lock hole 717. Excess portions 713 of strap 714 may be tied off or may be left to hang. In operation, clamp 711 may be securely clamped around a ladder step as illustrated in FIG. 71. Note that in FIG. 71, clamp 711 is illustrated as round. However, clamp 718 may be suitably shaped (e.g., with a flat portion) so as to more closely follow the cross-sectional contour of a ladder step. Alternately, clamp 711 may be shaped to fit the contours of a ladder side bar, so as to free up step space.

Once clamp 711 is clamped to the ladder step, strap 714 may be attached to a gutter, nailing plate, or other support, via safety clip 80 (or the like) as illustrated in FIG. 71. Cinching up strap 714 through buckle 716 will hold the ladder tightly to a building or the like.

Figure 72:
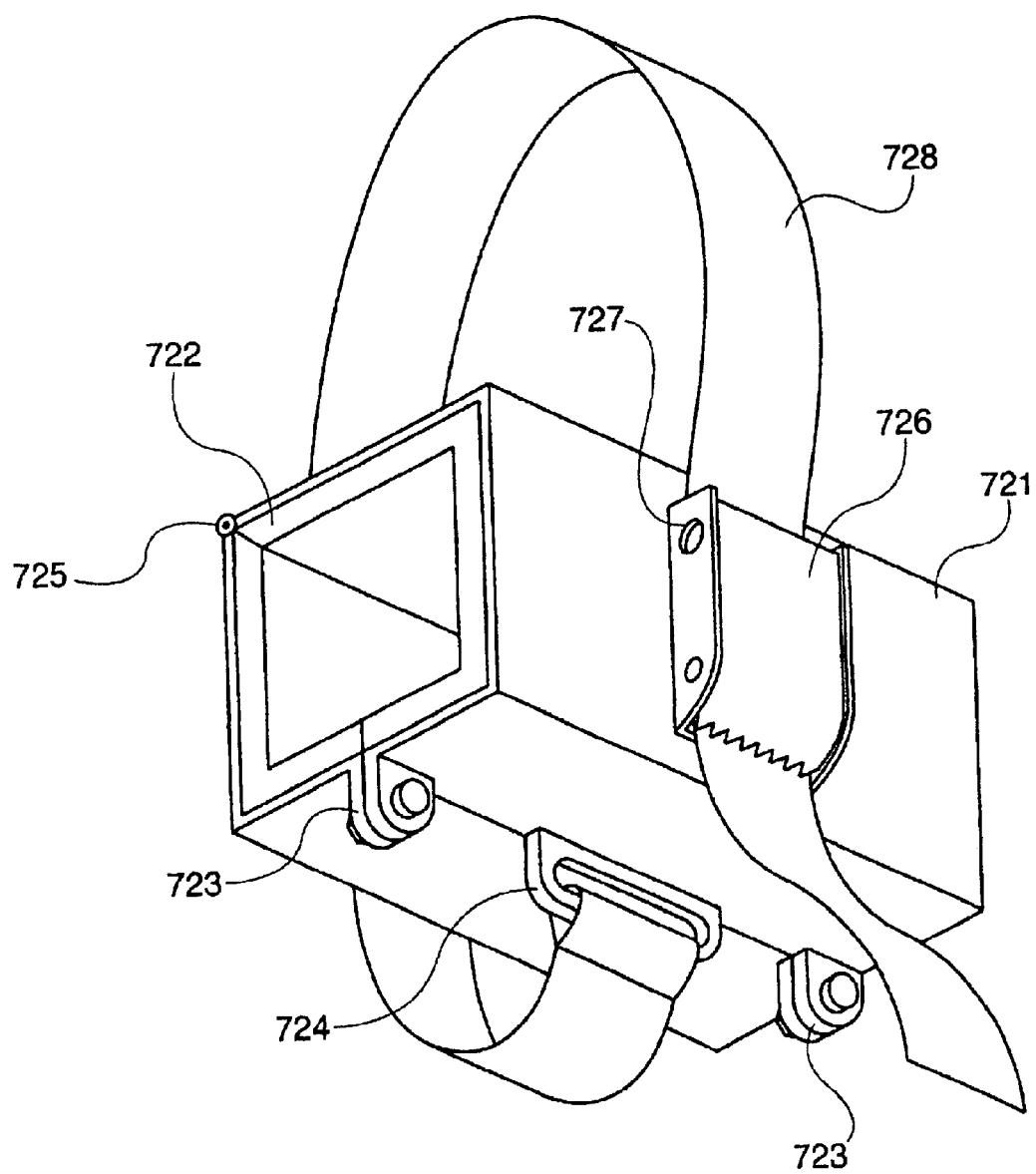
FIG. 72 is a perspective view of the rack strap of the first embodiment of the present invention.

FIG. 72 is a perspective view of the rack strap of the first embodiment of the present invention. Clamp 721 may be mounted to a truck ladder rack, car luggage rack, or the like. Clamp 721 may be lined with compressible foam rubber 722 so as to securely grip various rack channel cross-sections without slipping.

Clamp 721 may be provided in two halves joined by hinge 725. The two halves may be attached though use of bolts or fasteners 723 which may be further secure by use of a safety clip as illustrated. The safety clip doubles as an attachment point for strap 724. Strap 724 may be tightened by passing an end portion 728 through buckle 726 which is provided with a lock hole 727. Excess portions 723 of strap 724 may be tied off or may be left to hang.

Figure 73:
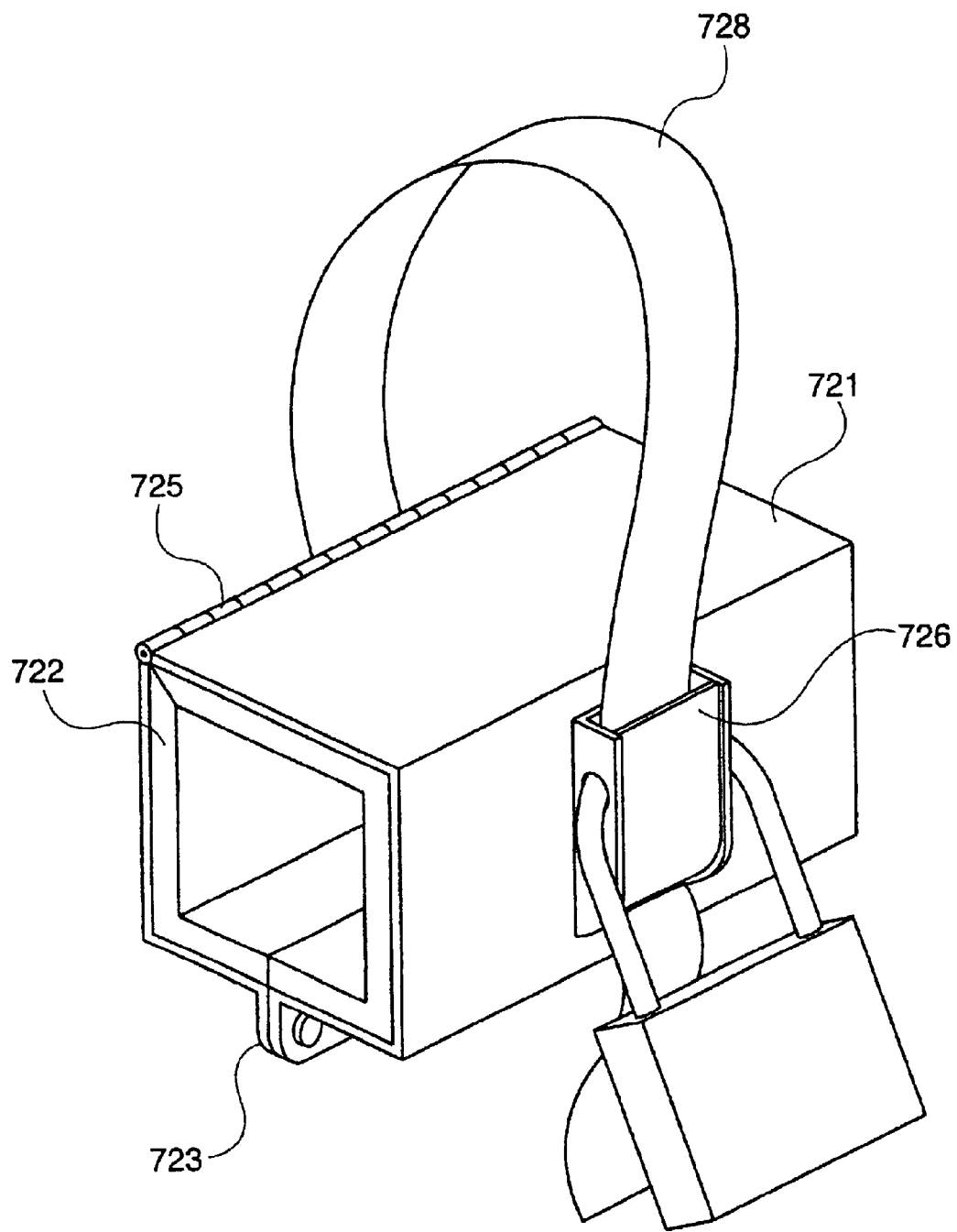
FIG. 73 is another perspective view of the rack strap of the first embodiment of the present invention illustrating how a lock may be applied.

FIG. 73 is another perspective view of the rack strap of the first embodiment of the present invention illustrating how a lock may be applied. A padlock may be passed through lock hold 727 to prevent buckle 726 from being released. The strap may be locked to prevent loosening of the strap or petty theft or borrowing of the objects secured to the strap. Workers on a job site will be less inclined to "borrow" a ladder that is so locked. Of course, a determined thief may be able to cut strap 724 to release the ladder. However, an armored strap 724 may be provided to prevent or discourage such theft.

Figure 74:
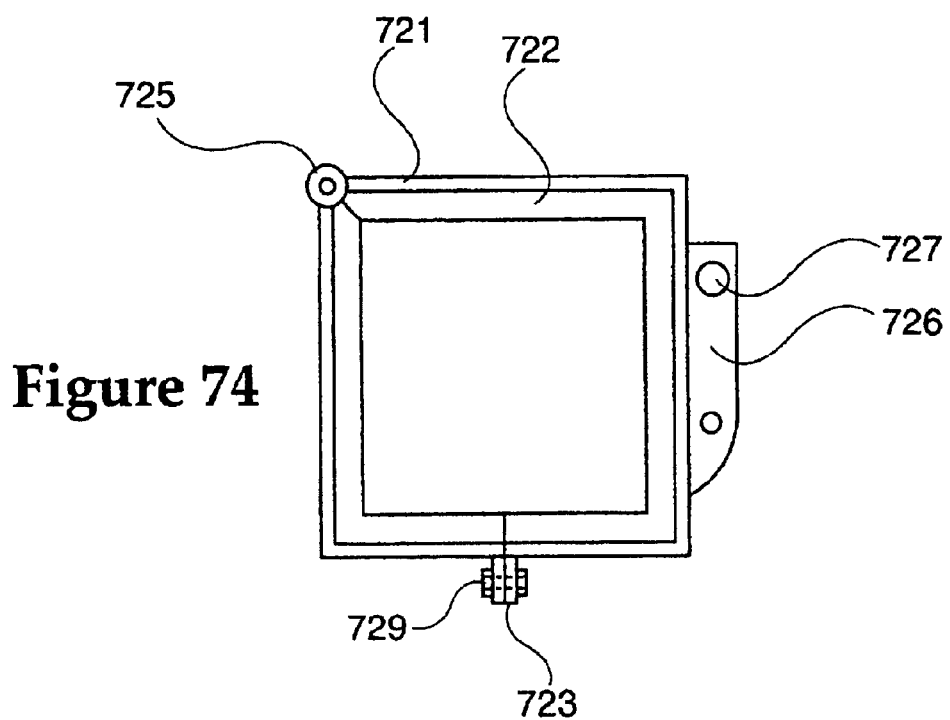
FIG. 74 is a top view of the rack strap of the first embodiment of the present invention in the closed position.
Figure 75:
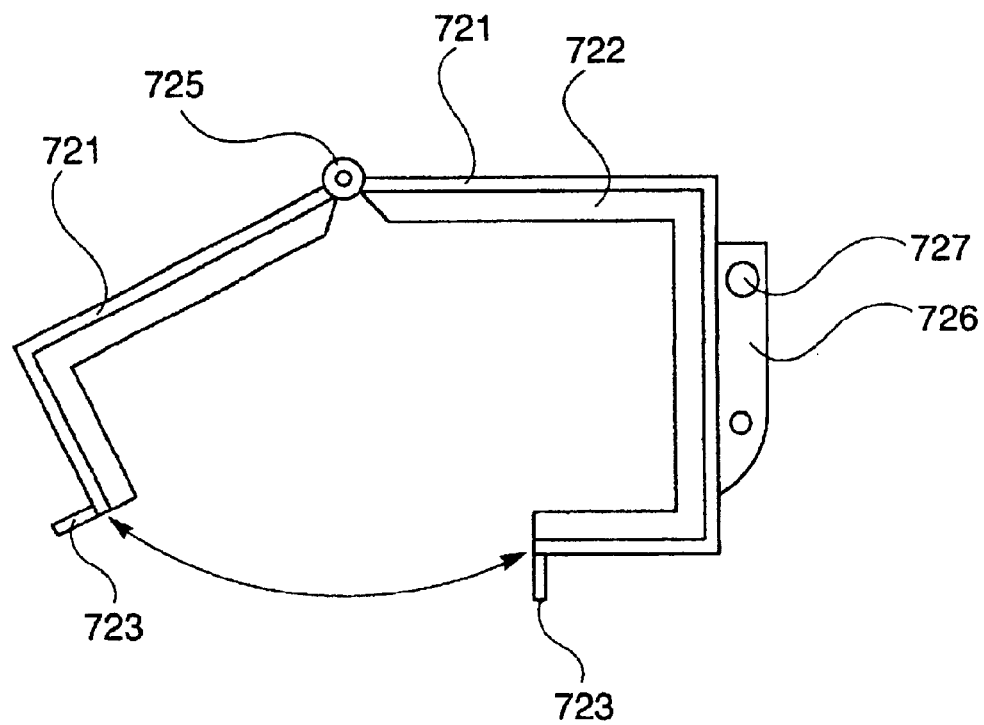
FIG. 75 is a top view of the rack strap of the first embodiment of the present invention in the open position.

Note that the strap may be wound around the device when the strap is secured to the buckle. Note that although disclosed here in terms of a draw-tight strap, the present invention may also be applied to ratchet straps. FIG. 74 is a top view of the rack strap of the first embodiment of the present invention in the closed position. FIG. 75 is a top view of the rack strap of the first embodiment of the present invention in the open position.

Figure 76:
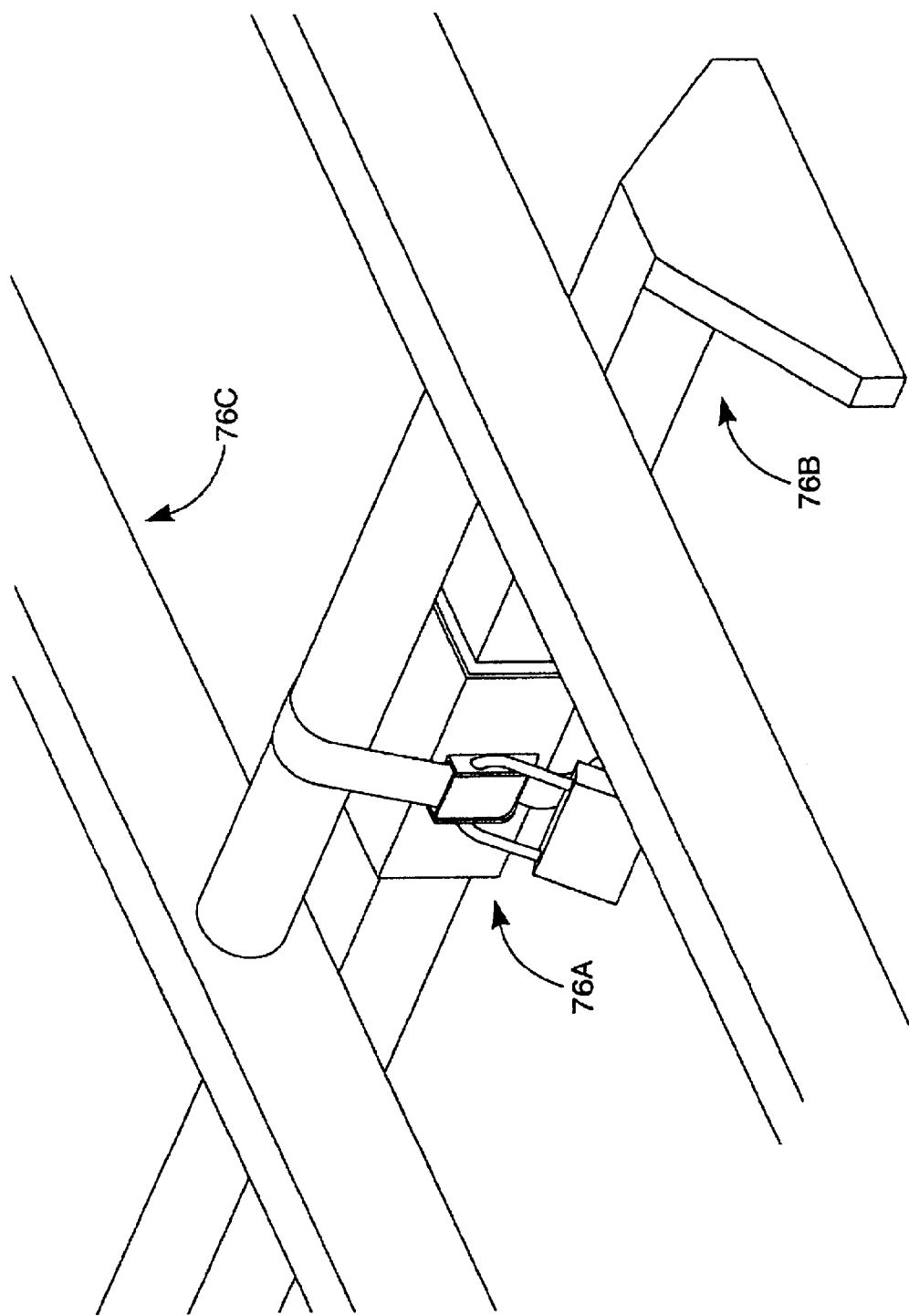
FIG. 76 is another perspective view of the rack strap of the first embodiment of the present invention illustrating how the apparatus may be installed on a ladder rack.

FIG. 76 is another perspective view of the rack strap of the first embodiment of the present invention illustrating how the apparatus 76A may be installed on a ladder rack. As illustrated in FIG. 76, a ladder 76C may be cinched down tightly to a roof rack 76B by means of the strap. Note that the present invention may be used in a number of ways in addition to that shown in FIG. 76. For example, two such devices may be used on either side of a roof rack to secure a large load by passing straps between two devices.

Figure 77:
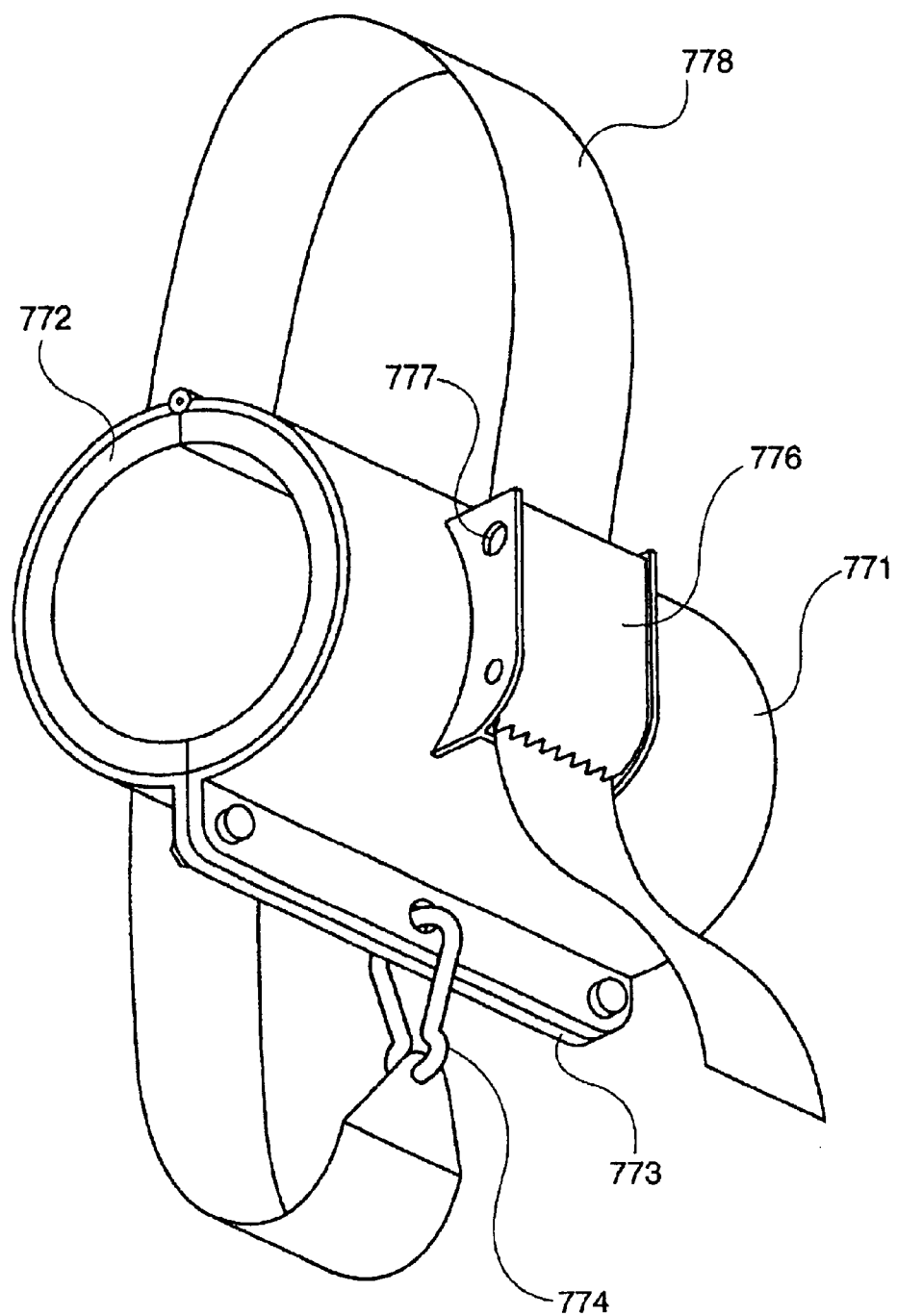
FIG. 77 is a perspective view of an alternative embodiment of the rack strap of the present invention for round tube racks.

FIG. 77 is a perspective view of an alternative embodiment of the rack strap of the present invention for round tube racks. The apparatus of FIG. 77 operates in the same manner as that of FIGS. 72–76, except that the shape has been optimized for round tubing. Other shapes may also be used (e.g., hexagon) without departing from the spirit and scope of the present invention.

Figure 78:
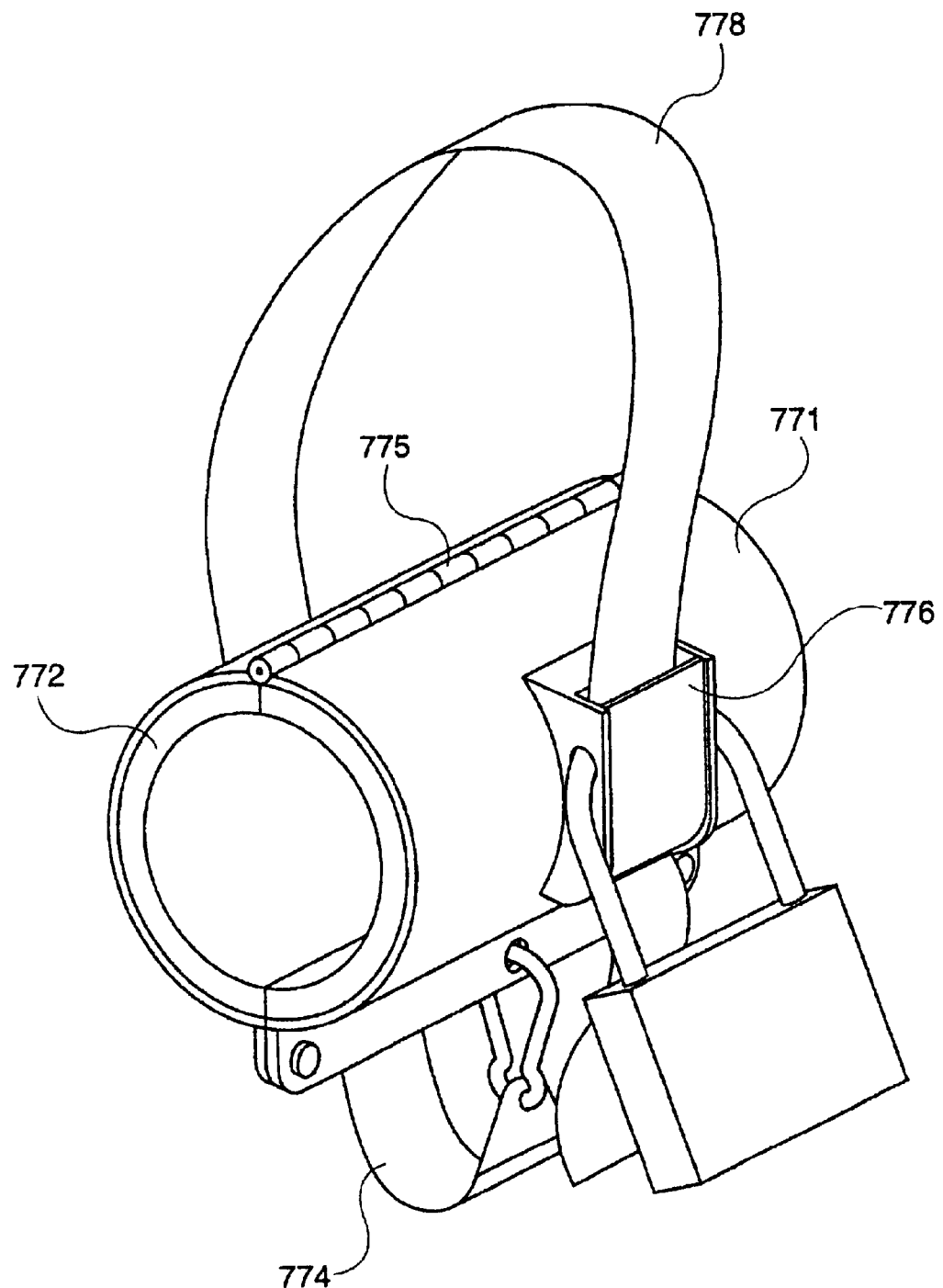
FIG. 78 is another perspective view of the alternative embodiment of rack strap of the present invention illustrating how a lock may be applied.

Clamp 771 may be mounted to a truck ladder rack, car luggage rack, or the like. Clamp 771 may be lined with compressible foam rubber 772 so as to securely grip various rack channel cross-sections without slipping. Clamp 771 may be provided in two halves joined by hinge 775. The two halves may be attached though use of bolts or fasteners 773 which may be further secure by use of a safety clip 774 as illustrated. The safety clip doubles as an attachment point for strap 778. Strap 778 may be tightened by passing an end portion through buckle 776 which is provided with a lock hole 777. Excess portions of strap 778 may be tied off or may be left to hang. FIG. 78 is another perspective view of the alternative embodiment of rack strap of the present invention illustrating how a lock may be applied.

Figure 79:
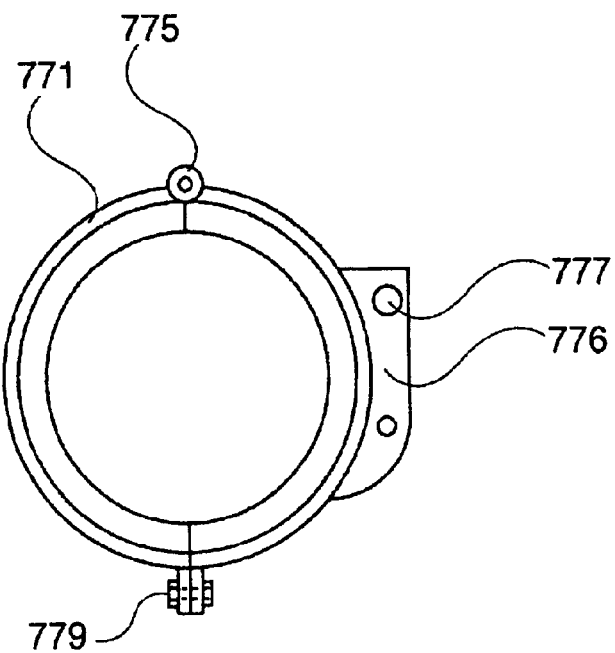
FIG. 79 is a top view of the alterative embodiment of the rack strap of the present invention in the closed position.
Figure 80:
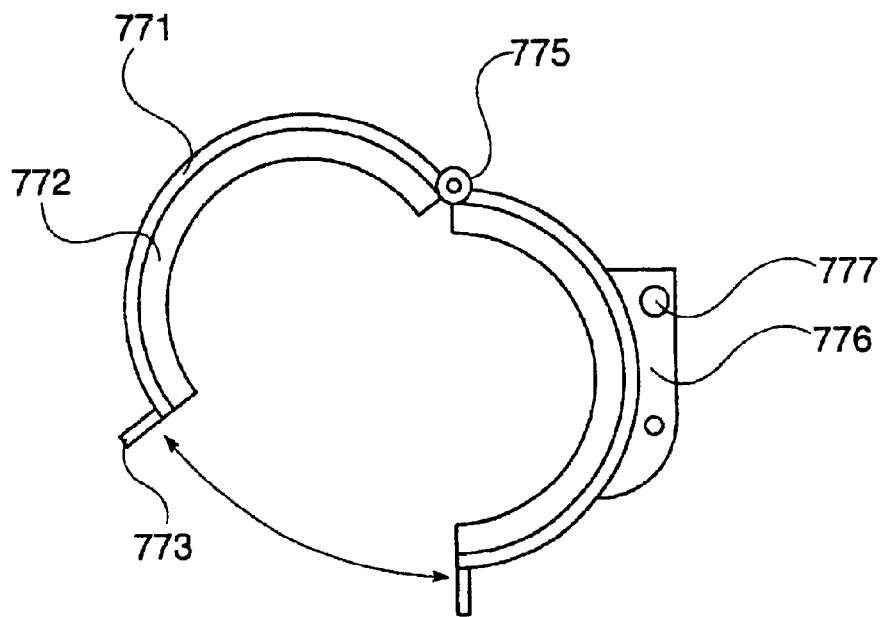
FIG. 80 is a top view of the alternative embodiment of the rack strap of the present invention in the open position.
Figure 81:
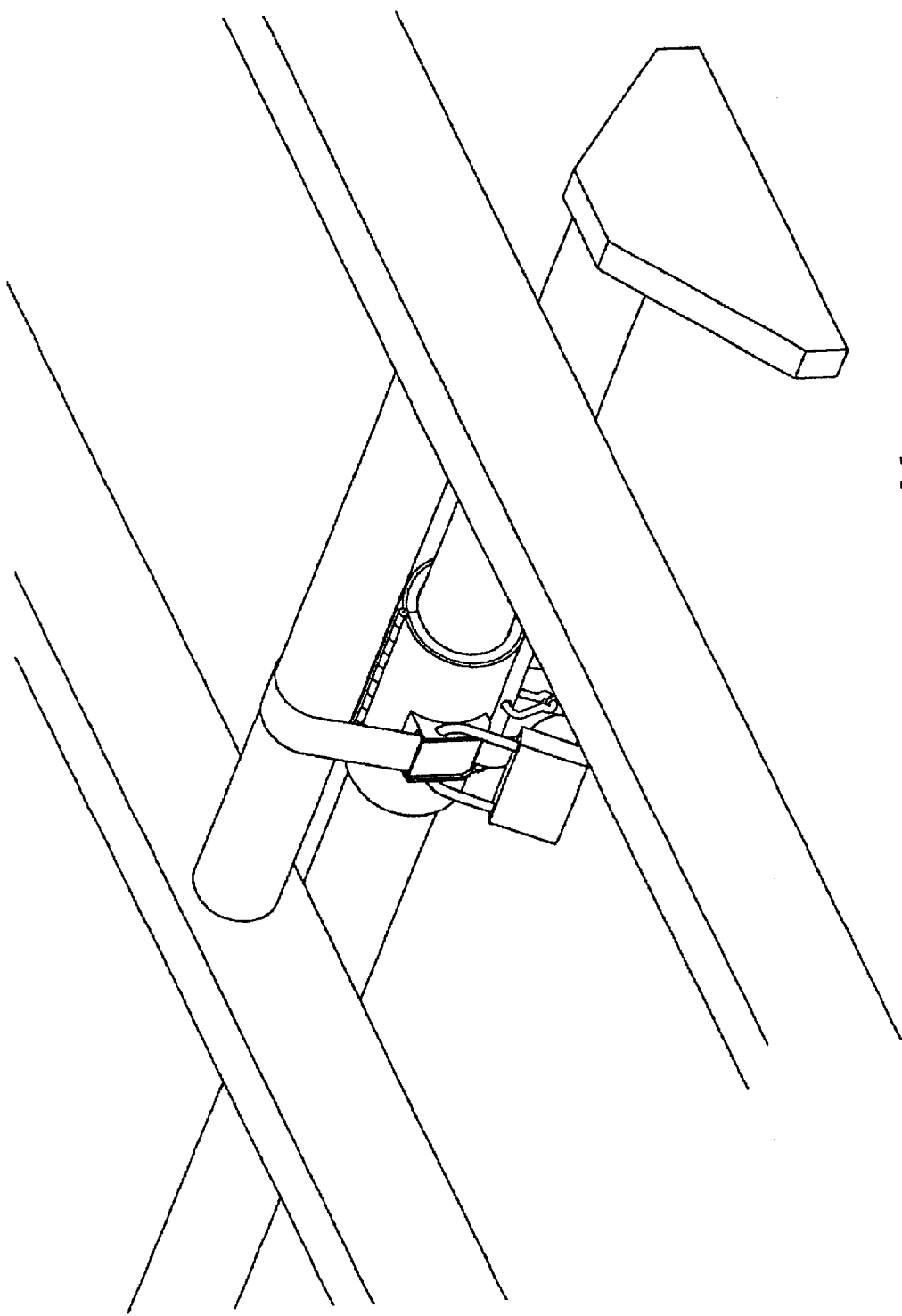
FIG. 81 is another perspective view of the alterative embodiment of the rack strap of the present invention illustrating how the apparatus may be installed on a ladder rack.

FIG. 79 is a top view of the alterative embodiment of the rack strap of the present invention in the closed position. FIG. 80 is a top view of the alternative embodiment of the rack strap of the present invention in the open position. FIG. 81 is another perspective view of the alterative embodiment of the rack strap of the present invention illustrating how the apparatus may be installed on a ladder rack.

It should be noted that all of the embodiments of the present invention, the use of ratchet straps or draw-tight straps on various embodiments is largely interchangeable. Thus, any disclosure illustrating the use of a draw-tight strap should be understood to encompass a ratchet strap and vice-versa.

Figure 82:
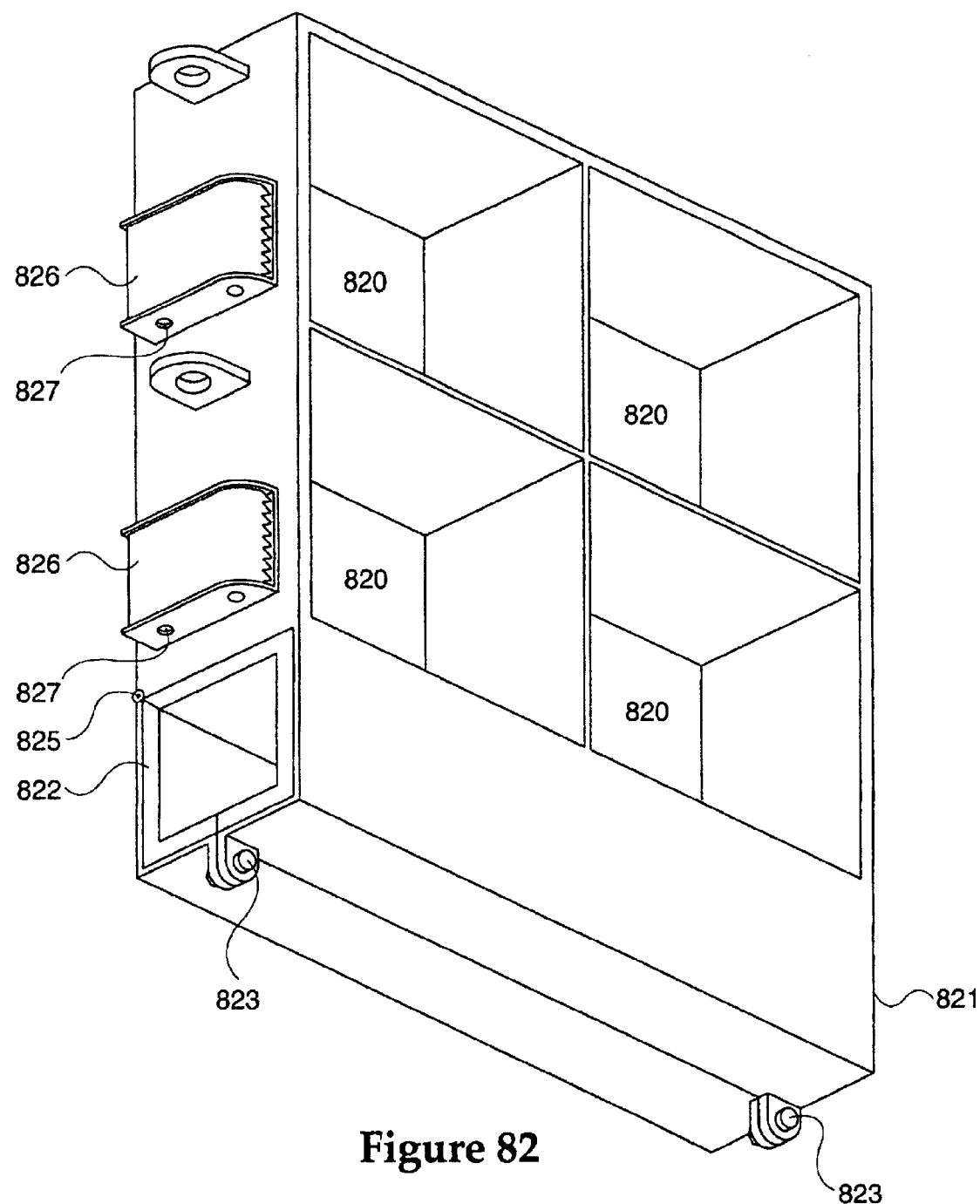
FIG. 82 is a perspective view of a jack post roof rack holder of the second embodiment of the present invention.

FIG. 82 is a perspective view of a jack post roof rack holder of the second embodiment of the present invention. This embodiment is a variation on one invention set forth above. In this embodiment of the present invention, a clamp 821 is provided which may be mounted to a truck ladder rack, car luggage rack, or the like. The clamp may be lined with compressible foam rubber 822 so as to securely grip various rack channel cross-sections without slipping. The use of the foam rubber allows the apparatus to be made for a number of different rack styles.

A draw-tight or ratchet strap 826 may be mounted to clamp 821 to secure a ladder or other object to the roof rack. Hooks for the strap may thus not be required. In addition, the strap may be locked to prevent loosening of the strap or petty theft or borrowing of the objects secured to the strap.

Figure 83:
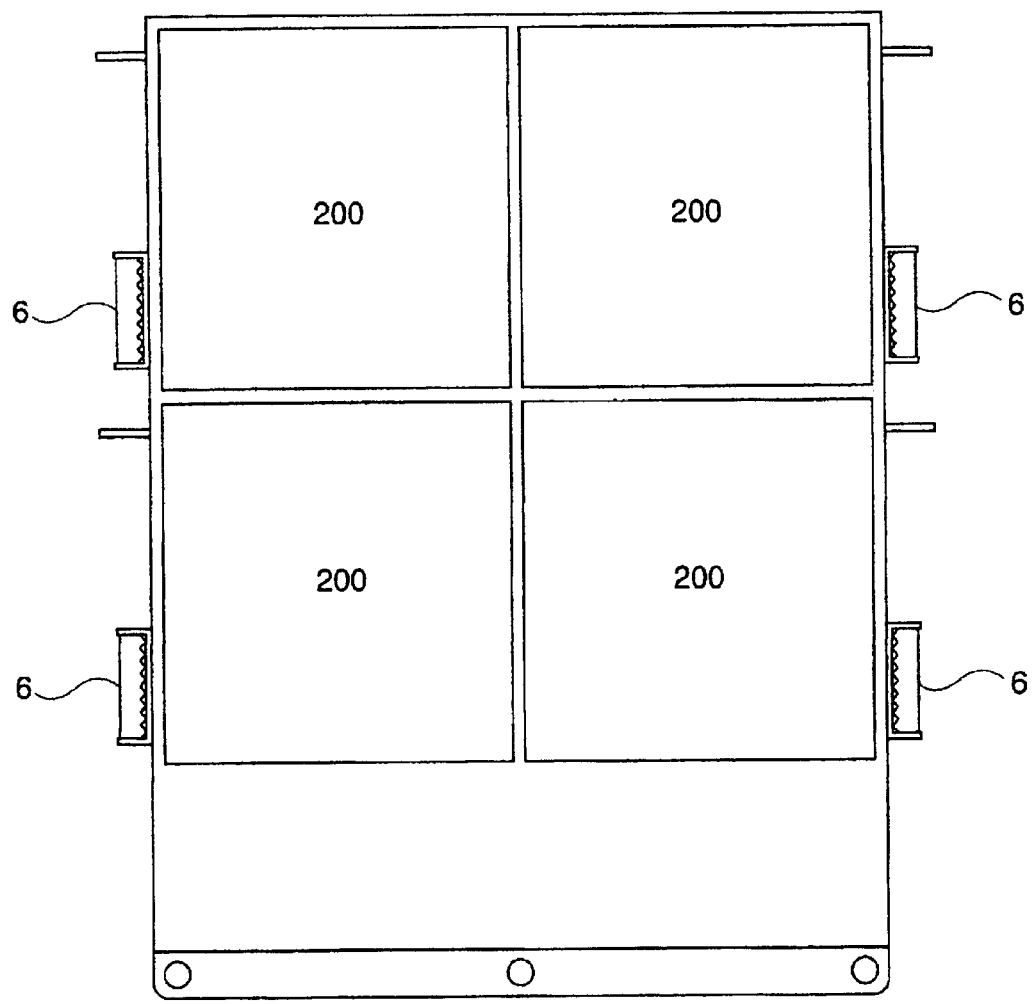
FIG. 83 is a front view of the jack post roof rack holder of the second embodiment of the present invention.

FIG. 82 is a perspective view of the rack strap of this embodiment of the present invention. FIG. 83 is an end view of the same. Clamp 821 may be mounted to a truck ladder rack, car luggage rack, or the like. Clamp 821 may be lined with compressible foam rubber 822 so as to securely grip various rack channel cross-sections without slipping.

Clamp 821 may be provided in two halves joined by hinge 825. The two halves may be attached though use of bolts or fasteners 823 which may be further secured by use of a safety clip. A strap (not shown) may be tightened by passing an end portion through one or more of buckles 826 which may be provided with a lock hole 827. Excess portions of the strap may be tied off or may be left to hang.

A padlock may be passed through lock hole 827 to prevent buckle 826 from being released. The strap may be locked to prevent loosening of the strap or petty theft or borrowing of the objects secured to the strap. Workers on a job site will be less inclined to "borrow" a jack post that is so locked. Of course, a determined thief may be able to cut the strap to release the jack post. However, an armored strap may be provided to prevent or discourage such theft.

In use, the strap may be wound around a portion of a jack post which may be inserted into one of openings 820. Note that although disclosed here in terms of a draw-tight strap, the present invention may also be applied to ratchet straps.

Two such devices may be used on either ends of a roof rack to secure several jack posts by placing the jack posts through openings 820 in the two devices.

The embodiment of the rack strap of the present invention may also be suitably modified for round tube racks. Other shapes may also be used (e.g., hexagon) without departing from the spirit and scope of the present invention.

Figure 84:
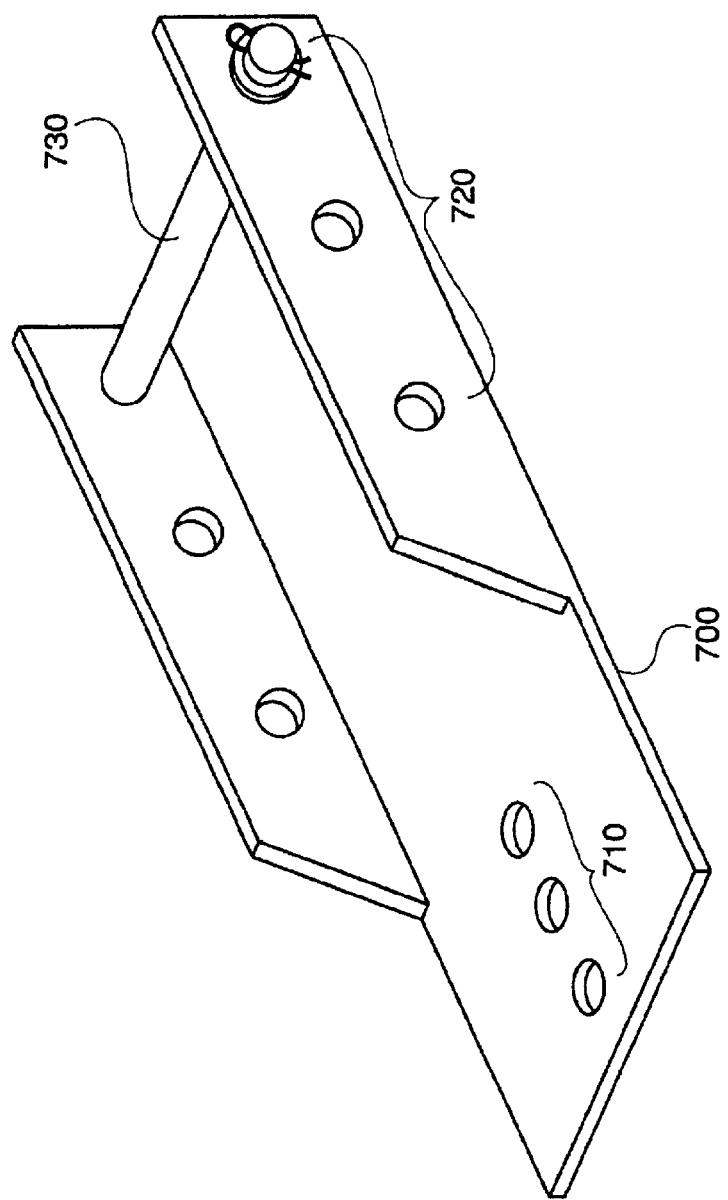
FIG. 84 is a perspective view of one embodiment of the SURETETHER™ invention.

FIG. 84 is a perspective view of another embodiment, a tie-off called Sure-Tether is provided to allow roofers to secure safety harnesses and ropes.

Plate 700 may be secured to a roof by nails or screws driven through nailing holes 710. Adjustable pin 730 may be placed through holes 720. In use, a safety line or the like may be secured to pin 730 to secure an individual or an apparatus such as a ladder or the like.

Figure 85:
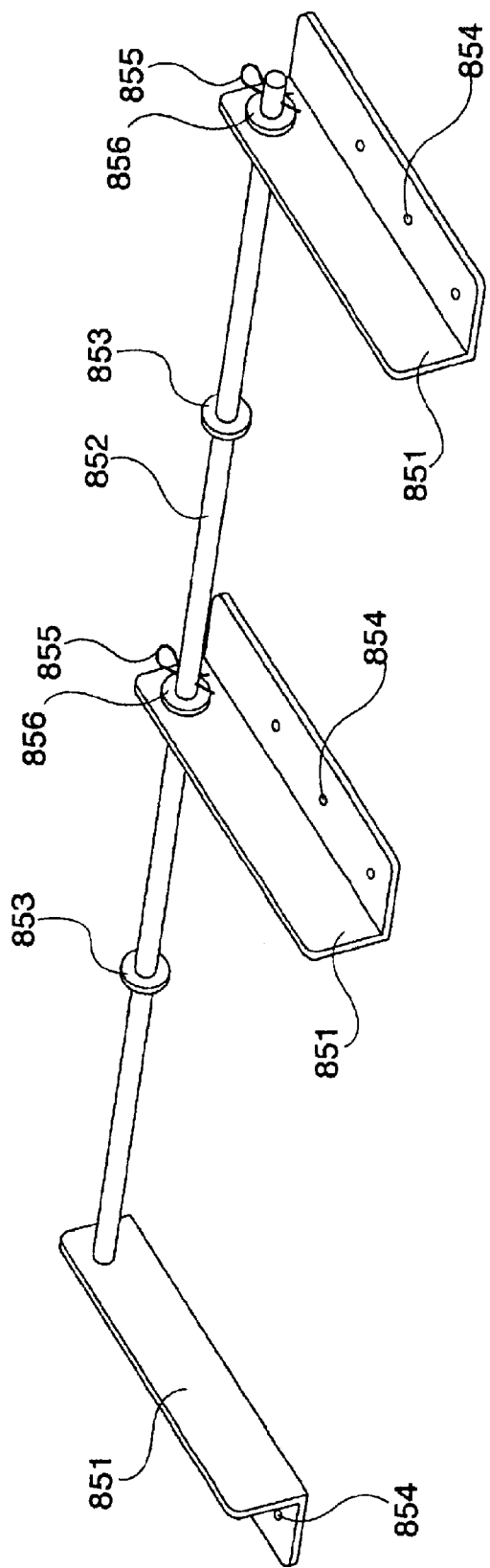
FIG. 85 is a perspective view of another embodiment of the SURETETHER™ of the present invention for roof trusses.

FIG. 85 is a perspective view of another embodiment of the SURETETHER™ embodiment of the present invention for roof trusses. This apparatus may be nailed or screwed to roof trusses (directly or through sheathing or other layers) to provide a tie-off point for tethers. Tethers amy be safety lines attached to safety harnesses for men, materials, and equipment, as well as scaffolding, ladders, and the like.

Bar 852 may be on the order of ¾" to 1" in diameter and may be made of steel or aluminum. A number of holes may be drilled in bar 852 in one foot increments (or the like) to allow insertion of pins 855 securing washers 853 and 855 (not shown for washer 853 in this drawing). A workman may clip or tie a line to bar 852. Washers 853 prevent the line from sliding along bar 852 very far.

Plates 851 may be nailed or screwed through holes 854 into roof trusses. Plates 851 are adjustable on bar 852 for different roof truss center distances (e.g., 16", 24" and the like). The overall length of bar 852 may be on the order of 6 feet, allowing for multiple tie-offs or allowing a roofer to move his tie-off as work progresses.

Figure 86:
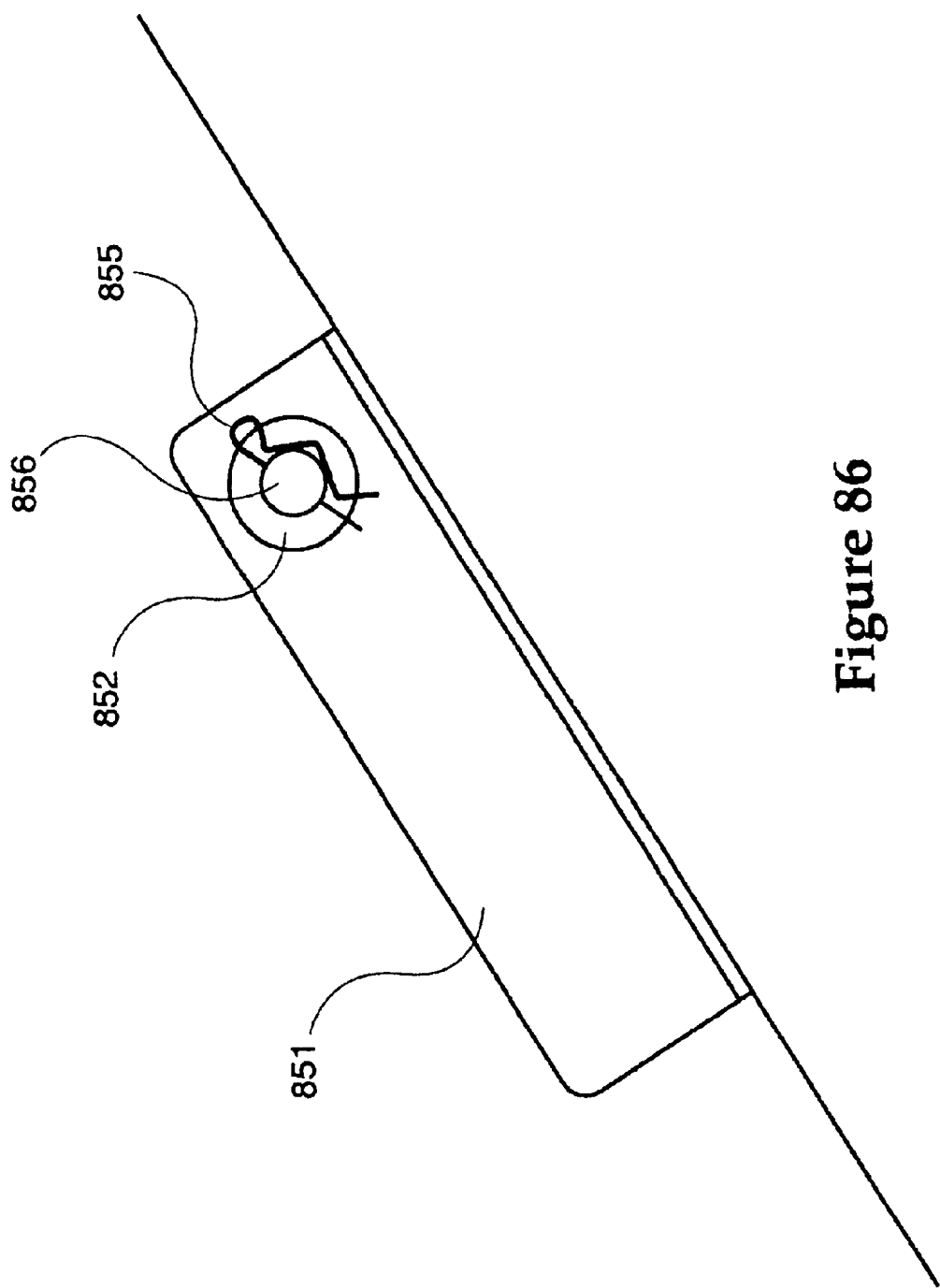
FIG. 86 is a side view of the SURETETHER™ embodiment of the present invention.
Figure 87:
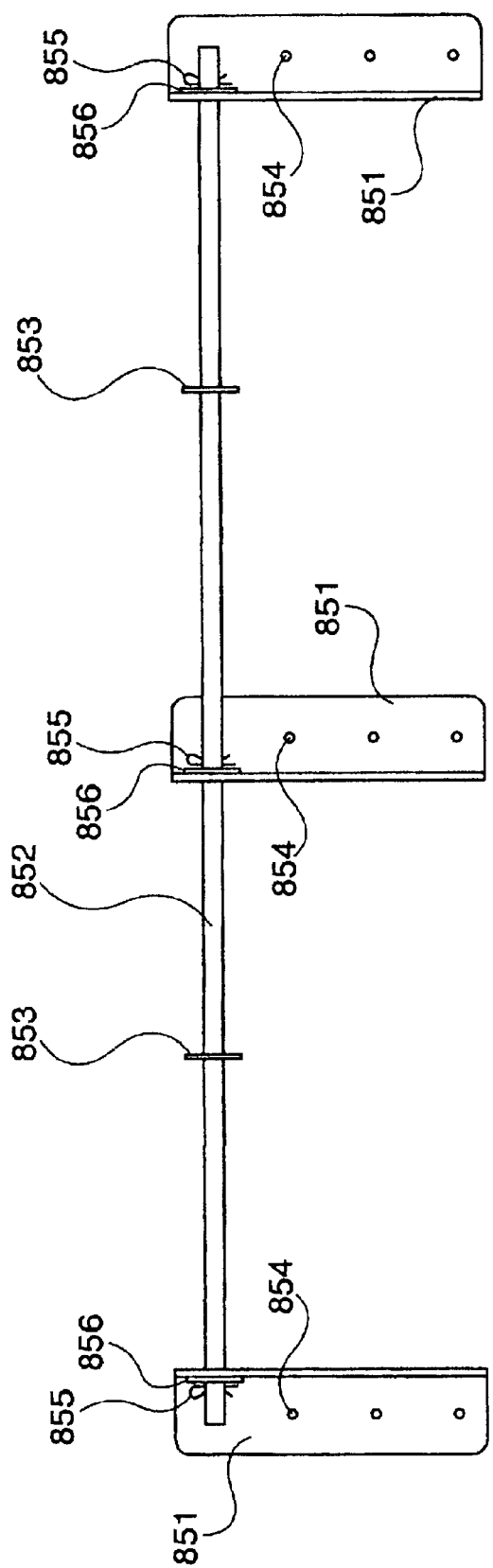
FIG. 87 is a top plan view of the SURETETHER™ embodiment of the present invention for roof trusses.

FIG. 86 is a side view of the SURETETHER™ embodiment of the present invention illustrating how the unit would appear on an inclined roof. FIG. 87 is a top plan view of the SURETETHER™ embodiment of the present invention for roof trusses.

Figure 89:
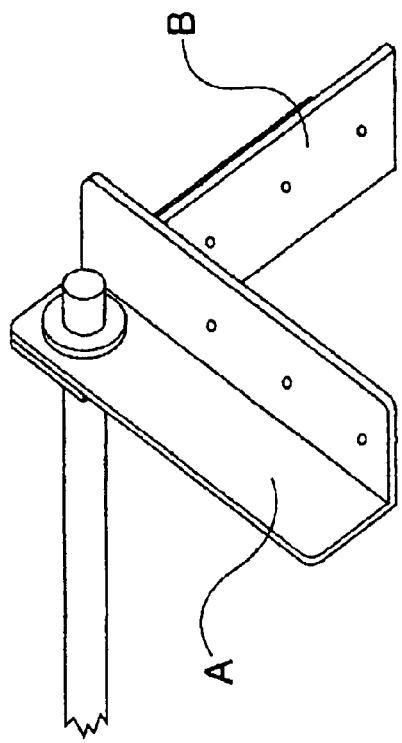
FIG. 89 is a perspective view of the alternative version SURETETHER™ embodiment of the present invention.
Figure 88:
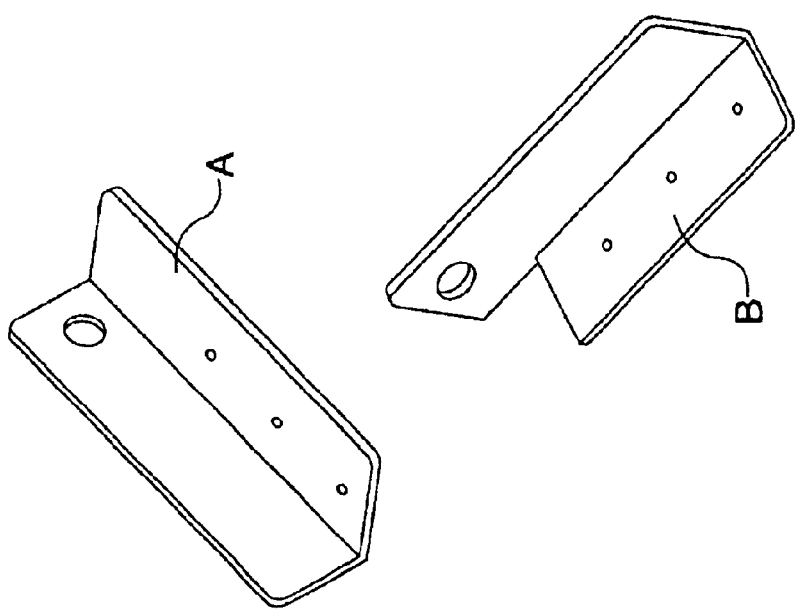
FIG. 88 is an exploded perspective view of an alternative version of the SURETETHER™ embodiment of the present invention.

FIG. 88 is an exploded perspective view of an alternative version of the SURETETHER™ embodiment of the present invention. In this embodiment, individual plates 88A or 88B may be nailed to roof trusses to provide individual tie-off points through the bar hole. FIG. 89 is a perspective view of the alternative version SURETETHER™ embodiment of the present invention of FIG. 88. In this embodiment, plates A and B are assembled on a bar to hold a tie-off bar on a roof peak such that the tie-off bar is accessible to both sides of the roof.

Figure 90:
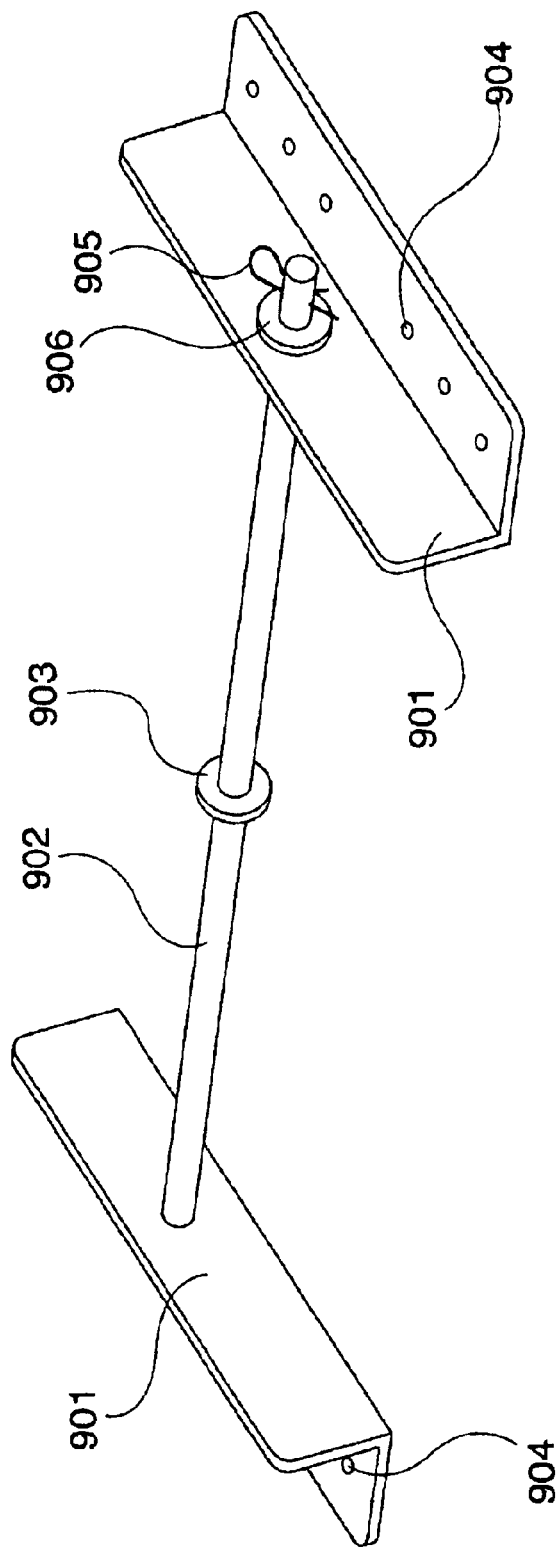
Figure 91:
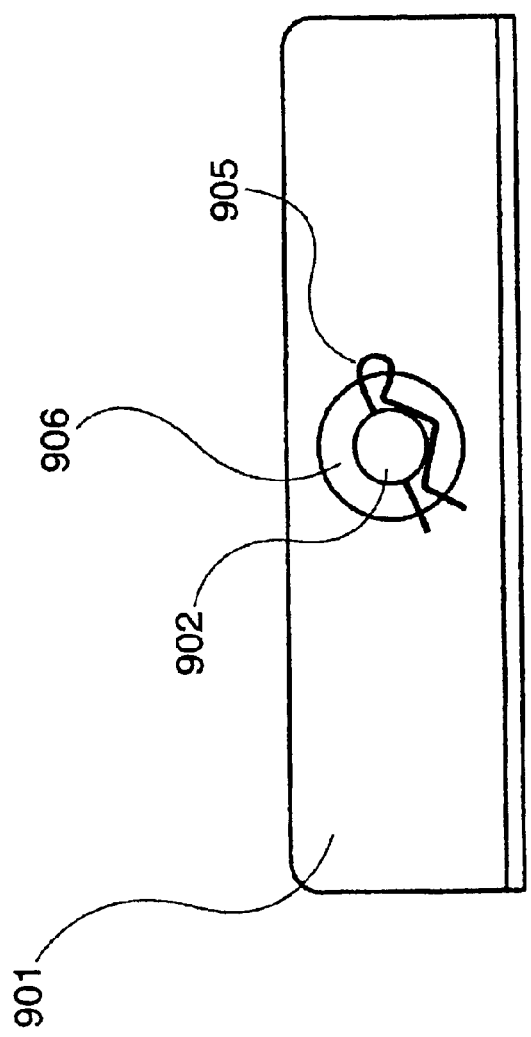
FIG. 91 is a side view of the SURETETHER™ embodiment of the present invention.
Figure 92:
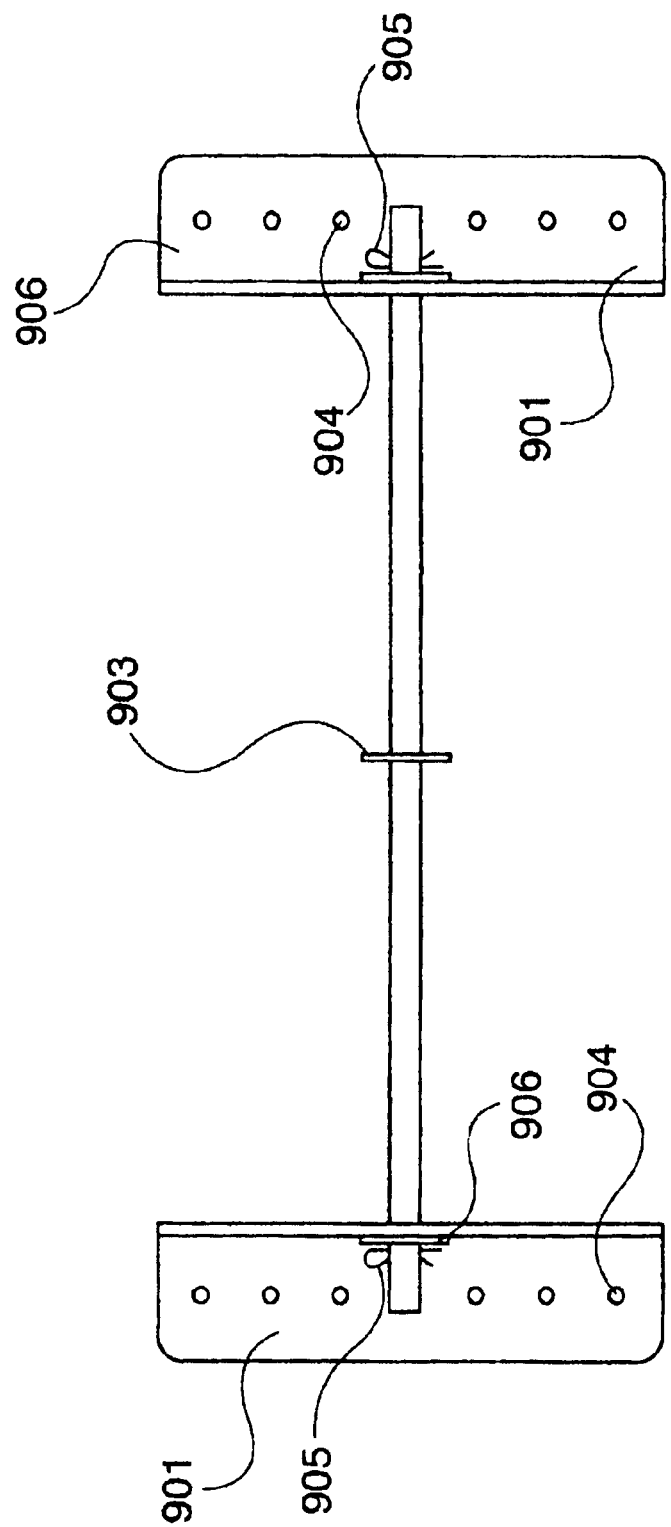

FIG. 90 is a perspective view of the SURETETHER™ embodiment of the present invention for walls and the like. This shorter, smaller embodiment may be used also on roofs. The spacing between plates 901 may be on the order of two feet to allow nailing to wall studs. FIG. 91 is a side view of the SURETETHER™ embodiment of the present invention. FIG. 92 is a side view of the SURETETHER™ embodiment of the present invention shown on a wall or flat surface.

In FIGS. 90–92, plates 901 may be secured to a roof by nails or screws driven through nailing holes 904. Bar 902 may be on the order of ¾" to 1" in diameter and may be made of steel or aluminum. Holes may be drilled in bar 902 in to allow insertion of pins 905 securing washers 906. A workman may clip or tie a line to bar 902. A washers 903 may be welded to bar 902 or secured by clips, to prevent the line from sliding along bar 902 very far.

Plates 901 may be nailed or screwed through holes 904 into roof trusses. Plates 901 may be adjustable on bar 902 for different roof truss center distances (e.g., 16", 24" and the like). The overall length of bar 902 may be on the order of two feet, allowing for multiple tie-offs or allowing a roofer to move his tie-off as work progresses.

Figure 93:
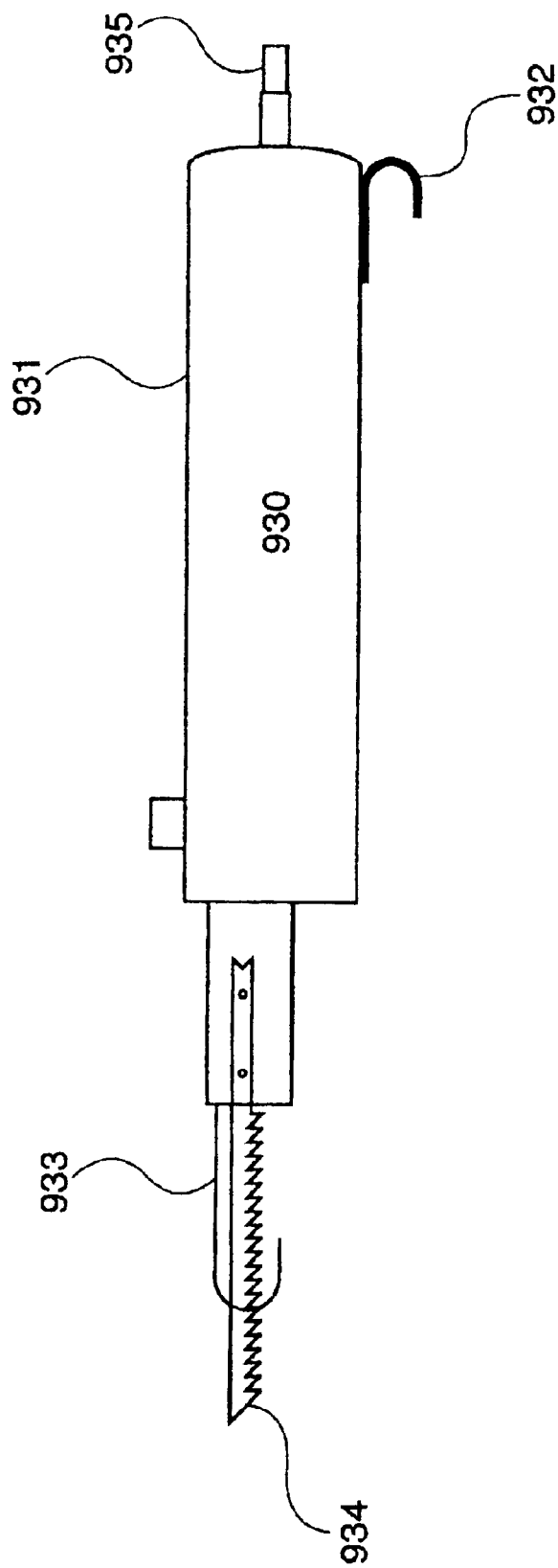
FIG. 93 is a side view of a pneumatic powered roof shingle cutting tool of the present invention.

FIG. 93 is a side view of a pneumatic powered roof shingle cutting tool of the present invention. When installing roofing materials, it is often necessary to cut shingles either before installation, or in situ. For example, when building a roof "Valley", shingles may be installed over the valley, and then later cut to the valley "V" shape. Traditionally, a knife has been used for such cuts. However, there is little precision in depth of cut with a knife, and in addition, such a cut can be laborious and difficult. Too deep a cut may create roof leaks.

Power tools are generally not well suited to cutting shingles. Most are heavy and require electrical power. In addition, large power tools present a hazard to workers below if they fall off the roof. What is needed is a small powered tool which can cut shingles accurately and cleanly. The SHINGLESAW™ 930 of FIG. 93 is, in the preferred embodiment, a pneumatically powered miniaturized reciprocating saw designed especially for roofing applications. In an alternative embodiment, SHINGLESAW™ 930 may be powered by rechargeable battery packs or the like.

SHINGLESAW™ 930 may be provided with a cutting blade 932 of approximately 2" in length. SHINGLESAW™ 930 may be sized to fit in one hand, much as a prior art razor knife is designed to fit. Adjustable depth gauge 933 may be adjusted to control depth of cut and prevent blade 932 for piercing underlayment or the like. A hook 932 may be provided to allow SHINGLESAW™ to be clipped to a belt or the like. Air chuck 935 allows SHINGLESAW™ to be connected to an air line (such as used for roofing nail guns or the like).

Figure 108:
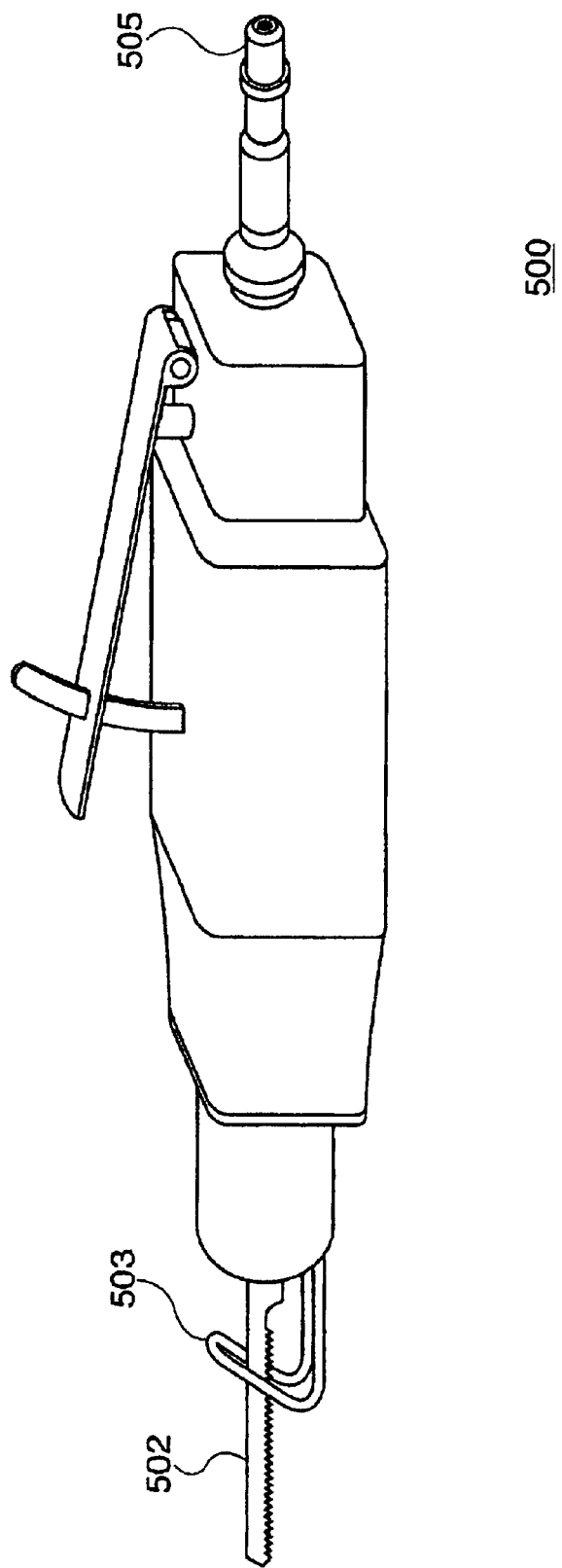
FIG. 108 is a side view of a pneumatic powered roof shingle cutting tool (SHINGLESAW™) of the present invention.

The SHINGLESAW™ 500 of FIG. 108 is, in the preferred embodiment, a pneumatically powered miniaturized reciprocating saw designed especially for roofing applications. In an alternative embodiment, SHINGLESAW™ 500 may be powered by rechargeable battery packs or the like.

SHINGLESAW™ 500 may be provided with a cutting blade 502 of approximately 2" in length. SHINGLESAW™ 500 may be sized to fit in one hand, much as a prior art razor knife is designed to fit. Adjustable depth gauge 503 may be adjusted to control depth of cut and prevent blade 502 for piercing underlayment or the like. Air chuck 505 allows SHINGLESAW™ to be connected to an air line (such as used for roofing nail guns or the like).

FIG. 151 is a side view of a pneumatic powered roof shingle cutting tool or SHINGLESAW™ of the present invention. The SHINGLESAW™ 2800 of FIG. 151 is, in the preferred embodiment, a pneumatically powered miniaturized rotary saw designed especially for roofing applications. In an alternative embodiment, SHINGLESAW™ 2800 may be powered by rechargeable battery packs or the like.

SHINGLESAW™ 2800 may be provided with a rotary double-edged cutting blade 2860 of approximately 2" in length. Other numbers of edges may also be used (e.g., four edges). In another embodiment, removable carbide blade inserts may be provided on blade element 2860. Such carbide blade inserts may be held in place by setscrew, clip, or the like. Carbide provides the necessary hardness to withstand the abrasive environment of shingle-cutting, as the asphalt and abrasive grit of shingles may wear down a regular steel blade rapidly.

SHINGLESAW™ 2800 may be sized to fit in one hand, much as a prior art razor knife is designed to fit. Adjustable depth gauge 2840 may be adjusted via wing nut 2810 to control depth of cut and prevent blade 2860 from piercing underlayment or the like. A safety guard 2850, similar to that of a circular saw, only suitably miniaturized, may be provided to protect the user. Air chuck 2830 allows SHINGLESAW™ to be connected to an air line (such as used for roofing nail guns or the like). Lever 2820 may activate an air switch to activate the pneumatic actuator of SHINGLESAW™ 2800.

FIG. 169 is a front perspective view of another embodiment of the SHINGLESAW™ of the present invention. FIG. 170 is a rear perspective view of another embodiment of the SHINGLESAW™ of the present invention. This embodiment of SHINGLESAW™ illustrates the first production model to be marketed by the assignee of the present invention, A Prior Art angle grinder airmotor 1691 is provided with a saw housing assembly 1692 formed of anodized aluminum, clamped to the output portion of the airmotor.

The airmotor may be provided with a quickconnect 1693 to allow it to be connected to an air line such as used by a roofer for a nailgun or the like. A safety 1694 may be provided to the lever switch 1695 to prevent a user from accidently activating the SHINGLESAW™ 1690. The blade housing and guard 1692 may be pivotally mounted to the shoe plate 1696 by means of an adjustable wingnut 1697 so as to allow for depth control of the cut. Note the four bladed saw 1698 in FIG. 169, with each blade provided with a carbide tip (not shown).

SHINGLESAW™ unlike Prior Art circular saws and the like, is small enough to fit in roof valleys and other tight areas where larger saws will not fit. Unlike rechargeable battery-powered saws, the SHINGLESAW™ in the embodiment of FIGS. 169, uses air power, and thus has the power and capacity for extended work.

SINGLESAW™ may also be provided with a cutting guide attached to the underside of shoe plate 1696, behind blade 1698 to act as a cutting guide in a similar manner to a rip fence on a circular saw, but to make flush cuts such as on the edge of a roof, such that the saw blade will cut flush with the drip edge without the saw blade cutting the drip edge itself.

FIG. 171 is a side view of a blade design for the SHINGLESAW™ of the present invention. In this design, six blade tips are provided, each with a carbide insert. The shape of the blade is designed to prevent the blade from "loading up" with roofing tar and debris. The blade in the preferred embodiment is 3⅜" in diameter, but may also be made in 4", 6" and even standard circular saw sizes (e.g., 7.22" or the like). However, in the preferred embodiment the saw blade is made smaller to keep the overall tool size compact and also to allow the low-torque air motor sufficient leverage to cut the shingles.

FIG. 172 is a side view of a second blade design for the SHINGLESAW™ of the present invention. FIG. 173 is a side view of a third blade design for the SHINGLESAW™ of the present invention. In these designs, which may have the same diameters as the saw blade discussed above, are provided with a "chipper" design carbide insert. FIG. 174 is an enlarged perspective view of a blade tooth design for the SHINGLESAW™ of the present invention illustrating this chipper design. This chipper design saw blade tooth helps prevent buildup of tar and other roofing debris on the saw blade.

Different blade and blade teeth designs may be employed to cut different types of materials such as wood, metal, or the like. While disclosed in the preferred embodiment as cutting shingle materials, the SHINGLESAW™ may be used to cut other materials. Unlike Prior Art circular saw blades, which are designed to make thin cuts, the SHINGLESAW™ blade is approximately ¼" thick to make a wide cut without binding in the cut material. Experiments with Prior Art circular saw blades shows these blades to bind when cutting through several layers of roofing material.

FIG. 175 is a side view of another embodiment of the SHINGLESAW™ of the present invention. In this embodiment, a rechargeable battery 1751 is provided to run the saw. Rechargeable battery powered saws are known in the art. The saw 1752 of FIG. 175 may be provided with the unique blade design of the present invention. In addition, the saw 1752 of FIG. 175 may be designed to run on tubular rechargeable batteries 1751 known in the art.

FIG. 183 is a perspective view of another embodiment of the SHINGLESAW™ of the present invention. FIG. 184 is a side view of another embodiment of the SHINGLESAW™ of FIG. 183. This embodiment of the SHINGLESAW™ is designed to cut up existing shingles prior to their removal. In the Prior Art, roofers removed shingles with "roofer's shovels", shovels with a sharpened saw-tooth edge. By driving a such a shovel up underneath the shingles, the shingle nails could be cut and the shingles removed. However, since the shingles overlap, a portion of adjacent shingles would be pulled up, making the job messy, as shingles and portions of shingles would be removed or partially removed.

The apparatus of FIGS. 183 and 183 solves this problem by providing a plurality of cutting blades 1831 similar to those described above in connection with the other embodiments of SHINGLESAW™. These blades 1831 are arranged in parallel, approximately 6" apart. When run up and down a roof, this version of SHINGLESAW™ cuts the roof into strips which can then be easily removed with a roofer's shovel.

A depth control 1834 prevents this version of SHINGLE-SAW™ from cutting into the roof structure and controls depth by adjusting the position of shoe plate 1832. A handle 1841 may be provided with a power cord 1842 and control switch 1843. The apparatus may be powered by an electric motor 1833 or air motor, although in the preferred embodiment an electric motor is used to provide the needed power and torque to drive the multiple saw blades.

Figure 94:
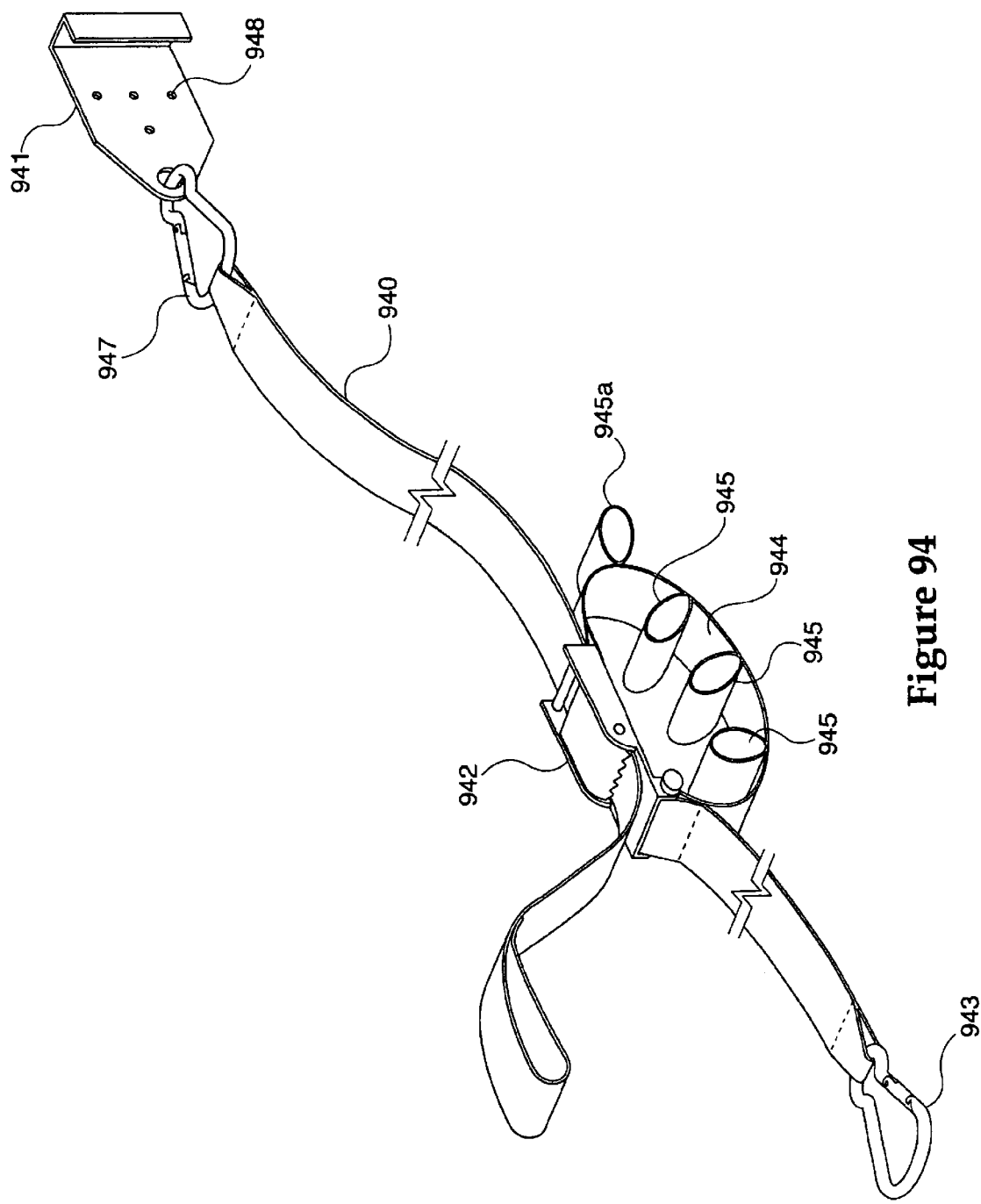
FIG. 94 is a perspective view of another embodiment of the "soft" version of the SUREFOOT™ invention of the present invention.

FIG. 94 is a perspective view of an embodiment of the "soft" version of the SUREFOOT™ invention of the present invention. In the embodiment of FIG. 94, a clip 941 may be provided which may be attached to a roof surface or other feature via its clip portion of by nail holes 948. The main portion of this embodiment comprises a strap 940 which may be fed through buckle 942. Also attached to buckle 942 is loop-strap 944 provided with sewn loops 945. loop-strap 944 may be wrapped around one leg of a ladder or the like, with sewn loops 945 gripping the ladder leg. Buckles 943, 947 may be used to tie-off to clip 941, other features, or to a user.

Figure 95:
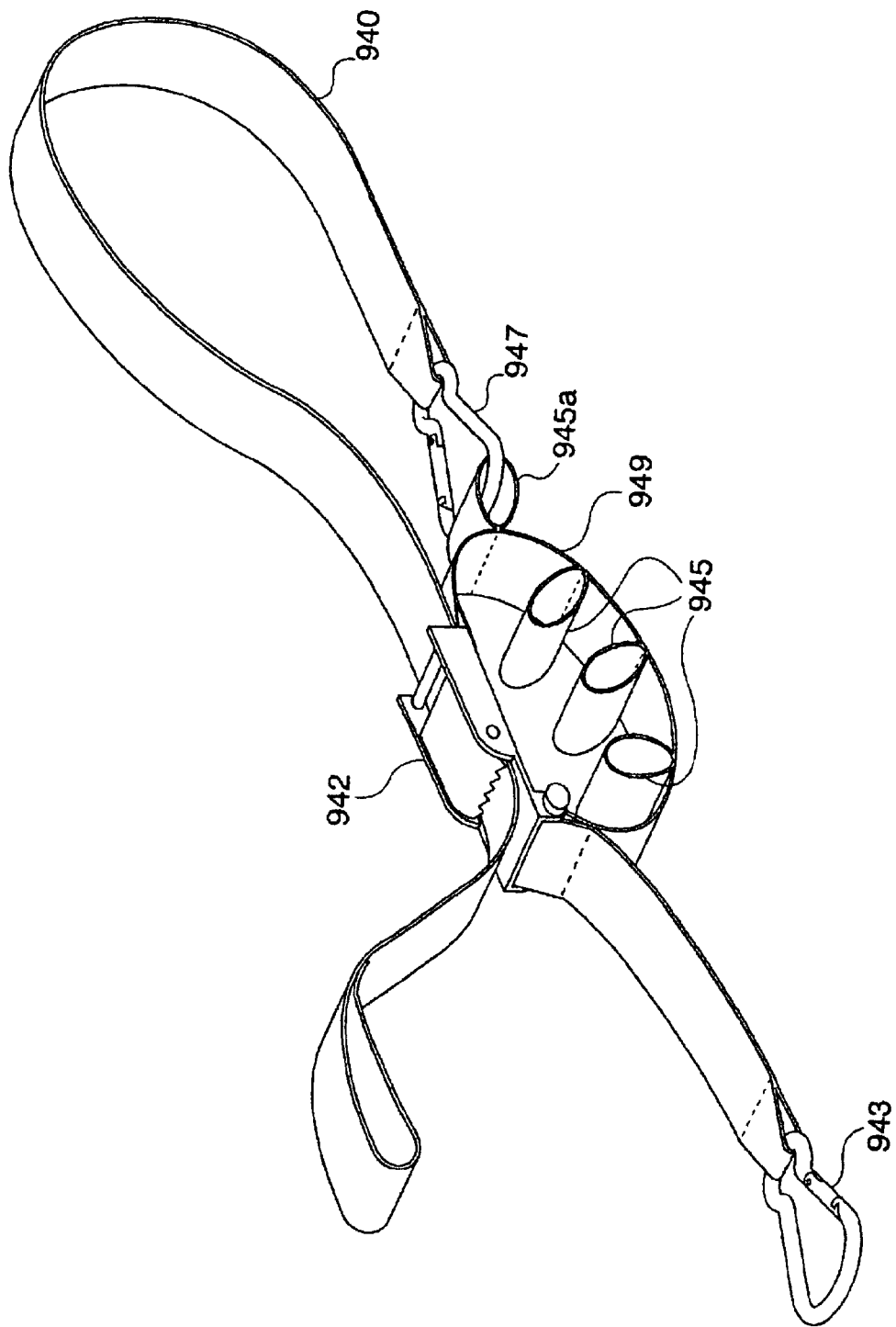
FIG. 95 is a perspective view of another embodiment of the "soft" version of the SUREFOOT™ invention of the present invention.

FIG. 95 is a perspective view of another embodiment of the "soft" version of the SUREFOOT™ invention of the present invention. In the illustration of FIG. 95, clip 947 may be attached to outer sewn loop 945a. In this manner, strap 940 may be secured around an object, such as a tree or utility pole or the like.

Figure 96:
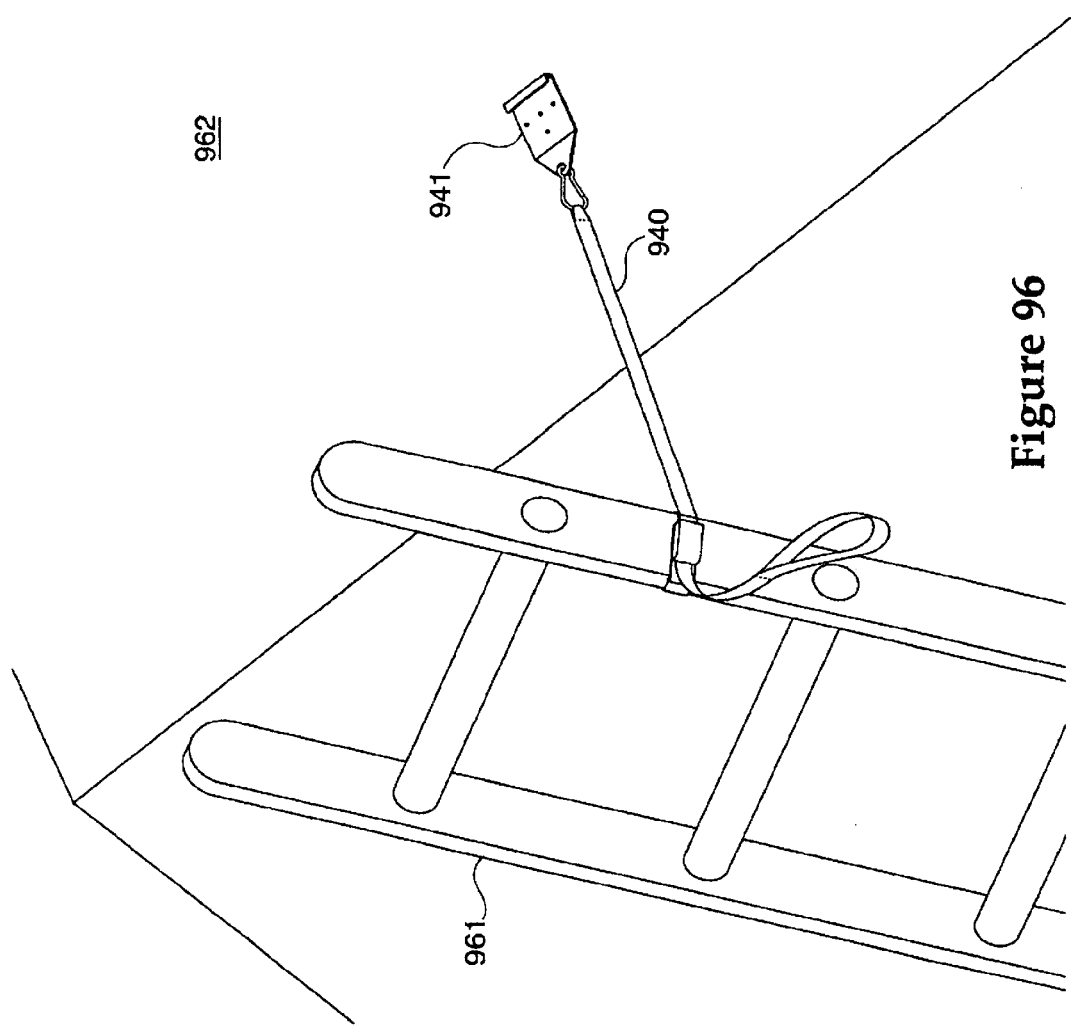
FIG. 96 is a perspective view of another embodiment of the "soft" version of the SUREFOOT™ invention of the present invention, illustrating how the invention may be used to secure a ladder to a roof.

FIG. 96 is a perspective view of another embodiment of the "soft" version of the SUREFOOT™ invention of the present invention, illustrating how the invention may be used to secure a ladder 961 to a roof 962. In this embodiment, clips 941 may be secured to the roof 962 by nails or the like. In an alternative embodiment, clops 941 may be permanently attached to roof 962 at predetermined intervals at the roof edge (e.g., portion of clip beneath shingle edge) or may be attached to soffits, gutter hardware, or the like. In this manner, clips may be installed for later use in cleaning gutters, roof access, and the like. Clips 941 may be suitably shaped for such applications.

Figure 97:
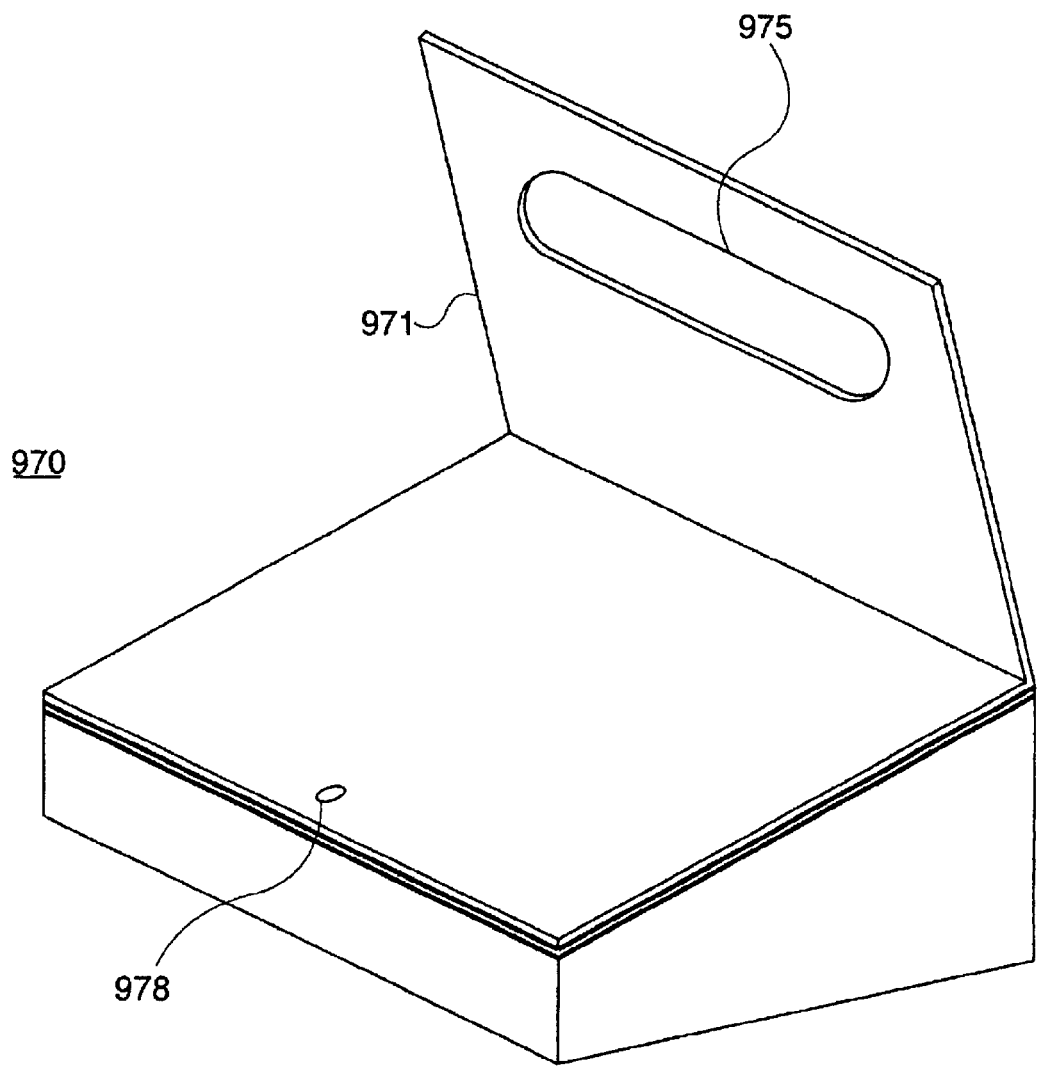
FIG. 97 is a perspective view of another embodiment of the SHINGLE WEDGE™ of the present invention.
Figure 98:
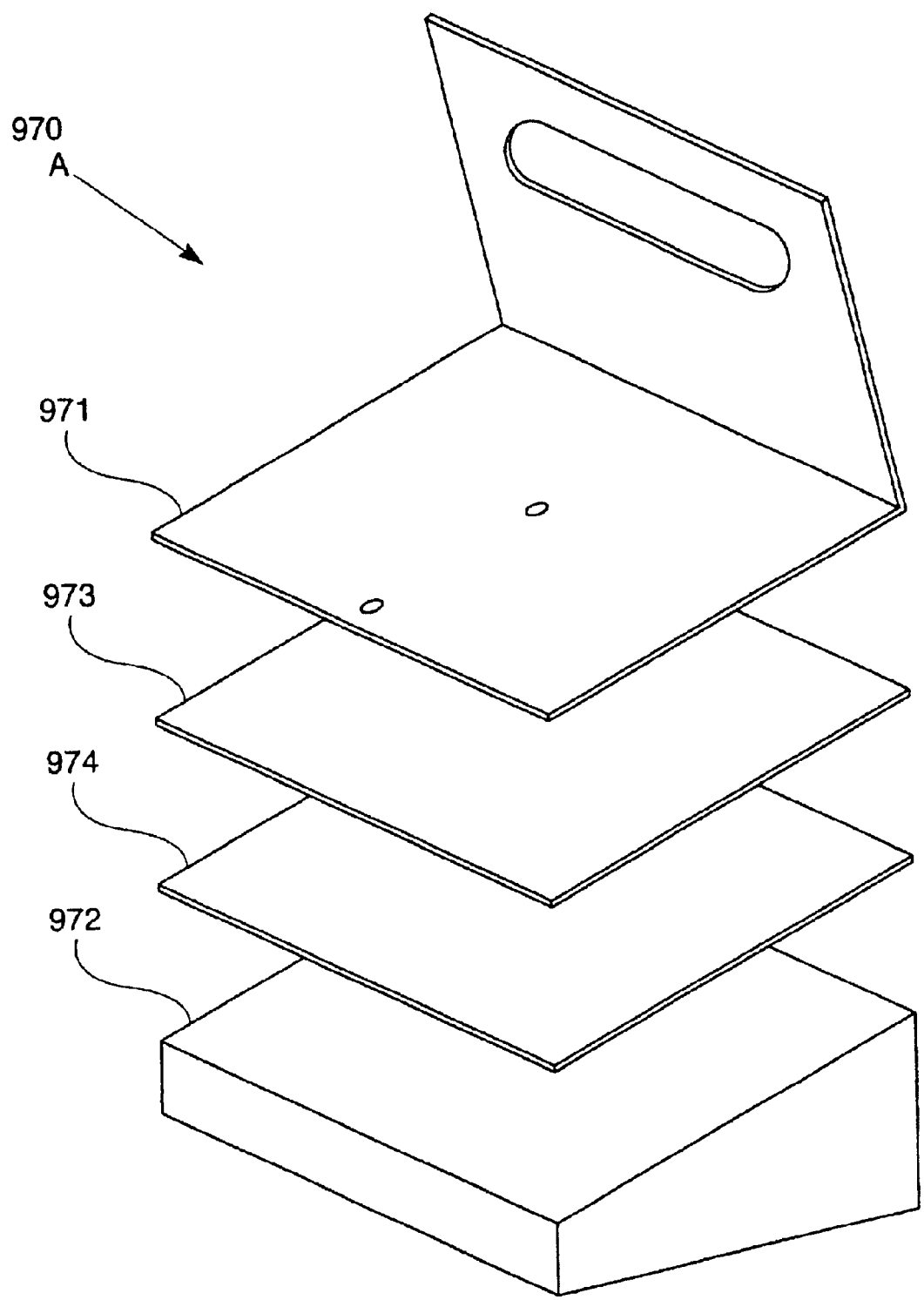
FIG. 98 is an exploded perspective view of the SHINGLE WEDGE™ of FIG. 97.
Figure 99:
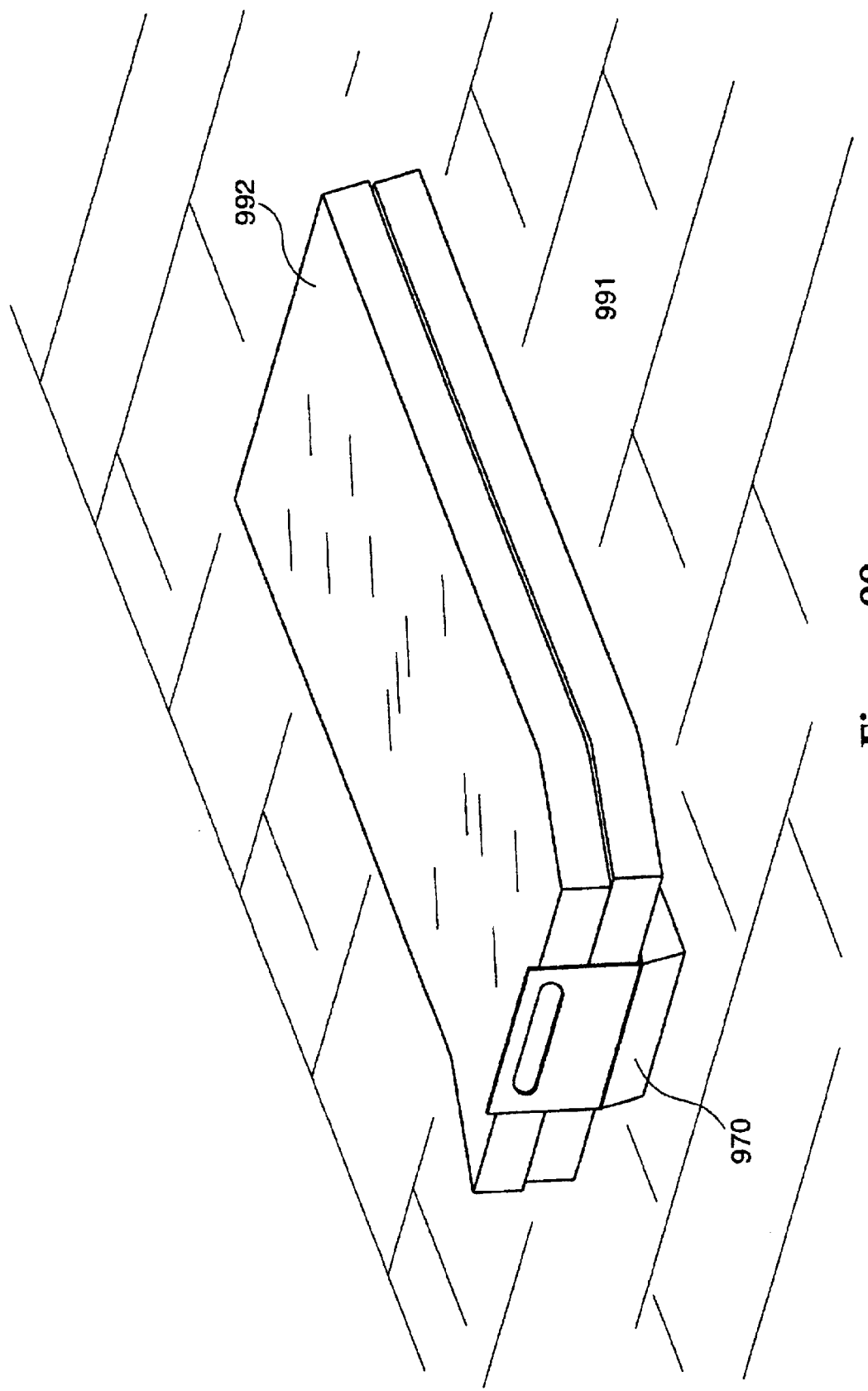
FIG. 99 is a perspective view of the SHINGLE WEDGE™ of FIG. 97, in use on a roof.

FIG. 97 is a perspective view of another embodiment of the SHINGLE WEDGE™ of the present invention. FIG. 98 is an exploded perspective view of the SHINGLE WEDGE™ of FIG. 97. FIG. 99 is a perspective view of the SHINGLE WEDGE™ of FIG. 97, in use on a roof. SHINGLE WEDGE™ 970 comprises an aluminum or steel base plate 971 bent into an "L" shape with handle 975 and nail hole 978. Wedge-shaped foam insert 972 may be attached to base plate 971 via velcro pieces 973 and 974.

Thus, as foam insert 972 wears, it may be replaced simply by removing it using the velcro fasteners 973 and 973. In an alternative embodiment, foam insert 972 may be glued or otherwise fastened to base plate 971. Foam insert 972 may comprise expanded polyurethane foam such as that used for furniture cushions and the like and commonly available at fabric stores and the like. Other elastomeric materials may be substituted for foam insert 972 without departing from the spirit and scope of the present invention.

As illustrated in FIG. 99, SHINGLE WEDGE™ may be placed on a roofing surface, preferably with one end wedged beneath the lower edge of an existing shingle. A nail, screw, or other fastener may be driven through nail hole 978 to secure the apparatus to the roof 991. Packages (bundles) of shingles 992 may then be placed on the roof 991 and SHINGLE WEDGE™ 970. SHINGLE WEDGE™ 970 prevents the shingles 992 from sliding off the roof. When in use, the apparatus can be easily and readily moved about the roof as work progresses.

Figure 100:
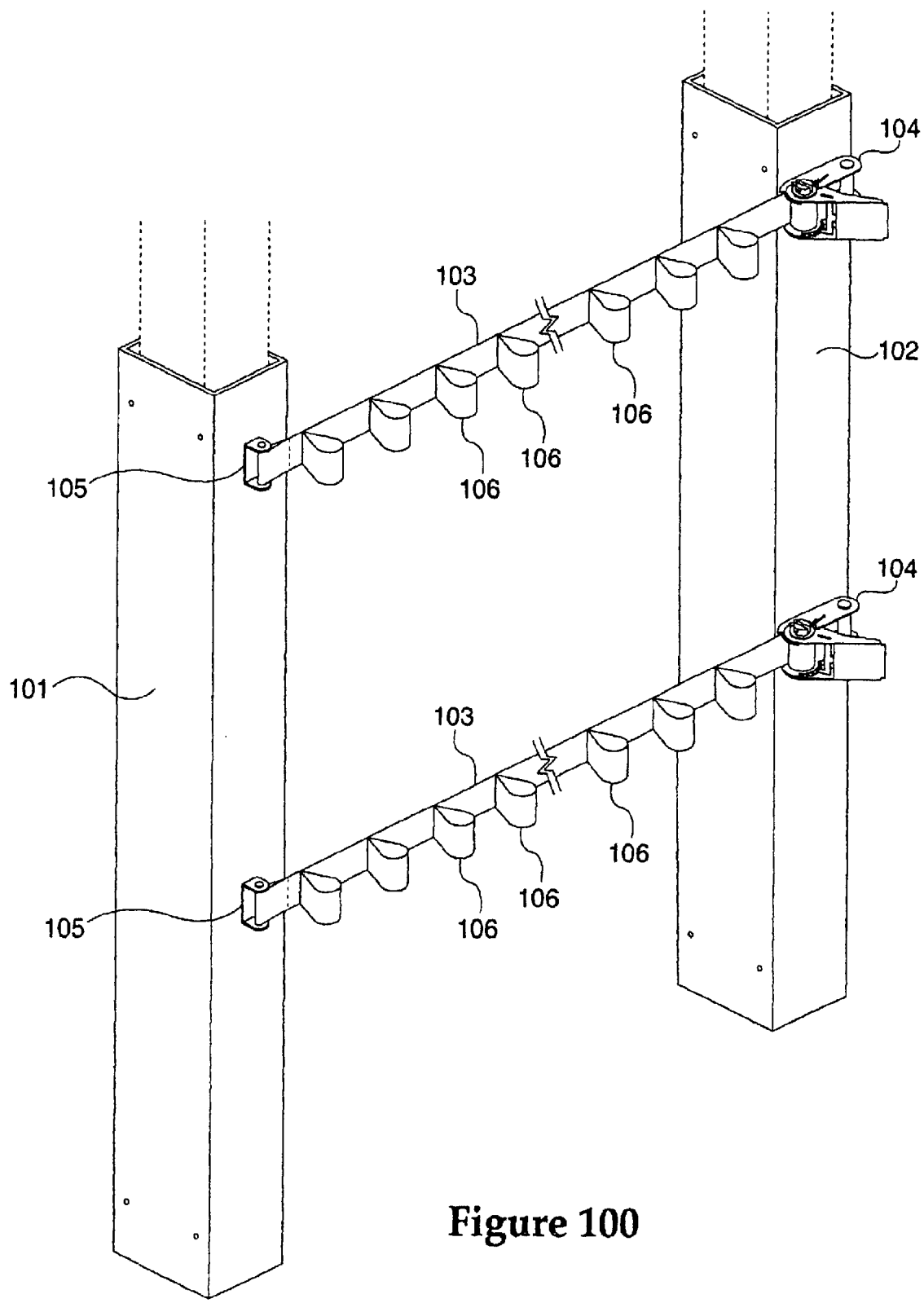
FIG. 100 is a perspective view of an embodiment of the "soft" version of the SURETETHER™ invention of the present invention, illustrating installation using jack post sleeves.

FIG. 100 is a perspective view of an embodiment of the "soft" version of the SURETETHER™ invention of the present invention, illustrating installation using jack post sleeves 101 and 102. Jack post sleeves 101 and 102 may be slid over scaffold jack posts and held in place by gravity (e.g., against scaffold supports) or by a clamping mechanism or the like.

Attached to jack post sleeve 101 is a attachment point 105 for a strap 103 which is attached to jack post sleeve 102 via ratchet strap 104. When properly set up, strap 103 is maintained in tension. Strap 103 is provided with a plurality of sewn-in loops 106 to use as tie-off locations for workers.

Figure 101:
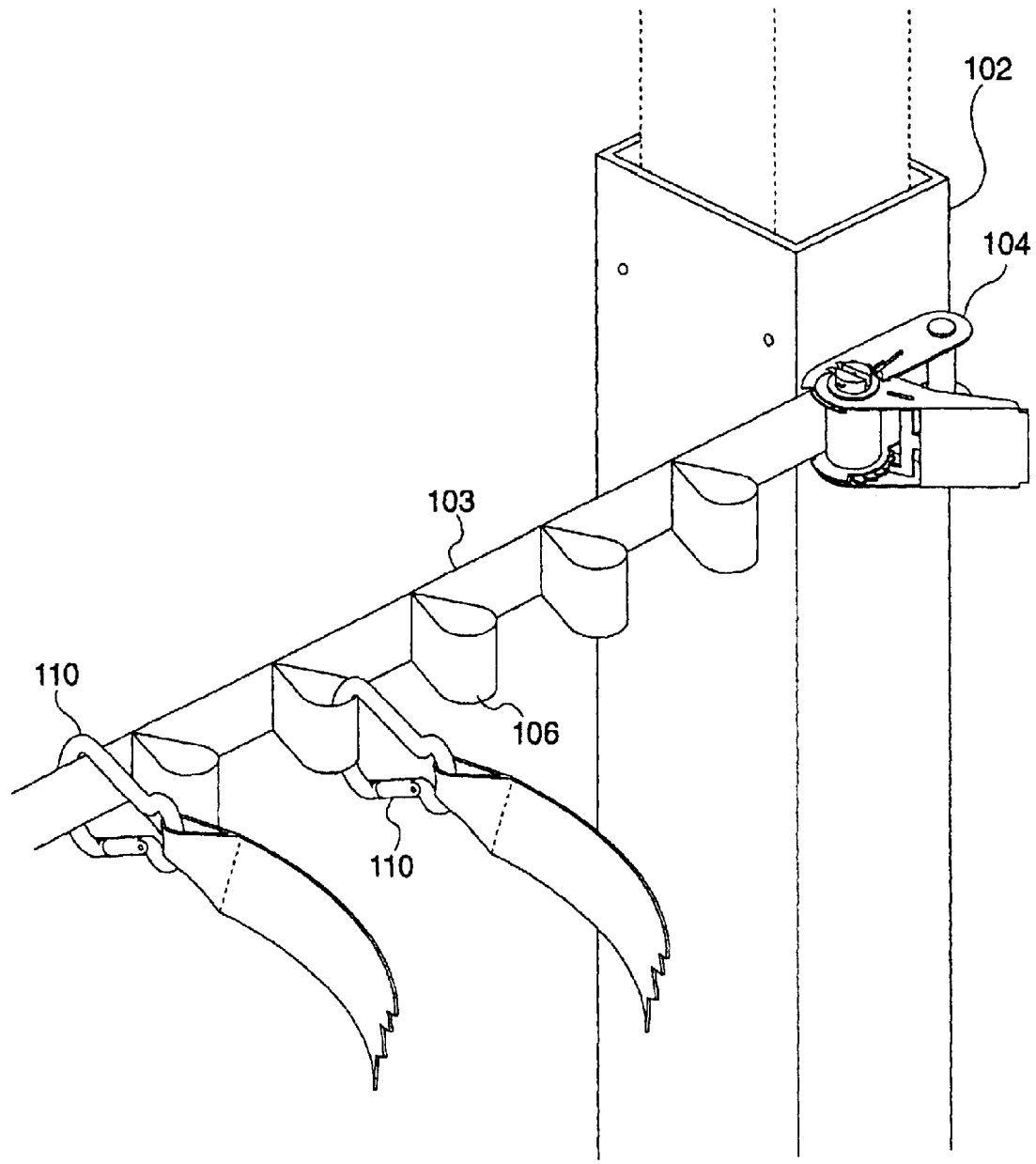

FIG. 101 is a perspective view of another the "soft" version of the SURETETHER™ of FIG. 100 illustrating how safety straps may be clipped on. A worker can move down the strap by attaching his safety harness clip 110 over the strap and sliding it along as he moves. Once in a localized position, the worker can then attach to one of the plurality of sewn-in strap loop 106, as illustrated in FIG. 101.

Figure 102:
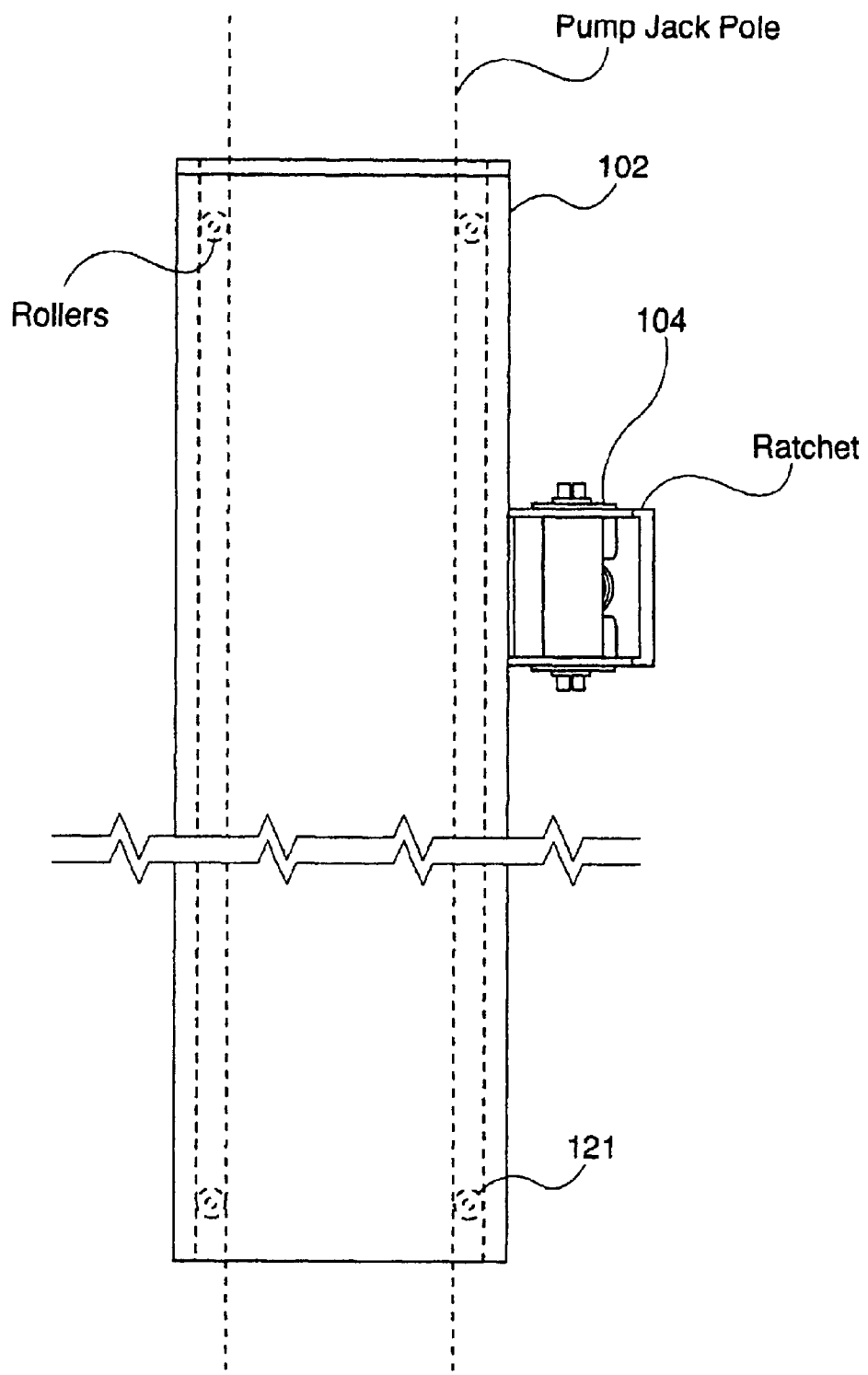
FIG. 102 is a perspective view of another embodiment of the "soft" version of the SURETETHER™ invention of the present invention, illustrating how the pump jack sleeves may be provided with a rolling mechanism to allow for movement with work.

FIG. 102 is a perspective view of another embodiment of the "soft" version of the SURETETHER™ invention of the present invention, illustrating how the pump jack sleeves may be provided with a rolling mechanism to allow for movement with work. Rollers 121 may be provided within jack post sleeve 102 (and 101) to allow the jack post sleeve to freely slide along the jack post as the scaffolding is jacked up the post.

Figure 103:
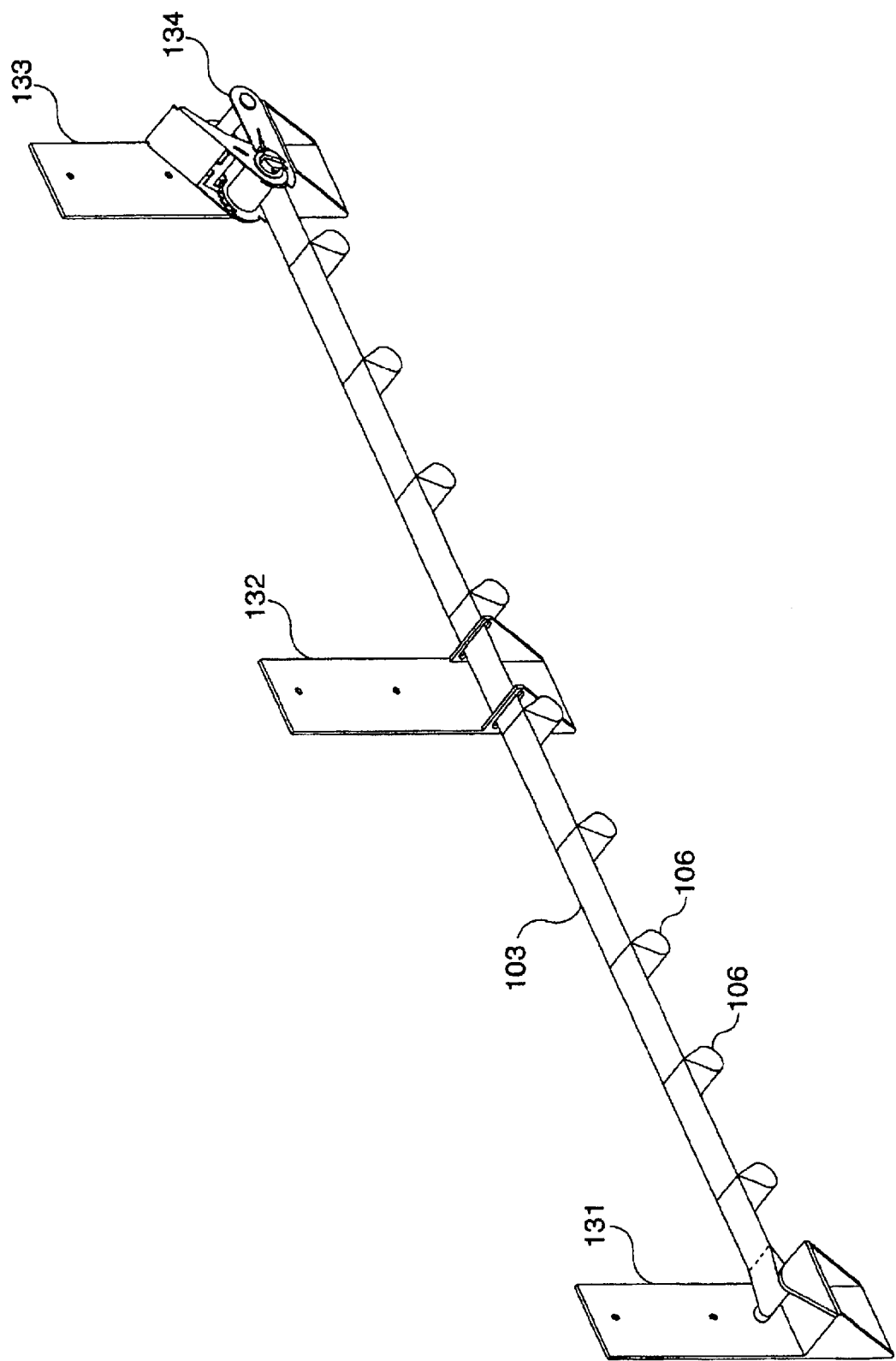
FIG. 103 is a perspective view of another embodiment of the "soft" version of the SURETETHER™ invention of the present invention, illustrating a wall- or roof-mounted embodiment.

FIG. 103 is a perspective view of another embodiment of the "soft" version of the SURETETHER™ invention of the present invention, illustrating a wall- or roof-mounted embodiment. In this embodiment, strap 103 is attached to a roof or wall surface using plate 131, 132, and 133, the latter of which is attached to ratchet 134.

Figure 104:
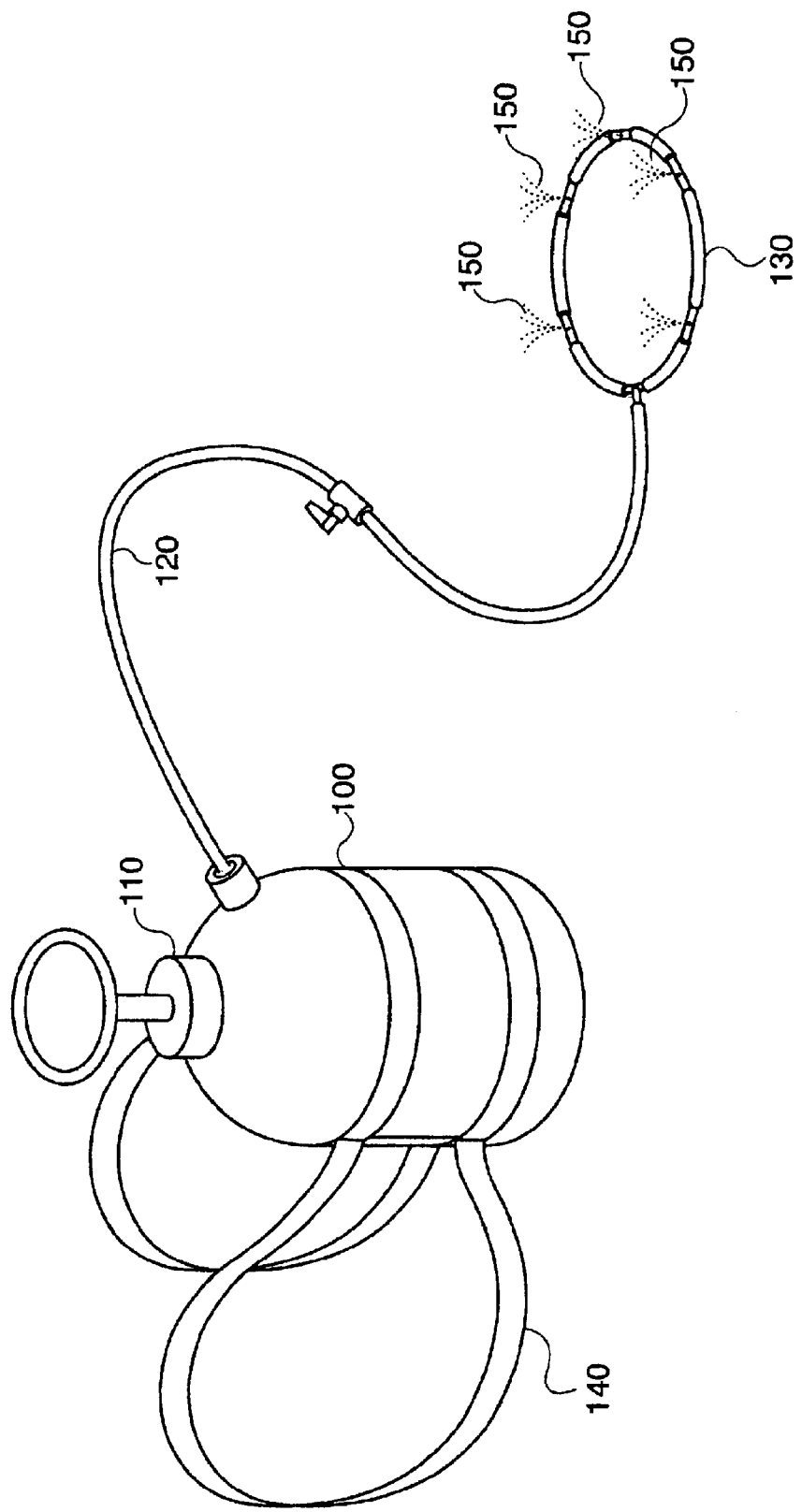
FIG. 104 is a perspective view of a cooling system provided to spray water on the face and neck area of an individual.

FIG. 104 is a perspective view of a cooling system provided to spray water on the face and neck area of an individual. A large liquid reservoir 100, which may be molded to the shape of the back, is provided with a pressure pump 110. Reservoir 100 may be pressurized to force liquid through flexible tube 120. Spray or misting nozzles 150 may be provided to spray the user's head and neck area to provide cooling. A valve (not shown) may be provided to allow the user to control the flow rate and/or turn the apparatus on or off.

Figure 105:
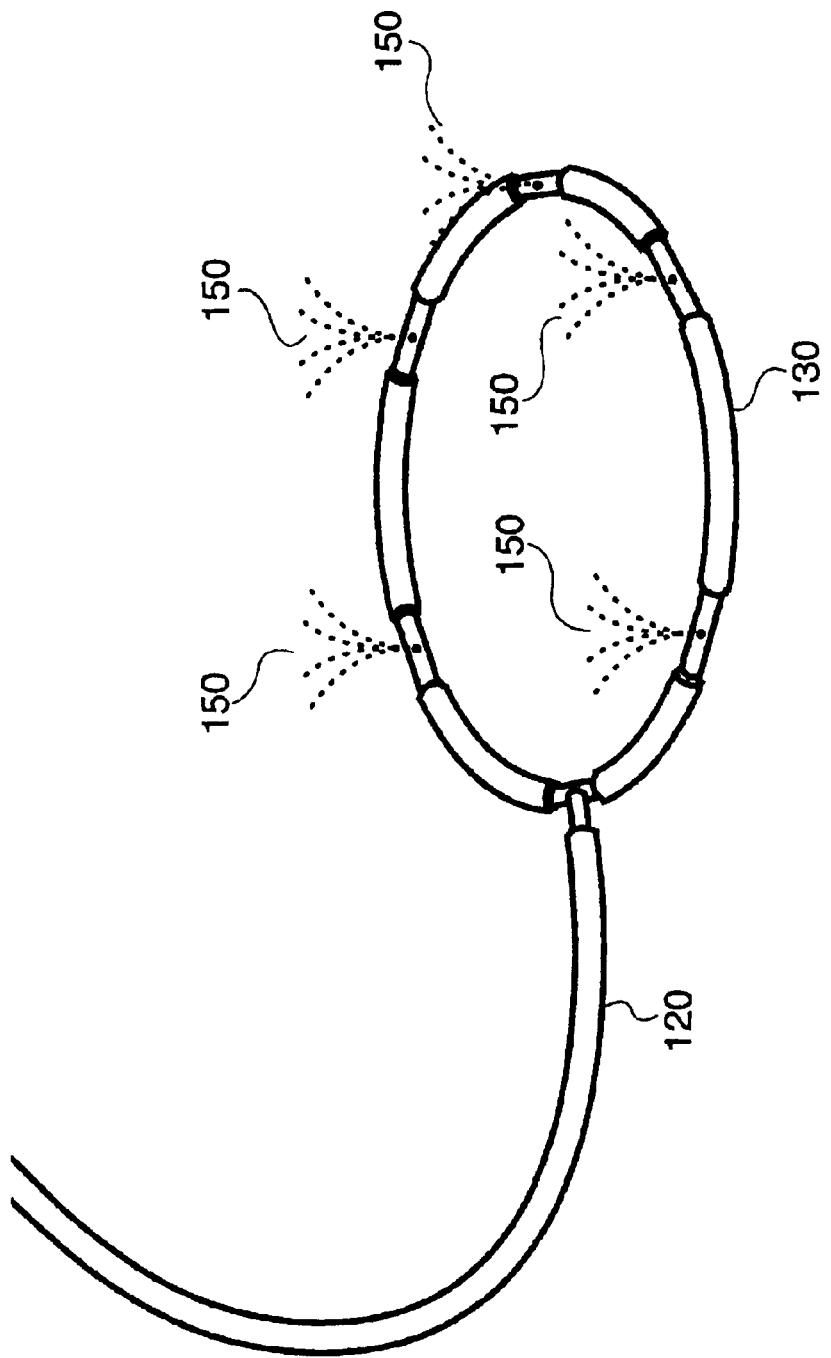
FIG. 105 is an enlarged perspective view of the embodiment of FIG. 104 illustrating the spray ring.

FIG. 105 is an enlarged perspective view of the first embodiment of the present invention illustrating the spray ring. Spray ring 130 may comprise a number of hose sections connected to spray or misting nozzles 150. Spray ring 150 may be disassembled to place on the neck of a user, or may be made large enough to fit over the head and neck of a user. Spray or misting nozzles 150 may comprise any one of a number of evaporative cooling nozzles known in the art, or may comprise fine holes drilled into a section of tubing to provide appropriate spray patterns.

The number and size of such nozzles may be varied to provide desired spray patterns and effectiveness. Note that while illustrated in FIG. 105 as an assembly of nozzles and tubes, the entire apparatus may be made as one piece of tubing or plastic. In addition, the ring shape of FIG. 105 may be substituted by a U-shape or linear array without departing from the spirit and scope of the invention.

Figure 106:
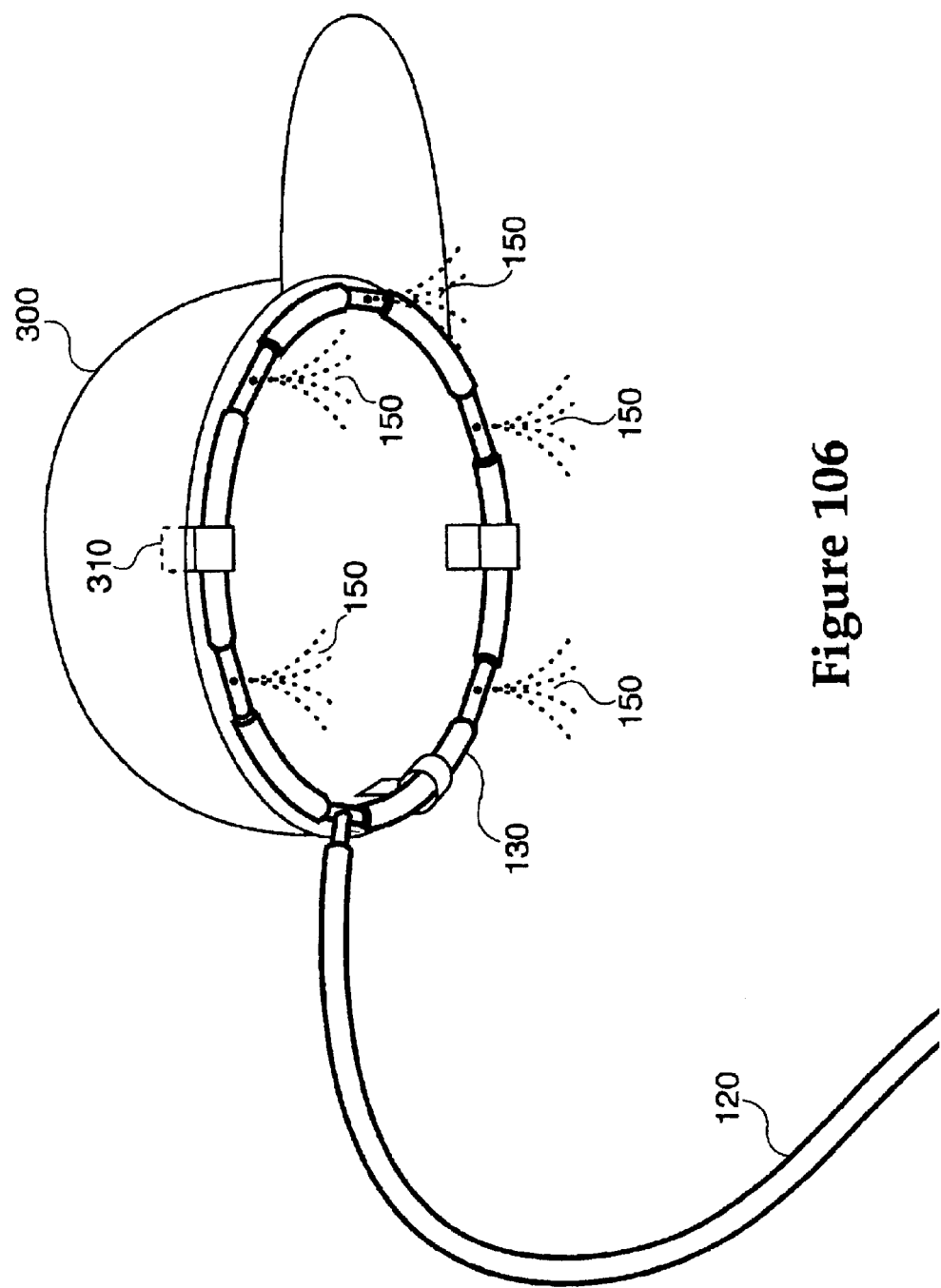
FIG. 106 is an enlarged perspective view of the embodiment of FIG. 104 illustrating the spray ring as mounted to a hat.

FIG. 106 is an enlarged perspective view of the first embodiment of the present invention illustrating the spray ring as mounted to a hat. Spray ring 130 may be clipped to hat 300 by means of clips 310. Clips 310 may comprise velcro strips, metal or plastic clips, or the like. In this embodiment, hat 300 keeps spray ring 130 in place where water may spray down on the user. Spray ring 130 may be suitably arranged to prevent water from being sprayed directly into the eyes of the user.

Figure 107:
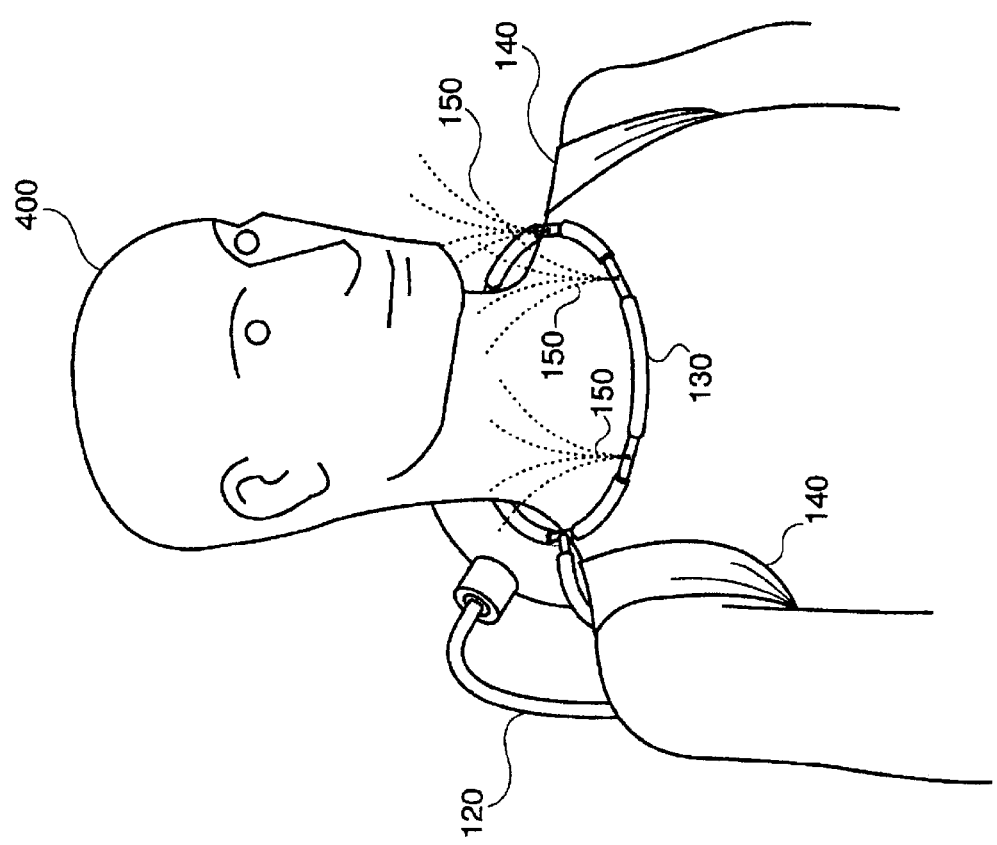
FIG. 107 is an enlarged perspective view of the embodiment of FIG. 104 illustrating the spray ring mounted to the neck of a wearer.

FIG. 107 is an enlarged perspective view of the first embodiment of the present invention illustrating the spray ring mounted to the neck of a wearer. In this embodiment, water may be sprayed upwards onto the head and neck of user 400. Reservoir tank 100 may be attached to the user by straps 140. As noted above, tank 100 may be molded into an ergonomically acceptable shape so as to mold to the back of the user and provide greater comfort and capacity. In addition, pump 110 may be relocated so as to allow the user to more readily pump without having to reach over his back. In addition, a battery operated electric pump or pneumatic charging means may be used to pressurize the tank.

In can be seen that in the embodiment of FIG. 104-4, greater cooling is provided than the limited means of the Prior Art. Large amounts of water are available to the user, allowing the user to remain in hot areas for longer periods of time. In addition, the spray nozzles of the present invention may supply sufficient water to wash away sweat and salt from the face and neck area, increasing user comfort. As such, a roofer, for example, can remain on the roof longer between breaks, and get more work done in less time.

Figure 109:
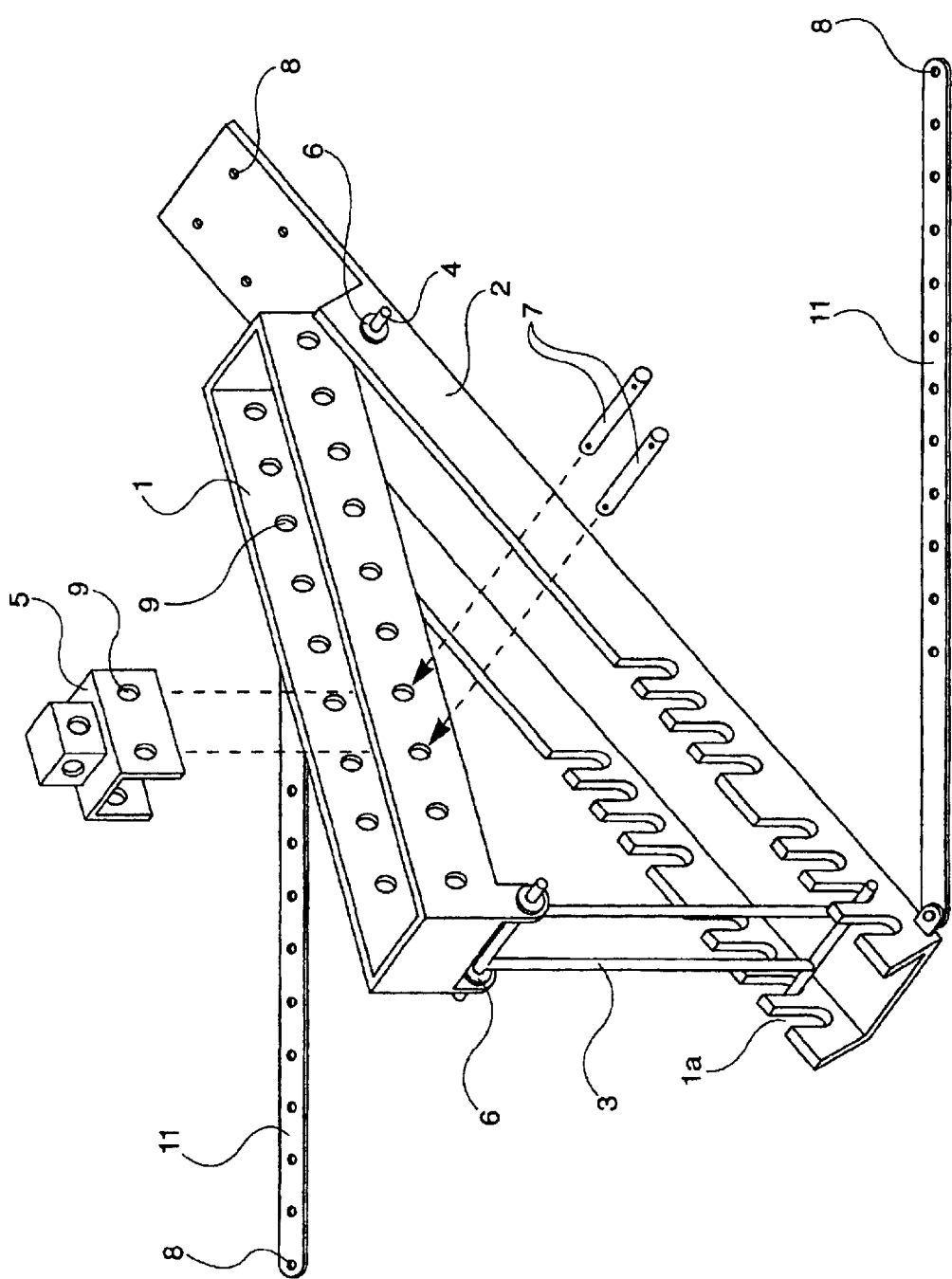
FIG. 109 is a perspective view of a material and supply support with a lightweight adjustable jack post support.
Figure 110:
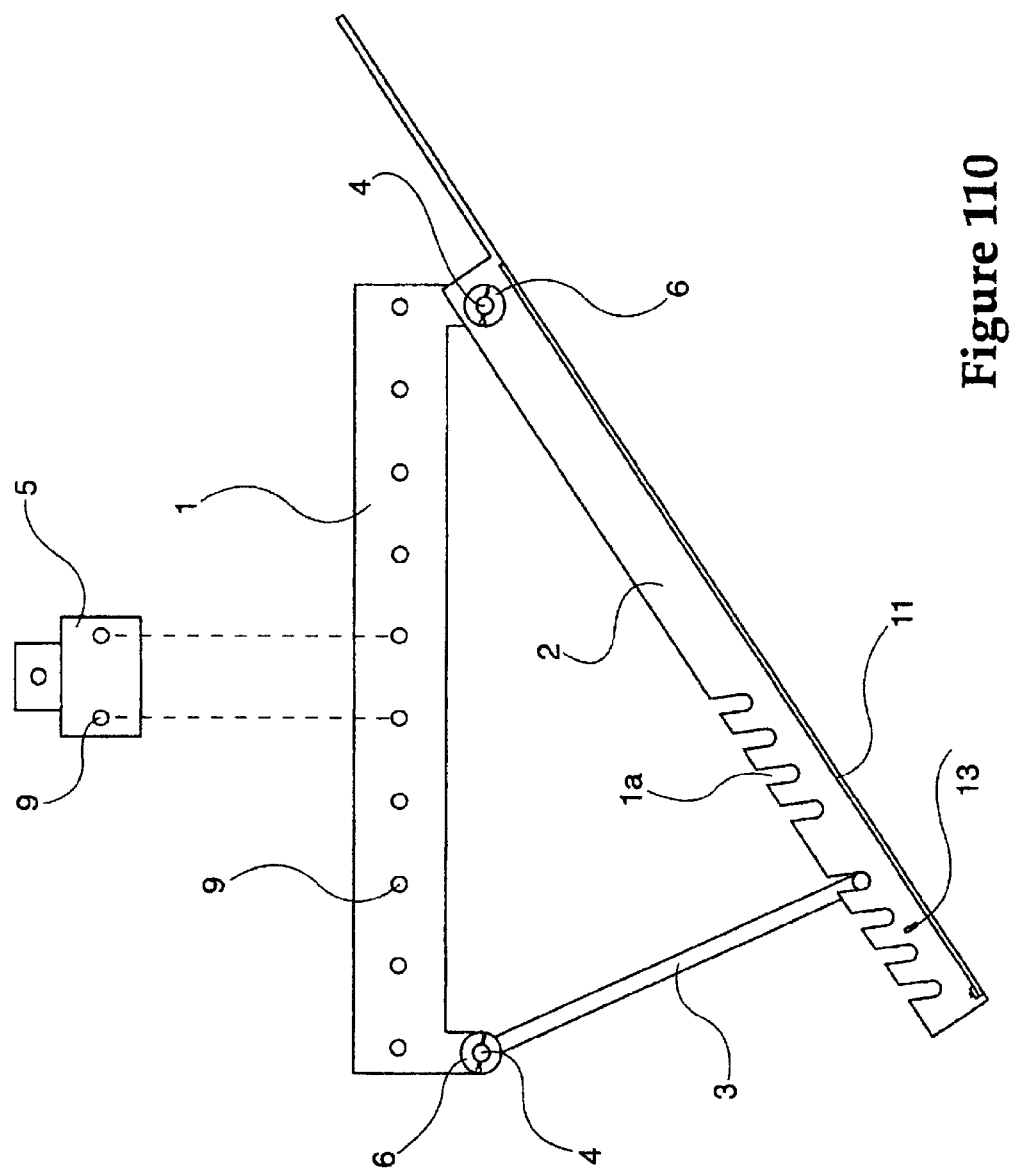
FIG. 110 is a side view of the embodiment of FIG. 109.
Figure 111:
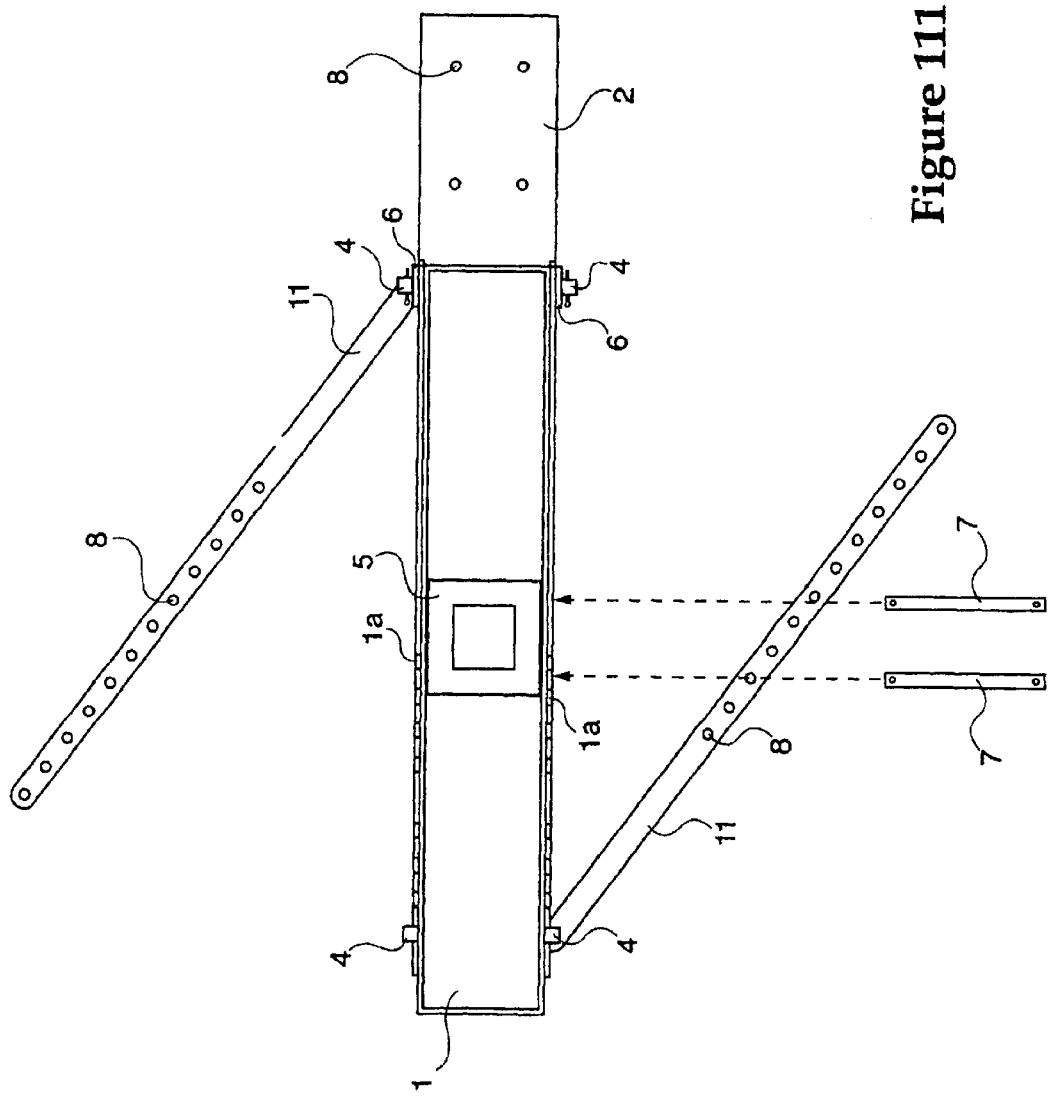
FIG. 111 is a top view of the embodiment of FIG. 109.
Figure 112:
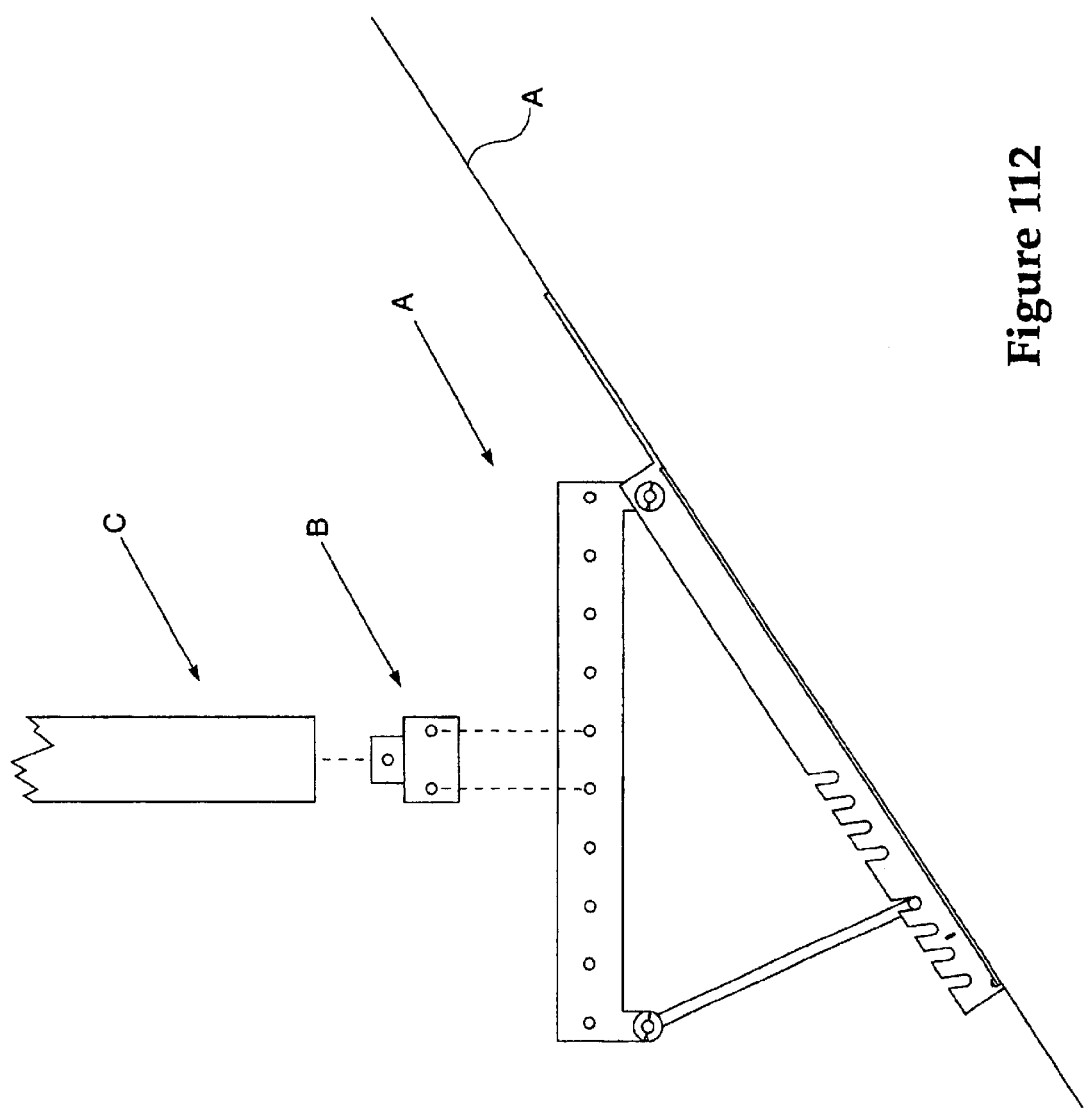
FIG. 112 is another side view of the embodiment of FIG. 109.

FIG. 109 is a perspective view of a material and supply support with a lightweight adjustable jack post support. FIG. 110 is a side view of the embodiment of FIG. 109, a material and supply support with a lightweight adjustable jack post support. FIG. 111 is a top view of embodiment of FIG. 109 invention, a material and supply support with a lightweight adjustable jack post support. FIG. 112 is another side view of the third embodiment of the present invention, a material and supply support with a lightweight adjustable jack post support.

Referring to FIGS. 109–112, in this embodiment, a single channel having U-shaped cross-section may be provided, each with an adjustable support pole. Connected to the support pole though a pivot joint is an adjustable support channel which has its other end hinged to single channel. The support pole may be adjusted to achieve a suitable angle of adjustment corresponding to roof incline. A number of these devices may be used to support scaffold brackets on inclined roof surfaces.

Referring to FIGS. 109–112, a number of channels 2 having a U-shaped cross-section may be provided, each with an adjustable support poles 3. Connected to the support pole 3 though a pivot joint 6 is an adjustable platform support channel 1 which has its other end hinged to channel 2 through pivot 4. The support poles 3 may be adjusted to achieve a suitable angle of adjustment corresponding to roof incline by inserting the bar into one of notches 1a. Notches 1a may be provided at intervals corresponding to standard roof pitches.

Support channel 1 may be used to support one leg of a scaffold bracket. When a number of the devices of FIGS. 109–112 are attached to a roof via nailing holes 8, at the same height, scaffold brackets may be placed atop support channel 1, secured by base plate 5 held in place by pin(s) 7 though holes 9. Holes 9 may be spaced at regular intervals. In use, the other side of the scaffold bracket may be held in place by the roof itself. Security bars 11 may be provided attached to the apparatus and nailed to the roof vial nail holes 8 in order to stabilize the apparatus.

Figure 113:
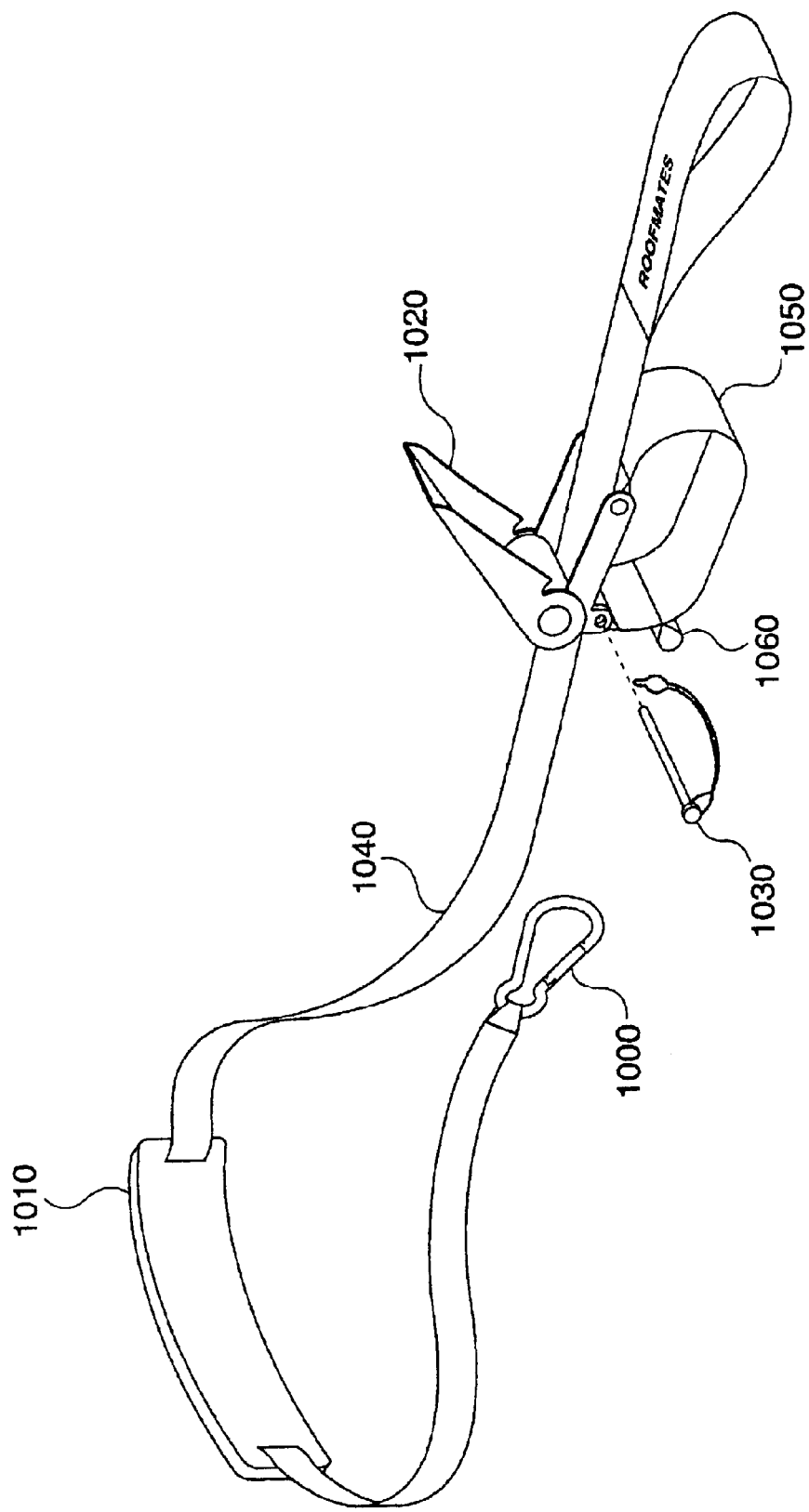
FIG. 113 is a perspective view of another embodiment of the "soft" version of the SUREFOOT™ invention of the inventor.

FIG. 113 is a perspective view of another embodiment of the "soft" version of the SUREFOOT™ invention of inventor. In the illustration of FIG. 113, clip 1000 may be attached to one end of strap 1040 and clipped to outer sewn loop 1060. In this manner, strap 1040 may be secured around an object, such as a tree or utility pole or the like. Padding 1010 may be provided to better grip a tree trunk or the like as well as prevent marring to the trunk. Ratchet 1020 may be used to ratchet the strap around the tree trunk or utility pole or the like. Loop 1050 may be fed through a rung or bar of a ladder or the like. Locking pin 1030 may be used to prevent ratchet 1020 from being accidently released.

Figure 114:
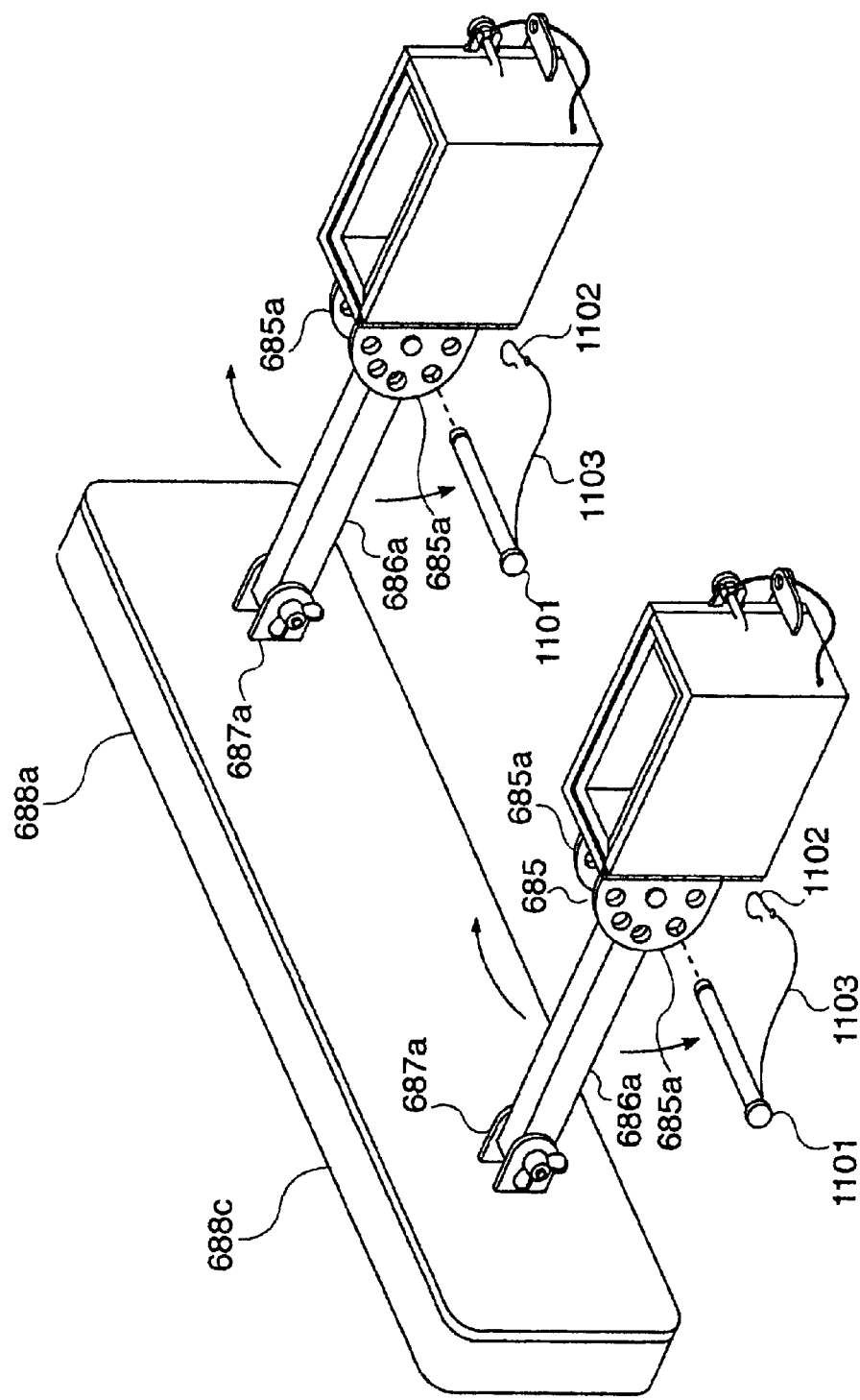
FIG. 114 is a perspective view of another embodiment of the SUREFOOT™ invention with an attached pivot leg and rubber covered foot bar.
Figure 115:
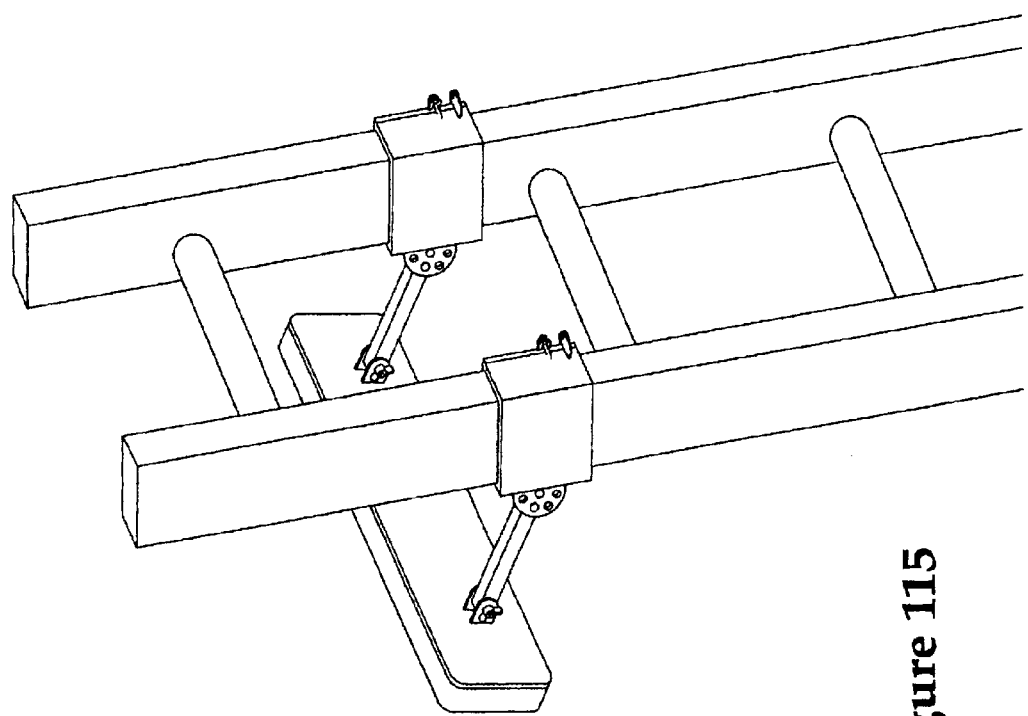
FIG. 115 is a perspective view of another embodiment of the SUREFOOT™ invention with an attached pivot leg and rubber covered foot, illustrating the apparatus attached to a ladder.

FIG. 114 is a perspective view of the fifth embodiment of the present invention, a version of the SUREFOOT™ invention with an attached pivot leg and rubber covered foot bar. FIG. 115 is a perspective view of the fifth embodiment of the present invention, a version of the SUREFOOT™ invention with an attached pivot leg and rubber covered foot, illustrating the apparatus attached to a ladder.

Referring to FIGS. 114 and 115, pivot 685 comprising side plates 685a may be mounted to one end of sure foot 681 with a plurality of adjustment holes 685b. Legs 686a may be mounted to side plates 685a via a bolt or pins 1101 and adjusted for angle using pin 1101 with attached clip 1102 (note safety string 1103 for clip).

Again referring to FIGS. 114 and 115, foot 688a may be covered with urethane foam 688c to provide grip. Nails holes (not shown) may also be provided to accept temporary nailing or screwing. Foot 688a may be mounted to leg portions 686a via a pivots 687a.

In use, the device may be attached to a ladder leg and placed or nailed to a roof, wall or other surface (either at the top or bottom of the ladder). In addition, the device may be used by attaching to the bottom of a ladder to steady the ladder as an extra leg, or to act as a ladder stabilizer. In addition, the device may be used to hold a ladder away from a wall to prevent gutters form being crushed.

Figure 116:
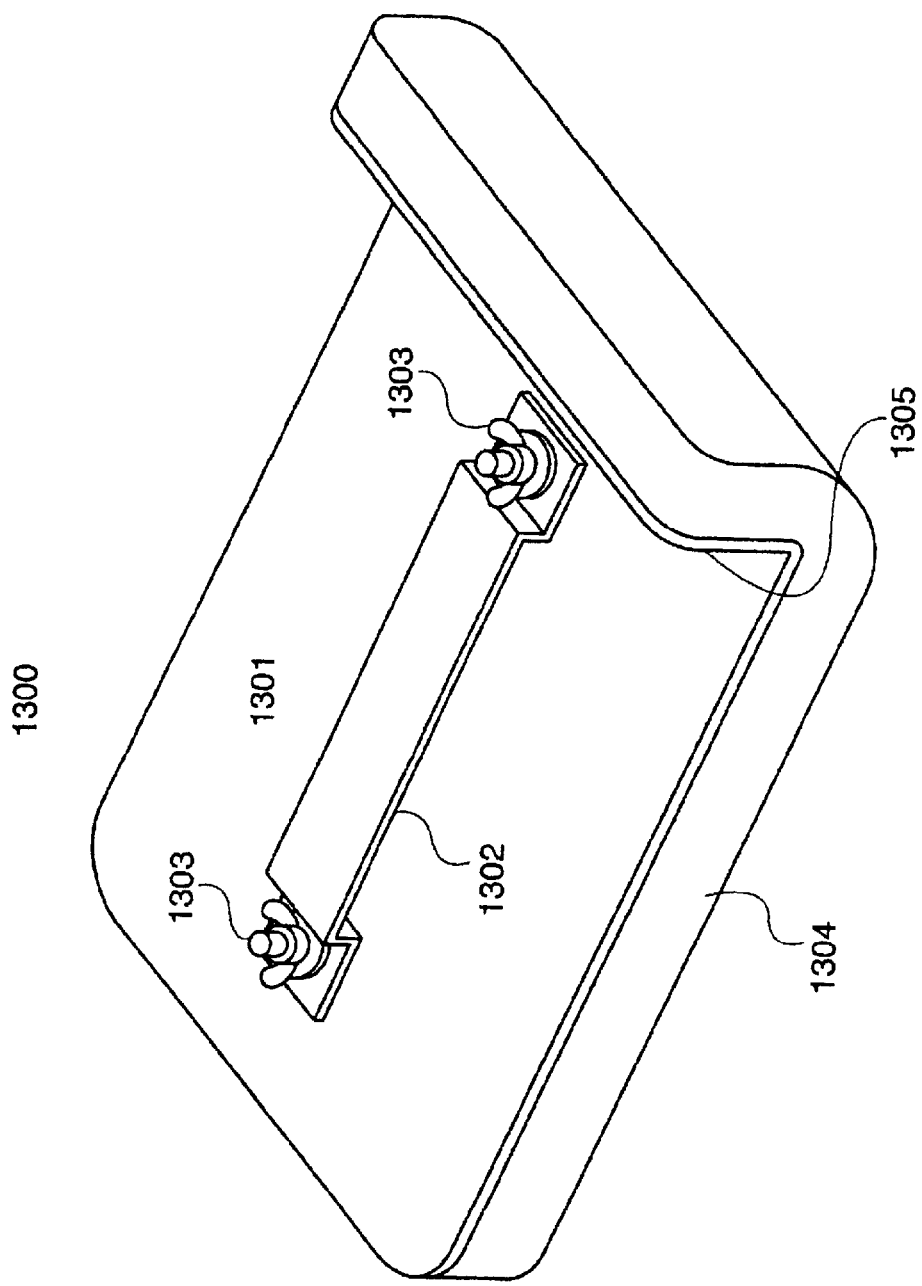
FIG. 116 is a perspective view of another embodiment of the a SUREFOOT™ for indoor use.
Figure 117:
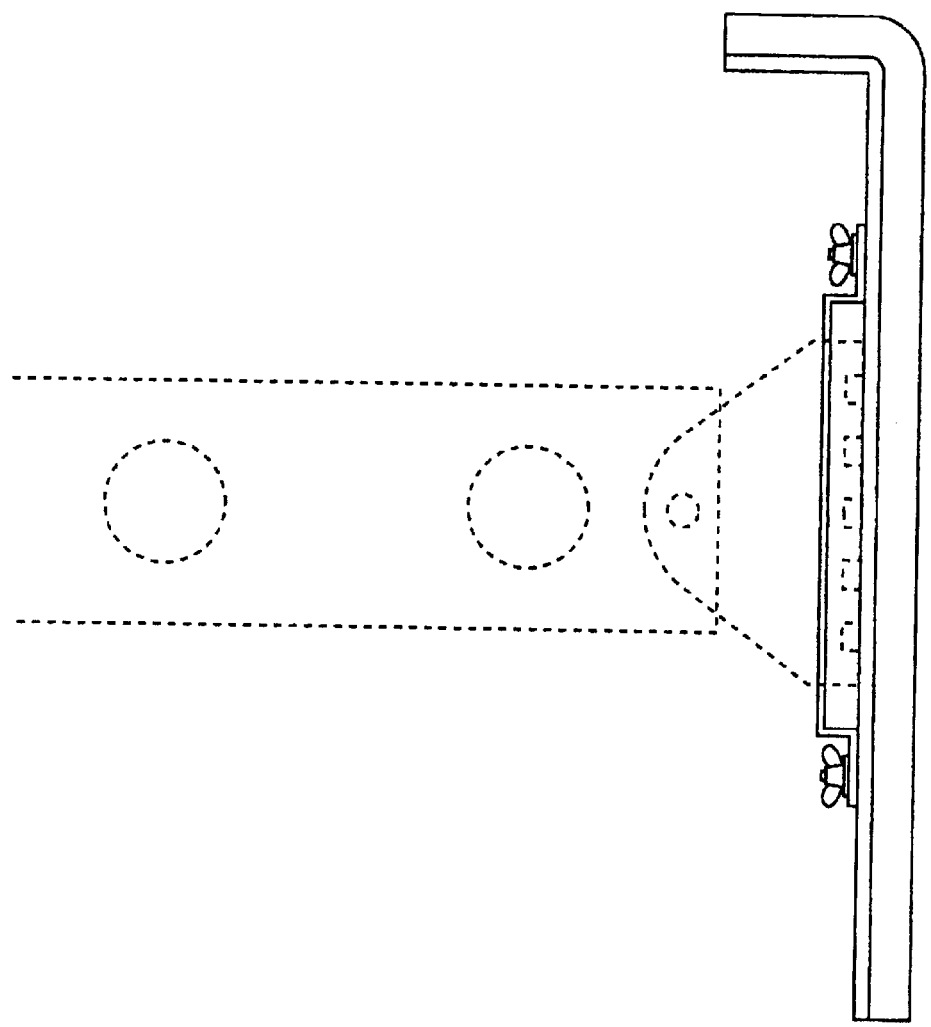
FIG. 117 is a side view of the embodiment of FIG. 116, a SUREFOOT™ for indoor use.

FIG. 116 is a perspective view of a sixth embodiment of the present invention, a SUREFOOT™ for indoor use. FIG. 117 is a side view of the sixth embodiment of the present invention, a SUREFOOT™ for indoor use. When using ladders indoors, care must be taken to insure that the ladder does not mar floor or wall surfaces. Rough ladder feet and edges, typically metal, may ruin hardwood or stone floors as well as steps and the like. Covering such sharp edged feet with cloth or the like can cause a ladder to slip.

In the embodiment of FIGS. 117 and 117, a SUREFOOT™ apparatus 1300 is provided which may be attached to the foot of a ladder. Bracket 1302 may be attached to base plate 1301 via wingnuts 1303 or the like. Resilient foam 1304 (e.g., expanded polyurethane foam or the like) may be attached to the bottom of base plate 1301 via adhesive, velcro, or the like. A bent lip portion 1305 may be formed on one side of base plate 1301 for use on stairs or near walls.

In use, the apparatus is attached to the pivoting foot of an aluminum ladder or the like. The apparatus rests between the ladder and the floor, preventing the ladder from marring the floor surface and distributing the weight of the ladder and user over a broader area. In addition, the foam acts as a non-slip anti-skid device, to prevent the ladder from moving or slipping. When used on a stairway or against a wall, bent lip portion 1305 may rest against the stair riser or wall baseboard to prevent marring of these surfaces.

Figure 118:
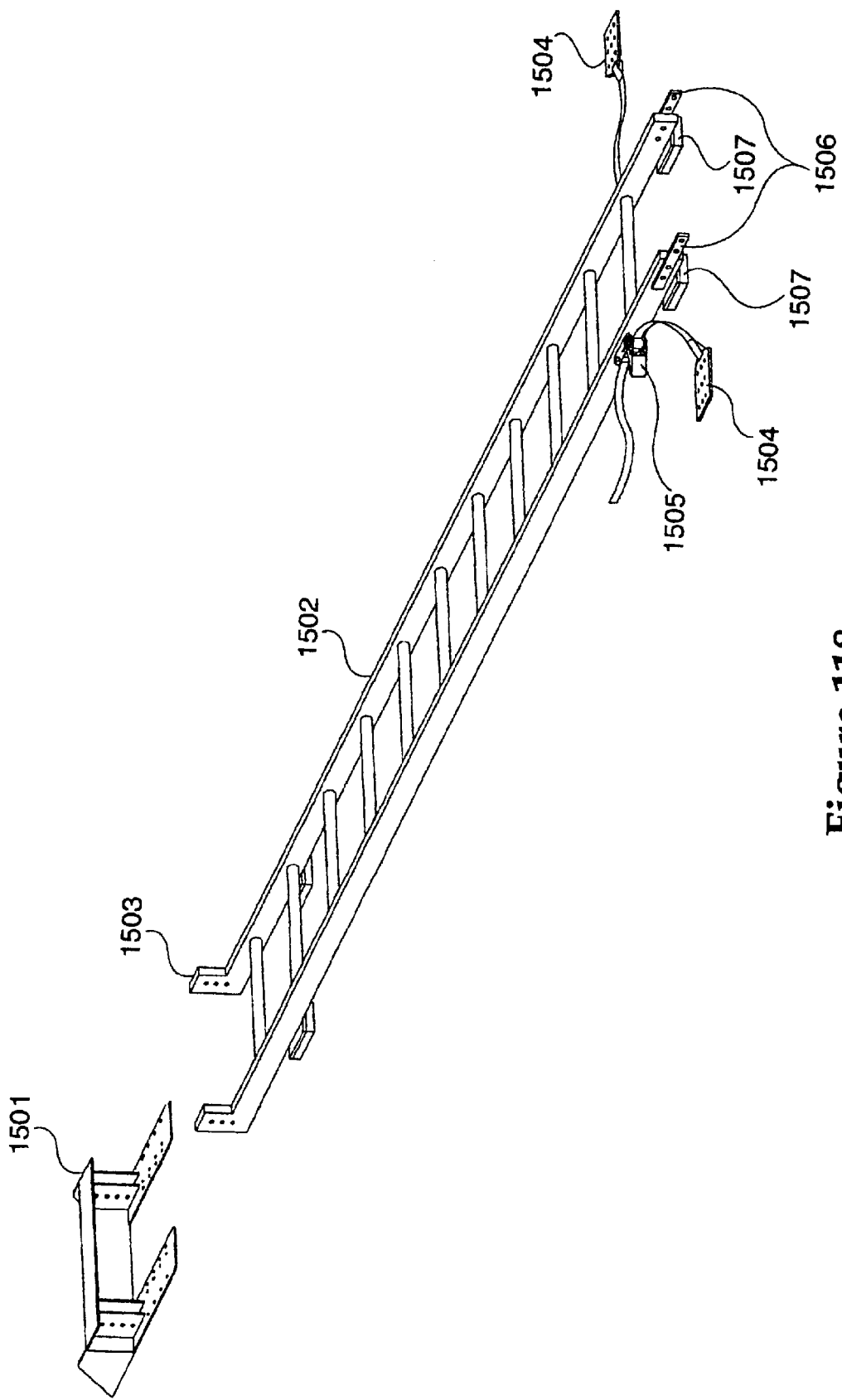
FIG. 118 is a perspective view of the ROOFLADDER™, illustrating the ladder and roof ladder support bracket.

FIG. 118 is a perspective view of a seventh embodiment of the present invention, the ROOFLADDER™, illustrating the ladder and roof ladder support bracket. In this seventh embodiment, a roof ladder 1502 is provided. Roof ladder 1502 may be provided in one or more sections and may be supported from the bottom of the roof by roof ladder bracket 1501 as illustrated in FIG. 118. Note that FIG. 118 illustrates the roof ladder as it would look from the top of the roof downward.

Figure 119:
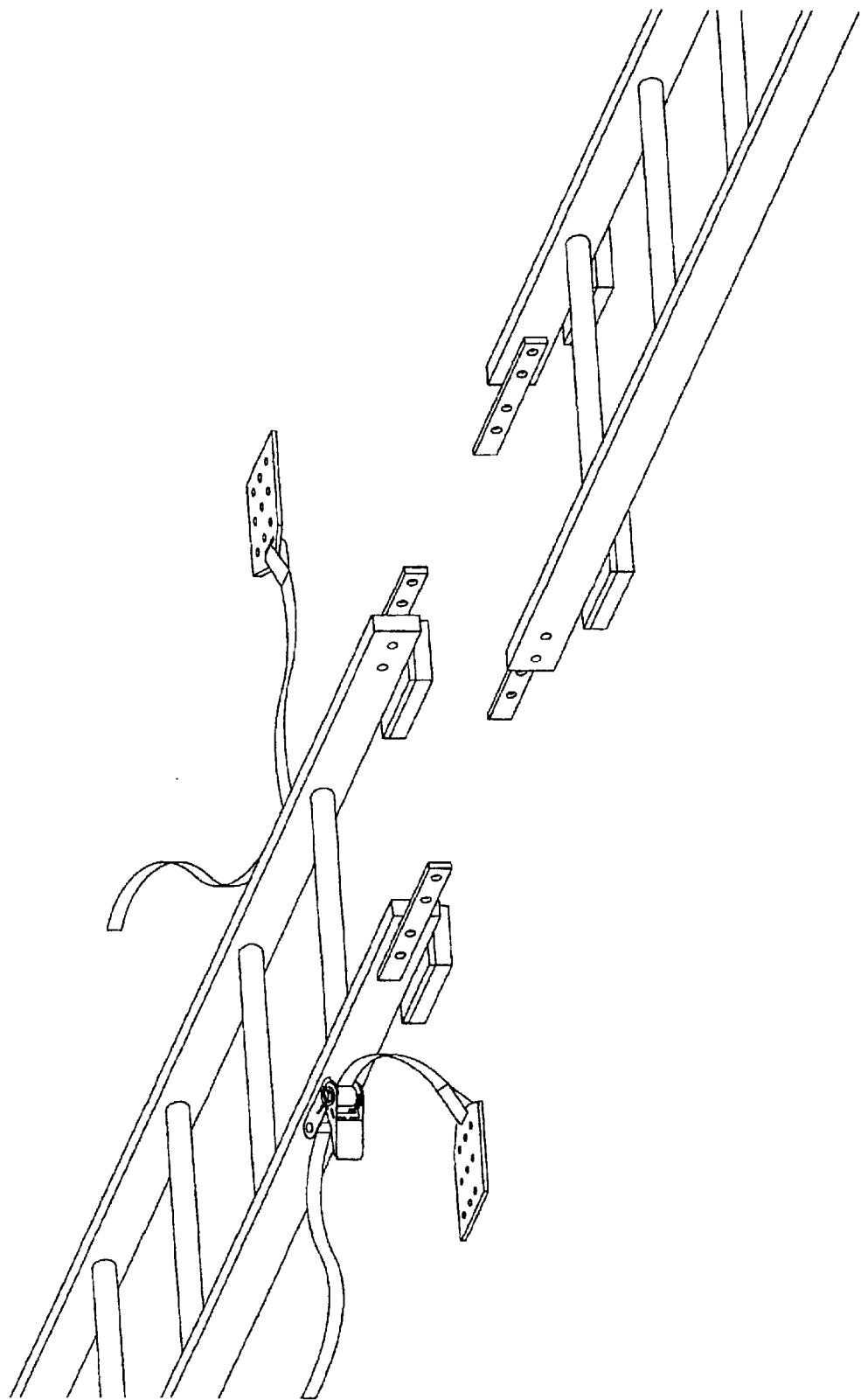
FIG. 119 is a perspective view of an enlargement of the connection mechanism between two ROOFLADDERS™.
Figure 120:
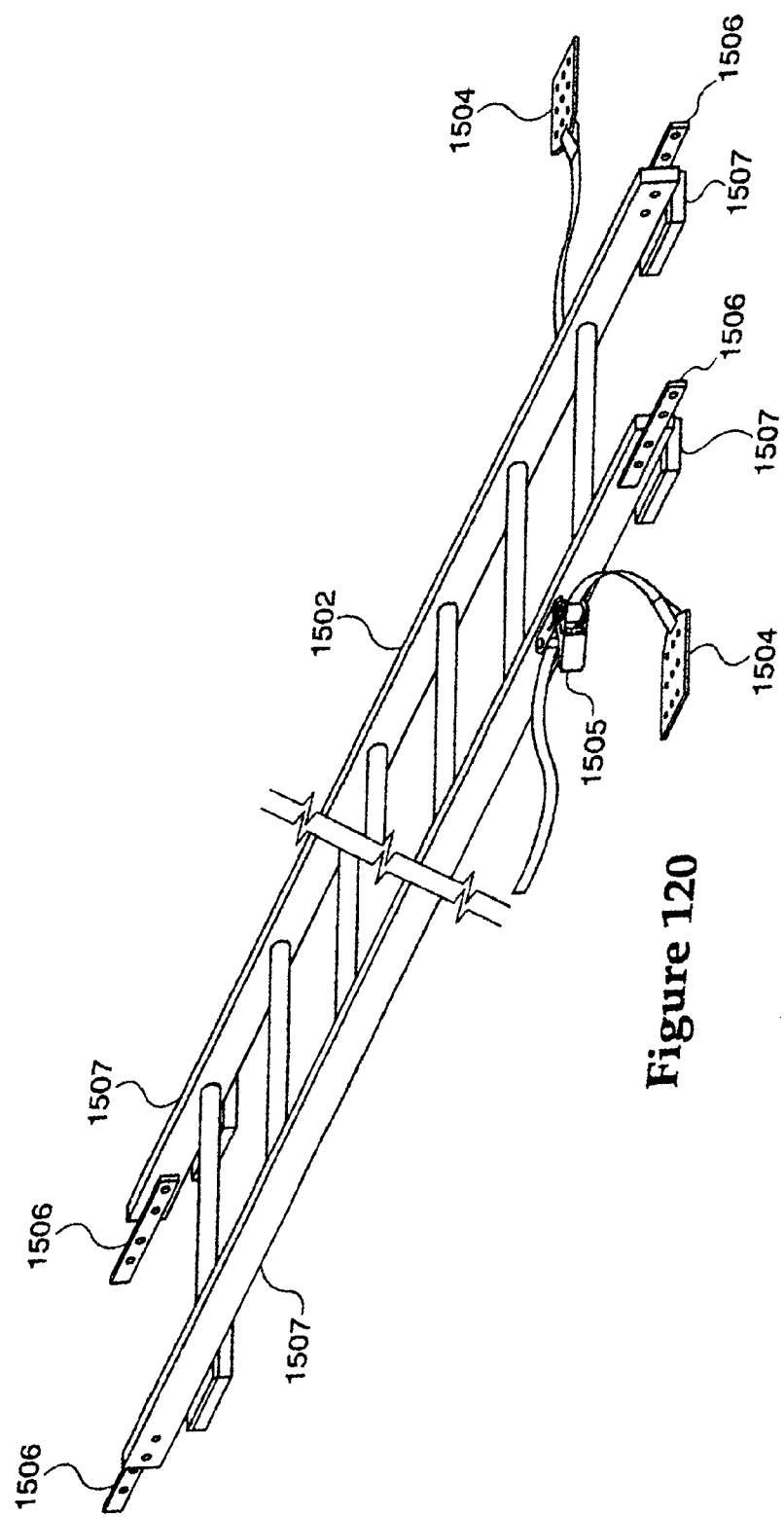
FIG. 120 is a perspective view illustrating a section of ROOFLADDER™.

As shingling progresses, for example, the roof ladder bracket 1501 may be installed near bottom edge of a roof. Additional, lightweight sections 1502 may then be added as the shingling progresses up the roof. FIG. 119 is a perspective view of a seventh embodiment of the present invention illustrating an enlargement of the connection mechanism between two ROOFLADDERS™. FIG. 120 is a perspective view of the seventh embodiment of the present invention, illustrating a section of ROOFLADDER™. Connectors 1506 may attach adjacent sections using bolts or pins (not shown). Each section may rest on the roof using foam-backed pads 1507 which prevent marring of the roof surface. Nail plates 1540, secures to ladder section 1502 via ratchets 1505 may secure each section to prevent lateral movement of ladder section 1502.

In use, a scaffold board or the like may be attached to the roof ladder using brackets and the like as is known in the art. Individual sections of roof ladder may be attached to one another like sections of railroad track, using suitable fasteners. Each section may be provided as a lightweight unit. A smaller number of steps may be used, for example, to provide short and easy to handle ladder sections. Since the ladder is built up as roofing progresses upward, the ladder does not "cover" the work area and movement of the ladder is not required to install shingles. In addition, it is not necessary to climb to the peak to secure a ladder or use a J-hook or the like by trying to manipulate a ladder from the bottom, which can be awkward and cumbersome.

FIG. 121 is a perspective and exploded view of an eighth embodiment of the present invention, illustrating the tool anti-slip apparatus. In this eighth embodiment, a means is provided to prevent roofing tools from sliding off a roof. A piece of resilient foam 1801 may be attached to a tool surface using Velcro™ fasteners 1802 and 1803. The resilient foam 1801 prevents the tool from sliding, and the use of Velcro™ 1802 and 1803 allows the foam to be renewed.

A first hook and loop fastener portion 1802 may be applied to one side of the resilient foam (e.g., expanded polyurethane or the like) to form removable foam cover 1804. A second layer of hook-and-loop fastener material 1803 may be applied to the tool 1805 itself. Foam cover 1804 may then be removably placed on tool 1805. When tool 1805 (here illustrated as a nailgun) is placed on the roof surface, resilient foam 1801 prevents it from slipping off the roof.

FIG. 167 is a perspective view of another embodiment of the apparatus of FIG. 121. In this embodiment, named GUNPAD™, a plastic C-shaped channel 1671 may be formed (e.g., from a section of PVC pipe, molded, or the like) with an inner diameter (e.g., 3") about the same as the outer diameter of a roofing nailgun cylinder. Rubber strips 1672 (foam, expanded polyurethane, or the like) may be glued to this plastic channel or applied with Velcro® hook and loop fastener or the like.

When clipped over the cylinder of a roofing nailgun, the GUNPAD™ provides a padded rubber surface which is less likely to slip off a roof. Most nailguns have smooth plastic or metal finished which allow them to slide off a roof with ease, creating a falling tool hazard to workers below.

When the rubber wears off the GUNPAD™, the apparatus may be removed and a new GUNPAD™ clipped in place. The GUNPAD™ can be applied to a number of Prior Art roofing nailguns without modifying the nailgun or voiding the warranty. Note that the C-shaped channel may also be made of metal (e.g., spring steel) or other material which will grip the nailgun. Rubber may also be provided on the inside surface to securely grip the nailgun.

Figure 122:
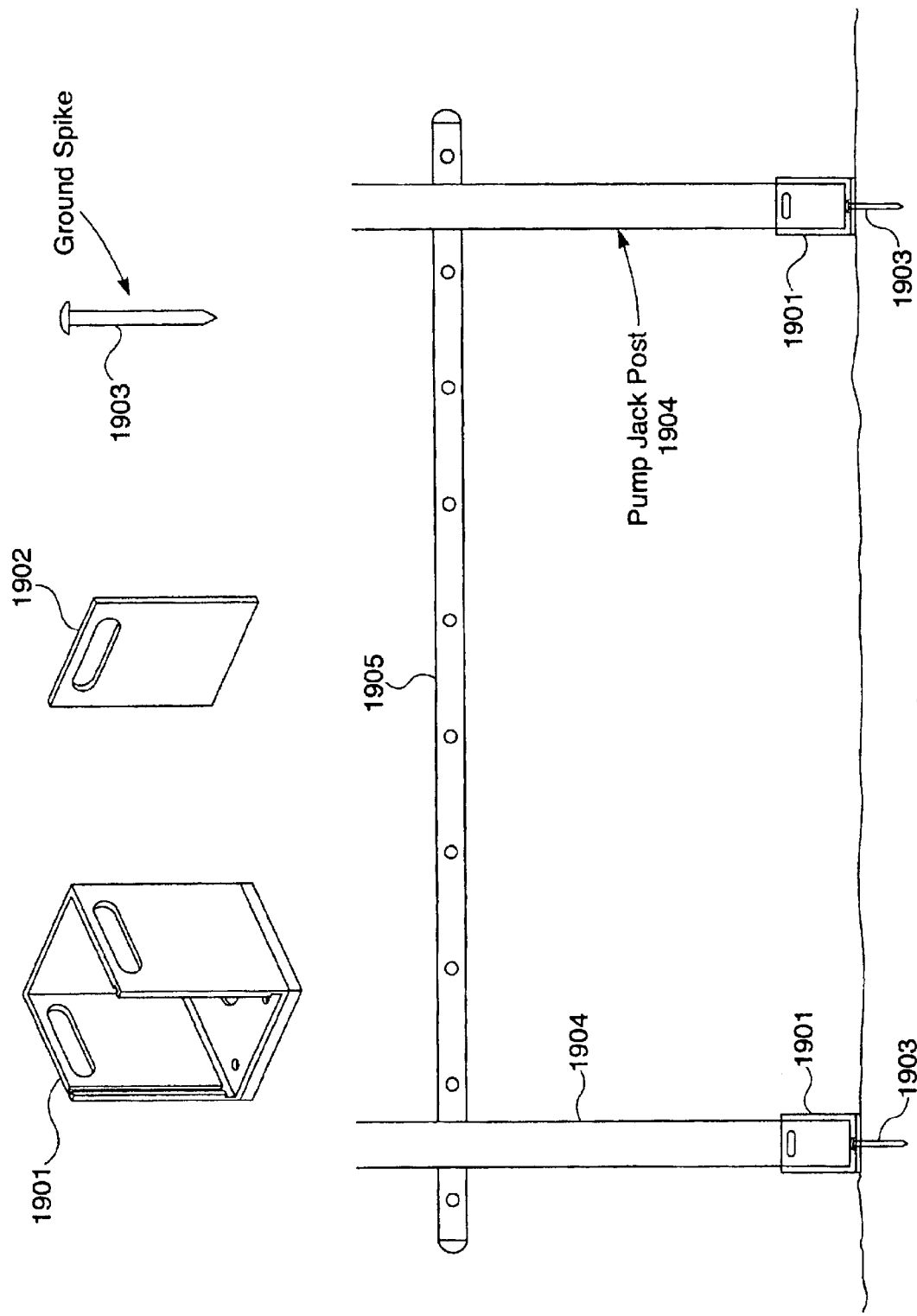

FIG. 122 is a diagram illustrating another embodiment of the present invention, a pump jack post anchor 1901. In this ninth embodiment, a pump jack mounting device 1901 is provided to secure a pump jack pole 1904 to the ground. A cup-like sleeve 1901 is provided with a hole the bottom for receiving a ground spike 1903. A portion 1902 of the sleeve may be removed (e.g., slide connection) to facilitate driving the ground spike into the ground. Once secured to the ground, the removable portion 1902 of the sleeve 1901 is reinserted and a pump jack pole 1904 inserted into the sleeve. Walkboard 1905 may be then attached to pump jack poles 1904 via pump jacks (not shown).

Figure 123:
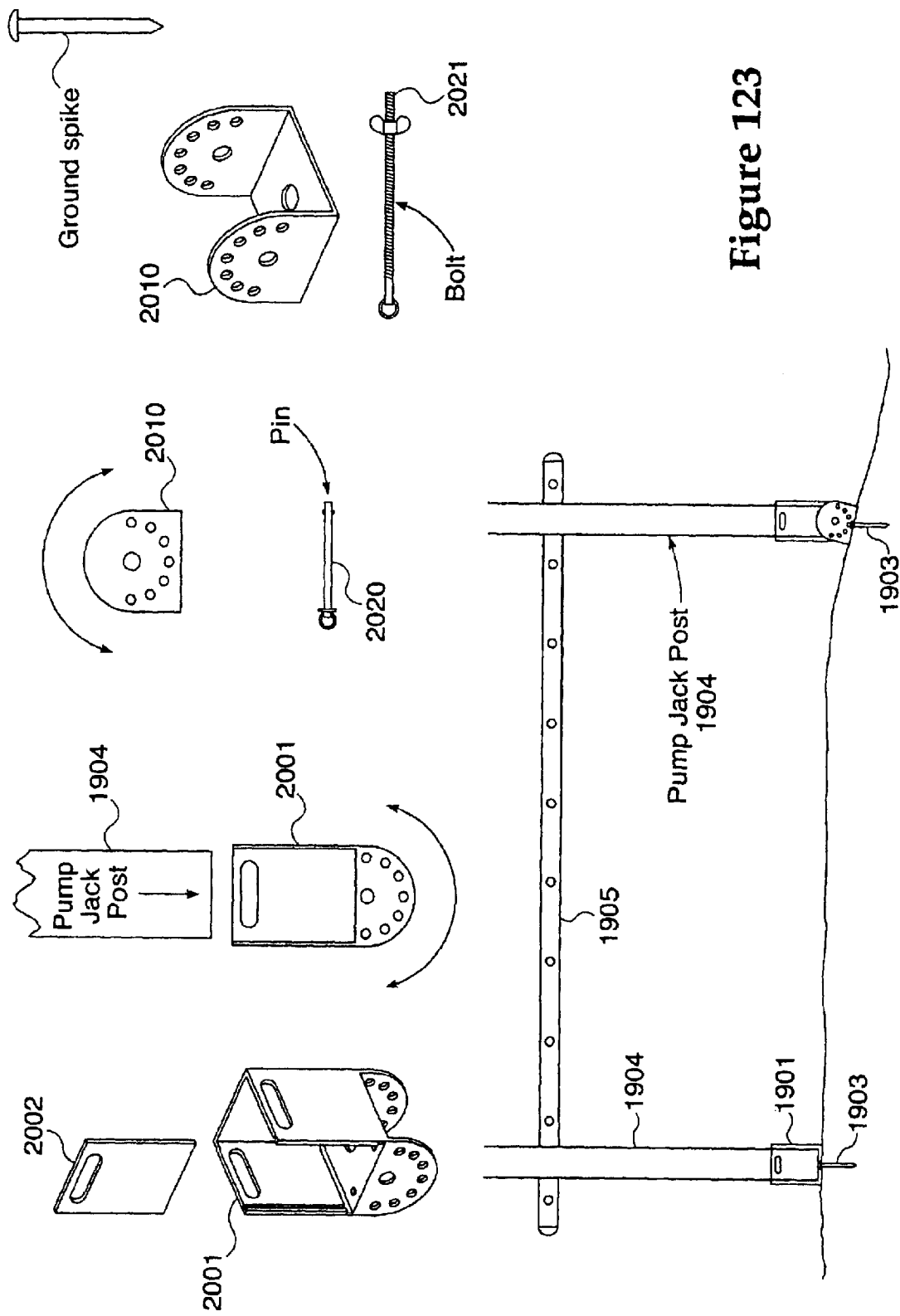

FIG. 123 is a diagram illustrating another version of the ninth embodiment of the present invention, a pump jack anchor 2001 with adjustable pivot base 2010. In this alternative version of this ninth embodiment, an adjustable angle plate 2010 is provided for securing the sleeve 2001 top the ground on sloped or uneven terrains. Angle plate 2010 may attach to sleeve 2001 via a through bold 2021. Adjustment pin 2020 may be used to adjust the angle of angle plate 2010 with respect to sleeve 2001. Removable sleeve portions 2002 may be provided or eliminated in this embodiment.

Figure 124:
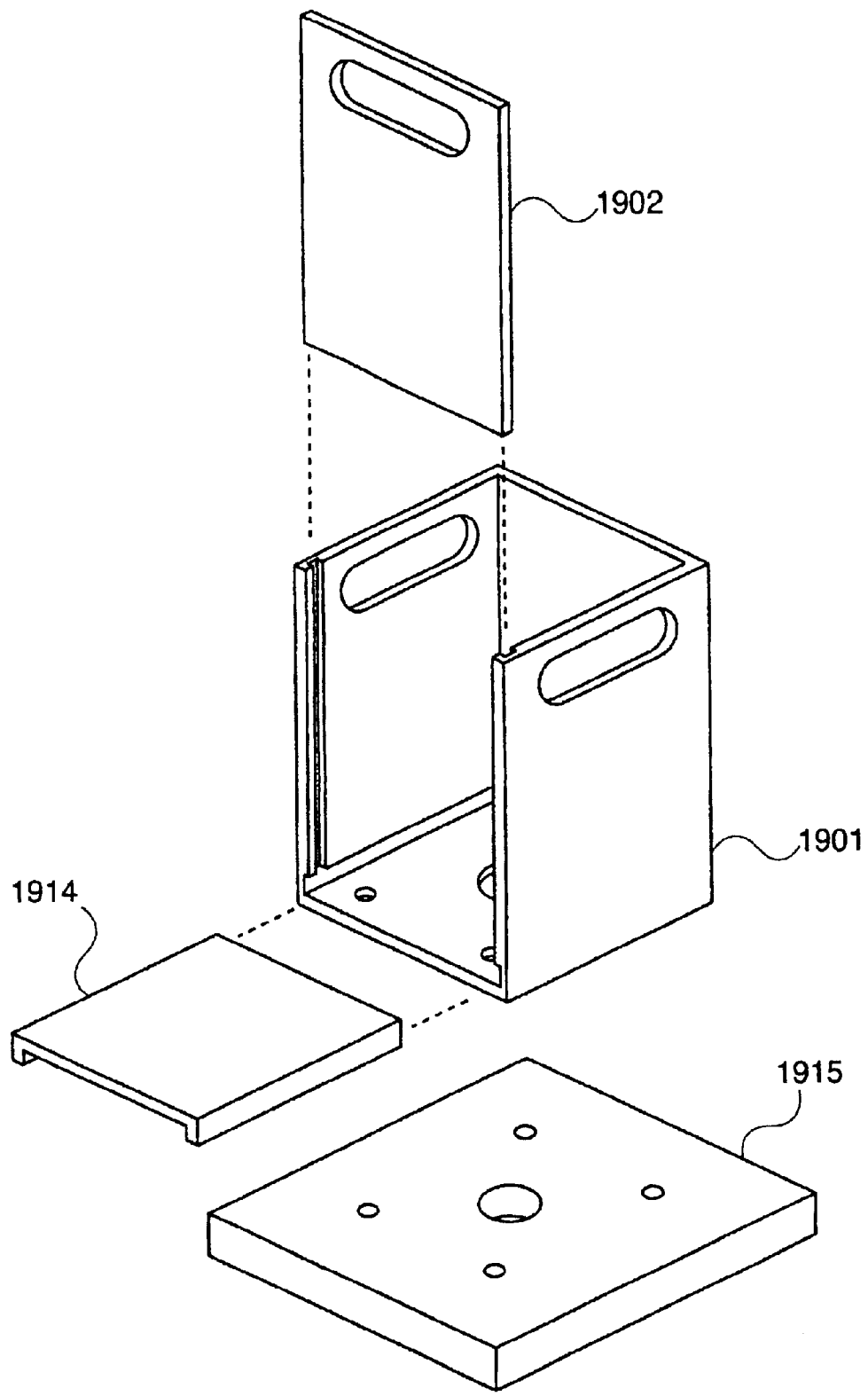

FIG. 124 is a diagram illustrating a first embodiment of the present invention, a pump jack post anchor 1901. An earlier embodiment of this invention is described, for example, in FIGS. 19–20 of Provisional U.S. Patent Application Ser. No. 60/365,538, entitled "ROOFMATES™ ROOFING ACCESSORIES AND COOLING HEADGEAR" filed Mar. 20, 2002 and incorporated herein by reference.

In this first embodiment, a pump jack mounting device 1901 is provided to secure a pump jack pole (not shown) to the ground. A cup-like sleeve 1901 is provided with a hole the bottom for receiving a ground spike (not shown). A portion 1902 of the sleeve may be removed (e.g., slide connection) to facilitate driving the ground spike into the ground. Once secured to the ground, the removable portion 1902 of the sleeve 1901 is reinserted and a pump jack pole 1904 inserted into the sleeve.

The apparatus of FIG. 124 may also be provided with bottom cover plate 1914 which may slidably fit into sleeve 1901. Bottom cover plate 1914 may be used to prevent the pump jack pole from pressing down on the spike or other securing means (not shown) and/or for preventing dirt and debris from entering the sleeve 1901. In addition, a rubber pad 1915 may be provided beneath sleeve 1901 in order to prevent sleeve 1901 from sinking into soft ground.

Rubber pad 1915 also may be used to prevent sleeve 1901 from slipping on hard ground, concrete, asphalt, or the like. Note that in addition to a central hole provided in sleeve 1901 and rubber pad 1915 to accept the spike, a number of smaller nail/screw holes are also provided. If sleeve 1910 is mount on a deck, for example, these smaller holes may be used to nail or screw sleeve 1901 to such a surface. Note also that rubber pad 1915 may also be used to prevent marring or damage to a surface from the concentrated pressure from sleeve 1901.

Figure 125:
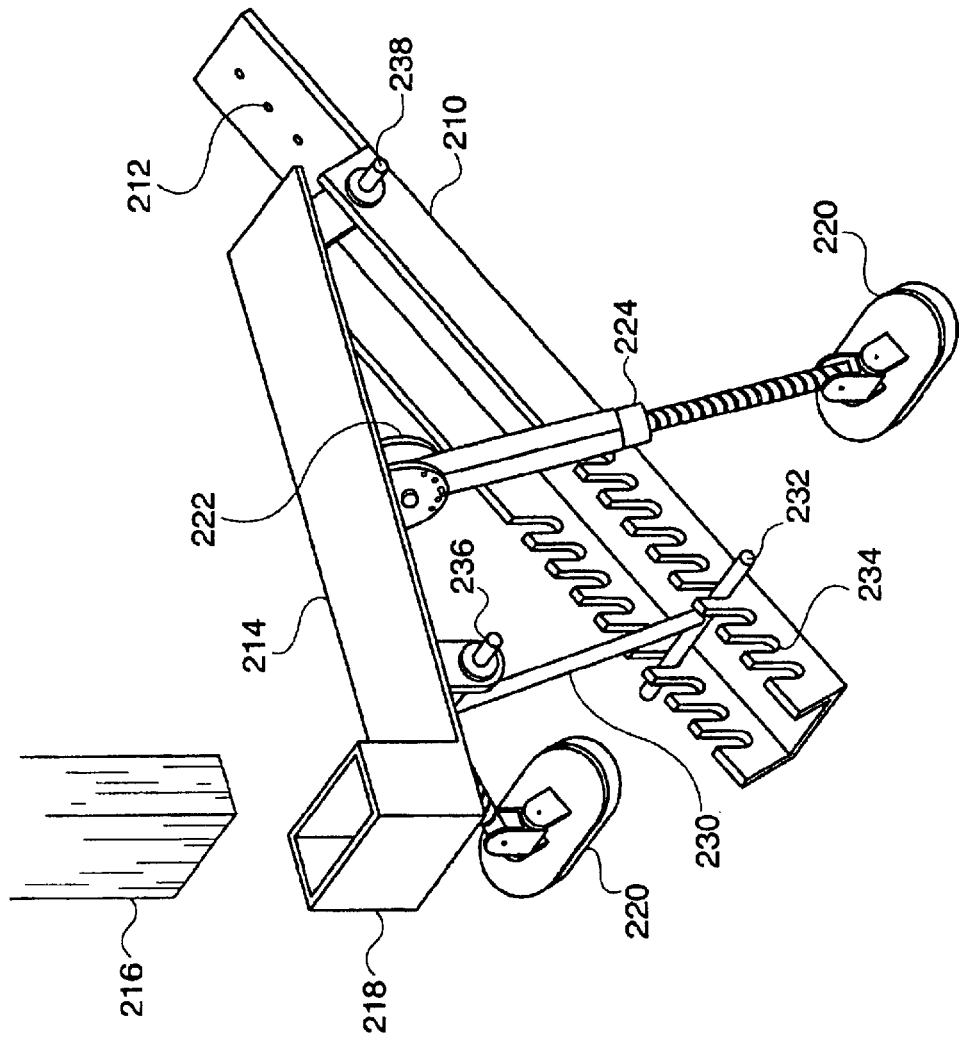

FIG. 125 is a perspective view of the apparatus of the second embodiment of the present invention. In this second embodiment of the present invention, a ROOFER'S SAWHORSE™ is provided to allow a roofer or other construction worker to support materials on a uneven surface such as a roof. The sawhorse may be adjustable for pitches of 4×12 to 12×12 or other pitches.

The sawhorse of FIG. 125 may comprise base plate 210 secured to a roof or other structure by a nails or screws secured through screw holes 212. Additional screw holes (not shown) may be provided throughout the length of base plate 210. Sawhorse platform 214 may be pivotably coupled to base plate 210 through pivot 238. The angle of sawhorse platform 214 may be adjusted by adjusting support rod 230, pivotably mounted to sawhorse platform 214 through pivot 236, through one of a number of adjustment slots 234.

Sawhorse platform 214 may be provided with slot 218 for accepting a 2×4 216 or the like so as to prevent a load on sawhorse platform 214 from sliding off. Stabilizing legs 220 may be provided with foam-backed feet to stabilize the ROOFER'S SAWHORSE™. Stabilizing legs 220 may be adjusted for length using threaded shaft 224. Threaded shaft 224 may be substituted with a locking pin and sliding shaft arrangement. Pivot 222 may be used to adjust the angle of support leg 220.

Figure 126:
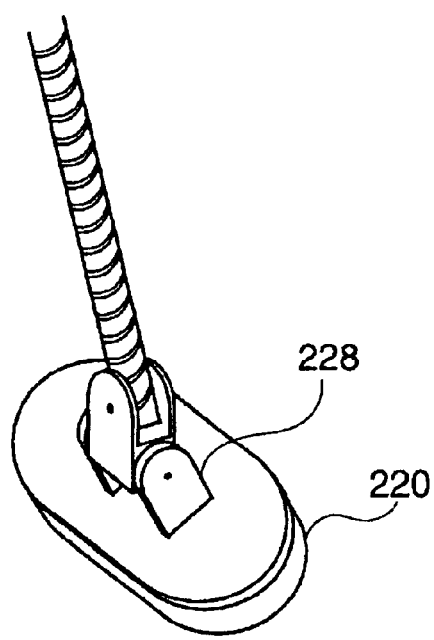

FIG. 126 is an enlarged perspective view of a first foot design option of the apparatus of the second embodiment of the present invention. In the embodiment of FIG. 3, support leg 220 is attached via two U-couplings 228 to allow support leg 220 to rest flat against a roof or other surface.

Figure 127:
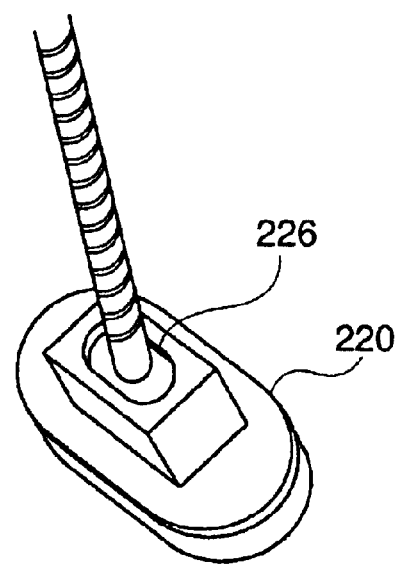

FIG. 127 is an enlarged perspective view of a second foot design option of the apparatus of the second embodiment of the present invention. In the embodiment of FIG. 4, support leg 220 is attached via ball joint 226 to allow support leg 220 to rest flat against a roof or other surface.

Figure 128:
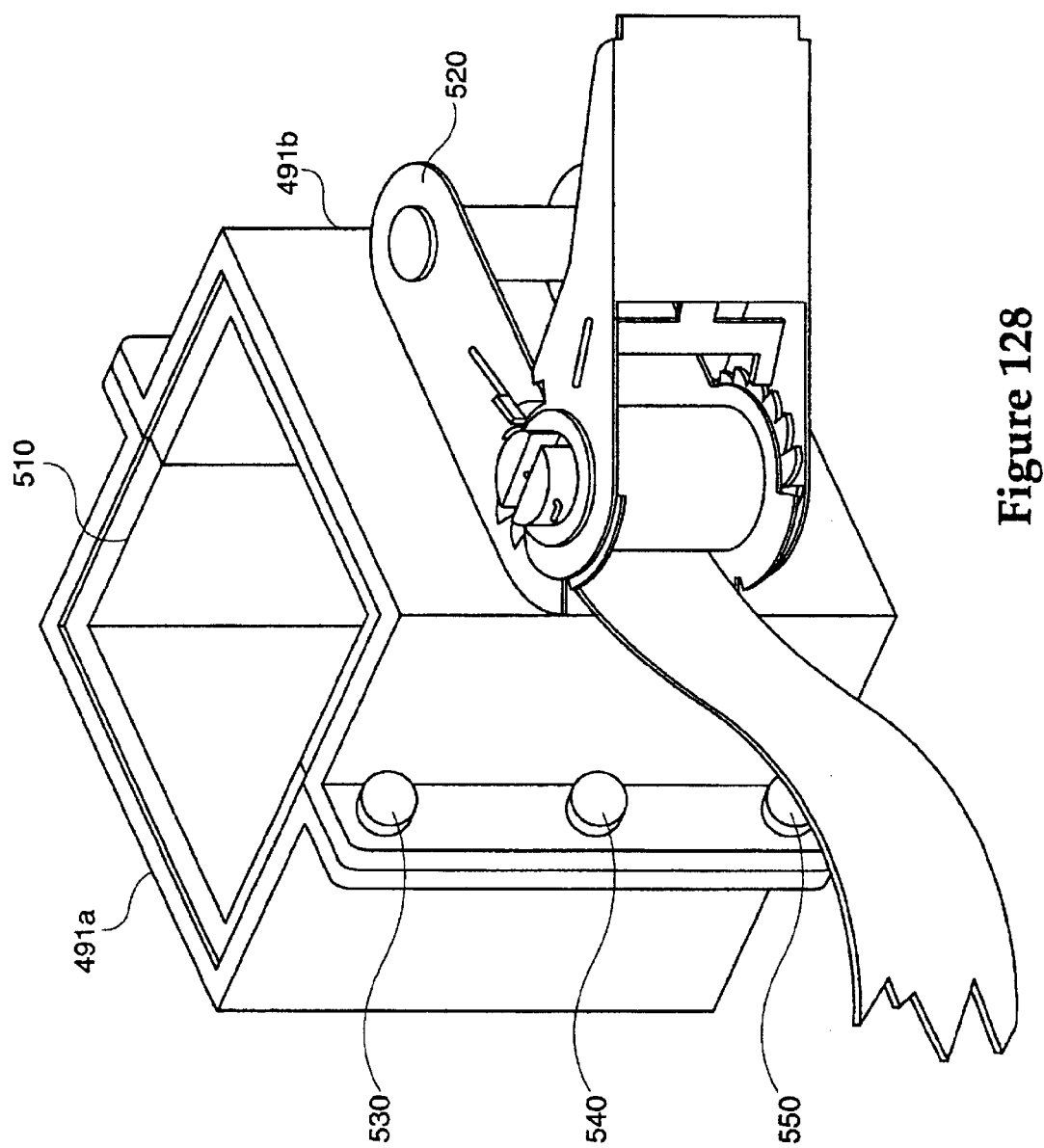

FIG. 128 is a perspective view of an improved embodiment of the SURE FOOT™ of the present invention. Reference is made to FIG. 49 of co-pending U.S. patent application Ser. No. 10/050,964, entitled "ROOFMATES™ ROOFING ACCESSORIES", filed Jan. 22, 2002, and incorporated herein by reference in its entirety. The embodiment of FIG. 128 of the present application is an improvement on the embodiment of FIG. 49 of the '964 application. FIG. 128 is a perspective view of one version of the SUREFOOT™ embodiment of the present invention with a ratchet strap mechanism 520 attached. The Sure-Foot in this embodiment may include a box clamp device encompassing parts 491a and 491b which may be wrapped around a ladder leg. The box clamp device 491a, 491b may be lined with foam rubber 510 to securely grip various ladder leg sizes without damaging or marring the ladder leg.

Unlike prior embodiments which utilized hinges and threaded nuts to secure, the embodiment of FIG. 128 may be bolted or riveted to a ladder using fasteners 530, 540, 550 provided on either side of parts 491a and 491b (the fasteners on the far side of the device are not shown). This embodiment allows the box clamp device to be semi-permanently attached to a ladder in a secure manner which prevents the user from inadvertently loosening or otherwise disturbing the clamp. Also, in use, it has been shown that some roofers cannot readily understand the knurled knob embodiment as it is not as intuitive as the bolted clamp embodiment of FIG. 128.

Figure 129:
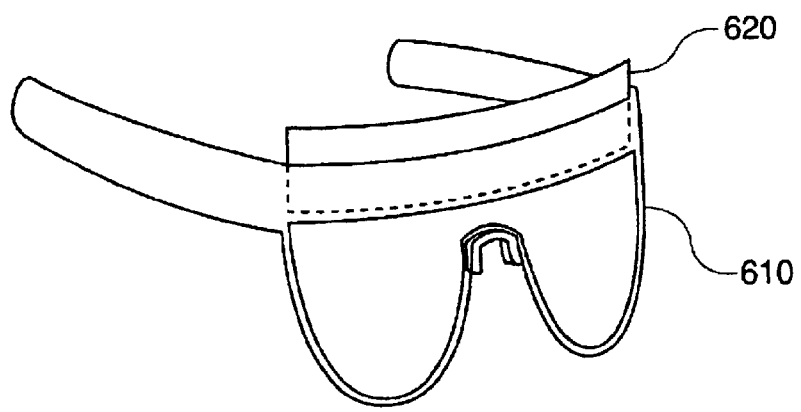

FIG. 129 is a perspective view of a first embodiment of the SWEATFAYS™ of the present invention. In this embodiment, a set of sunglasses 610 or goggles is provided with a built-in sweatband 620. By attaching the sweatband 620 directly to the goggles, any water or sweat running down the forehead is absorbed before it can run into the eyes. Sweatband 620 may be attached to goggles 610 by use of velcro or the like so as to be removable and replaceable from goggles 610.

Figure 130:
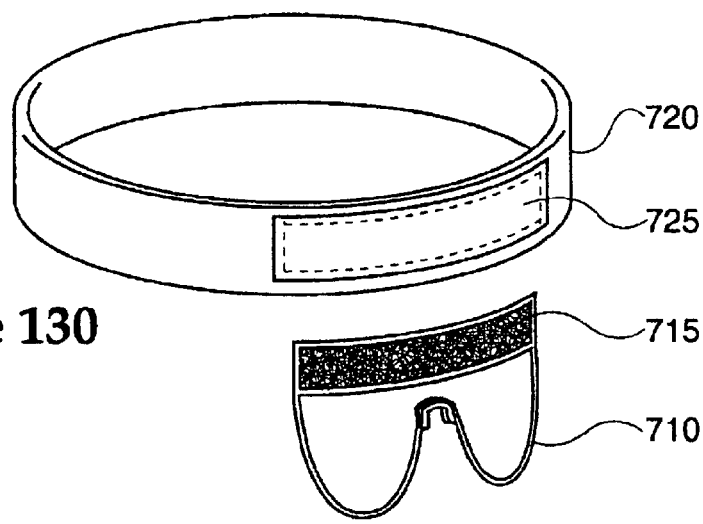

FIG. 130 is a perspective exploded view of a second embodiment of the SWEATRAYS™ of the present invention. In this embodiment, a sweatband 720 is provided with an attachable eye shield 710. Sweatband 720 may comprise, for example, a terry cloth sweatband as known in the art, or other type of headband, bandanna, or the like, preferably made of an absorbent material eye shield 710 may comprise a safety eye shield of clear plastic (e.g., polycarbonate) or may be shaded, polarized, or otherwise colored or treated to protect against UV rays, prevent glare, or the like, as is known in the sunglasses art.

Figure 131:
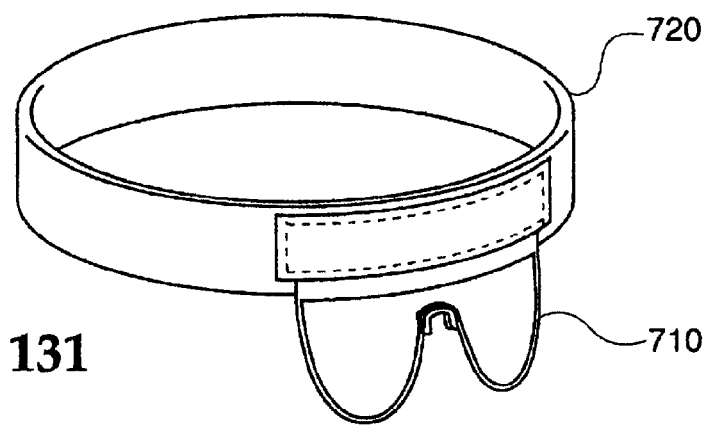
Figure 132:
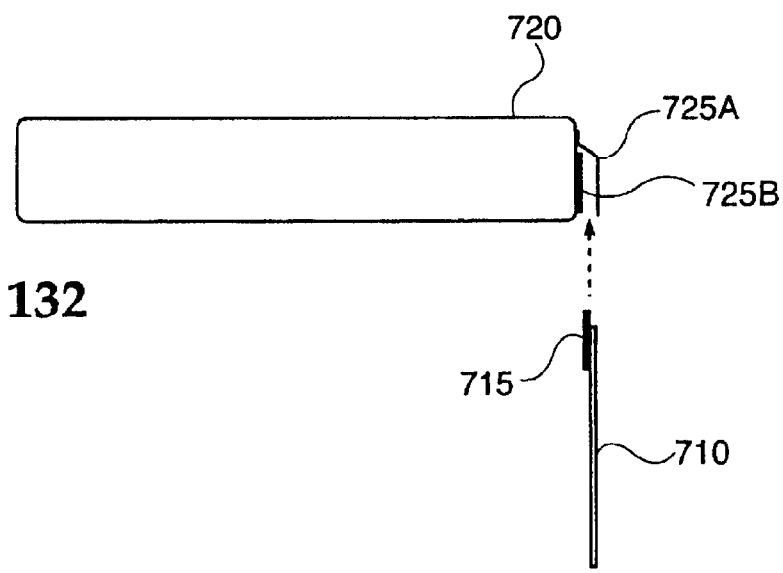

FIG. 131 is a perspective assembled view of the second embodiment of the SWEATRAYS™ of the present invention. As illustrated in FIGS. 130–132, eye shield 710 may be attached to sweat band 720 by means of hook-and-loop fastener portions 715 and 725. Hook-and-loop fastener portion 725 (e.g., VELCRO™ or the like) may be sewn to sweatband 720. Hook-and-loop fastener portion 715 may be attached to eye shield 710 by means of adhesive or the like. It should be noted that other types of removable fastening mechanisms (e.g., snaps, adhesives or the like) may be used without departing from the spirit and scope of the present invention.

FIG. 132 is a side exploded view of the second embodiment of the SWEATRAYS™ of the present invention. In this view, hook-and-loop fastener portion 725 comprises two portions 725A and 725B. Portion 725B comprises a hook-and-loop fastener (e.g., hook portion) which may interface with hook-and-loop fastener portion 715 (e.g., loop portion). Portion 725B comprises a cloth cover which slides over eye shield 710 and may be sewn to headband 720 on three sides, leaving a bottom side open to accept eye shield 710.

Cloth cover 725B not only provides an improved appearance to the overall device, but the tension produced by the cloth cover 725B against eye shield 710 pushes eye shield 710 against hook-and-loop fastener portion 725 to insure that eye shield 710 does not come loose when in use. Without cloth cover 725B, eye shield 710 would tend to un-stick from hook-and-loop fastener portions 715 and 725 and eye shield 710 would fall off as a result. This cloth cover 725A may be applied to other embodiments of the present invention as well.

It should be noted that eye shield 710 may take the form of a face shield, eyeglasses, or other combination of plexiglass, polycarbonate, glass, or other transparent, semi-transparent, translucent (or even in some circumstances, opaque) material for shielding the face and/or eyes.

FIG. 133 is a perspective view of a third embodiment of the SWEATRAYS™ of the present invention. In this embodiment, a bandanna or "dew rag" 1020 is provided, either pre-sewn in a headband or hat configuration or provided as a plain bandanna. Such pre-sewn bandannas are particularly popular with motorcyclists and the embodiment of FIG. 133 may be applied to the motorcycling and other recreational fields as well.

In both the embodiments of FIG. 132 and FIG. 133, hook-and-loop fasteners such as Velcro® may be used to secure the lenses to the sweatband or bandanna. In a preferred embodiment, a hook-and-loop fastener may be provided on the sweatband or bandanna with a mating hook-and-loop fastener on a tear-off strip fastened at one end to the sweatband or bandanna. The lens(es) may be provided with complimentary hook-and-loop fasteners on either side of a top portion thereof, such then when a user wishes to install the lens(es) all they need do is pull up on the tear-off strip, insert the lens(es) onto the hook-and-loop fastener on the sweatband or bandanna, and then reapply the tear-off strip to the outer surface of the lens(es) to secure the lens(es) and provide a finished appearance to the overall apparel.

In addition, the lens(es) may be provided with a hinge or adjustment mechanism to allow a user to adjust the angle of the lens(es) to compensate for different size heads, foreheads, and the like. Alteratively, the lens(es) could be provided with a stepped portion to allow the lens(es) to sit further from the face of the user. Prescription lens(es) may also be provided.

One problem with safety equipment is getting workers to wear and use it. Workers may be adverse to using a particular piece of safety equipment if they feel awkward or feel they look ridiculous or silly. Given the popularity of the "dew rag" or bandanna headgear, the embodiment of FIG. 133 may overcome these problems.

As illustrated in FIG. 133, eye shield 1010 may be attached to bandanna 1020 by means of hook-and-loop fastener portions 1015 and 1025. Hook-and-loop fastener portion 1025 (e.g., VELCRO™ or the like) may be sewn to bandanna 1020. Hook-and-loop fastener portion 1015 may be attached to eye shield 1010 by means of adhesive or the like. It should be noted that other types of removable fastening mechanisms (e.g., snaps, adhesives or the like) may be used without departing from the spirit and scope of the present invention.

It should be noted that the cloth cover 725A of FIG. 132 may be applied to the invention of FIG. 133. In the preferred embodiment, cloth cover 725A may comprise an absorbent material sewn to the inside of bandanna 1020 such that it is not visible from the outside of bandanna 1020 and also acts as an sweat band. In this manner, the bandanna 1020 provides no outward appearance of having any attachment means for eye shield 1010. It should also be noted that eye shield 1010 may be provided in various shapes such as those presently popular with sports sunglasses and the like.

FIG. 134 is a perspective view of the apparatus of the fourth embodiment of the present invention. In this embodiment of the present invention, a cooling system is provided to spray water on the face and neck area of an individual. A large liquid reservoir 100, which may be molded to the shape of the back, is provided with a pressure pump 110. Reservoir 100 may be pressurized to force liquid through flexible tube 120. Spray or misting nozzles 150 may be provided to spray the user's head and neck area to provide cooling. A valve 130 may be provided to allow the user to control the flow rate and/or turn the apparatus on or off.

Liquid reservoir 100 may be provided with cap 111 to allow reservoir 100 to be filled with cold water or other liquid. Cap 111 may be made large enough (which may require mounting on the back or other portion) to allow ice water to be filled into liquid reservoir 100. Other liquids such as alcohol, which also provides an evaporative cooling effect, may be used in reservoir 100 without departing from the spirit and scope of the present invention.

FIG. 135 is an enlarged perspective view of the first embodiment of the present invention illustrating the spray ring as attached to a Hard hat 1200. Spray ring 130 may comprise a number of hose sections connected to spray or misting nozzles 150. Spray ring 130 may be disassembled to install onto a heard hat by means of clips or adhesive clamps 1220. Spray or misting nozzles 150 may comprise any one of a number of evaporative cooling nozzles known in the art, or may comprise fine holes drilled into a section of tubing to provide appropriate spray patterns. The number and size of such nozzles may be varied to provide desired spray patterns and effectiveness. Note that while illustrated in FIG. 135 as an assembly of nozzles and tubes, the entire apparatus may be made as one piece of tubing or plastic. In addition, the ring shape of FIG. 135 may be substituted by a U-shape or linear array without departing from the spirit and scope of the invention.

FIG. 136 is an enlarged perspective view of the first embodiment of the present invention illustrating the spray ring as mounted to a baseball hat. Spray ring 130 may be clipped to hat 300 by means of clips 310. Clips 310 may comprise velcro strips, metal or plastic clips, or the like. In this embodiment, hat 300 keeps spray ring 130 in place where water may spray down on the user. Spray ring 130 may be suitably arranged to prevent water from being sprayed directly into the eyes of the user.

FIG. 137 is an enlarged perspective view of an alternative fourth embodiment of the present invention illustrating the use of electric fans to spray and cool the user. In this embodiment, a reservoir 1400 may be provided to hold cold water, ice water, or other liquid. As in the embodiment of FIG. 134, reservoir 1400 may be molded to fit the back. Reservoir may be fitted with a hand pump to pressurize reservoir 1400. However, in the preferred embodiment, a small battery-powered pump 1420 may be provided, powered by rechargeable battery 1430 (e.g., 12–14 V power tool rechargeable battery pack) controlled by a switch 1440, to send pressurized water to spray rings 1470.

Switch 1450 may control current to one or more fans 1460 coupled to spray rings 1470. In operation, the user may wear reservoir 1400 as a back pack secured by straps 1480. The user may select a fan only mode by switching on fan(s) 1460 using switch 1450. Additional cooling may be achieved by switching on pump 1420 via switch 1440 to pump water from reservoir 1400 through spray rings 1470 via tubing 1490.

FIG. 154 is a perspective view of an alternative embodiment of the apparatus of FIG. 137. FIG. 155 is a top view of the apparatus of FIG. 154. In the embodiment of FIG. 154, an electric fan or fans 3160 may be used to force air through an ice-filled backpack tank 3100 and out nozzles 3150 to provide a stream of air-conditioned air to a user. In this embodiment, reservoir 3100 may be provided to hold cold water, ice water, or other chilled liquid, filled through cap 3190. As in the embodiment of FIG. 134, reservoir 3100 may be molded to fit the back.

In an alternative embodiment, the nozzles 3150 may be removed and suitable flexible hoses attached thereto which may be fed together (e.g., through a "T" fitting) or separately to a headgear such as a hardhat or the like to provide cooling to the head of the wearer.

Fan 3160 may be mounted to the back of reservoir 3100 or may be provided inside of reservoir 3100 within an air plenum chamber molded into the back of reservoir 3100. In the preferred embodiment, a small battery-powered fan 3160 may be provided, powered by rechargeable battery 3130 (e.g., 12–14 V power tool rechargeable battery pack) controlled by a switch 3140, to send intake air through heat exchanger tubes 3170 to nozzles 3150.

Switch 3140 may control current to one or more fans 3160. In operation, the user may wear reservoir 3100 as a back pack secured by straps 3180. The user activate fan(s) 3160 by switching on fan(s) 3160 using switch 3140. Air is drawn into the fan plenum through a suitable intake and then passes through heat exchanger tubes 3170 where the air is chilled by the contents of reservoir 3100. Chilled air is then directed toward a user's face and neck area by nozzles 3150.

FIG. 138 is a perspective view of a water cooler of the fifth embodiment of the present invention. In this sixth embodiment of the present invention, a water cooler 1501 with an adjustable base for use on a roof or other slanted surface is provided. The water cooler and support may be marketed under the name WATERMATE™, a trademark of the inventor. Roof plate 1502 may be backed with a layer of rubber foam (not shown) (e.g., 1" thick, medium density foamed polyurethane or upholstery type foam commonly found in fabric stores).

Roof plate 1502, having a substantial surface area and being backed with the foam layer, will tend to grip the roof surface and not slide off. The Foam layer tends to conform to the rough surface of the roof and thus does not readily slip off. Foam layer may be sufficient to support the insulated water container 1501, which may comprise, for example, a five gallon insulated water cooler.

By using a layer of foam as opposed to nailing or screwing, the water cooler of FIG. 138 may be readily moved from place to place on the roof. Alternately, one or more nail holes may be provided to secure the apparatus or act as a safety backup to the foam layer. Support platform 1502 may supports water container 1501. Pivots 1506 hold adjustment bar 1504 which may be placed into notches 1501a in roof plate 1502. The other end of water container 1501 may rotate with respect to roof plate 1502 via shaft 1504a.

Water container 1501 may be provided with tap and nozzle assembly 1509 to dispense water. Cap 1510 may be threaded or snap into place and may be made wide enough to accept ice cubes and the like. The low profile of water container 1501 reduces the likelihood of tipping and also allows the entire assembly to be compact. Although not shown in FIG. 12, the flat top of water container 1501 may be mounded with a tray for holding articles such as tools, water cups, or the like. Alternately, a water cup dispenser may be attached to the assembly.

In a seventh embodiment, known as ROOFMISTER™, a water tank and pump may be provided on the ground, fed to one or more misting nozzles mounted on a rooftop. FIG. 139 is a perspective view of the misting nozzle portion of the seventh embodiment of the present invention. In this embodiment of the present invention, a large (e.g., 425 gallon) plastic or metal tank may be provided at a ground location, mounted to a highway trailer, wheelbarrow, cart, or the like, or mounted in a pickup truck bed. A high pressure pump, such as provided for a pressure washer or the like, may be used to pump and pressurize the water.

The pressurized water may then be fed through hose 1606 to one or more nozzles 1604 via valves 1605. Nozzle(s) 1604 may be mounted to strategic locations on a roof top, work site, or other desired location by means of mounting bracket 1601 provided with nail holes 1607. Nozzle 1604 may be pivoted to aim the resultant water spray by swivelling upper bracket 1602 in relation to lower bracket 1601 via pin 1603.

FIG. 140 is a side view of the eighth embodiment of the present invention illustrating a battery or solar powered cooling fan and mister provided with a built-in water tank and roof mount. This embodiment is similar to that of FIG. 138 in the details of the roof mounting apparatus. However, water tank 1740 may be mounted to the base plate which may be held in place on an inclined roof by foam pad 1750 or by nails 1760.

Electric pump 1790 may pump water through water line 1720 to mister nozzle 1710. Fan 1720 (illustrated here as a squirrel cage fan) may blow air through the mist produced by nozzle 1710 to create a cooling breeze for roofers or other workers.

Pump 1790 may be powered by a rechargeable battery pack 1770 (e.g., 12–18 V portable power tool battery pack known in the art) or may be powered (or the battery recharged by) solar panel 1780.

FIG. 141 is a perspective view of a ninth embodiment of the present invention in which a radial fan powered by 110 Volts or the like, may be used in an adjustable platform, provided with a mist spray fed by a ground mounted tank. It should be appreciated that this embodiment, or components thereof, may be used in conjunction with the embodiments of FIGS. 138–141, and these components may be mixed and matched to produce other various embodiments.

In the illustrated embodiment of FIG. 141, a ground mounted tank 1810 is provided. Ground mounted tank 1810 may comprise a large (e.g., 425 gallon) plastic or metal tank may be provided at a ground location, mounted to a highway trailer, wheelbarrow, cart, or the like, or mounted in a pickup truck bed. A high pressure pump, such as provided for a pressure washer or the like, may be used to pump and pressurize the water. Alternately, a low pressure pump may be provided to get water up to rooftop level where it may be pressurized by mister pump 1830. In yet another configuration, water tank 1810 may be mounted so as to provide a gravity feed to mister pump 1830. In yet another configuration, mister pump 1830 may pull water up from a lower level.

Mister pump 1830 and fan 1840 may be powered by 110 Volts A/C power or other electrical "mains" power supply so as to eliminate the need for batteries or solar panels and the like. In another configuration of the present invention, mister pump 1830 and fan 1840 may be powered by batteries, solar panels, or the like. Fan 1840 is illustrated here as a radial fan as is known in the art and may be adjustable in a number of directions so as to direct air flow to the user(s). In addition, fan 1840 may be an oscillating type fan so as to circulate air in an oscillating manner.

Fan 1840 may be provided with mister ring 1850 provided with mister sprayers. Fan 1840 may be mounted to a roof mount 1870 provided with foam backing 1860 and/or nail holes (not shown) in a similar manner to that of FIG. 140.

FIG. 156 is a perspective view of the eighth embodiment of the present invention illustrating a battery or solar powered cooling fan and mister provided with an external water tank and roof mount. This embodiment is similar to that of FIG. 138 in the details of the roof mounting apparatus. However, water tank 3340 may be provided at ground level on a trailer or pickup bead, for example.

Electric pump 3390 may pump water through water line 3320 to mister nozzle 3310. Fan 3320 (illustrated here as a squirrel cage fan) may blow air through the mist produced by nozzle 3310 to create a cooling breeze for roofers or other workers.

Pump 3390 may be powered by a rechargeable battery pack (not shown) such as a 12–34 V portable power tool battery pack known in the art, or may be powered (or the battery recharged by) a solar panel (not shown).

FIG. 157 is a perspective view of an alterative version of the ninth embodiment of the present invention in which a squirrel cage fan 3320 may be powered by 110 Volt power cord 3410 or the like, and may be provided with an adjustable platform 3370, provided with a mist spray fed by a ground mounted tank 3340. It should be appreciated that this embodiment, or components thereof, may be used in conjunction with the embodiments of FIGS. 138–141, and these components may be mixed and matched to produce other various embodiments.

In the illustrated embodiment of FIG. 157, a ground mounted tank 3340 is provided. Ground mounted tank 3340 may comprise a large (e.g., 425 gallon) plastic or metal tank may be provided at a ground location, mounted to a highway trailer, wheelbarrow, cart, or the like, or mounted in a pickup truck bed. A high pressure pump (not shown) such as provided for a pressure washer or the like, may be used to pump and pressurize the water. Alternately, a low pressure pump (not shown) may be provided to get water up to rooftop level where it may be pressurized by mister pump 3390. In yet another configuration, water tank 3340 may be mounted so as to provide a gravity feed to mister pump 3390. In yet another configuration, mister pump 3390 may comprise a high pressure, pump which may pull water up from a lower level, as illustrated in FIG. 157.

Mister pump 3390 and fan 3320 may be powered by 110 Volts A/C power or other electrical "mains" power supply 3410 so as to eliminate the need for batteries or solar panels and the like. In another configuration of the present invention, mister pump 3390 and fan 3320 may be powered by batteries, solar panels, or the like. Fan 3320 is illustrated here as an squirrel cage type fan as is known in the art and may be adjustable in a number of directions so as to direct air flow to the user(s).

Fan 3320 may be provided with misters sprayers 3310. Fan 3320 may be mounted to a roof mount 3370 provided with foam backing (not shown) and/or nail holes (not shown) in a similar manner to that of FIG. 138.

FIG. 159 is a perspective view of the SUNTAN CHAIR AND MISTER of the present invention. In this embodiment, a lawn chair or the like may be provided with a small battery powered (or other power source) fan and mister which may be bolted to, clipped to, integrated into, or placed adjacent to, the lawn chair. As illustrated in the Figure, a reel may be provided to reel out hose and/or power connections to the fan and mister. In use, a sunbather or the like may lay in the chair and control the amount of air and mist via valves and switches (as shown above) to provide a cooling mist spray as in the previously described embodiments of the ROOFMISTER™ and the like described herein.

FIG. 142 is a perspective view of the tenth embodiment of the present invention, a ROOFWINCH™, which is provided to allow a roofer or other worker to lift materials and pump jack poles up to a roof. The ROOFWINCH™ may be secured to a roof by means of nail holes 1940. Spool 1930 may contain a length of rope, wire, cable, chain, or the like 1910 sufficient to reach the ground from most residential and light commercial buildings. Bar 1920 may be used to guide rope, wire, cable 1910 over the edge of the roof. Handle 1950 may be used to raise and lower materials, and in particular, pump jack poles.

When installing pump jack poles for use in home construction or renovation, a worker on the ground may tie a rope to one end of the pump jack pole, while a worker on the roof hoists the pump jack pole into position. This Prior Art technique has some disadvantages, as it is dangerous for the roof worker to lean over the roof to hoist the pump jack pole up manually. The worker could fall due to the poor balance situation, or accidentally drop the pump jack pole, injuring workers below or damaging the house (e.g., though the window). Moreover, the rope attached to the pump jack pole itself may come loose and cause the pump jack to fall.

In operation of the present invention, on the other hand, a far end of rope, wire, cable 1910 may be attached to the pump jack pole using a unique apparatus described below, and the winch of FIGS. 142–143 or 144–145 may be used to safely lift the pump jack pole into place.

FIG. 143 is a top view of the apparatus of FIG. 142. FIG. 144 is a perspective view of an alternative embodiment of the apparatus of FIG. 142. FIG. 145 is a top view of the apparatus of FIG. 144. In the embodiment of FIGS. 144–145, an electric gear motor or the like 2150 is substituted for handle 1950. A small battery pack, such as a 12–18 V battery pack used for rechargeable power tools, may be used to drive motor 2150. A suitable reversing switch may be provided to control direction of travel, and possibly speed as well, using a switch mounted to the device, or on a remote control.

FIG. 146 is a perspective view of the pump jack pole holder 2300 of the tenth embodiment of the present invention. Pump jack pole holder 2300 may be provided with a hinged portion hinged at hinge 2340 and secured by wing nut or the like 2330. Cable or rope 1910 may be attached to eye 2310 using a clip or the like or with a knot or other attaching means. Rollers 2320 are provided on all four interior sides of pump jack pole holder 2300 to allow pump jack pole holder to slide freely on a pump jack pole.

FIG. 147 is a perspective view of the apparatus of FIGS. 142–143 and 146 as used to haul up a pump jack pole. In operation, pump jack pole holder 2300 is placed around a pump jack pole 2410 at ground level. Winch 1900 (or 2100) may then be activated to raise the pole. A worker at ground level may hold the bottom edge of the pole in place. As pump jack pole 2410 is lifted, pump jack pole holder 2300 may slide up the length of pump jack pole 2410. In the illustration of FIG. 147, the pump jack pole is illustrated as shorter than the roof edge. However, in actual practice, it is likely that pump jack pole 2410 will be taller than the roof edge, so that pump jack pole holder 2300 will not likely slip off of pump jack pole 2410.

FIG. 148 is a perspective view of the FLASHING MASTER™ 2500 of the present invention. FIG. 149 is a front view of the FLASHING MASTER™ 2500 of the present invention. FIG. 150 is a side view of the FLASHING MASTER™ 2500 of the present invention. In this embodiment of the present invention, a box 2510 is provided with a means 2730 for supporting a roll bar 2720 which may support a roll of flashing material 2560.

Flashing material 2550 from roll 2560 may be fed through slot 2570 to dispense a portion of flashing material 250 from roll 2560. In this manner, the roll of flashing material 2560 is protected from abuse and neglect. Rolls 2560 may be inserted into box 2510 by lifting lid 2520 which may be attached by hinge 2530. Note that slot 2570 may be made a portion of the opening formed by lid 2520 or the like.

In addition, the apparatus 2500 of FIGS. 148–150 may also be used to cut and measure flashing material 2570 as follows. A cutting bar 2540 may be provided in slot opening 2570 or the like to allow for easy cutting of flashing material 2550. A measuring indices 2580 may be provided on the face of slot 2570 to allow for measurement of flashing portions. In addition, a measuring tape or the like may be attached to or near slot 2570 to allow lengths of flashing material 2550 to be measured before cutting.

FIG. 152 is a perspective view of the ROOFLADDER™ adjustable ladder platform 2900. FIG. 153 a perspective view of the ROOFLADDER™ 3000 and safety strap 3010. In this thirteenth embodiment of the present invention, a variation on applicant's ROOFLADDER™ 3000 is provided. In this invention, a ladder 3050 may be attached to a plate 3060 provided with a foam backing 3040. Foam backing 3040 prevents ladder 3050 from slipping off a roof surface and also prevents ladder 3050 from marring the roof surface.

Plate 3060 may also be provided with nailing holes 3020 to allow the ladder to be nailed to roof trusses. In this manner, ROOFLADDER 3000 may be secured to a roof without marring the roof surface or slipping off. As opposed to prior art ridge-hooked ladders, the ROOFLADDER™ of the present invention may be pushed upward onto a roof from the bottom, and then nailed at the bottom through nailing holes 3020. As noted in applicant's earlier filed Provisional Application incorporated above, sections of ROOFLADDER™ may be connected together much in the same way as sections of model railroad track. Thus, a roof ridge is not needed to secure ROOFLADDER™ to a roof.

As illustrated in FIG. 153, a ladder mounted platform 2900 with an adjustable angle plate may be provided to support materials, persons, or scaffold boards. A safety cable 3010 may be provided to secure persons or materials. FIG. 152 illustrates a more detailed view of the ladder mounted platform 2900 which may be used in conjunction with ROOFLADDER™ 3000 or other types of ladders. Platform 2900 may be used to support a scaffolding board between two parallel, spaced apart ROOFLADDERS™ 3000.

Platform 2900 may include base plate 2910 which may be secured to ladder rungs via top hooks 2920 and bottom hooks 2930. Gravity may hold the platform in place, or optional clips, straps, wires, or safety chains may be used to prevent platform 2900 from sliding out of place. Adjustable plate 2940 may support a scaffolding board, or may be used as a work or tool platform (e.g., bucket of paint, shingles, etc.) or may be used to stand on, sit on, or the like. Adjustment mechanism 2950 may be used to adjust the angle of adjustable plate 2940 to make it substantially level. Adjustment mechanism 2950 may incorporate one of the many adjustment techniques used by applicant in the disclosed embodiments in the present application and the applications incorporated by reference. Standard roof pitch adjustments may be provided.

FIG. 156 is a perspective view of an alternative embodiment of the eighth embodiment of the present invention. FIG. 157 is a perspective view of an alternative embodiment of the ninth embodiment of the present invention with an external water tank shown. FIG. 158 is a side view of the alternative embodiment of the ninth embodiment of the present invention of FIG. 157.

FIG. 160 is a side view of the LADDER BRACE™ of the present invention. FIG. 161 contains several views of the components of the LADDER BRACE™ of the present invention. In this embodiment of the present invention, a ladder 3701 may be clamped by bracket 3705 using bolts, wing-nuts, clamps and/or clips 3706. Bracket 3705 is in turn supported by box bracket 3703 which is clamped to pump jack pole 3702 via bolts, wing-nuts, clamps and/or clips 3704. Once attached to pump jack pole 3702, ladder 3701 is firmly secured and may be used to access a scaffold or the like attached to pump jack pole 3702.

FIG. 162 is a perspective view of another embodiment of the ROOF HOIST™ of the present invention. In this embodiment, the ROOF LADDER™ described above may be provided with a battery or 110 V powered laddervater type mechanism as is known in the art. The adjustable platform of the ROOF LADDER™ described above may be used to allow the materials to be loaded level on the movable platform. Once loaded, the platform may travel up and down the ROOFLADDER™ on suitable wheels mounted to the ROOFLADDER™ in a similar manner to railroad wheels or the like.

FIG. 163 is front view of the LADDER GROUND SUPPORT of the present invention. In this embodiment, a wedge-shaped apparatus is inserted under the low side of a ladder. Ground spikes may be driven into the ground as shown to prevent the apparatus from slipping. A suitable adjusting means (shown here as a screw jack) may be used to level the ladder surface. The top surface of the apparatus may be provided with a ladder foot pocket or rest or may be bolted or otherwise attached to the ladder.

FIG. 164 is a perspective view of the ROOFTANK™ 1600 of one embodiment of the present invention, illustrating how two tanks 1610 may be connected in series with a hose or U-shaped tube 1630, and attached to a support structure 1660. The ROOFTANK™ 1600 may comprise one or more air tanks formed from standard PVC pipe 1610. In the preferred embodiment, 3" PVC pipe may be used, although other sizes of PVC pipe may also be employed. ROOFTANK™ 1600 may provide an independent source of air for a nailgun or other air powered tool, or may act as an air accumulator such that when multiple roofers are using the same air compressor, air pressure will not drop off as rapidly.

The ROOFTANK™ may be constructed by putting standard PVC plumbing end caps 1620 onto a selected length of 3" or other sized pipe 1610. Such pipes may be rated for hundreds of pounds of pressure, and thus can withstand the 90–110 lbs of pressure produced by most tool compressors. Threaded fittings 1640, 1650 may be provided on the end caps 1610, either by threading the end caps 1610 or by using suitable adapters (or by providing a specialized end cap with a threaded portion). In the embodiment of FIG. 164, a U-shaped tube 1630 may be used to connect two end caps 1610 together.

Male and female air hose quick-connects 1640, 1650 may be provided to allow ROOFTANK™ 1600 to be connected to an air hose on one end and an air tool hose on another. Self-sealing quickconnects 1640, 1650 may be used, or the connects 1640, 1650 may be valved to allow the tank to hold air and be used as a stand-alone air supply.

The entire apparatus may be mounted to one of the adjustable roof material stands 1660 disclosed previously in the present application, as illustrated in FIG. 164. Note that the ROOFTANK™ may also be mounted to a roof using other means, and the length shown is by way of example only. Since PVC pipe is inexpensive (e.g., a few dollars for a 10 foot length), a large ROOFTANK™ may be formed at little expense.

FIG. 165 is a top view of the ROOFTANK™ of one embodiment of the present invention, illustrating how two tanks may be connected in series with a hose or U-shaped tube 1630. FIG. 166 is a top view of the ROOFTANK™ of one embodiment of the present invention, illustrating a single tank which may be used by itself or in series with other tanks. In the embodiment of FIG. 166, the ROOFTANK™ may be provided with a male quickconnect 1640 on one end and a female quickconnect 1650 on the other. In such an embodiment, capacity of the ROOFTANK™ may be increased by joining two or more ROOFTANKS™ together. Alternatively, a single ROOFTANK may be attached directly to an air tool to provide a portable temporary air supply.

FIG. 168 is a perspective view of another embodiment of the SUREFOOT™ ladder bracing apparatus of the present invention known as the LADDERSPIKE™. In this embodiment, a double hook 1681 may be provided which will attach to a ladder rung 1685 (shown in dashed lines). A spike 1682 may then be driven through a corresponding hole 1683 in the LADDERSPIKE™ into the ground or into other materials, to steady the ladder.

The LADDERSPIKE™ may be used at the bottom of the ladder, as shown, or may be used to secure a ladder at the top, to a roofing surface or other surface, using nail(s), screw(s), or the like. The apparatus may be stamped from one piece of metal, seriously reducing costs as compared to some of applicant's earlier embodiments of the SUREFOOT™ series of products.

The LADDERSPIKE™ apparatus of FIG. 168 may be approximately 12" in depth and approximately the width of standard ladder run (e.g., 10"). The pull loop 1684 shown near the spike hole is provided to allow the LADDERSPIKE™ apparatus to be removed from the ground when it is time to move the ladder.

FIG. 176 is a perspective view of another version of the GABLEMASTER™ of the present invention, known as the MINIMASTER™. This apparatus has very similar components to that of FIG. 1 of the present invention, but made be made smaller in size (e.g., 18" square). In addition, to simplify the design longitudinal struts may be provided only in one direction instead of two orthogonal directions as indicated in FIG. 1.

Main support table 1761 for the unit may support a ladder, siding jack, walking board, or the like and may be constructed from aluminum sheet of approximately ¼ inch in thickness. Support adjustment plates 1761 may be provided from aluminum angle stock or flat plate welded to support table 1761. In the alternative, support table 1761 and adjustment plates 17611 may be constructed from a single piece of cast aluminum.

Materials other than aluminum may be used, of course. However, for high strength and low weight, the inventor has found aluminum construction to work well. The apparatus of the present invention could be conceivably made of other metals (e.g., steel) or even from plastics or composites (e.g., fiberglass and/or carbon fiber construction) without departing from the spirit and scope of the present invention.

Pre-drilled holes 17616 may be provided in support adjustment plates 17611 at predetermined locations to secure a ladder leg, siding jack, or the like.

Main support bars 1762 may be fabricated from aluminum channel and are designed to be fastened to a roof truss on 24" centers. Although not illustrated here, an additional support bar 1762 may be provided in a slidable fashion on connecting rods 1764 and 1765. Such an additional support bar or bars may be used to secure the device to roof trusses which are not on 24" centers (e.g., 12" or 16" centers). Main support bars 1762 may be secured to roof trusses by nailing or screwing through pre-drilled holes 17612. If nails are used, double-headed nails are preferred, as they may be readily removed without damaging or marring the roof surface.

Typically, four to eight double-headed nails may be used to secure main support bars 1762 to a roof truss. Eight or more predrilled nail holes may be provided in each of main support bars 1762 in the preferred embodiment.

A plurality of grooves or notches 17610 may be cut into support bars 1762 to allow angle adjustment of main support table 1761 to compensate for different roof pitches. Connecting rod 1765 may be adjusted to a corresponding one of the notches 17610 to provide correct support to main support table 1761 via support bars 1763. Support bars 1763 may in turn be connected to main support table 1761 via rod pin 17615 and plate 17614 in a pivoting fashion. Connecting rod 1764 may rotate within the holes provided in main support bars 1762 and rotatably support platform 1761 via plates 1767 to allow for rotation with angle adjustment.

Connecting rod 1765 may be provided with spacers 1769 and carter pins 17613 to lock spacers 1769 in place. Spacers 1769 may provide proper alignment between connecting rod 1765 and main support bars 1762 to provide correct spacing for 24" (or the like) roof truss centers. In an alternative embodiment, multiple spacers or spacer positions may be provided to allow the apparatus to adjust to different roof truss spacings.

FIG. 177 is a front and side view of another embodiment of the SURETETHER™ of the present invention. In this embodiment, brackets 1771 are provided with mounting tabs 1777 which may be slid under siding. Once the siding job is complete, the SURETETHER™ can be removed by sliding it up so that the fasteners release through the keyhole slots 1774. The siding can then be snapped back in place, leaving the fasteners intact underneath. In the embodiment of FIG. 177, a cable 1772 may be used to tie together two of the tethers. Workers may attach safety harnesses or the like to this cable as shown by the loop 2773 in the center or at loops 1775 at the ends.

FIG. 178 is a perspective view of another embodiment of the SURETETHER™ of the present invention. Brackets 1781 are provided with mounting tabs 1787 which may be slid under siding. Once the siding job is complete, the SURETETHER™ can be removed by sliding it up so that the fasteners release through the keyhole slots 1782. The siding can then be snapped back in place, leaving the fasteners intact underneath. In this embodiment, a metal rod 1783 or the like is used in place of the cable of FIG. 177. The metal rod 1783 may be secured with washers, clips, threaded fasteners, cotter pins, or the like 1784 at each end, where the rod 1783 is fed through block 1785.

FIG. 179 is a front perspective view of another embodiment, of the SUREFOOT™ of the present invention. FIG. 180 is a side view of another embodiment of the SUREFOOT™ of the present invention of FIG. 179. FIG. 181 is a top view of another embodiment of the SUREFOOT™ of the present invention of FIG. 179. FIG. 181 is a rear perspective view of another embodiment of the SUREFOOT™ of the present invention.

This embodiment provides a means for securing a ladder 1795 to a pump jack pole 1821. Pump jack poles are used by siding workers and the like to secure a scaffold or walk board. Two approx 4"×4" aluminum poles may be secured to a building and the ground and a pump jack mechanism secured to each. A scaffold or walkboard is secured to the pump jack mechanisms.

When two workers kick the pump jack mechanism, the scaffold or walkboard can be raised or lowered accordingly. In use, when a worker wishes to come down from the scaffold, they are supposed to use the pump jack mechanisms to raise and lower the entire scaffold or walkboard. In reality, to save time, workers often lay a ladder against the scaffold or walkboard and use the ladder to ascend or descend from the walkboard. Laying a ladder against a movable walkboard or scaffold is dangerous, and moreover, OHSA and other regulatory agencies are requiring that all ladders on a jobsite be secured.

In the embodiment of FIGS. 179–181, a SUREFOOT™ is provided which may slidably secure a ladder 1795 to a pump jack pole 1821. Ladder bracket 1794 may secure to a ladder rung with wingnuts 1798 or the like through plate 1794 which may be hinged via piano hinge 1797. A rung-shaped clamp portion 1796 securely grips the rung of the ladder 1795. Rubber or foam may line the clamp to securely grip the ladder if necessary. Note that in the preferred embodiment, the apparatus attaches to a ladder rung. However, in other embodiments, the apparatus may attach to other ladder portions without departing from the spirit and scope of the present invention.

The pump jack clamp 1791 may attached to ladder bracket through brace 1800, which may be mounted at an angle of 75 degrees below horizontal in actual application, so as to slant the ladder at an angle of 75 degrees as required by OSHA. Other angles may also be used. Pump jack clamp 1791 may be provided with rollers 1799 and cotter pins 1792 (which may also act as axles to other rollers).

In the preferred embodiment, a single cotter pin 1792 may be used to secure the pump jack clamp 1791. Two sets of holes may be provided for a single cotter pin 1792, as illustrated in FIG. 180. The inner set of holes may be use when the ladder is at higher elevations and higher angles of attack of the ladder. The outer set of holes may be used at lower elevations and lower angles of attack of the ladder.

The apparatus may be attached to the pump jack pole 1821 above or below the pump jack. When secured above the pump jack, the raising motion of the pump jack will automatically raise the ladder (particularly an extension ladder) as the pump jack is raised.

FIG. 185 is a top perspective view of the ROOFCAN™ roofer's garbage can of the present invention. FIG. 186 is a bottom perspective view of the ROOFCAN™ roofer's garbage can of the present invention. ROOFCAN™ provides a portable easy-to-use waste receptacle for roofing waste in a container designed not to roll off an inclined roof. The can 1851 may be made oval in shape to resist rolling. One end of can 1851 may be closed off or both ends may be open as shown. Handles 1852 may be provided to allow ROOFCAN™ to be moved from place to place. Rubber or foam strips 1852 may be placed on the bottom of ROOFCAN™ to help prevent the ROOFCAN™ from rolling or sliding off a roof.

FIG. 187 is a perspective view of another embodiment of the ROOFER'S WINCH™ of the present invention. FIG. 188 is a perspective view of another embodiment of the ROOFER'S WINCH™ of the present invention. In this embodiment winch 1875 may be mounted to round base 1871 via round insert 1873 and secured in a particular position by pin 1872. Round base 1871 may be secured to a roof or other surface by nail or screw holes 1876. Winch 1875 may be driven by electric motor 1874 which may be battery or A/C powered. Alternatively, an air powered or other powered motor may be used.

In use, the angle of winch 1875 may be altered depending upon application or roof rake or the like by removing pin 1872 and rotating insert 1873 in round base 1871. Although illustrated here as having two sets of orthogonal holes, other numbers of holes may be provided for pin 1872 to provide multiple angles of adjustment. The winch may be used to hoist materials up a roof incline (e.g., via roofer's ladder or the like) or to hoist materials up from the ground. In FIG. 188, a winch arm 1881 is illustrated to allow the winch to be used to hoist materials up from the ground.

FIG. 189 is a perspective view of a first embodiment of the LADDER BUMP-OUT of the present invention. FIG. 190 is a perspective view of an exploded portion of the first embodiment of the LADDER BUMP-OUT of the present invention of FIG. 189. FIG. 191 is a perspective view of an exploded portion of an alternative embodiment of the LADDER BUMP-OUT of the present invention of FIG. 189.

In the embodiment of FIG. 189, a ladder bracket is provided which may attach to a ladder a telephone box, gutter, roof edge, or other edge surface. Ladder clamp 1891 is provided with a hinged flap 1892 attached to bracket 1891 via hinge 1893. Wingnuts 1919 may be used to secure flap 1892 to clamp 1891. Clamp 1891 and/or flap 1892 may be lined with rubber or foam to securely grip a ladder rung.

brace 1894 may be provided with adjustment mechanism 1898 and 1897 to adjust the angle of lip clip 1896 via arm 1895. Adjustment mechanisms 1898 and 1897 may be coupled together with bolts and wingnuts or the like or cotter pins or other adjustable apparatus. One attached to a ladder rung, the apparatus may be attached at lip clip 1896 to the edge of a telephone box, gutter, or other edge to secure the ladder. A safety strap 1901 may be wound around a pole or other structure and secured via clip 1894 to a hole in the apparatus or to the structure itself. Clamp 1902 may be used to tighten strap 1901.

In FIG. 190, an alternative embodiment is presented where a ladder bump out may be mounted to the apparatus of FIG. 189 in place of the lip clip. Ladder bumpout comprises arms 1903, adjustment mechanism 1897, and bumpout plate 1905 which may be lined with rubber or foam 1906. Bumpout plate 1905 may be adjustably attached to arms 1903 via bolt or clip holes 1904 or may be fixed by welding or other means. In use, the apparatus may be attached to a ladder rung, and the bumpout plate placed up against the side of a wall or other structure to hold the ladder securely without damaging the gutters or other structural items. The safety strap of FIG. 189 may be applied in the embodiment of FIG. 190.

In the embodiment of FIG. 191, the bumpout plate 1908, which may be lined with rubber or foam 1907, is provided with a depression to conform to the shape of a pole or other rounded object. Bumpout plate may be mounted in a fixed (or adjustable) manner to arms 1910 and 1911 which may be adjustably connected to a portion of the apparatus of FIG. 189. Screw or nail holes may be provided to secure the bumpout plate 1908 to the pole or other rounded object.

While the preferred embodiment and various alternative embodiments of the invention have been disclosed and described in detail herein, it may be apparent to those skilled in the art that various changes in form and detail may be made therein without departing from the spirit and scope thereof.

It should also be noted that the present inventor has built and tested most, if not all, of the embodiments set forth in the present application, and as a master roofer, has tested all of the apparatus successfully. To the best knowledge of the inventor, no such products are commonly or commercially available to roofers at the time of filing.

Note that the apparatus of FIG. 21 may also be suitably modified for jobs other than roofing. As marketed under the name PAINTMATE™, a trademark of the inventor, the apparatus of FIG. 21 may be suitable sized to hold paint cans (1 or 5 gallon) brushes, rollers, roller trays, and the like. Such an apparatus may be suitable for use both in the commercial (e.g., contractor) market as well as the retail (e.g., homeowner) market.

Also the apparatus of FIGS. 12–26 may be enabled as a double roof peak embodiment. Two of the apparatus of FIGS. 12–26 may be joined together (e.g., by a pin or fastener) to span a roof peak and hold additional materials. In the alternative, a specialized roof peak spanning unit may be manufactured. However, it may reduce inventory and parts count (as well as cost) to provide for two separate units to be joined as one single unit.

The roof peak embodiment may provide additional load carrying capacity as well as area, as the unit, spanning the peak, does not rely upon nails or screws placed in shear to prevent the apparatus from sliding off the roof. Rather, since the apparatus spans the roof peak, the loads are carried directly downward on to the roof structure. As a result, a larger load of materials (e.g., squares or pallets of shingles or the like) may be supported.

I claim:

1. A bracket for securing a ladder to a pump jack pole, comprising:
    a ladder attachment portion for securing the bracket to a portion of a ladder;
    a slidable pole attachment portion, for slidably attaching the bracket to a pump jack pole,
    wherein the slidable pole attachment portion comprises a C-shaped pump jack pole clamp for sliding over a pump jack pole, and the slidable pole attachment portion further comprises at least one roller provided on an inside portion of the C-shaped pump jack pole clamp for allowing the C-shaped pump jack pole clamp to slide over a pump jack pole.

2. The bracket of claim 1, wherein the ladder attachment portion comprises a rounded portion for gripping an underside of a ladder rung and a flat portion for gripping a topside of a ladder rung, with fastening means fastening the rounded portion and the flat portion together.

3. The bracket of claim 2, further comprising a brace, coupling the ladder attachment portion and the slidable pole attachment portion at a predetermined angle so as to place the ladder at a predetermined angle to the pump jack pole.

4. The bracket of claim 1, further comprising a brace, coupling the ladder attachment portion and the slidable pole attachment portion at a predetermined angle so as to place the ladder at a predetermined angle to the pump jack pole.

5. The bracket of claim 4, wherein the ladder attachment portion comprises a rounded portion for gripping an underside of a ladder rung and a flat portion for gripping a topside of a ladder rung, with fastening means fastening the rounded portion and the flat portion together.

* * * * *